(12) United States Patent
Nakayama

(10) Patent No.: US 6,996,593 B2
(45) Date of Patent: Feb. 7, 2006

(54) FILTER PROCESSING APPARATUS AND ITS CONTROL METHOD, PROGRAM, AND STORAGE MEDIUM

(75) Inventor: Tadayoshi Nakayama, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 567 days.

(21) Appl. No.: 09/982,916

(22) Filed: Oct. 22, 2001

(65) Prior Publication Data

US 2002/0078113 A1   Jun. 20, 2002

(30) Foreign Application Priority Data

Oct. 23, 2000 (JP) .............................. 2000-323040
Nov. 10, 2000 (JP) .............................. 2000-344311
Dec. 27, 2000 (JP) .............................. 2000-399331

(51) Int. Cl.
*G06F 17/10* (2006.01)

(52) U.S. Cl. .................................................... 708/316

(58) Field of Classification Search ............... 708/316, 708/319

See application file for complete search history.

(56) References Cited

U.S. PATENT DOCUMENTS

| | | | |
|---|---|---|---|
| 5,157,622 A * | 10/1992 | Makino et al. | 708/319 |
| 5,166,895 A * | 11/1992 | Makino | 708/319 |
| 5,581,373 A | 12/1996 | Yoshida | 358/476 |
| 5,801,650 A | 9/1998 | Nakayama | 341/67 |
| 5,818,970 A | 10/1998 | Ishikawa et al. | 382/248 |
| 5,841,381 A | 11/1998 | Nakayama | 341/67 |
| 5,986,594 A | 11/1999 | Nakayama et al. | 341/107 |
| 6,192,386 B1 * | 2/2001 | Shinde | 708/313 |
| 6,377,968 B1 * | 4/2002 | Nakase et al. | 708/319 |

* cited by examiner

*Primary Examiner*—Tan V. Mai
(74) *Attorney, Agent, or Firm*—Fitzpatrick, Cella, Harper & Scinto

(57) ABSTRACT

This invention has as its object to suppress an increase in circuit scale and to simplify a circuit structure by executing a filter process using a plurality of arithmetic units each of which makes multiplication and addition. To achieve this object, image data $Y_{n+2}$, $Y_{n+3}$, and $Y_{n+4}$ to be processed are read out, and three lattice point data $d'_{n+1}$, $S'_{n}$, and $d_{n-1}$ are respectively read out from sequences H1, H2, and H3 corresponding to line buffers that store the lattice point data. $d'_{n+3} = Y_{n+3} + \alpha(Y_{n+2} + Y_{n+4})$ is computed, and $d'_{n+3}$ is stored in the sequence H1. $S'_{n+2} = \beta(d'_{n+1} + d'_{n+3})$ is computed, and $S'_{n+2}$ is stored in the sequence H2. $d'_{n+1} = d'_{n+1} + \gamma(S'_{n+2} + S'_{n})$ is computed, and $d_{n+1}$ is stored in the sequence H3. $S_n = S'_n + \delta(d_{n-1} + d_{n+1})$ is computed, and $S_n$ and $d_{n+1}$ are output to the next processing stage.

18 Claims, 101 Drawing Sheets

⇩ VERTICAL FILTERING

⇩ HORIZONTAL FILTERING

FIG. 5

| Filter | Filter coefficients | |
|---|---|---|
| | FORWARD DIRECTION | REVERSE DIRECTION |
| 5×3 filter | H0 = [−1, 2, 6, 2, −1]/8<br>H1 = [−1, 2, −1]/2 | G0 = [1, 2, 1]/2<br>G1 = [−1, −2, 6, −2, −1]/8 |

FIG. 6

| Filter | Lifting coefficients | |
|---|---|---|
| | FORWARD DIRECTION | REVERSE DIRECTION |
| 5×3 filter | p = (−1, −1) /2<br>u = (1, 1) /4 | p = (−1, −1) /2<br>u = (1, 1) /4 |

F I G. 15
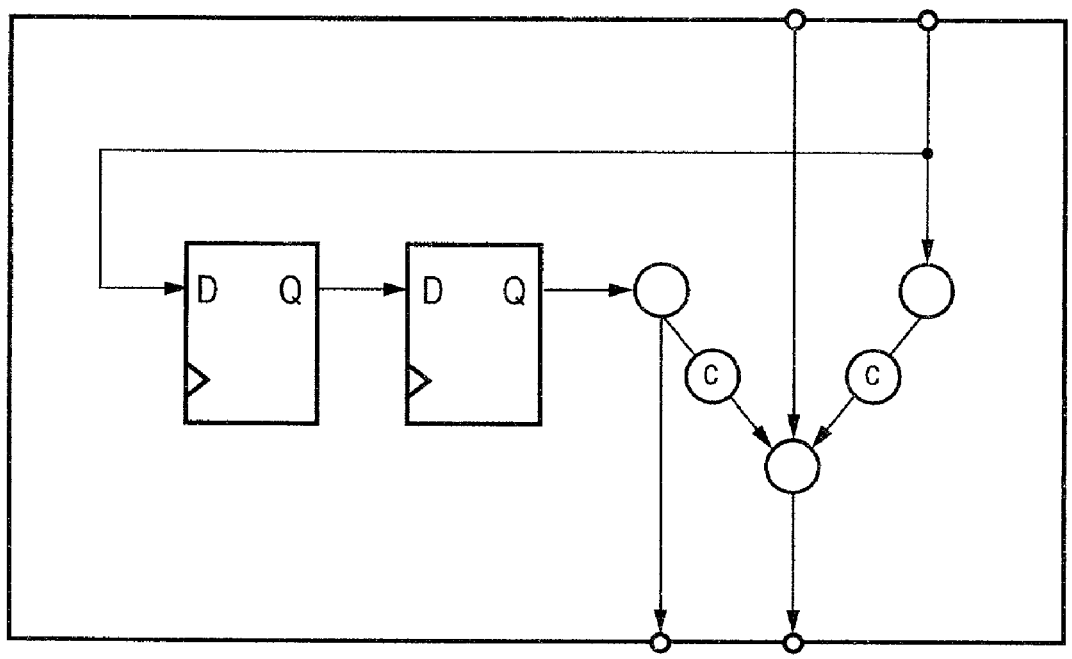

F I G. 99
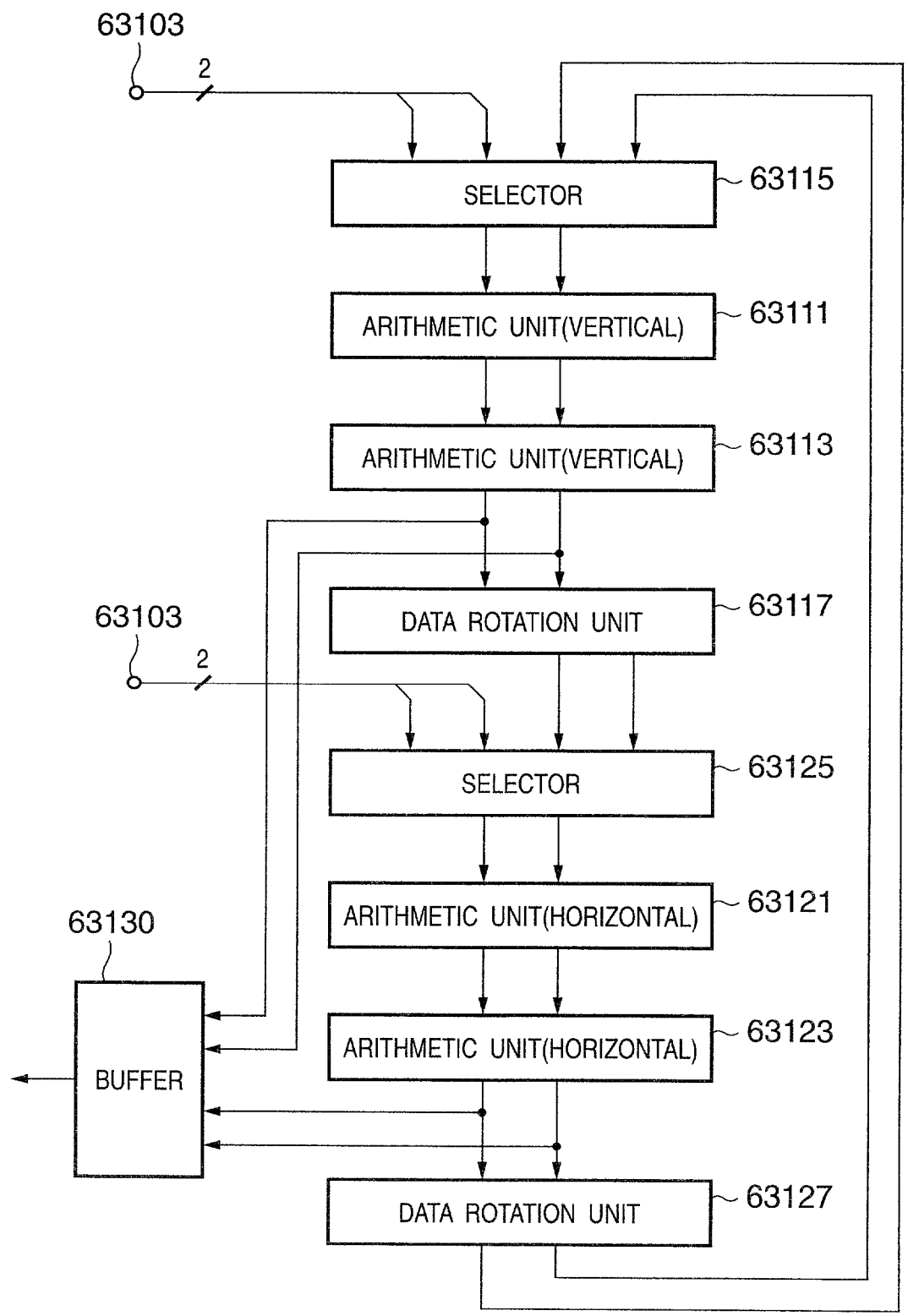

FILTER PROCESSING APPARATUS AND ITS CONTROL METHOD, PROGRAM, AND STORAGE MEDIUM

FIELD OF THE INVENTION

The present invention relates to a filter processing apparatus and its control method, a program, and a storage medium.

BACKGROUND OF THE INVENTION

An image, especially, a multi-valued image contains a very large volume of information, and upon storing and transmitting such image, the image data size becomes huge. For this reason, storage and transmission of an image use high-efficiency coding that reduces the data size by removing redundancy of an image or changing the contents of an image to a degree at which deterioration of image quality is not visually recognizable.

For example, in JPEG recommended by ISO and ITU-T as an international standard coding scheme of still images, image data is compressed in such a manner that image data is transformed into discrete cosine transform coefficients by computing the DCTs for respective blocks (8 pixels×8 pixels), the respective coefficients are quantized, and the quantized coefficients then undergo entropy coding. Since DCT and quantization are done for respective blocks, a so-called block distortion may be observed at the boundaries of blocks of a decoded image.

On the other hand, JPEG2000 has been examined as a new international standard coding scheme of still images. In JPEG2000, wavelet transformation has been proposed as one of pre-processes to be done before quantization. Since wavelet transformation continuously processes input data unlike the existing JPEG that processes data for respective blocks, deterioration of a decoded image is hard to recognize visually.

FIG. 1 is a block diagram for explaining the operation of a transformation memory 101 and discrete wavelet transformer 102.

FIG. 2A is a block diagram showing the basic arrangement of the discrete wavelet transformer 102. The left diagram in FIG. 2A shows the basic arrangement of a device (discrete wavelet transformer 102) for performing the forward discrete wavelet transformation (to be referred to as DWT hereinafter). Reference symbols H0 denotes a filter having low-pass characteristics; and H1, a filter having high-pass characteristics. The right diagram in FIG. 2A shows the basic arrangement of a device for performing the reverse DWT (inverse DWT). FIG. 5 shows an example of filter coefficients. The following explanation will be given based on forward filter coefficients of a 5×3 filter (five low-frequency taps, 3 high-frequency taps) shown in FIG. 5.

A case will be exemplified below wherein an input image shown in FIG. 2B is sequentially input to the discrete wavelet transformer 102 in turn from the upper left pixel in the main scan direction. Assume that the image size is N×M.

Image data input from the left side in FIG. 2A is filtered by the filter H0 having low-pass characteristics and the filter H1 having high-pass characteristics, the respective results undergo down-sampling to 2:1, and the down-sampling results are finally output as the same number of (N×M) wavelet coefficients as that of input pixels.

In order to execute the aforementioned filtering process in the vertical direction, image data is stored in the transformation memory 101, and is scanned in the horizontal direction while executing the vertical filtering process of M pixels in the vertical direction. As a result, two subbands of low- and high-frequency wavelet coefficients L and H are generated, as shown in FIG. 2C.

In order to further break up these subbands and to obtain wavelet coefficients in the horizontal direction, all the wavelet coefficients L and H are temporarily stored in the transformation memory 101.

The wavelet coefficients stored in the transformation memory 101 are read out in the horizontal direction, N coefficients in the horizontal direction undergo filtering using the filters H0 and H1 by the discrete wavelet transformer 102, and the filtering results are down-sampled to 2:1. As shown in FIG. 2D, LL is obtained by filtering L by H0, and LH is obtained by filtering L by H1. Also, HL is obtained by filtering H by H0, and HH is obtained by filtering H by H1. LL, LH, HL, and HH respectively have a size ((N/2)×(M/2)).

A method called a lifting scheme as a reconstruction method different from the aforementioned discrete wavelet transformation is known. FIG. 3 shows the basic arrangement of a forward lifting scheme, and FIG. 4 shows the basic arrangement of a reverse lifting scheme. In FIGS. 3 and 4, p and u are called lifting coefficients, and FIG. 6 shows an example of lifting coefficients used to generate the same output as the 5×3 filter.

The operation of the forward lifting scheme shown in FIG. 3 will be explained below on the basis of the lifting coefficients (FIG. 6):

$$p=(-1, -1)/2$$

$$u=(1, 1)/4$$

X is an input image, and is (X0, X1, X2, X3, X4, X5, ...), as shown in FIG. 3. The input image is classified into even- and odd-numbered pixels. Let Xe be the even-numbered pixels of the input image, and Xo be the odd-numbered pixels. The classified pixels are multiplied by the lifting coefficients, and then undergo an addition process, thus being converted into low- and high-frequency coefficients. More specifically, this process is described by:

(High-frequency coefficient) $X'o=Xo+p\cdot Xe$ (Low-frequency coefficient) $X'e=Xe+u\cdot X'o$ where X'o and X'e are respectively the low- and high-frequency coefficients. Note that k in FIG. 3 normalizes wavelet coefficients, but a detailed description thereof will be omitted since it does not directly concern the contents to be explained here.

Generation of pixels as the output of the reverse lifting scheme shown in FIG. 4 is described by:

(Even-numbered pixel) $Xe=X'e-u\cdot X'o$ (Odd-numbered pixel) $Xo=X'o-p\cdot Xe$ As can be seen from FIGS. 3 and 4, if the filter configuration changes, lifting coefficients and pixels to be processed differ, but the forward and reverse transformation processes of coefficients can be similarly done.

When this lifting scheme is used, if quantization is not made (or quantization using quantization step=1 is made), reversible transformation can be achieved, i.e., data reclaimed after compression encoding and decoding becomes the same as original data as long as quantized information is free from any loss. In JPEG2000, reversible transformation is implemented by adopting the lifting scheme.

As another feature of the lifting scheme, the arithmetic volume required for the filter process can be reduced, and the lifting scheme is also used in a 9×7 filter (9 low-frequency taps, 7 high-frequency taps) of JPEG2000.

However, the arithmetic volume of the filter process can be reduced using the lifting scheme when the filter direction agrees with the scan direction of the process, i.e., when the horizontal filter process is done while scanning image data in the horizontal direction. This is because intermediate results computed for the purpose of outputting high- and low-frequency transform coefficients at the previous sampling point can be re-used at the next sample point.

The process in the lifting scheme will be explained below using a lifting lattice shown in FIG. 7.

A case will be examined below wherein a horizontal sequence of pixels X0, X1, X2, X3, X4, . . . undergoes horizontal DWT transformation, and is scanned to the right. Assume that transform coefficients s4 and d5 corresponding to positions indicated by black dots have already been obtained.

s4 is the low-frequency transform coefficient of a 9×7 DWT filter, and d5 is the high-frequency transform coefficient. To obtain these coefficients s4 and d5, eight transform data indicated by gray dots in FIG. 7 also have already been calculated. For example, d'1 as one transform data is calculated by:

$$d'1 = X1 + \alpha \cdot (X0 + X2)$$

Other transform data are calculated using substantially the same arithmetic formulas except for inputs, multiplication coefficients, and the like. In this connection, in JPEG2000, coefficients are defined as follows:

α=−1.586134342
β=−0.052980118
γ=0.882911075
δ=0.443506852

In FIG. 7, when data at all gray dots have already been calculated, the next transform coefficients to be calculated are s6 and d7. When the previously calculated transform data and transform coefficients are re-used, the number of transform data to be newly calculated is two (d'9 and s'8), and the number of transform coefficients to be newly calculated is also two (s6 and d7), i.e., a total of four transform data and coefficients need only be calculated. Only two calculations are required per transform coefficient.

The contents of one calculation include one addition for adding the two end inputs of three inputs, one multiplication for multiplying the sum by the coefficient α or β, γ, δ, or the like, and one addition (second addition) for adding the product to the central input. This calculation will be referred to as a lattice point computation hereinafter.

Three transform coefficients/data d5, s'6, and d'7 are to be re-used, and as can be easily understood from the lifting lattice in FIG. 7, the calculated values can be easily re-used by only holding them in registers without any special control.

Conventionally, when filter processes such as wavelet transformation and the like are required as partial processes of a codec, two different filter processors, i.e., a filter processor for forward transformation and that for reverse transformation must be prepared, and the circuit scale consequently increases. The filter configuration is not suitable for hierarchical design, the circuit structure is complicated, and the times required for development and debugging are long, resulting an increase in cost of a product that incorporates that function.

The present invention has been made in consideration of the aforementioned problems, and has as its object to suppress an increase in circuit scale and to simplify the circuit structure by executing filter processes using a plurality of arithmetic units that make multiplication and addition.

Wavelet transformation used in JPEG2000 allows efficient transformation with a smaller arithmetic volume if it is processed by a method called a lifting scheme.

FIG. 30 shows the signal flow of the forward lifting scheme, and FIG. 31 shows the signal flow of the reverse lifting scheme. In FIGS. 30 and 31, α, β, γ, and δ are called lifting coefficients. The operation of FIG. 30 will be described below.

Input pixels are expressed in turn by X0, X1, X2, X3, X4, X5, . . . . The input pixels are classified into even- and odd-numbered pixel sequences by a classification unit 5201, pixels X0, X2, X4, . . . with even-numbered suffices are output to the upper side of the unit, and pixels X1, X3, X5, . . . with odd-numbered suffices are output to the lower side of the unit.

In a lifting process of the first stage, the even-numbered pixel sequence is multiplied by the lifting coefficient: α, and two successive products are added to a pixel in the odd-numbered pixel sequence located at the center of these two pixels.

This process can be generally described by:

$$D2n+1 = X2n+1 + \alpha \cdot X2n + \alpha \cdot X2n+2 \qquad (1)$$

In a lifting process of the second stage, a newly obtained odd-numbered pixel sequence (D1, D3, D5, . . . ) is multiplied by the lifting coefficient: β, and two successive products are added to a pixel in the even-numbered pixel sequence located at the center of these two pixels.

This process can be generally described by:

$$E2n+2 = X2n+2 + \beta \cdot D2n+1 + \beta \cdot D2n+3 \qquad (2)$$

In a lifting process of the third stage, the same process as in the first stage is done using the lifting coefficient: γ. In a lifting process of the fourth stage, the same process as in the second stage is done using the lifting coefficient: δ. The lifting process contents of the third and fourth stages are described by:

$$H2n+1 = D2n+1 + \gamma \cdot E2n + \gamma \cdot E2n+2 \qquad (3)$$

$$L2n+1 = E2n+2 + \delta \cdot H2n+1 + \delta \cdot H2n+3 \qquad (4)$$

In FIG. 30, K normalizes wavelet coefficients, but a detailed description thereof will be omitted since it is not essential to the present invention.

If the normalization process is ignored, Hn and Ln obtained by the lifting processes of the third and fourth stages respectively correspond to high- and low-frequency transform coefficients.

The signal flow of the reverse lifting scheme shown in FIG. 31 will be briefly explained below. After inverse coefficients are multiplied in correspondence with the normalization process in the forward lifting scheme, lifting processes of four stages are done. The processing contents of the respective stages are described by:

(First stage) $E2n+2 = L2n+2 - \delta \cdot H2n+1 - \delta \cdot H2n+3$ \qquad (5)

(Second stage) $D2n+1 = H2n+1 - \gamma \cdot E2n - \gamma \cdot E2n+2$ \qquad (6)

(Third stage) $X2n+2=E2n+2-\beta \cdot D2n+1-\beta \cdot D2n+3$ (7)

(Fourth stage) $X2n+1=D2n+1-\alpha \cdot X2n-\alpha \cdot X2n+2$ (8)

Equations (5), (6), (7), and (8) are obtained by transposing the terms of equations (4), (3), (2), and (1), respectively.

The lifting lattice structures shown in FIGS. 32 and 33 express the lifting scheme processes shown in FIGS. 30 and 31 from another viewpoint. In FIGS. 32 and 33, □ represents input data, ○ represents lattice points (or lattice point data arithmetic units), and arrows extending from ○ indicate the flows of lattice point data. These figures illustrate the basic processes (the processes of equations (1) to (8)) in the lifting scheme and new data obtained by these processes in correspondence with one lattice point.

In the forward lifting lattice structure shown in FIG. 32, one lattice point data is calculated using one of equations (1) to (4). In the reverse lifting lattice structure shown in FIG. 33, one lattice point data is calculated using one of equations (5) to (8).

Since a filter process such as wavelet transformation or the like requires many data to obtain one output, a region outside an image is referred to upon calculating a filter output for pixels at the boundary of the image. However, there is no data in such external region.

Hence, a process different from a normal process (to be referred to as a boundary process hereinafter) is required at the boundary of the image. As a simplest method, data of the boundary are continuously copied to and written in an external region to be referred to in advance.

In wavelet transformation in JPEG2000, internal data are arranged in the external region by a method of replicating internal data to have boundary data as the center.

FIG. 34 shows an example. In FIG. 34, ■ represents boundary input data, and other symbols are the same as those in FIG. 32.

Outside (on the left side of) X0 as left boundary input data, data X1, X2, X3, and X4 inside the boundary are replicated and arranged. Outside (on the right side of) X5 as right boundary input data, data X4, X3, and X2 inside the boundary are replicated and arranged.

In this way, when data are prepared in advance in a region outside the boundary, wavelet transform coefficients corresponding to all source data can be computed without any exceptional process.

The aforementioned method of preparing data in a region outside the boundary suffers the following problems.

A process for preparing data in a region outside the boundary is additionally required.

An extra storage area for storing replicated data outside the boundary is required.

The present invention has been made in consideration of the above problems, and has as its object to provide a filter process apparatus and its control method, a program, and a storage medium, which can simplify a structure since data outside a boundary need not be generated by a pre-process even when data to be processed is located outside the boundary of image data.

A wavelet transformation filter process using the lifting scheme will be described below.

Wavelet transformation used in JPEG2000 allows efficient transformation with a smaller arithmetic volume if it is processed by a method called a lifting scheme.

FIG. 30 shows the signal flow of the forward lifting scheme, and FIG. 31 shows the signal flow of the reverse lifting scheme. FIGS. 30 and 31 show the signal flows when data of 9 taps are used upon computing low-frequency wavelet transform coefficients, and data of 7 taps are used upon computing high-frequency wavelet transform coefficients. In FIGS. 30 and 31, $\alpha$, $\beta$, $\gamma$, and $\delta$ are called lifting coefficients.

The operation of FIG. 30 will be described below.

Input pixels are expressed in turn by X0, X1, X2, X3, X4, X5, ..., Xn. The input pixels are classified into even- and odd-numbered pixel sequences by a classification unit 5201, pixels X0, X2, X4, ..., X2n with even-numbered suffices are output to the upper side of the unit, and pixels X1, X3, X5, ..., X2n+1 with odd-numbered suffices are output to the lower side of the unit.

In a lifting process of the first stage, the even-numbered pixel sequence is multiplied by the lifting coefficient: $\alpha$, and two successive products are added to a pixel in the odd-numbered pixel sequence located at the center of these two pixels.

This process can be generally described by:

$D2n+1=X2n+1+\alpha \cdot X2n+\alpha \cdot X2n+2$ (9)

In a lifting process of the second stage, a newly obtained odd-numbered pixel sequence (D1, D3, D5, ..., D2n+1) is multiplied by the lifting coefficient: $\beta$, and two successive products are added to a pixel in the even-numbered pixel sequence located at the center of these two pixels.

This process can be generally described by:

$E2n+2=X2n+2+\beta \cdot D2n+1+\beta \cdot D2n+3$ (10)

In a lifting process of the third stage, the same process as in the first stage is done using the lifting coefficient: $\gamma$. In a lifting process of the fourth stage, the same process as in the second stage is done using the lifting coefficient: $\delta$. The lifting process contents of the third and fourth stages are generally described by:

$H2n+1=D2n+1+\gamma \cdot E2n+\gamma \cdot E2n+2$ (11)

$L2n+1=E2n+2+\delta \cdot H2n+1+\delta \cdot H2n+3$ (12)

In FIG. 30, K normalizes wavelet coefficients, but a detailed description thereof will be omitted since it is not essential to the present invention.

If the normalization process is ignored, Hn and Ln obtained by the lifting processes of the third and fourth stages respectively correspond to high- and low-frequency transform coefficients.

The signal flow of the reverse lifting scheme shown in FIG. 31 will be briefly explained below. After inverse coefficients are multiplied in correspondence with the normalization process in the forward lifting scheme, lifting processes of four stages are done. The processing contents of the respective stages are generally described by:

(First stage) $E2n+2=L2n+2-\delta \cdot H2n+1-\delta \cdot H2n+3$ (13)

(Second stage) $D2n+1=H2n+1-\gamma \cdot E2n-\gamma \cdot E2n+2$ (14)

(Third stage) $X2n+2=E2n+2-\beta \cdot D2n+1-\beta D2n+3$ (15)

(Fourth stage) $X2n+1=D2n+1-\alpha \cdot X2n-X2n+2$ (16)

Equations (13) to (16) are obtained by transposing the terms of equations (12) to (9), respectively.

The wavelet transformation filter process using the lifting scheme has been explained. A wavelet transformation filter process that combines recursive arithmetic operations with the lifting scheme will be explained below.

The lifting lattice structures shown in FIGS. 32 and 33 express the lifting scheme processes shown in FIGS. 30 and 31 from another viewpoint. In FIGS. 32 and 33, □ represents input data, ○ represents lattice points (or lattice point data arithmetic units), and arrows extending from ○ indicate the flows of lattice point data. These figures illustrate the basic processes (the processes of equations (9) to (16)) in the lifting scheme and new data obtained by these processes in correspondence with one lattice point.

In the forward lifting lattice structure shown in FIG. 32, one lattice point data is calculated using one of equations (9) to (12). In the reverse lifting lattice structure shown in FIG. 33, one lattice point data is calculated using one of equations (13) to (16).

By observing the lifting lattice structure, the dependence among input data and lattice point data is manifest. For example, upon calculating L4 as transform output data, nine input data: X0 to X8 are required. Also, as can be seen from this structure, L4 can be calculated from only three lattice point data: H3, E4, and H5.

When L4 and H5 have been calculated and output, four data X8, D7, E6, and H5 can be left. From these four data and new input data X9 and X10, four lattice point data can be calculated in the order of D9, E8, H7, and L6. L6 and H7 are output as transform data, and four data X10, D9, E8, and H7 are left and re-used in the next calculation, thus allowing efficient arithmetic processes.

In order to efficiently execute the arithmetic processes, pairs of pixel data with even- and odd-numbered suffices from the head of the sequences must be processed as units. In the above description, since the pairs of input pixel data start from an odd-numbered suffix, pixel data with an even-numbered suffix at the head is odd.

In horizontal wavelet transformation, only one head pixel is odd. However, in vertical wavelet transformation, data for one head line become odd. In addition, since the vertical size of most of image data is specified by an even number, last one line becomes odd.

In case of hardware processing, since the time required for processing a pair of lines is the same as that required for processing the head one line, one odd line at each of the head and end of an image has poor processing efficiency.

As described above, when efficient arithmetic processes are executed by saving the lifting processing results and re-using them, data for two lines in the middle of a data stream can be simultaneously processed. However, in an image having an even-numbered size, only the head and last lines must be solely processed, resulting in poor efficiency.

The present invention has been made to solve the aforementioned problems, and has as its object to provide a filter processing apparatus and its control method, a program, and a storage medium, which can efficiently execute wavelet transformation.

SUMMARY OF THE INVENTION

In order to achieve the above objects, for example, a filter processing apparatus of the present invention comprises the following arrangement.

That is, a filter processing apparatus characterized by comprising:

a plurality of arithmetic units each of which comprises multiplication means for multiplying input data by a predetermined coefficient, addition means for adding a product of said multiplication means to a plurality of data including some of the input data, and data storage means for generating data obtained by delaying the input data by a predetermined amount in accordance with a type of data, and in that said plurality of arithmetic units are cascaded to execute a filter process for data inputted to the first stage of arithmetic unit.

In order to achieve the above objects, for example, a filter processing apparatus of the present invention comprises the following arrangement.

That is, a filter processing apparatus characterized by comprising:

a plurality of arithmetic units each of which comprises multiplication means for multiplying input data by a predetermined coefficient, and addition means for adding a product of said multiplication means to a plurality of data including some of the input data; and storage means for storing data from the respective arithmetic units, and outputting delayed data of the stored data, and in that said plurality of arithmetic units are cascaded to execute a filter process for data inputted to the first stage of arithmetic unit.

In order to achieve the above objects, for example, a filter processing apparatus of the present invention comprises the following arrangement.

That is, a filter processing apparatus having a multilayered structure that includes:

an uppermost arithmetic layer comprising a plurality of arithmetic units each of which receives three data corresponding to pixel data which are to undergo a filter process, and computes output data; and a plurality of intermediate arithmetic layers each comprising the plurality of arithmetic units each of which receives three inputs including two output data computed by the layer immediately above the intermediate arithmetic layer of interest, and one data obtained by the layer two layers above the intermediate arithmetic layer of interest, and computes output data, characterized in that each of the plurality of arithmetic units comprises one of:

a first arithmetic unit having a first arithmetic mode for computing output data using three input data; and a second arithmetic unit which can switch between the first arithmetic mode, and a second arithmetic mode for computing output data for three data on the basis of two out of three input data, and the arithmetic mode of the second arithmetic unit is switched to the second arithmetic mode when data which is to undergo the filter process is input at a timing near a boundary of an image.

In order to achieve the above objects, for example, a filter processing apparatus of the present invention comprises the following arrangement.

That is, a filter processing apparatus for processing data, characterized by comprising:

a plurality of arithmetic units each having holding means for holding data, a plurality of adders, subtractors, or adders/subtractors, and a multiplier or a position converter, and in that said plurality of arithmetic units form a cascade connection of n units, and compute two different wavelet transform coefficients using input data of 2n+1 taps and 2n−1 taps.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 shows filter coefficients;

FIG. 6 shows lifting coefficients;

FIG. 15 is a diagram showing the arrangement when the lattice point data arithmetic unit is formed by a delay unit consisting of n registers (e.g., n=2);

FIG. 99 is a diagram showing the arrangement of a two-dimensional DWT/IDWT transformation processor of a 5×3 filter;

DETAILED DESCRIPTION OF THE PREFERRED EMBODIMENTS

Preferred embodiments of the present invention will now be described in detail in accordance with the accompanying drawings.

[First Embodiment]

In the prior art, a horizontal pixel sequence: X0, X1, X2, X3, X4, . . . is described as input pixels to the filter process shown in FIG. 7. In the embodiment to be described below, nine pixel data (Y0, Y1, Y2, Y3, Y4, . . . , Y8) of a vertical column of those for nine lines are input, as shown in FIG. 8.

A process for making a horizontal scan while executing a vertical filter process will be examined first.

Upon making a horizontal scan while executing the vertical filter process, since nine input pixels are wholly switched to nine pixels of the next column to be processed, intermediate arithmetic results calculated upon computing transform coefficients one column before cannot be used. For this reason, every time a horizontal scan is made to switch a column, all transform data corresponding to gray dots in FIG. 8 must be calculated. Since black dots correspond to transform coefficients (low- and high-frequency transform coefficients), they must be calculated in any case.

Hence, 10 calculations, i.e., five calculations per coefficient are required every time a column is switched. This arithmetic volume is 2.5 times that required when intermediate calculation results can be re-used.

To solve this problem, an arithmetic processor that implements discrete wavelet transformation in this embodiment as a filter processing apparatus with the arrangement shown in FIG. 9 will be explained.

Figure 9:
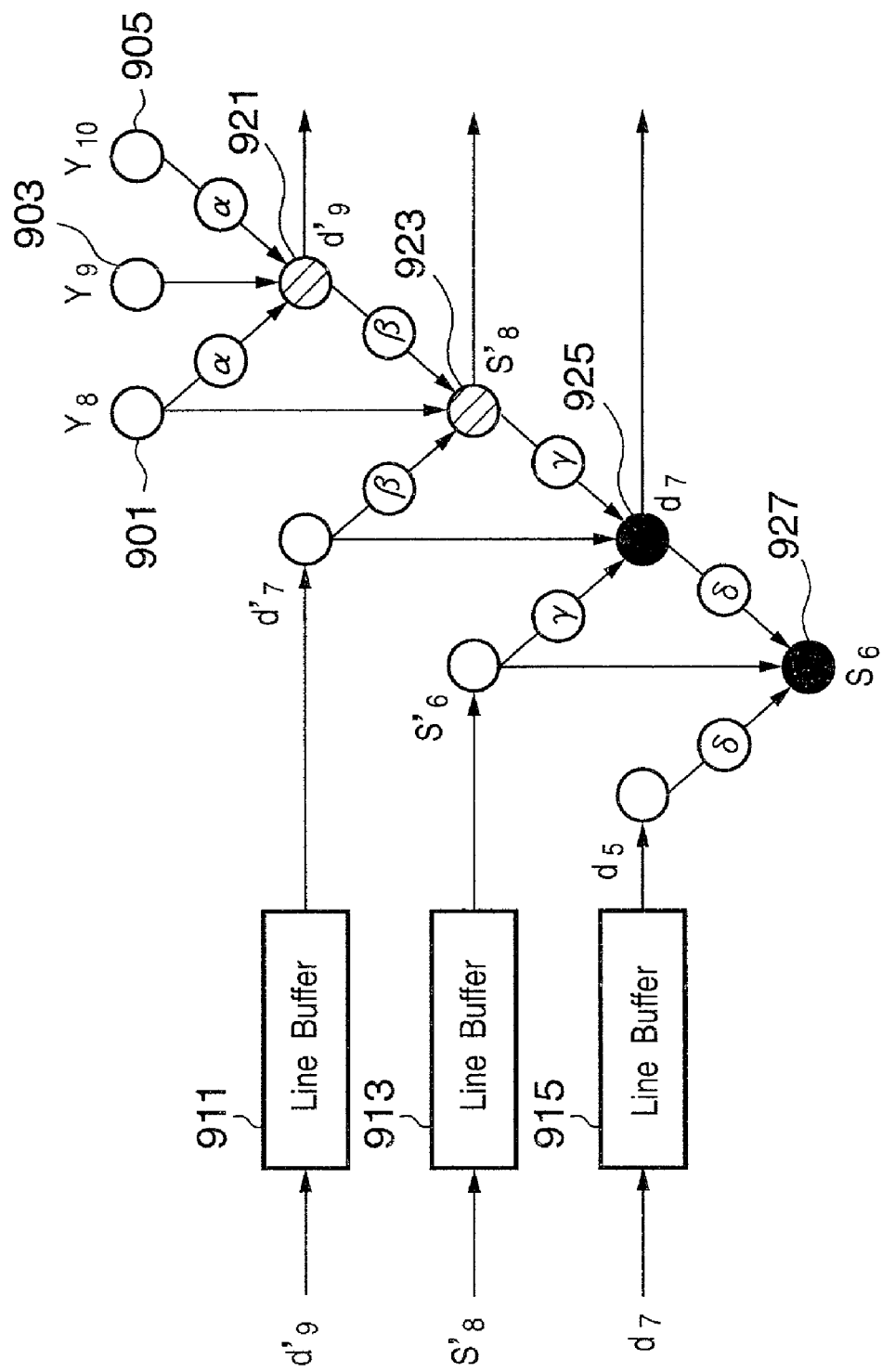
FIG. 9 is a diagram showing the arrangement of a forward arithmetic unit in the first embodiment of the present invention.

In FIG. 9:

reference numerals 901, 903, and 905 denote terminals for inputting line data Y8, Y9, and Y10;

911, 913, and 915, line buffers for storing transform coefficients or transform data in respective lines, delaying the stored transform coefficients or transform data by a delay time (for a delay line), and outputting the transform coefficients or transform data of an identical column at a line the delay time before; and 921, 923, 925, and 927, terminals (also called lattice points) at which the computed lattice point data appear. For example, lattice point data d'9 calculated by:

$$d'9 = Y9 + \alpha \cdot (Y8 + Y10)$$

appears at the lattice point 921.

In FIG. 9, d'9 calculated based on the above equation is stored in the line buffer 911 and is delayed two lines to obtain transform data d'7 at an identical column position two lines before. Using d'7 and d'9, s'8 is calculated. The calculated transform data s'8 is stored in the line buffer 913. Likewise, d7 and s6 are calculated using the line buffers 913 and 915. Also, calculated d7 is stored in the line buffer 915.

The line buffers 911, 913, and 915 have a size corresponding to a horizontal scan length, and the delay time is two lines. This is because the vertical filter processing using data at an identical column position is done at the timing of every two lines.

More specifically, transform coefficient d5 and transform data s'6 and d'7 output from the line buffers can be calculated using input pixels Y0 to Y8. However, transform coefficients s6 and d7 are obtained after Y10 is input.

In the next vertical filter process cycle, data are shifted by one column in the horizontal direction, similar calculations are made, and the calculation results are sent to the line buffers corresponding to the lines.

In this way, the vertical filter process is executed while making a horizontal scan, thus sequentially inputting and storing transform coefficients and transform data in the line buffers. Using the line data (input pixel) Y8 used at that time, and new line data Y9 and Y10, the next horizontal scan is made.

At this time, since four lattice point arithmetic operations are made using d5, s'6, and d'7 output from the line buffers 915, 913, and 911 in addition to the line data, two transform coefficients s6 and d7 can be obtained. Of course, the transform coefficient d7 and transform data s'8 and d'9 are re-input to the line buffers 915, 913, and 911 to prepare for the next horizontal scan.

In the still next horizontal scan, two transform coefficients s8 and d9 can be calculated using line data Y10, Y11, and Y12, and the outputs d7, s'8, and d'9 from the line buffers.

In this manner, when a horizontal scan is made while executing the vertical filter process, one transform coefficient can be obtained per two lattice point arithmetic operations.

Figure 10:
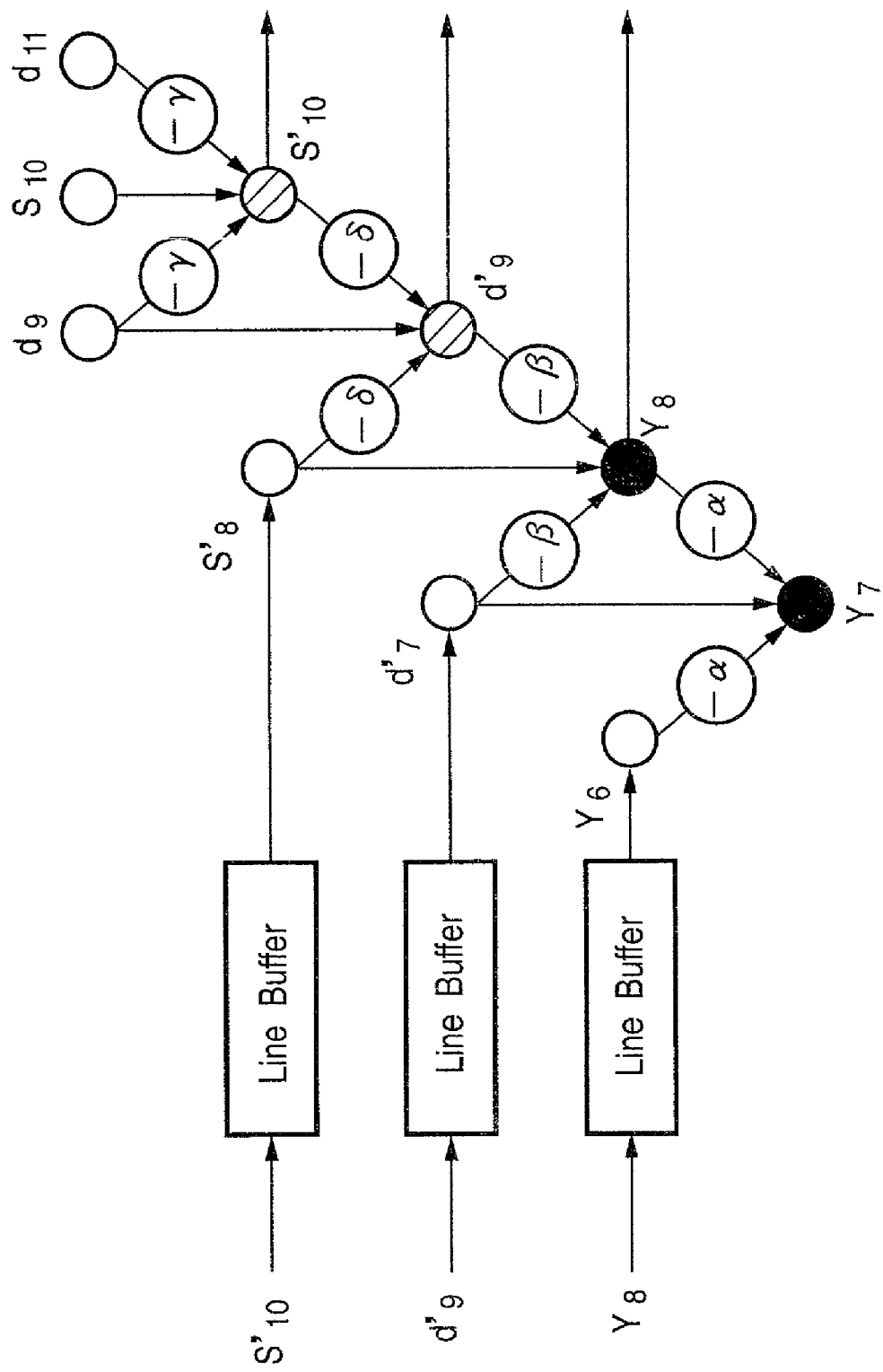
FIG. 10 is a diagram showing the arrangement of a reverse arithmetic unit in the first embodiment of the present invention.

The aforementioned arrangement shown in FIG. 9 can be used in an inverse transform process for reclaiming the transform coefficients after the filter process to original values, and an arrangement in this case is as shown in FIG. 10. Since this is apparent from the similarity of the filter process using a lifting lattice, a description thereof will be omitted.

Figure 11:
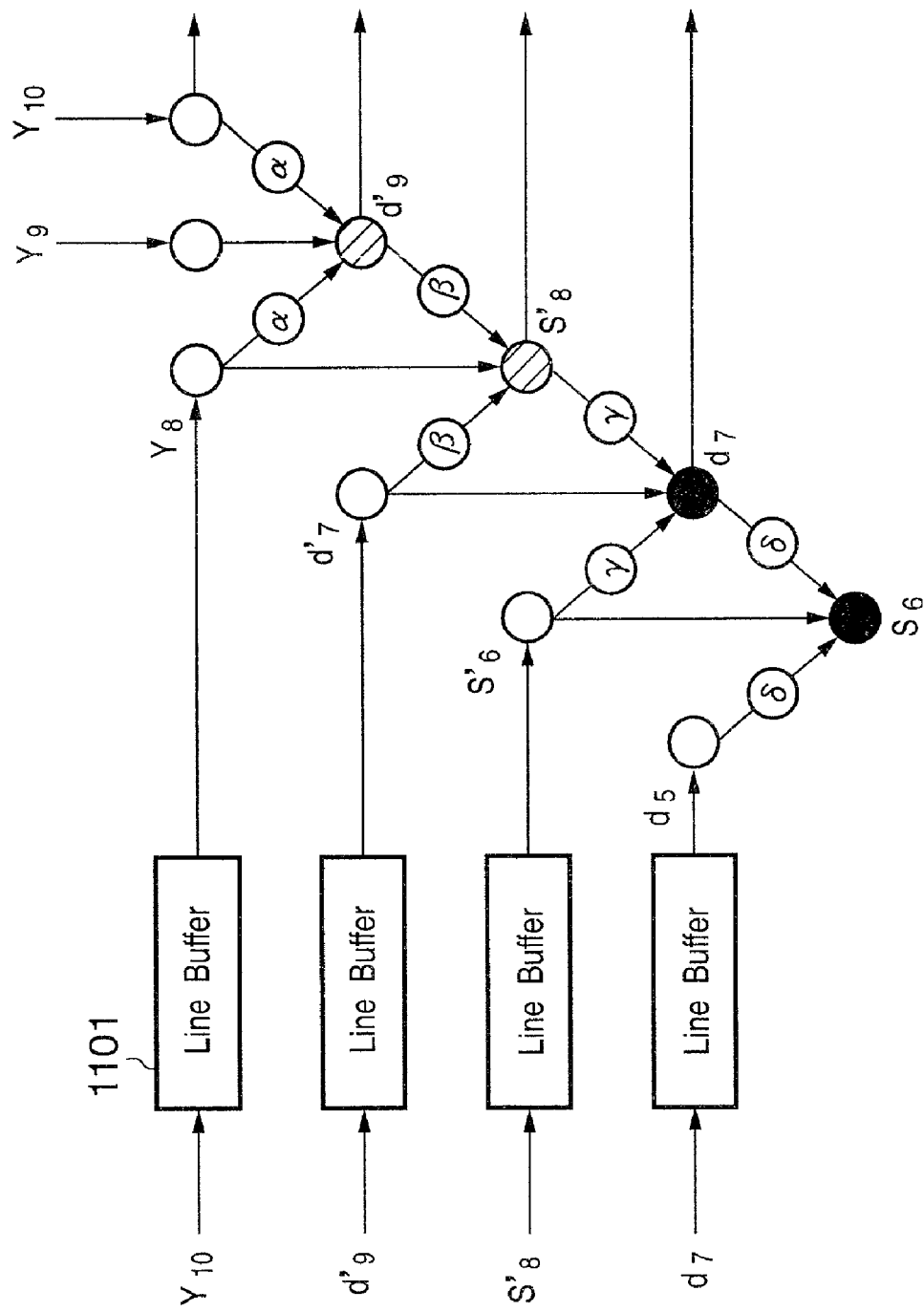
FIG. 11 is a diagram of an arithmetic unit which has the same function as that of the arithmetic unit shown in FIG. 9 but has another arrangement.

An arrangement having the same function as that of FIG. 9 can be implemented by an arrangement of FIG. 11. Line data Y8 is stored in a newly added line buffer 1101. In the next horizontal scan, only new line data Y9 and Y10 are externally input, and the already input line data Y8 is supplied from the line buffer 1101 by delaying Y10 two lines.

Modification 1

Figure 12:
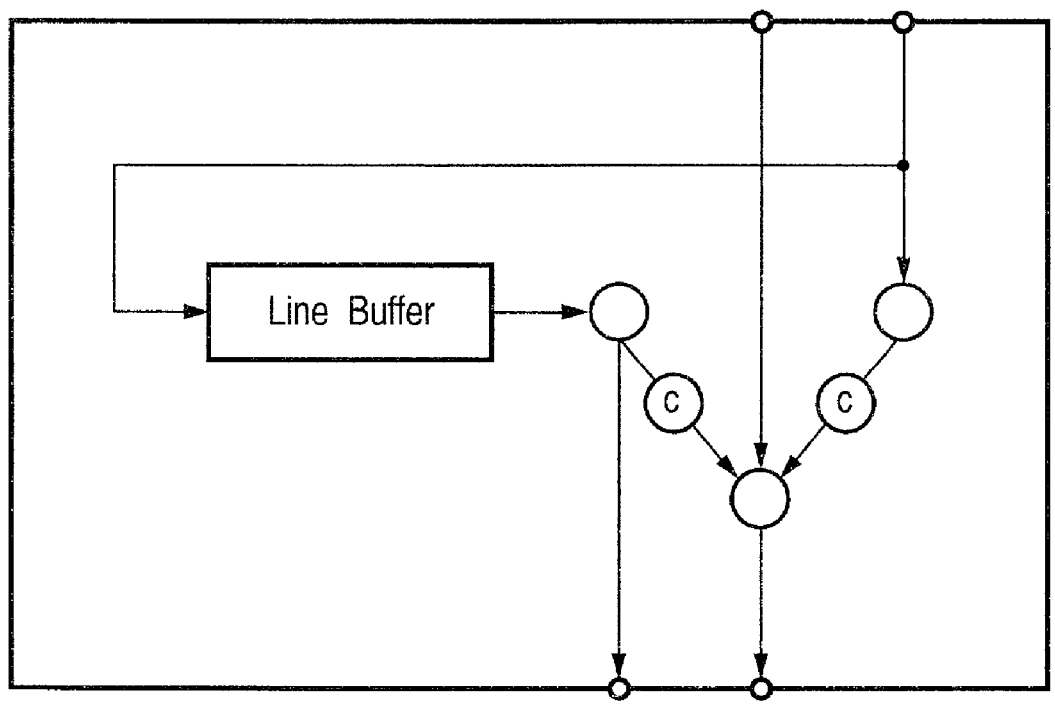
FIG. 12 is a diagram of a lattice point data arithmetic unit used in modification 1 in the first embodiment of the present invention.
Figure 13:
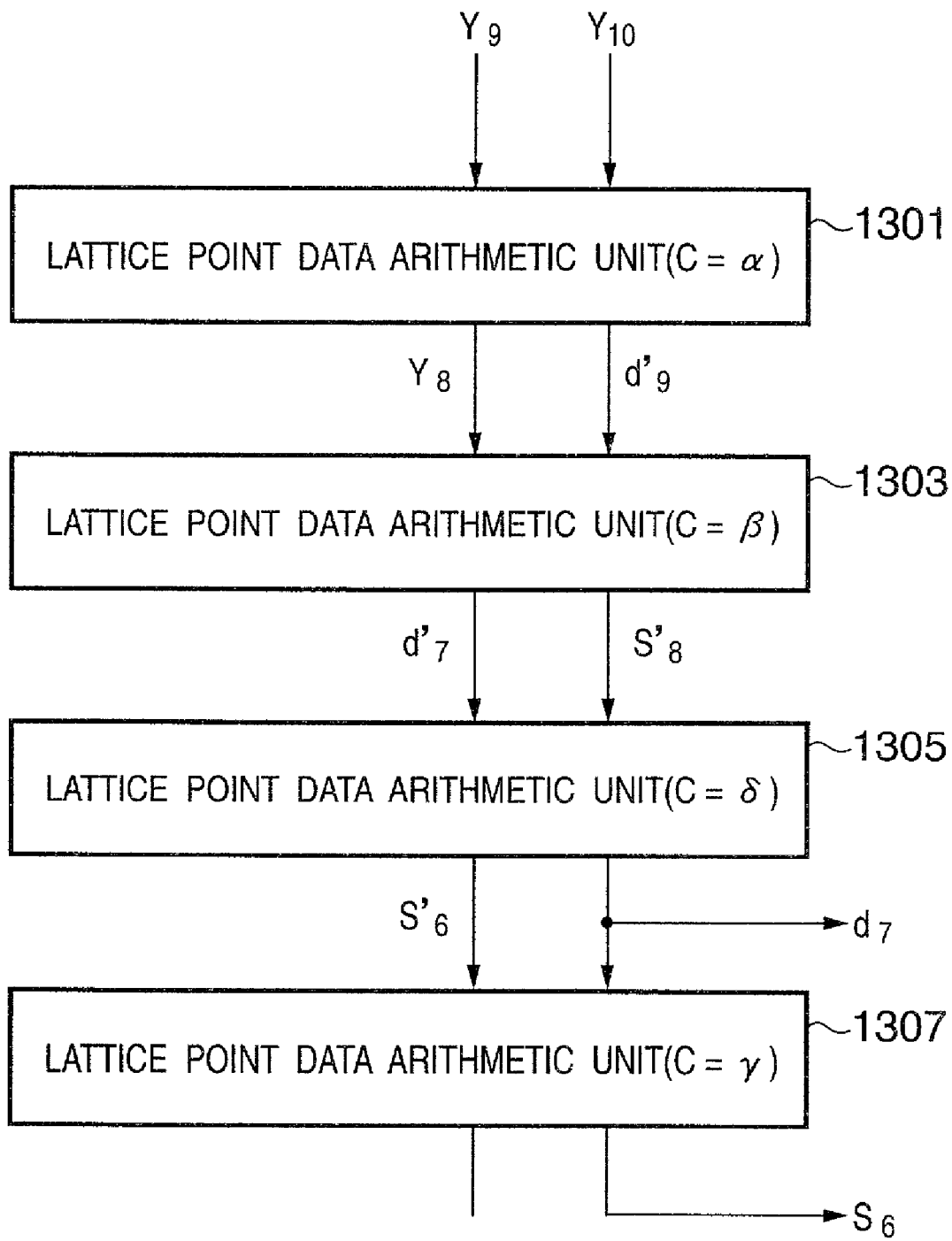
FIG. 13 is a diagram showing the arrangement of a filter arithmetic processor formed by connecting a plurality of units shown in FIG. 12.

In modification 1, a filter arithmetic processor is formed by connecting a plurality of lattice point data arithmetic units shown in FIG. 12, as shown in FIG. 13 to execute the vertical filter process.

The lattice point data arithmetic unit shown in FIG. 12 is obtained by extracting a portion for computing data for one lattice point, and one line buffer as an input source of data required for the arithmetic operation from the arithmetic unit that compute data corresponding to four lattice points in FIG. 11. Therefore, the arithmetic function and the like are the same as the aforementioned contents.

On the other hand, reference numerals 1301, 1303, 1305, and 1307 in FIG. 13 denote lattice point data arithmetic units shown in FIG. 12, which have the same basic arrangement although they use different multiplication coefficients. Since the arrangement of the filter arithmetic processor shown in FIG. 13 is obtained by merely replacing the arrangement of the arithmetic processor shown in FIG. 11 by the four units, it is functionally the same as FIG. 11.

Figure 14:
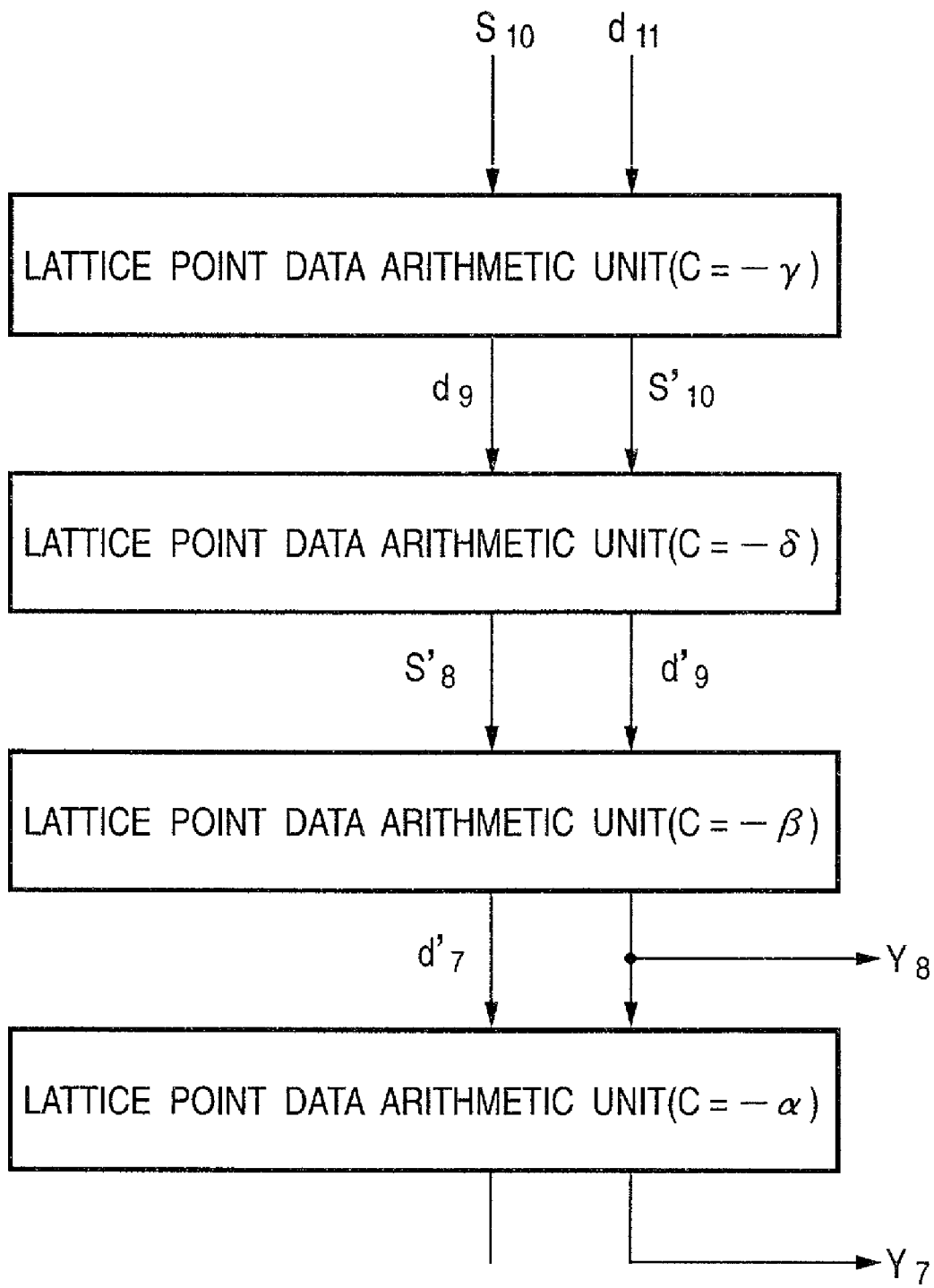
FIG. 14 is a diagram showing the arrangement of a filter arithmetic processor for inverse transformation used in modification 1 in the first embodiment of the present invention.

A filter arithmetic processor for inverse transformation (filter process in the reverse direction) can be formed using identical units, as shown in FIG. 14. The difference from FIG. 13 is that multiplication coefficients in the units are vertically replaced, and their signs are inverted.

The aforementioned filter arithmetic processor and that for inverse transformation using the lattice point data arithmetic units of this modification can be implemented using the lattice point data arithmetic units shown in FIG. 12, the parameters ($\alpha$, $\beta$, $\gamma$, $\delta$) of which are adjusted. That is, using lattice point data arithmetic units as common hardware (or software), both filter processes (filter processes in the forward and reverse directions) can be implemented.

In the aforementioned lattice point data arithmetic unit, the delay unit is not limited to the line buffer, but may be formed by n registers.

For example, FIG. 15 shows a case when n=2.

Figure 16:
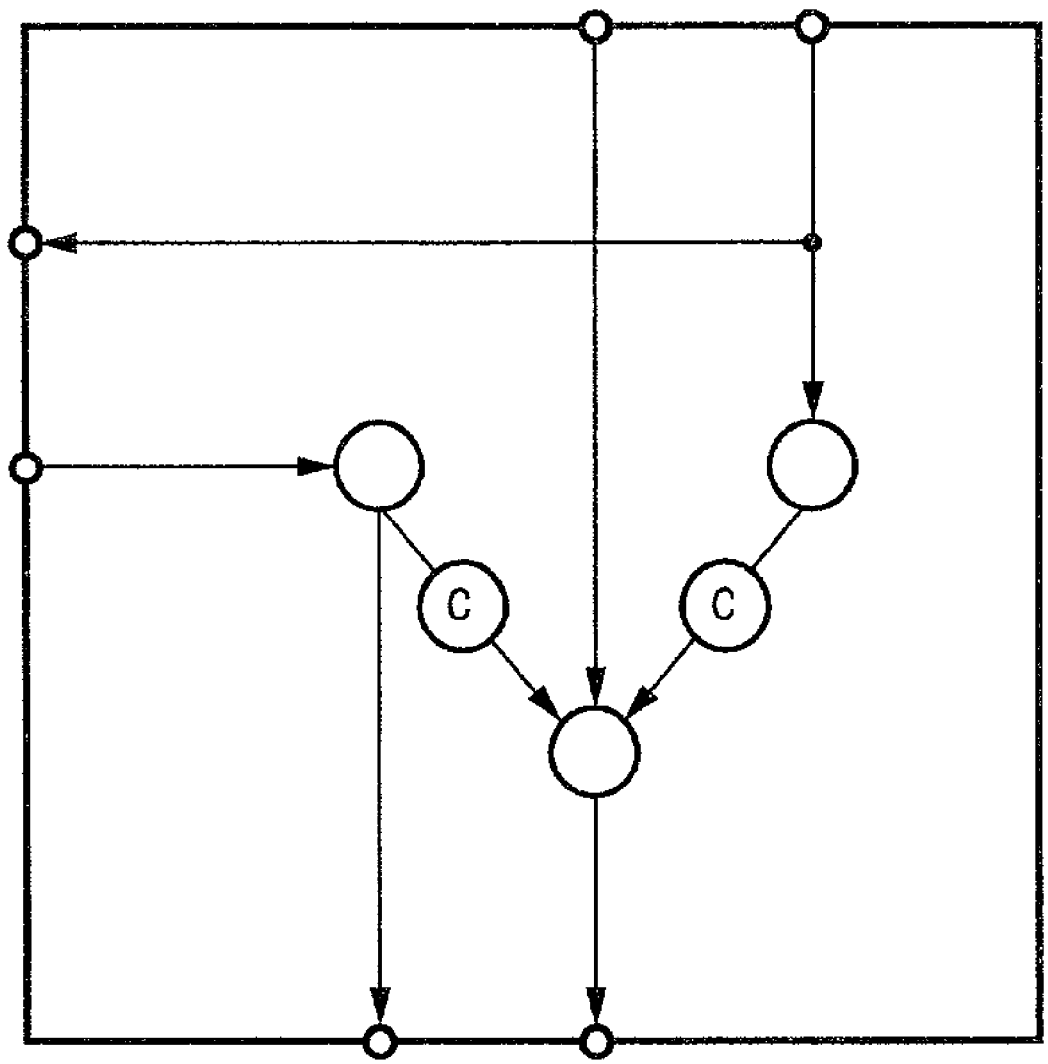
FIG. 16 is a diagram showing the arrangement of the lattice point data arithmetic unit which has an external memory that can be commonly accessed, and implements a delay by that memory.
Figure 17:
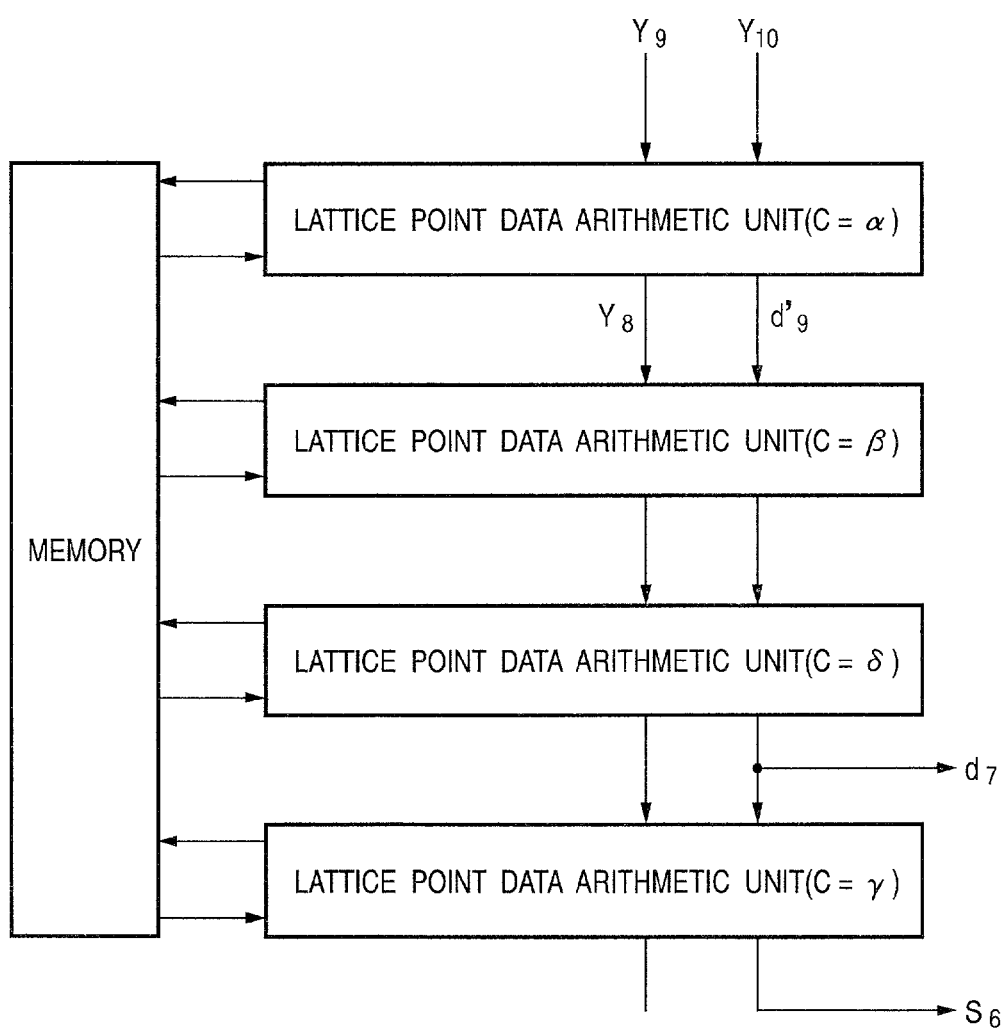
FIG. 17 is a diagram showing the overall arrangement of a filter arithmetic processor using the lattice point data arithmetic units shown in FIG. 16.

On the other hand, the lattice point data arithmetic unit may not have any delay unit, and an external memory that can be commonly accessed may be connected to achieve a delay. FIG. 16 shows the arrangement of a lattice point data arithmetic unit in this case, and FIG. 17 shows the arrangement of a filter arithmetic processor using the lattice point data arithmetic units shown in FIG. 16.

In the following description, assume that the lattice point data arithmetic unit incorporates a delay unit for the sake of simplicity. However, as can be seen from the above description, the following description can be applied to a lattice point data arithmetic unit having an external delay unit.

Since the multiplication coefficients in the lattice point data arithmetic units are constants, versatile multipliers need not be used, and constant multipliers in which the way multiplicands are added is determined can be used.

The arrangement of the aforementioned filter arithmetic processor of this modification is not limited to a specific filter process such as wavelet transformation or the like, but can be applied to a general filter process. Also, as can be seen from the following description, the same applies to the subsequent modifications.

Modification 2

In modification 2 of the first embodiment, a selector for selecting the input to each lattice point data arithmetic unit is connected to the input side of the unit, and data to be selected by each selector is switched depending on forward or inverse transformation, thus implementing both forward and reverse transformation processes using common units.

Figure 18:
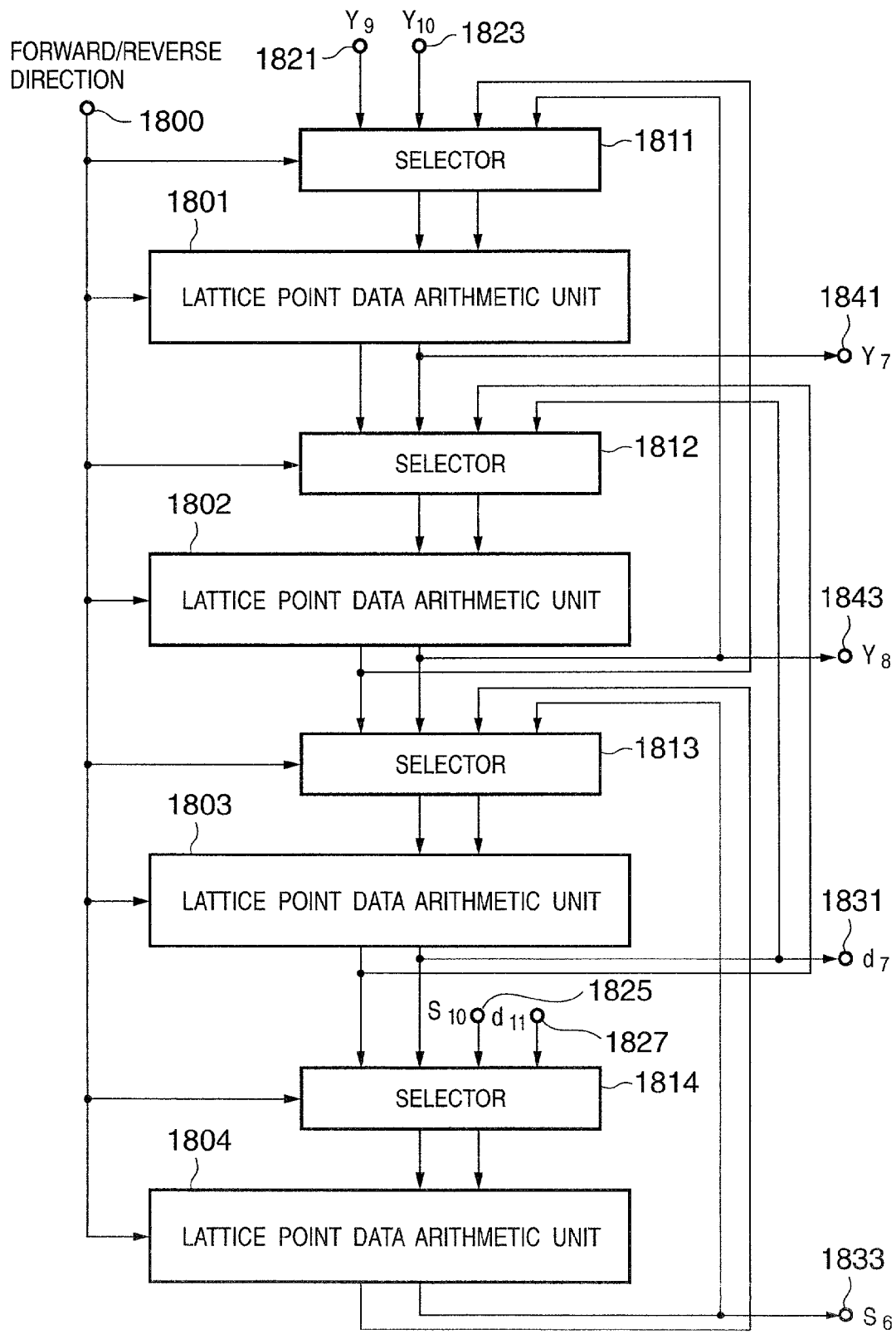
FIG. 18 is a diagram sowing the arrangement of a filter arithmetic processor in modification 2 in the first embodiment of the present invention.

FIG. 18 shows the arrangement of a filter arithmetic processor in this modification. In FIG. 18:

reference numeral 1800 denotes a terminal for receiving a control signal that designates the type (forward/reverse direction) of transformation;

1801 to 1804, lattice point data arithmetic units which respectively have parameters $\alpha$, $\beta$, $\gamma$, and $\delta$, and also constant multipliers and a function of adding/subtracting products;

1811 to 1814, 4-input/2-output selectors for switching their outputs to input pixel data or transform coefficients (or coefficient data) on the basis of the control signal which is input via the terminal 1800 and designates the type of transformation;

1821 and 1823, terminals for inputting image data before transformation;

1825 and 1827, terminals for inputting coefficient data after transformation;

1831 and 1833, terminals for outputting data (transform coefficients) obtained by the forward transformation process; and 1841 and 1843, terminals for outputting data (input pixel data) obtained by the inverse transformation process.

The selectors 1811 to 1814 switch data to be selected and output on the basis of the control signal which is input from the terminal 1800 and designates the type of transformation, and the respective lattice point data arithmetic units 1801 to 1804 add data upon forward transformation or subtract data upon inverse transformation.

Figure 19:
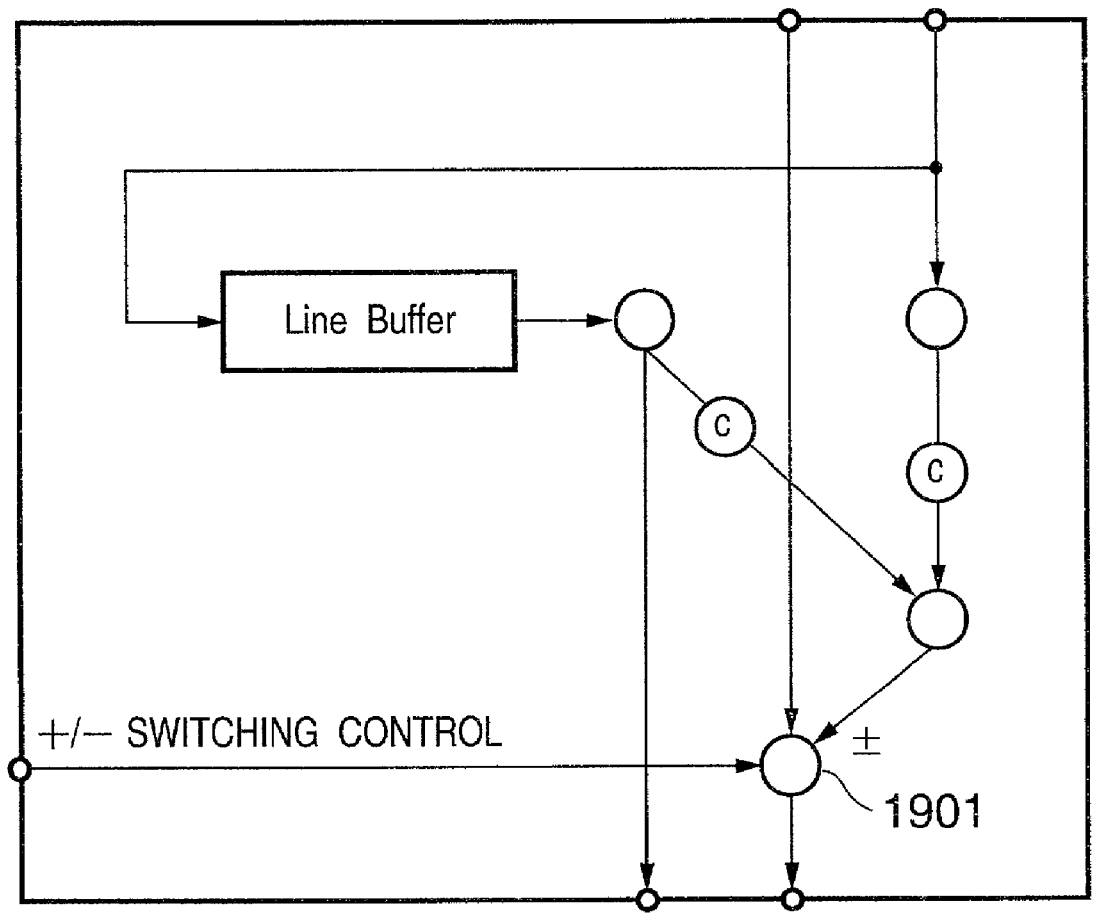
FIG. 19 is a diagram showing the arrangement when the lattice point data arithmetic unit shown in FIG. 18 is modified.

For this purpose, the arrangement of each of the lattice point data arithmetic units 1801 to 1804 is changed to that shown in FIG. 19, so as to be able to add/subtract a product of a given constant. A practical difference in the circuit arrangement is that an adder is replaced by an adder/subtractor 1901.

When a control signal for designating forward transformation is input to the terminal 1800, the selectors 1811 to 1814 select and output left two inputs (the selector 1811 in FIG. 18 selects Y9 and Y10), and the lattice point data arithmetic units 1801 to 1804 are set in a mode for adding the constant multiplication results (the inverting circuit (adder/subtractor) 1901 in each lattice point data arithmetic unit is set in an add mode), thus achieving the arrangement equivalent to FIG. 13.

On the other hand, when a control signal for designating inverse transformation is input to the terminal 1800, the selects 1811 to 1814 select and output right two inputs (in FIG. 18, two outputs from the lattice point data arithmetic unit one stage below, except for the selector 1814 that selects two inputs s10 and d11), and the lattice point data arithmetic units 1811 to 1814 are set in a mode for subtracting the constant multiplication results (the adder/subtractor 1901 in each lattice point data arithmetic unit is set in a subtract mode), thus achieving the arrangement equivalent to FIG. 14.

As can be seen from FIG. 10, since Y7 is output from a unit (1801) when C=−$\alpha$, and Y8 is output from a unit (1802) when C=−$\beta$, the terminals 1841 and 1843 respectively output Y7 and Y8.

Figure 20A:
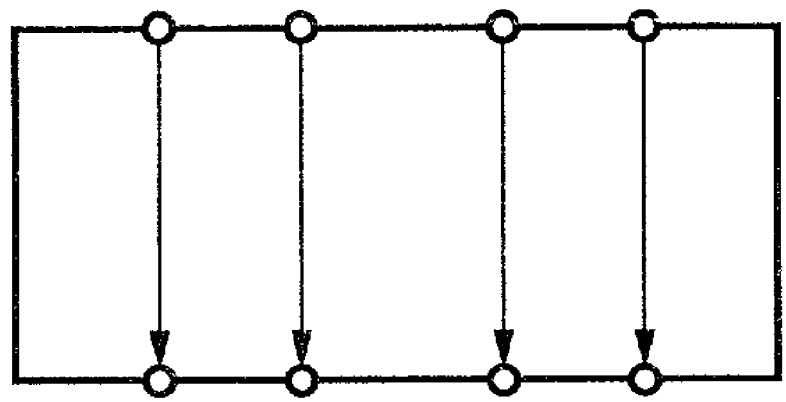
FIG. 20A shows a cross switch.
Figure 20B:
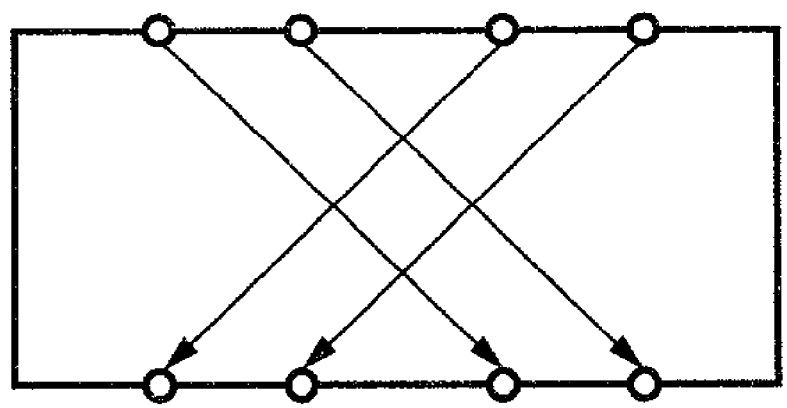
FIG. 20B shows a cross switch.
Figure 21:
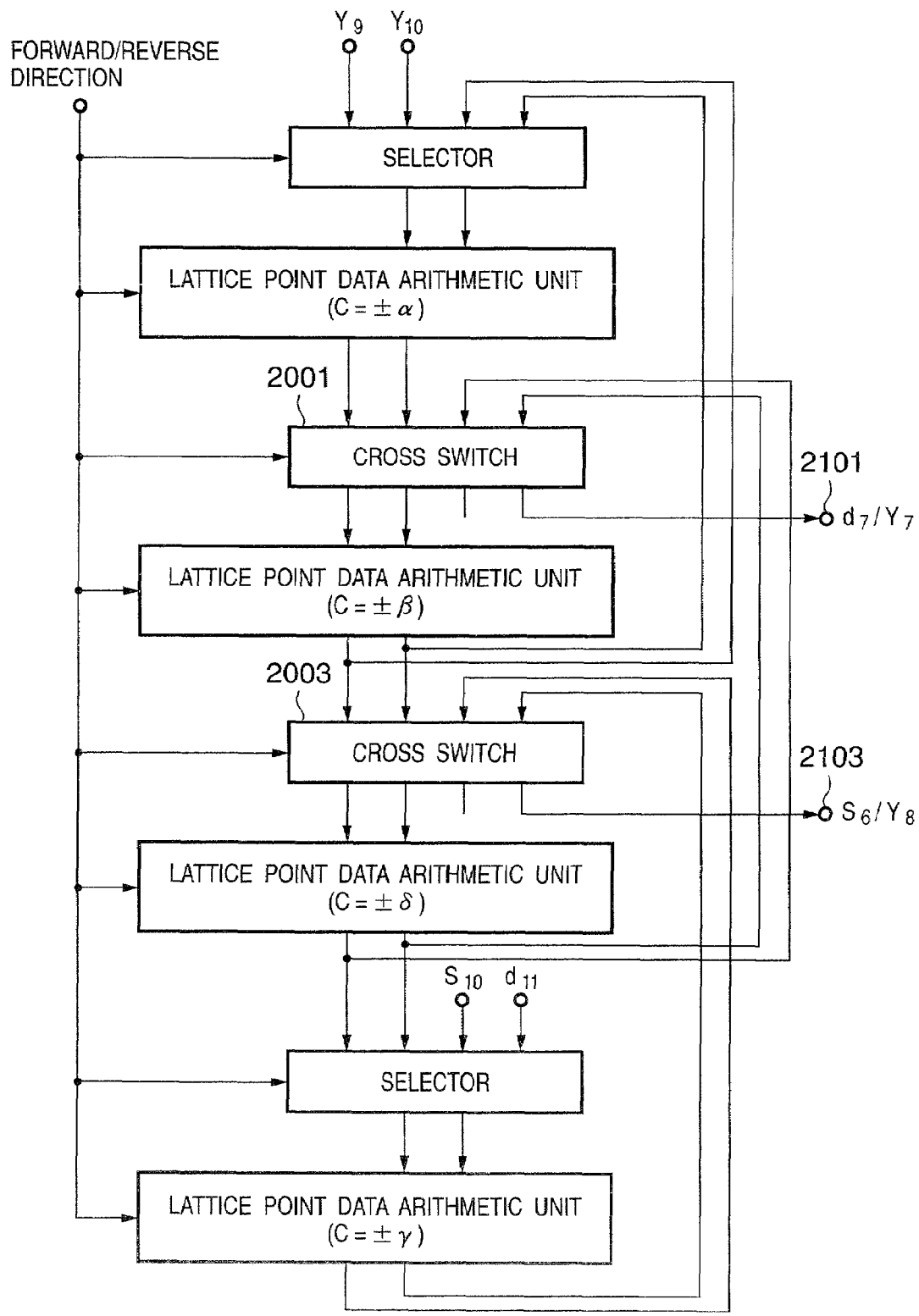
FIG. 21 is a diagram showing the arrangement of a filer arithmetic processor of modification 2 in the first embodiment of the present invention.

When the 4-input/2-output selectors 1811 to 1814 are used, the transform outputs are obtained from different terminals depending on forward or inverse transformation. However, when the selectors 1812 and 1813 are replaced by cross switches 2001 and 2003 shown in FIGS. 20A and 20B, transform outputs can be output from identical terminals 2101 and 2103 independently of forward or inverse transformation, as shown in FIG. 21.

Modification 3

A filter arithmetic processor of this modification executes a multiplication process for scaling, which is done at the end of the filter process based on the lifting scheme, using identical multipliers for forward and inverse transformation processes.

Let K be a scaling parameter. In JPEG2000, final high-frequency transform coefficients are obtained by multiplying those after the lifting arithmetic operations by K, and final low-frequency transform coefficients are obtained by multiplying those after the lifting arithmetic operations by 1/K.

Figure 22:
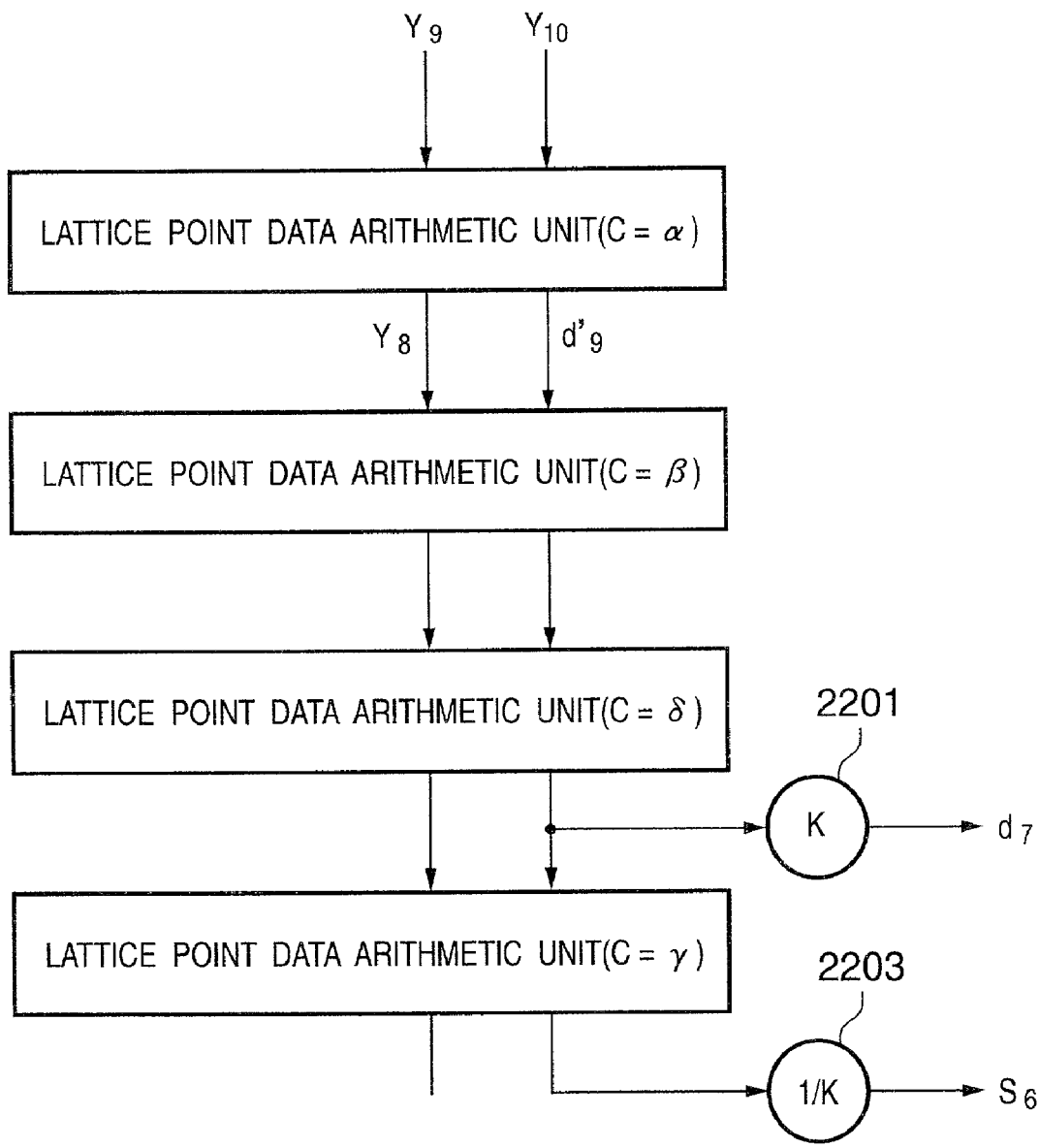
FIG. 22 is a diagram showing the arrangement obtained by adding multipliers for scaling to a vertical 9/7-DWT arithmetic processor shown in FIG. 13.

When multipliers (2201, 2203) for scaling are added to a vertical 9/7-DWT arithmetic processor of this modification as the filter arithmetic processor shown in FIG. 13, an arrangement shown in FIG. 22 is obtained. In FIG. 22, reference numeral 2201 denotes a multiplier for multiplying high-frequency transform data by K; and 2203, a multiplier for multiplying low-frequency transform data by 1/K.

Figure 23:
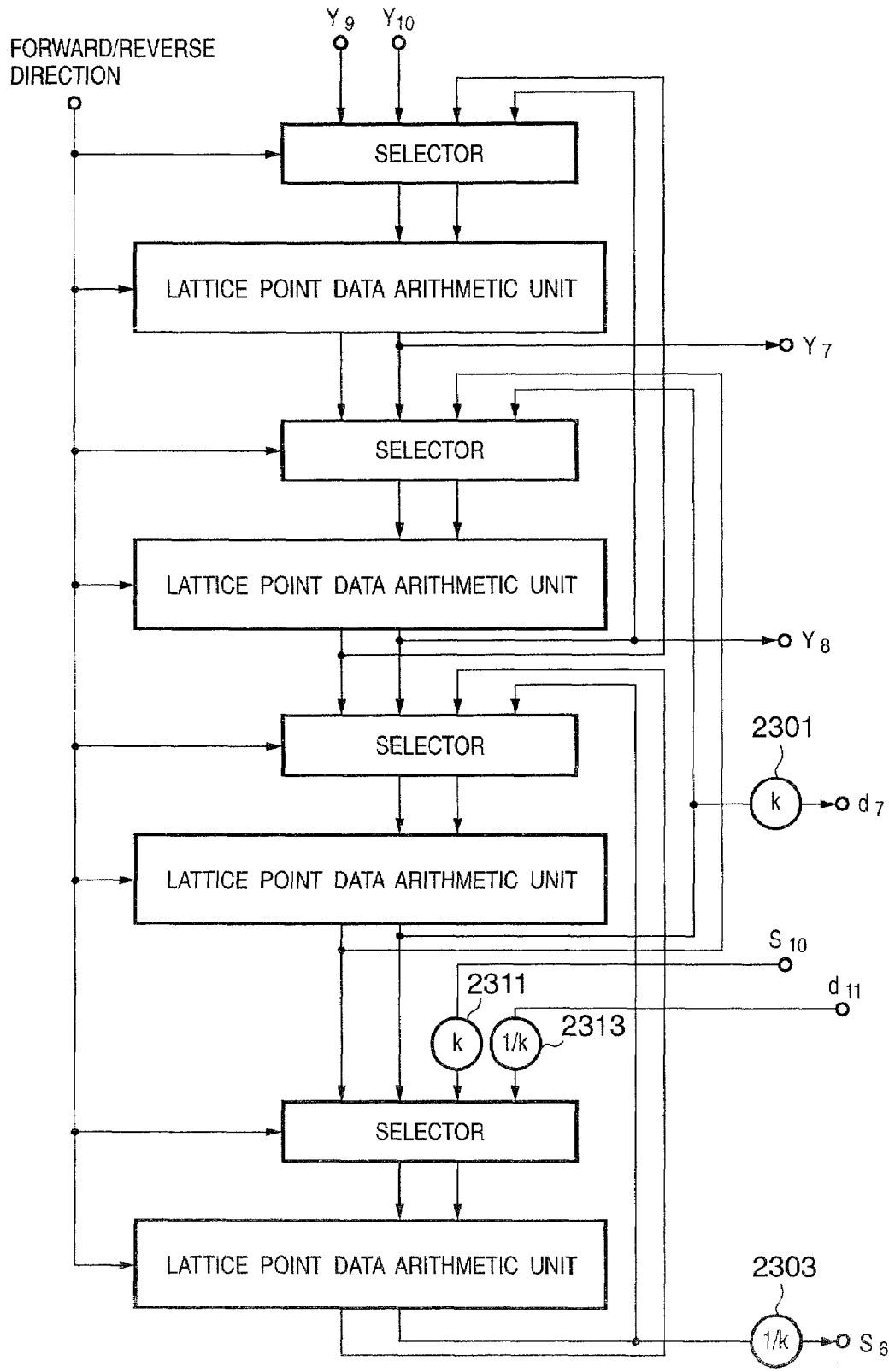
FIG. 23 is a diagram showing the arrangement obtained by adding multipliers for scaling to a vertical 9/7-DWT/IDWT arithmetic processor shown in FIG. 18.

When multipliers (2301, 2303, 2311, 2313) for scaling are added to the vertical 9/7-DWT/IDWT arithmetic processor shown in FIG. 18, an arrangement shown in FIG. 23 is obtained. As can be seen from FIG. 23, two multipliers 2301 and 2303 are required for DWT arithmetic scaling, and two multipliers 2311 and 2313 are required for IDWT arithmetic scaling.

These four multipliers are not simultaneously used, and only two multipliers are used at a given timing.

This modification uses two identical multipliers in the two transformation modes by following the rules of modification 2 as much as possible.

Figure 24:
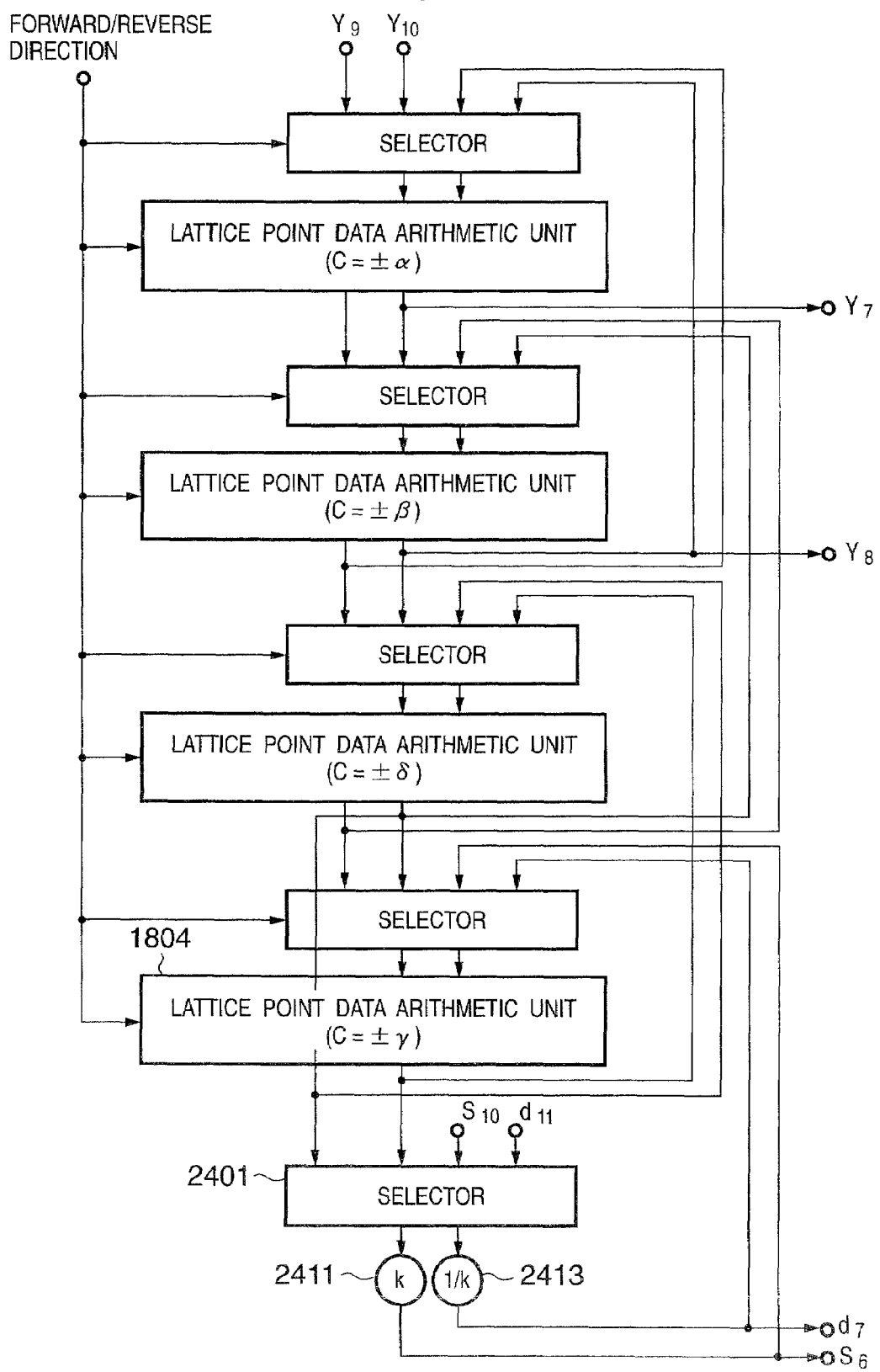
FIG. 24 is a diagram showing the arrangement of a vertical 9/7-DWT/IDWT arithmetic processor of modification 3 in the first embodiment of the present invention.

FIG. 24 shows the arrangement of a vertical 9/7-DWT/IDWT arithmetic processor of this modification. A selector 2401 is connected to the output side of the lattice point data arithmetic unit 1804, and two multipliers 2411 and 2413 which are commonly used are connected to the output side of the selector 2401. Other arrangements and building components are the same as those in FIG. 18 of modification 2.

Modification 4

Figure 25:
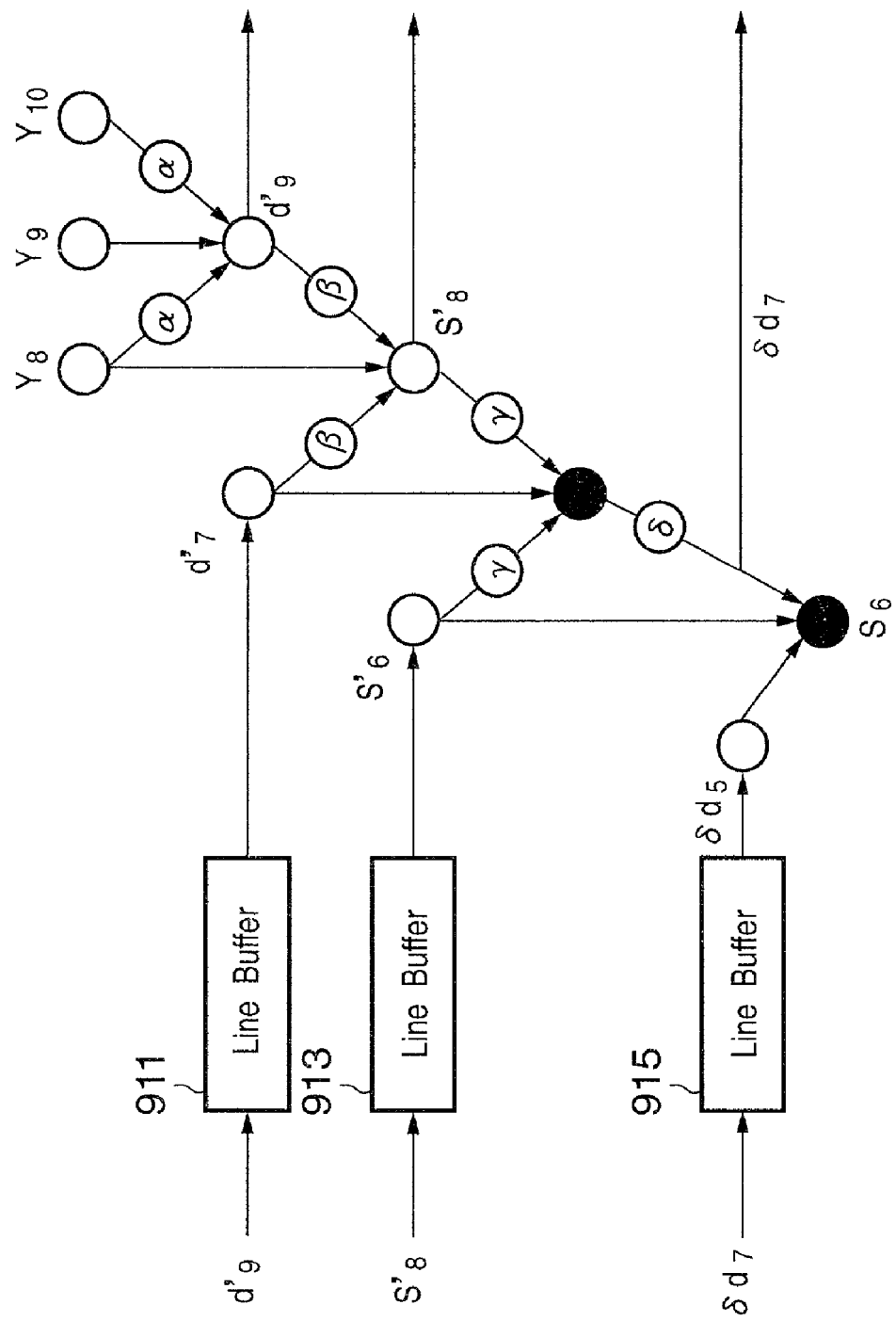
FIG. 25 is a diagram showing the arrangement of an arithmetic unit of modification 4 in the first embodiment of the present invention.

This modification presents an arithmetic processor shown in FIG. 25 as a modification of the arithmetic processor shown in FIG. 9. In the arithmetic processor shown in FIG. 9, d7 is input to the line buffer 915. However, in this modification, δ·d7 obtained by multiplying d7 by the parameter δ in advance is input. The line buffer 915 that receives δ·d7 outputs an output value δ·d5 similarly multiplied by the parameter δ. Other arrangements and operations are the same as those in the arithmetic processor shown in FIG. 9.

In this arrangement, the arithmetic volume is the same as that made by the arithmetic processor shown in FIG. 9. In this modification, d7 has been exemplified. However, the present invention is not limited to such specific data, and some or all of remaining d'9 and s'8 may be used. For example, in case of d'9, the line buffer 911 receives β·d'9, and its output is β·d'7. Upon computing s'8, β·d'7 is not multiplied by β.

Modification 5

Figure 26:
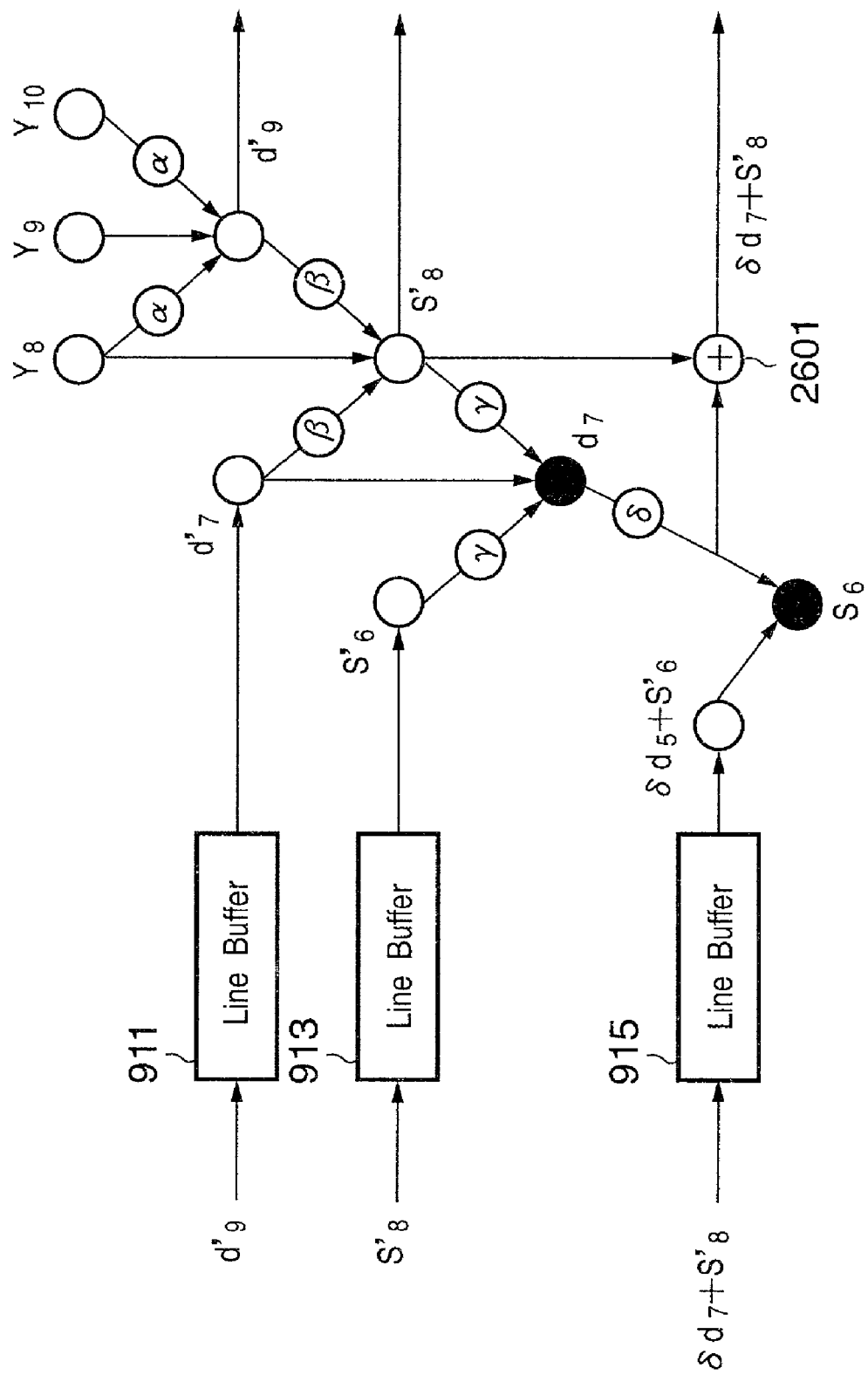
FIG. 26 is a diagram showing the arrangement of an arithmetic unit of modification 5 in the first embodiment of the present invention.

This modification presents an arithmetic processor shown in FIG. 26 as a modification of the arithmetic processor shown in FIG. 9. In the arithmetic processor shown in FIG. 9, d7 is input to the line buffer 915. However, in this modification, (δ·d7+s'8) is input, and an adder 2601 for adding s'8 to δ·d7 is equipped so as to generate (δ·d7+s'8) which is to be input to the line buffer 915.

In FIG. 26, the number of adders increases. However, an addition process required for computing the transform coefficient s6 includes additions of three terms in, e.g., modification 4, but those of two terms in this modification. Hence, the total arithmetic volume is the same as that of, e.g., modification 4.

Modification 6

In the above modification, three transform data calculated from identical column data one line before are delayed by the three delay units. In this modification, one transform coefficient calculated from identical column data one line before and an intermediate arithmetic result upon computing transform data on the lattice are respectively delayed by first and second delay units, and are used in calculations of a new transform coefficient.

Figure 27:
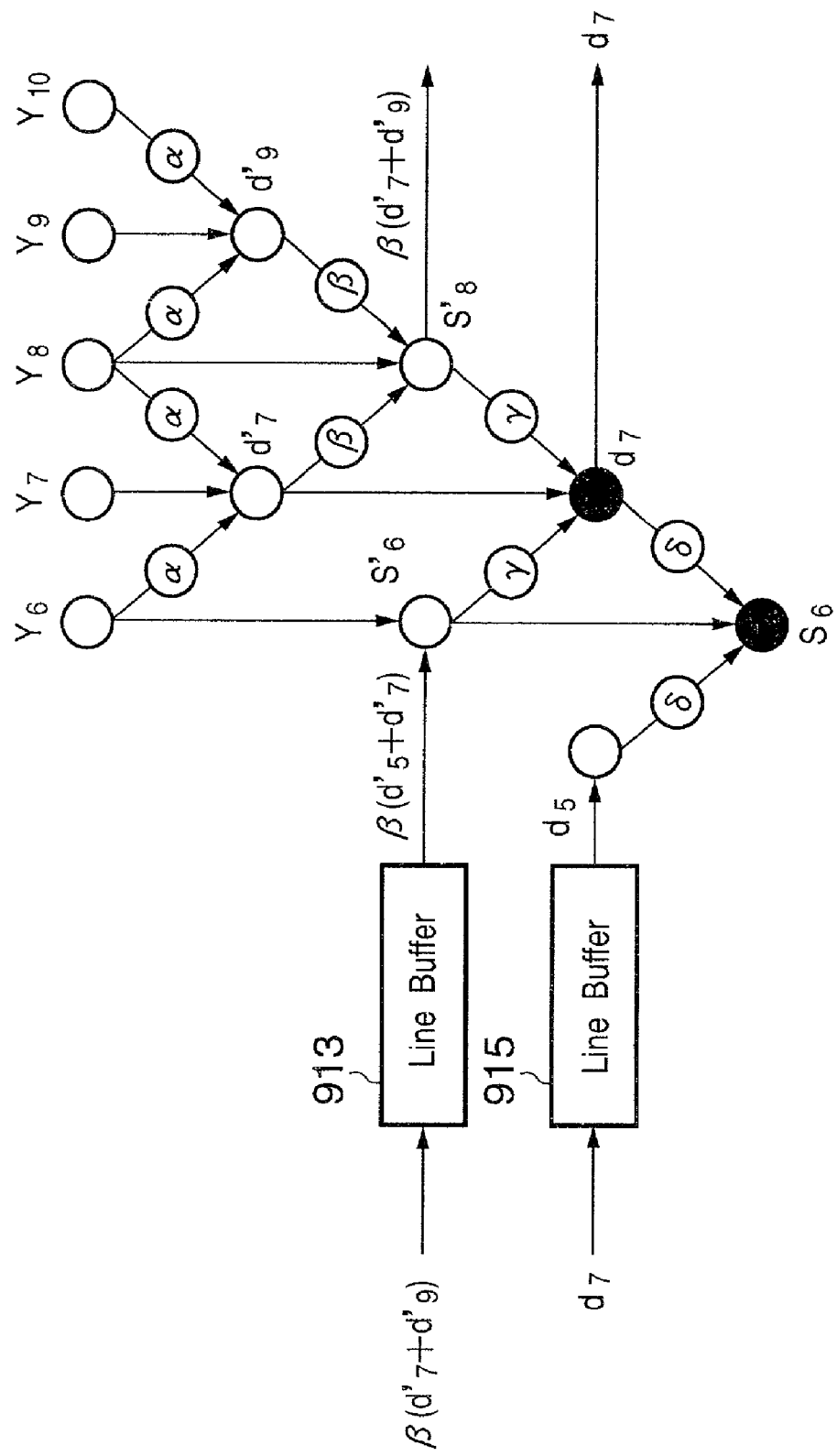
FIG. 27 is a diagram showing the arrangement of an arithmetic unit of modification 6 in the first embodiment of the present invention.

FIG. 27 shows a schematic arrangement of an arithmetic processor of this modification. Two delay units (line buffers) 913 and 915 are used in the arithmetic processor shown in FIG. 9. The line buffer 915 stores the transform coefficient d7 as in the first embodiment, but the line buffer 913 stores β·(d'7+d'9). Line data Y6, Y7, Y8, Y9, and Y10 required for calculating β·(d'7+d'9) are input from five terminals in the upper portion of FIG. 27, and another data β·(d'5+d'7) required for calculating the transform coefficient d7 is supplied from the line buffer 913. Since the execution timings and the like of the vertical filter process while making a horizontal scan are the same as those in the first embodiment, a detailed description thereof will be omitted.

Figure 28:
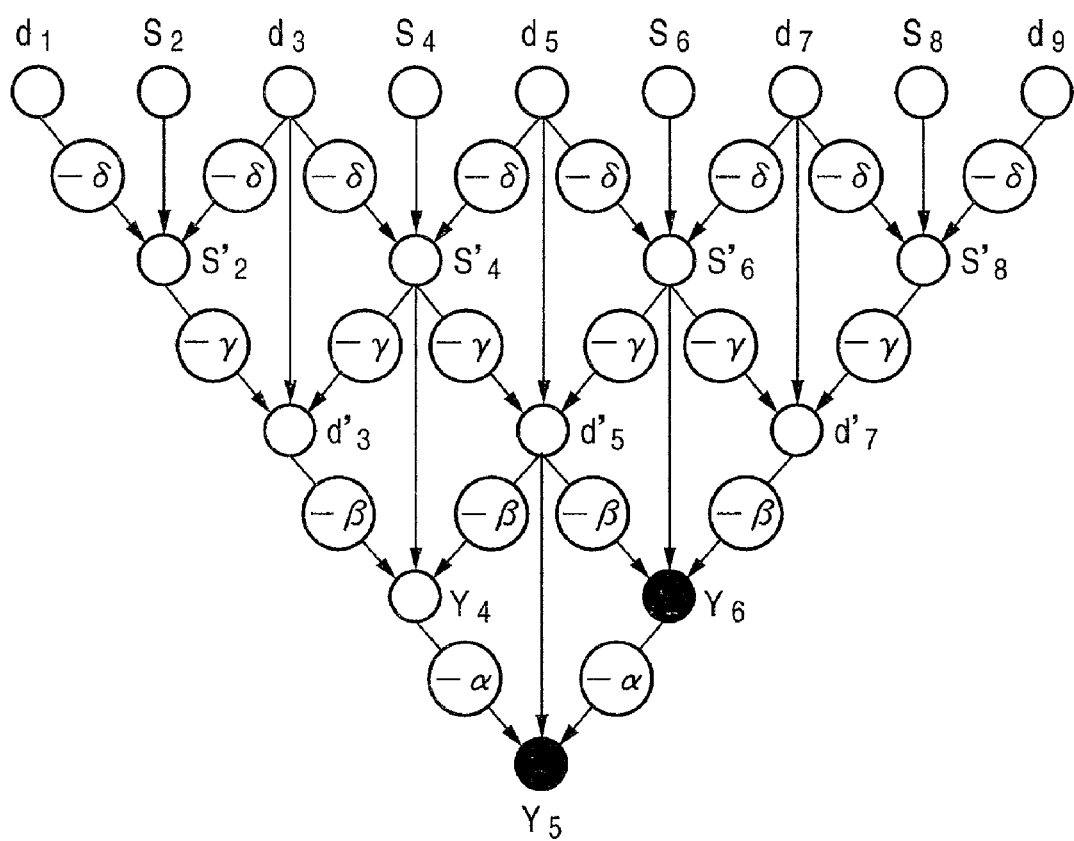
FIG. 28 shows a lifting lattice of inverse transformation.

Although this modification requires a larger arithmetic volume, the number of delay units can be smaller than that in the first embodiment. More specifically, three lattice point arithmetic operations are required per coefficient (two in the first embodiment), and only two delay units (first and second delay units) are required. In transformation using the lifting scheme, inverse transformation can be processed using the arrangement by inverting the order and signs of coefficients used in the lattice point arithmetic operations. That is, inverse transformation can be done by the arrangement obtained by applying the aforementioned embodiment and modifications to the lifting lattice shown in FIG. 28.

[Second Embodiment]

All the discrete wavelet transformation processes in the first embodiment and its modifications are associated with hardware. However, when the arithmetic processes are formulated, and sequences are implemented by line buffers, most of the above processes can be implemented by software. Hence, the present invention can be achieved not only by a wavelet coefficient transformation apparatus but by a wavelet coefficient transformation scheme.

Figure 29:
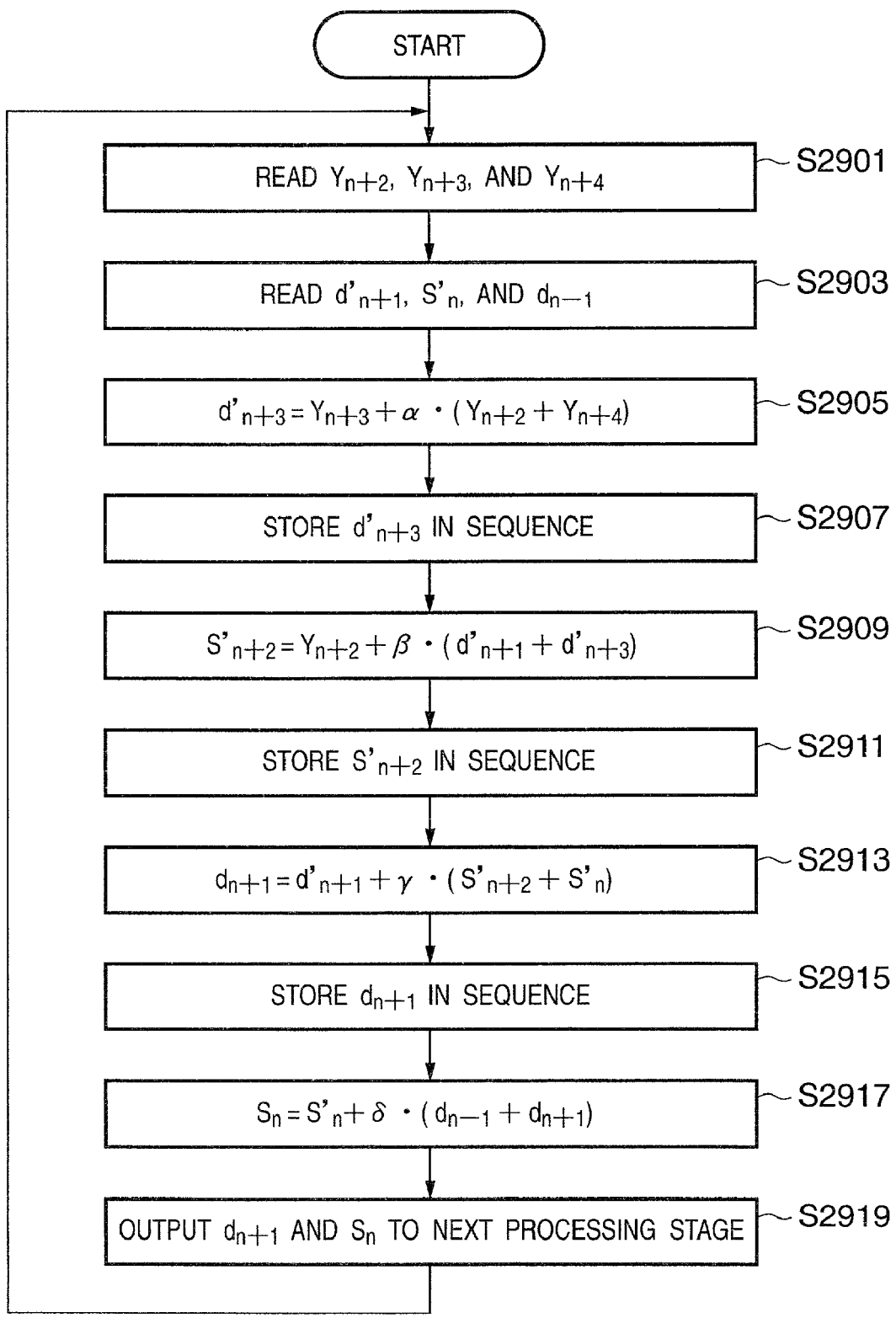
FIG. 29 is a flow chart of discrete wavelet transformation according to the second embodiment of the present invention.

This process will be explained below using the flow chart in FIG. 29. Assume that image data to be processed is input from an input device (not shown), and program codes according to this flow chart are stored in a memory that a CPU (not shown) can access. Note that index n used in the following description is n>1.

In step S2901, three image data (Yn+2, Yn+3, Yn+4) to be processed are read out from a memory (not shown).

In step S2903, three lattice point data d'n+1, S'n, and dn−1 are read out from sequences H1, H2, and H3 corresponding to line buffers, which store these lattice point data. In step S2905, d'n+3=Yn+3+α·(Yn+2+Yn+4) is computed. In step S2907, the lattice point data d'n+3 is stored in the sequence H1. In step S2909, S'n+2=Yn+2+β·(d'n+1+d'n+3) is computed. In step S2911, the lattice point data S'n+2 is stored in the sequence H2. In step S2913, d'n+1=d'n+1+γ·(S'n+2+S'n) is computed. In step S2915, the transform coefficient dn+l is stored in the sequence H3. In step S2917, Sn=S'n+δ·(dn−1+dn+1) is computed. In step S2919, the transform coefficients Sn and dn+1 are output to the next processing stage.

Since the processing contents of the respective steps and the overall process are obvious from the aforementioned embodiment, a description thereof will be omitted. As storage destinations of computed lattice point data and transform coefficients, simple transformation, registers, and the like may be used in place of the sequences.

According to the first and second embodiments of the present invention mentioned above, when the filter process is executed using a plurality of arithmetic units that make multiplication and addition, an increase in circuit scale can be suppressed, and the circuit structure can be simplified.

[Third Embodiment]

The embodiment to be described below allows an efficient boundary process when internal data of an image boundary are replicated and used in an external region upon processing the wavelet transformation process or filter process using the lifting arithmetic operations. Prior to the description of this embodiment, the terminology is defined.

A lattice point data arithmetic unit that computes one of equations (1) to (8) will be referred to as a single-function lattice point data arithmetic unit hereinafter.

By contrast, a lattice point data arithmetic unit which also has an arithmetic mode corresponding to the following boundary processes:

$$D0 = X0 + 2\alpha \cdot X1 \tag{1a}$$

$$E0 = X0 + 2\alpha \cdot D1 \tag{2a}$$

$$H0 = D0 + 2\gamma \cdot E1 \tag{3a}$$

$$L0 = E0 + 2\delta \cdot H1 \tag{4a}$$

$$DN = XN + 2\alpha \cdot XN{-}1 \quad (1b)$$

$$EN = XN + 2\beta \cdot DN{-}1 \quad (2b)$$

$$HN = DN + 2\gamma \cdot EN{-}1 \quad (3b)$$

$$LN = EN + 2\delta \cdot HN{-}1 \quad (4b)$$

$$E0 = L0 - 2\delta \cdot H1 \quad (5a)$$

$$D0 = H0 - 2\gamma \cdot E1 \quad (6a)$$

$$X0 = E0 - 2\beta \cdot D1 \quad (7a)$$

$$X0 = D0 - 2\alpha \cdot X1 \quad (8a)$$

$$EN = LN - 2\delta \cdot HN{-}1 \quad (5b)$$

$$DN = HN - 2\gamma \cdot EN{-}1 \quad (6b)$$

$$XN = EN - 2\beta \cdot DN{-}1 \quad (7b)$$

$$XN = DN - 2\alpha \cdot XN{-}1 \quad (8b)$$

will be referred to as a boundary lattice point data arithmetic unit hereinafter.

Equations (1a) to (4a) and (5a) to (8a) are arithmetic operations corresponding to the head boundary data, and equations (1b) to (4b) and (5b) to (8b) are arithmetic operations corresponding to the last boundary data.

A boundary lattice point data arithmetic unit based on a single-function lattice point data arithmetic unit that computes equation (1) also has one or both of arithmetic functions of equations (1a) and (1b). The same applies to lattice point data arithmetic units corresponding to equations (2) to (8).

Figure 37:
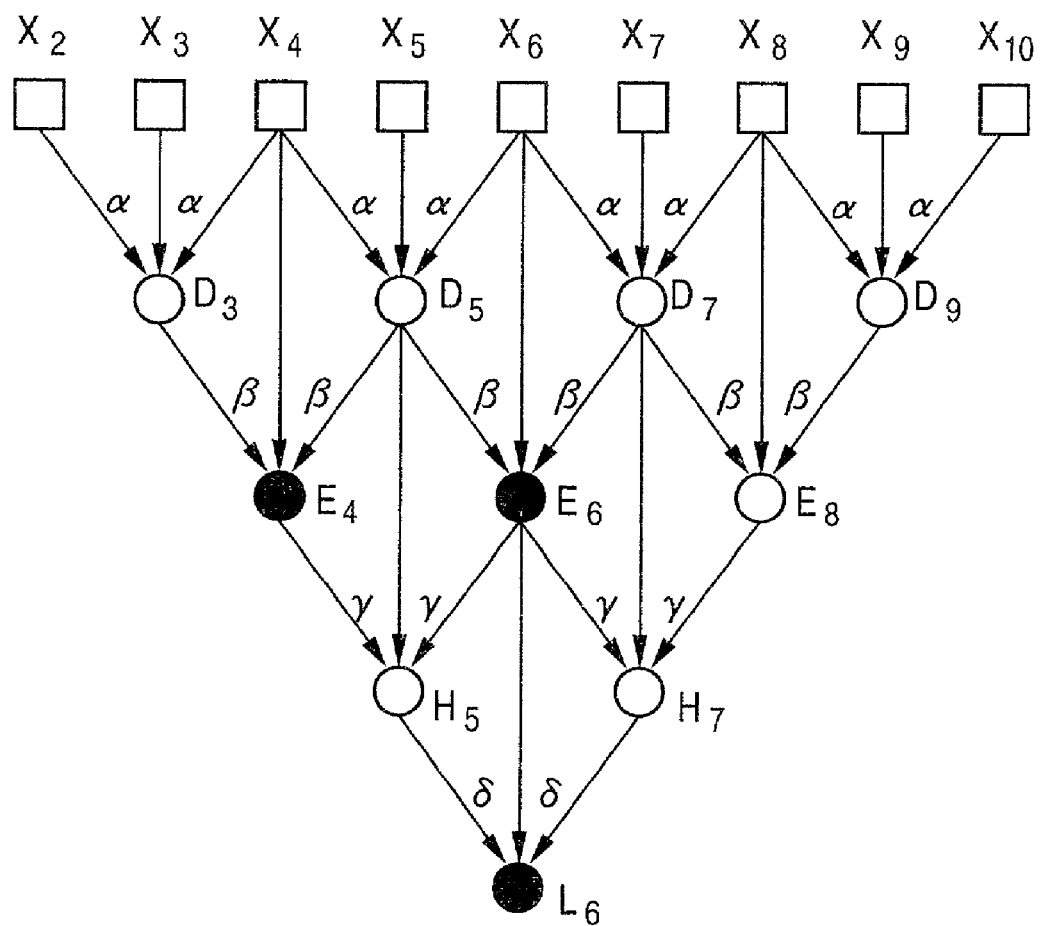
FIG. 37 is a view showing the structure of the third embodiment.

FIG. 37 shows the arrangement of the third embodiment according to the present invention in consideration of the definitions of terminology mentioned above. In FIG. 37:

● represents a lattice point data arithmetic unit also having an arithmetic function corresponding to boundary data, i.e., a boundary lattice point data arithmetic unit, and ○ represents a single-function lattice point data arithmetic unit. Other symbols are the same as those in FIG. 32.

A boundary lattice point data arithmetic unit that outputs E0 has arithmetic functions of both equations (2) and (2a), and a boundary lattice point data arithmetic unit that outputs L0 has arithmetic functions of both equations (4) and (4a).

FIG. 37 shows minimum lattice point data arithmetic units required for outputting a pair of low- and high-frequency transform coefficients, and that arrangement (connection relationship) can be replaced by hardware.

Figure 35:
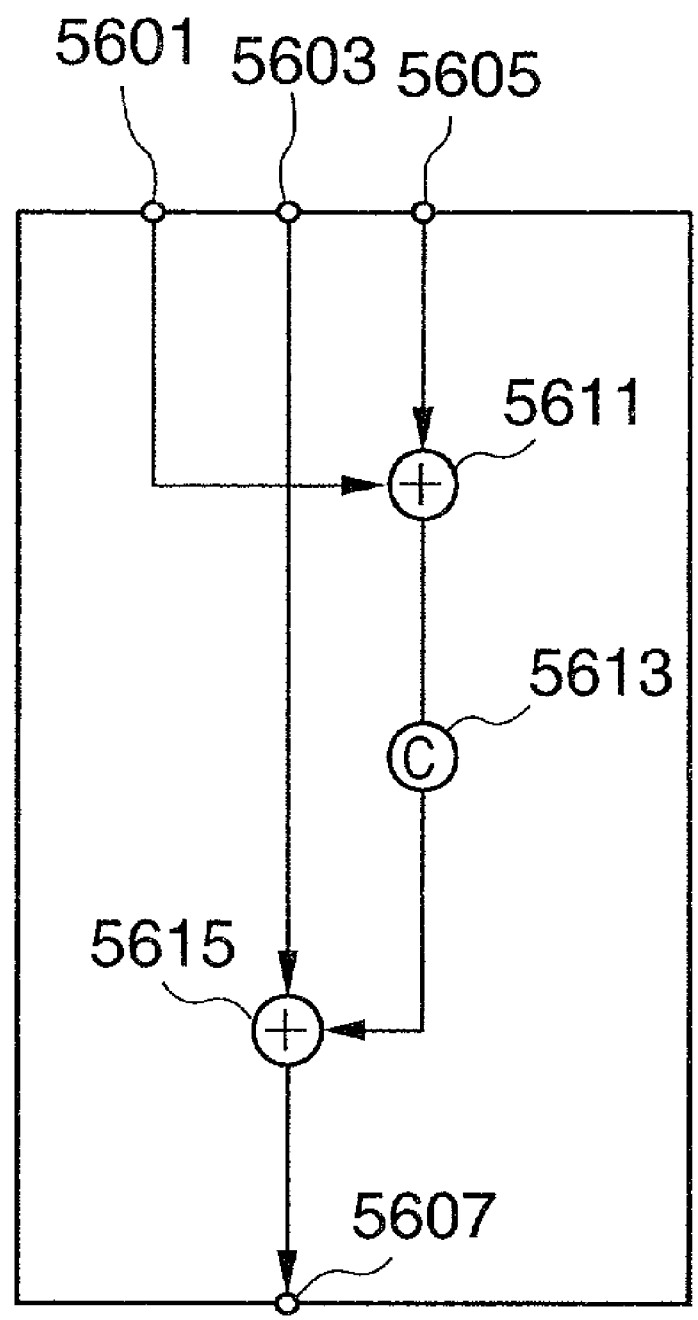
FIG. 35 is a diagram showing the arrangement of a lattice point data arithmetic unit.
Figure 36:
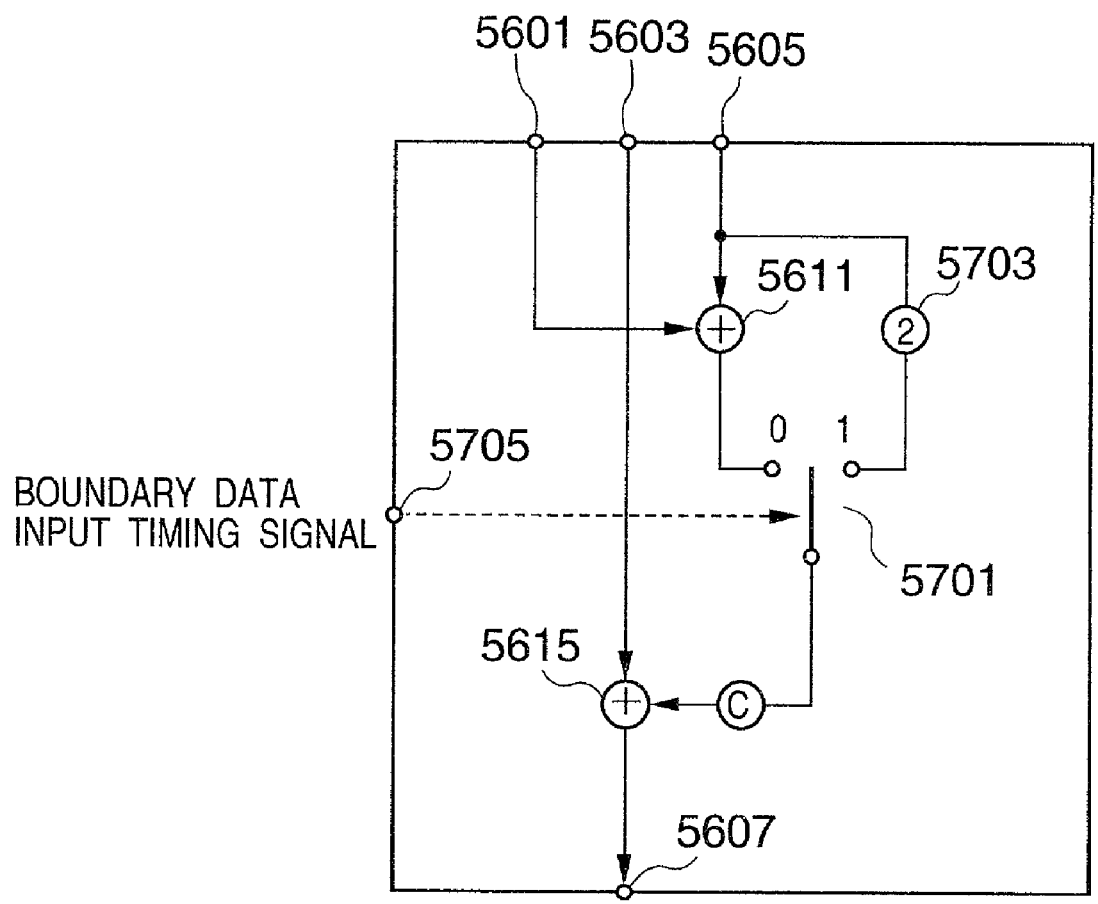
FIG. 36 is a diagram showing a wavelet transformation processor using the lattice point data arithmetic unit.

The lattice point data arithmetic units can be implemented by arrangements shown in FIGS. 35 and 36. In FIG. 35, reference numerals 5601, 5603, and 5605 denote terminals for inputting three data; 5607, a terminal for outputting computed lattice point data; 5611, an adder for adding two end input data; 5613, a multiplier for multiplying the sum by a coefficient (one of $\alpha$, $\beta$, $\gamma$, and $\delta$); and 5615, an adder for adding the product to the central input data.

The lattice point data arithmetic unit in which the multiplication coefficient of the multiplier 5613 is $\alpha$ is a single-function lattice point data arithmetic unit corresponding to equation (1), and those in which the multiplication coefficients are $\beta$, $\gamma$, and $\delta$ are single-function lattice point data arithmetic units corresponding to equations (2), (3), and (4), respectively.

Assuming that the multiplication coefficient is $\alpha$, and data X2, X3, and X4 are input to the terminals 5601, 5603, and 5605, D2=X2+$\alpha$(X1+X3) is computed according to equation (1), and the result is output from the terminal 5607.

In FIG. 36, a position converter 5703, selector 5701, and terminal 5705 for inputting a switching control signal of the selector are added in addition to the arrangement shown in FIG. 35. This lattice point data arithmetic unit also has an arithmetic function of boundary data in addition to that of FIG. 35.

When the head boundary data is input to the terminal 5603 and no effective data is input to the terminal 5601, data input from the terminal 5605 is input to the position converter 5703 which doubles that data by shifting up its bit position by one, and the converted data is selected by the selector 5701 in place of the output from the adder 5611 to make subsequent calculations. The arithmetic result is output as boundary-processed data from the terminal 5607. Since this arithmetic operation is executed only when the head boundary data is input to the terminal 5603, its timing is controlled by a control signal input from the terminal 5705.

When the lattice point data arithmetic units described using FIGS. 35 and 36 are arranged, as shown in FIG. 37, a boundary process can be done without any problems as a whole. To help easier understanding, FIGS. 38 to 40 show the flow of valid data by the solid lines and that of invalid data by the broken lines upon executing the boundary process.

Figure 38:
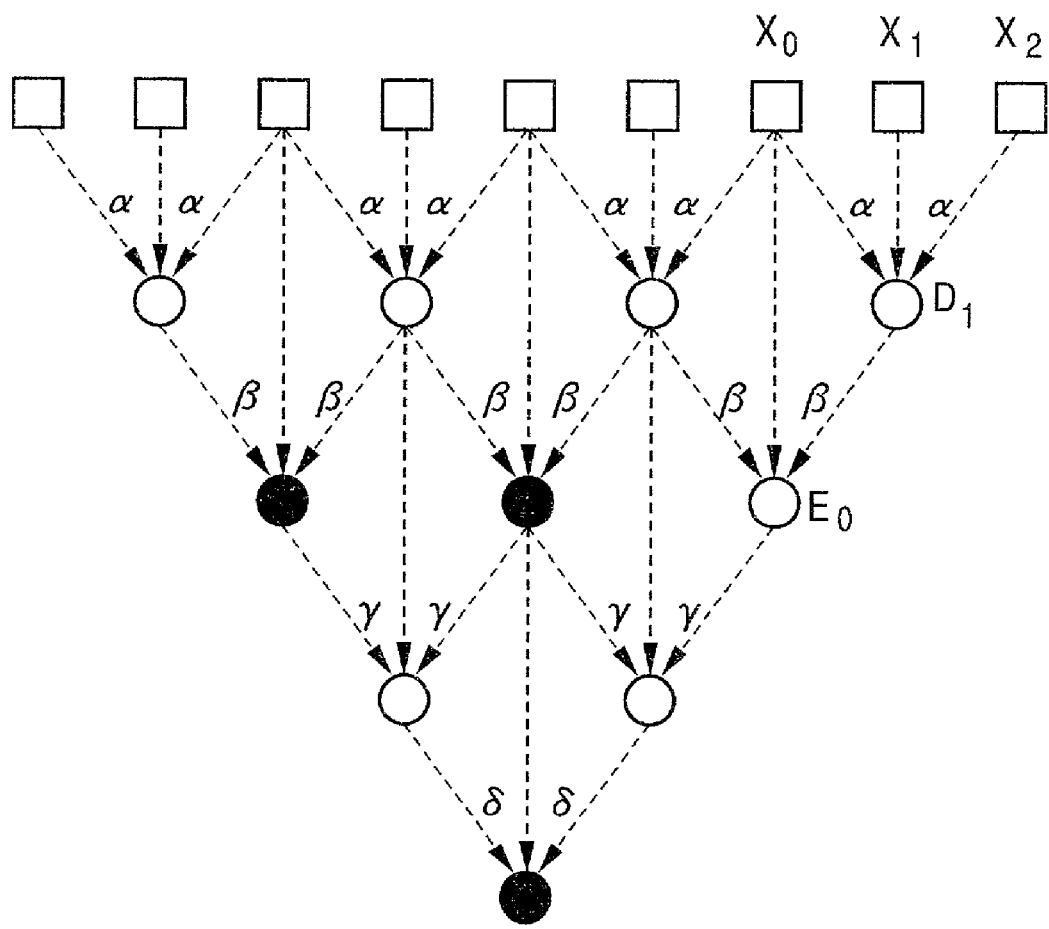
FIG. 38 is a view for explaining the operation of the third embodiment.

In FIG. 38, since head data X0 has not reached the position to be processed yet, no processing output is obtained, and all arithmetic operations are invalidated. Hence, all data flows are indicated by the broken lines. Since the lifting arithmetic operation yields two output data for a given data input, input data can be shifted by two taps to obtain the same number of output data as that of input data. For this reason, cases will be examined in FIGS. 39 and 40 to be described below wherein input states in which input data in FIG. 38 are shifted to the left by two taps each are processed.

Figure 39:
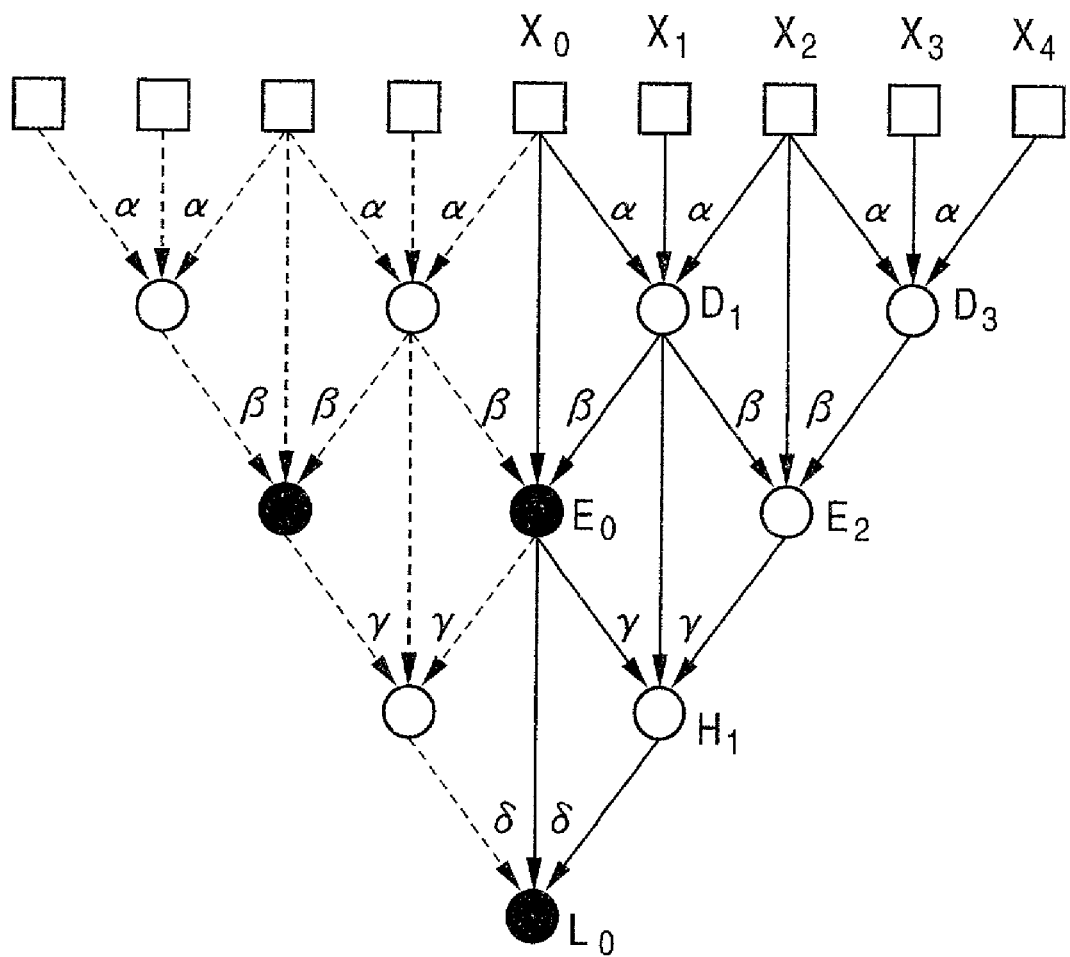
FIG. 39 is a view for explaining the operation of the third embodiment.

FIG. 39 shows a case wherein head data X0 is located at a boundary process position. Since there is no input data on the left side of head data X0, input/output data to the left four lattice point data arithmetic units are invalidated. At this time, since the lattice point data arithmetic units that compute E0 and L0 have only two valid input data, they process in an arithmetic mode corresponding to the boundary process. Of course, a control signal for switching the arithmetic mode is switched like 0→1→0 in synchronism with the timings of input data.

Figure 40:
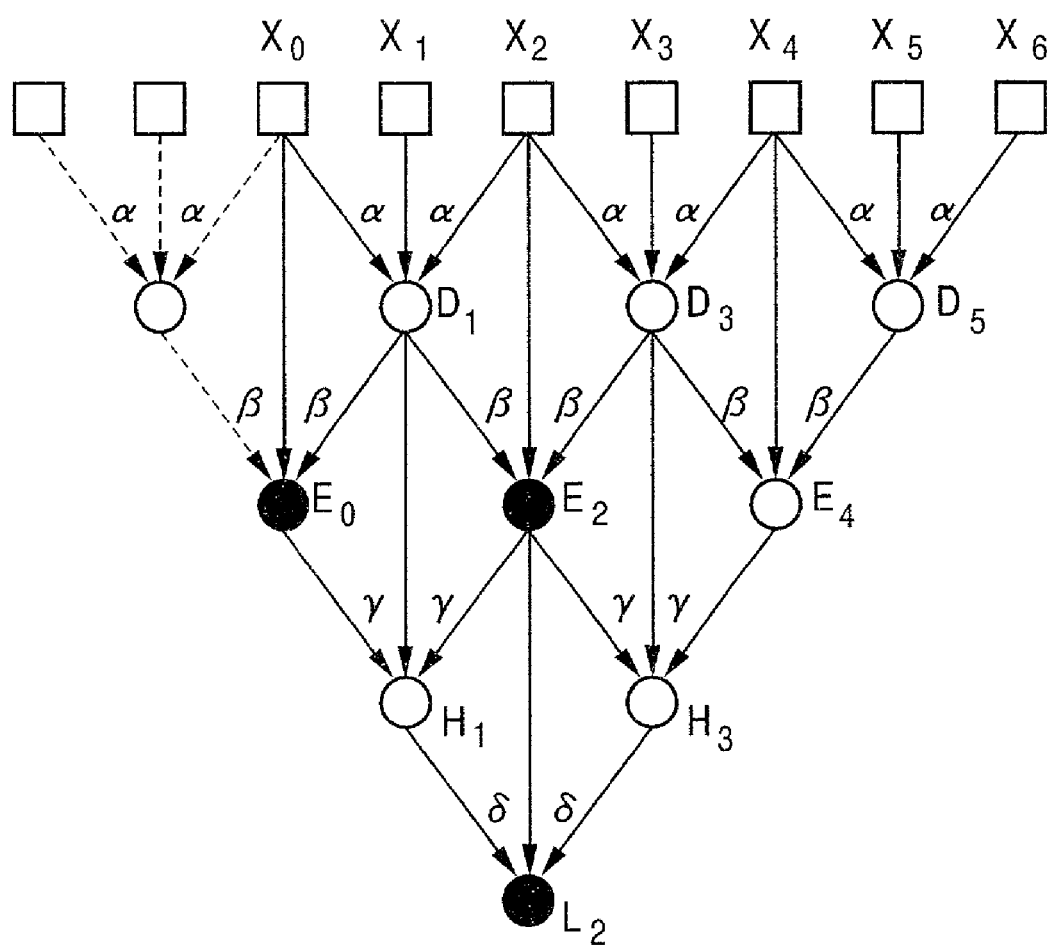
FIG. 40 is a view for explaining the operation of the third embodiment.

FIG. 40 shows a case wherein head data X0 has passed the boundary process position. In this case, E0 is required to calculate L2, and the lattice point data arithmetic unit that calculates E0 has only two valid input data. Hence, that lattice point data arithmetic unit must process in the arithmetic mode corresponding to the boundary process.

Figure 41:
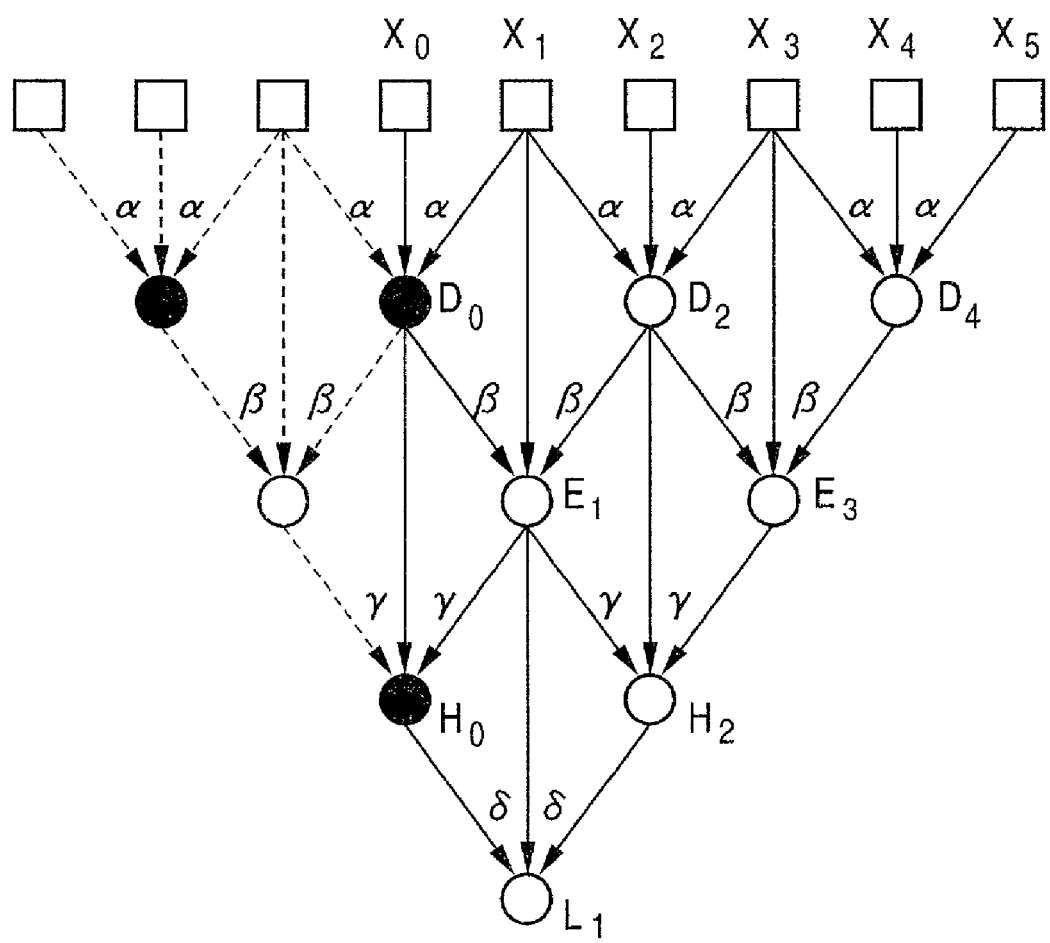
FIG. 41 is a view showing another structure of the third embodiment.

The above description corresponds to a case wherein the head input data is transformed into a low-frequency coefficient. Upon transforming the head input data into a high-frequency coefficient, processing must be done using another arrangement. FIG. 41 shows that arrangement. In order to transform the head input data into a high-frequency coefficient, the head data input position must be shifted by one unlike transformation into a low-frequency coefficient. FIG. 41 also shows this state.

The positions of the boundary lattice point data arithmetic units ● are shifted to the left by one in correspondence with the input position of the head data that has been shifted by one.

The shift direction of the boundary lattice point data arithmetic units ● is not limited to the left but may be the right. The arrangement in such case is as shown in FIG. 42.

Figure 42:
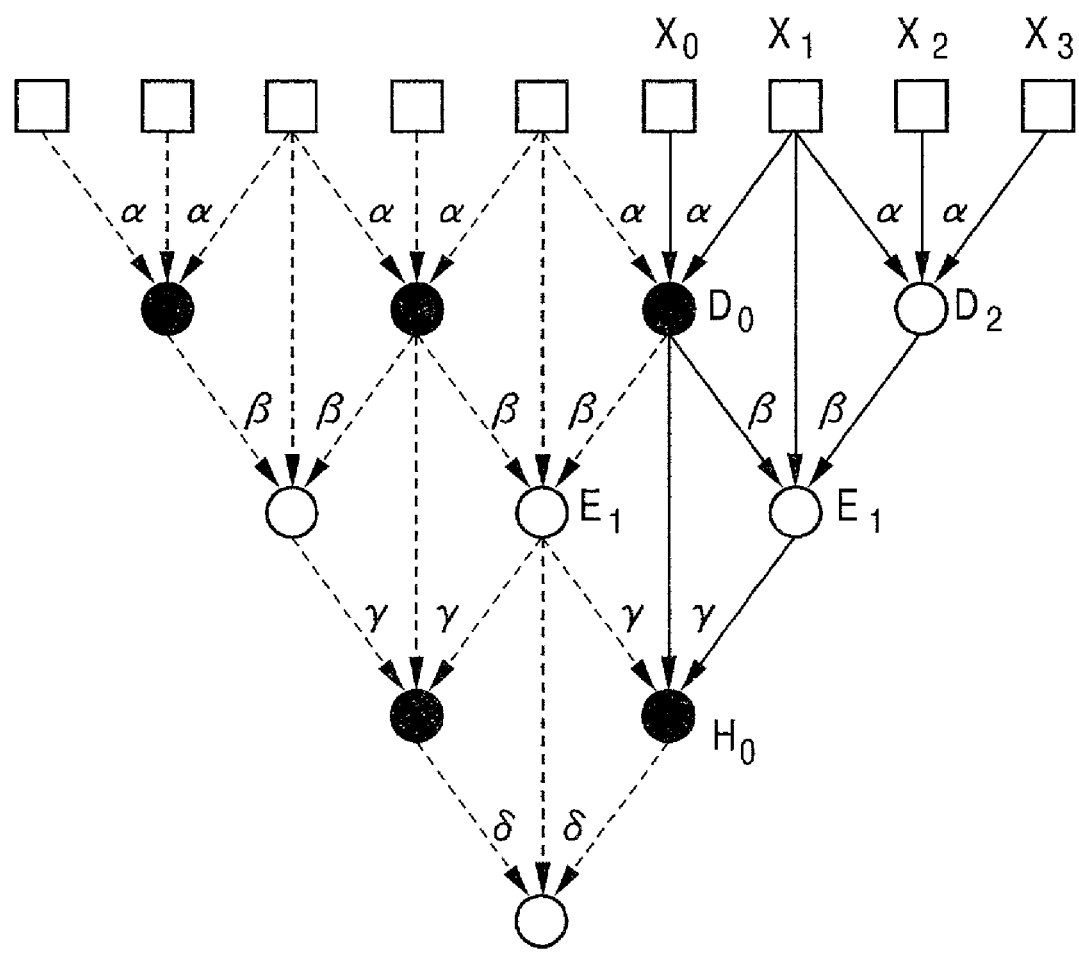
FIG. 42 is a view showing still another structure of the third embodiment.
Figure 43:
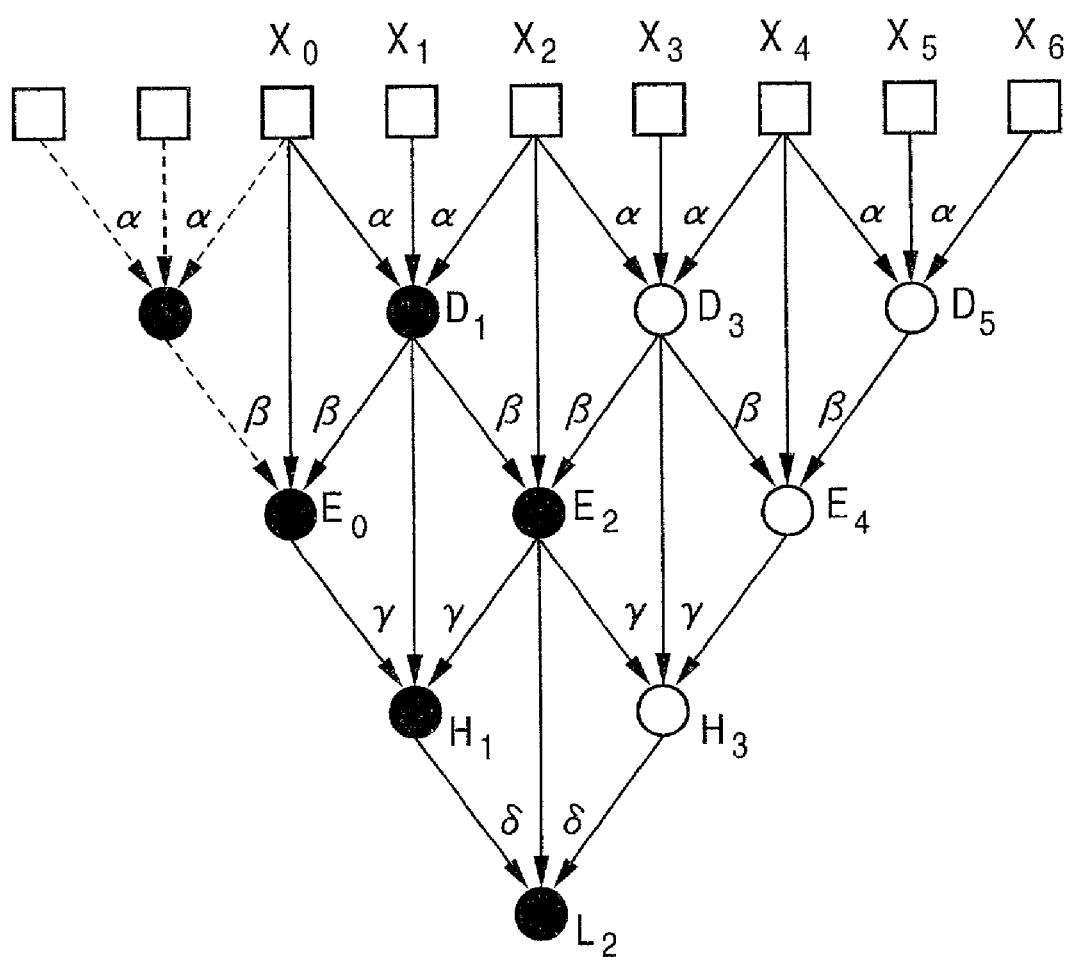
FIG. 43 is an expanded view of the structure of the third embodiment.
Figure 44:
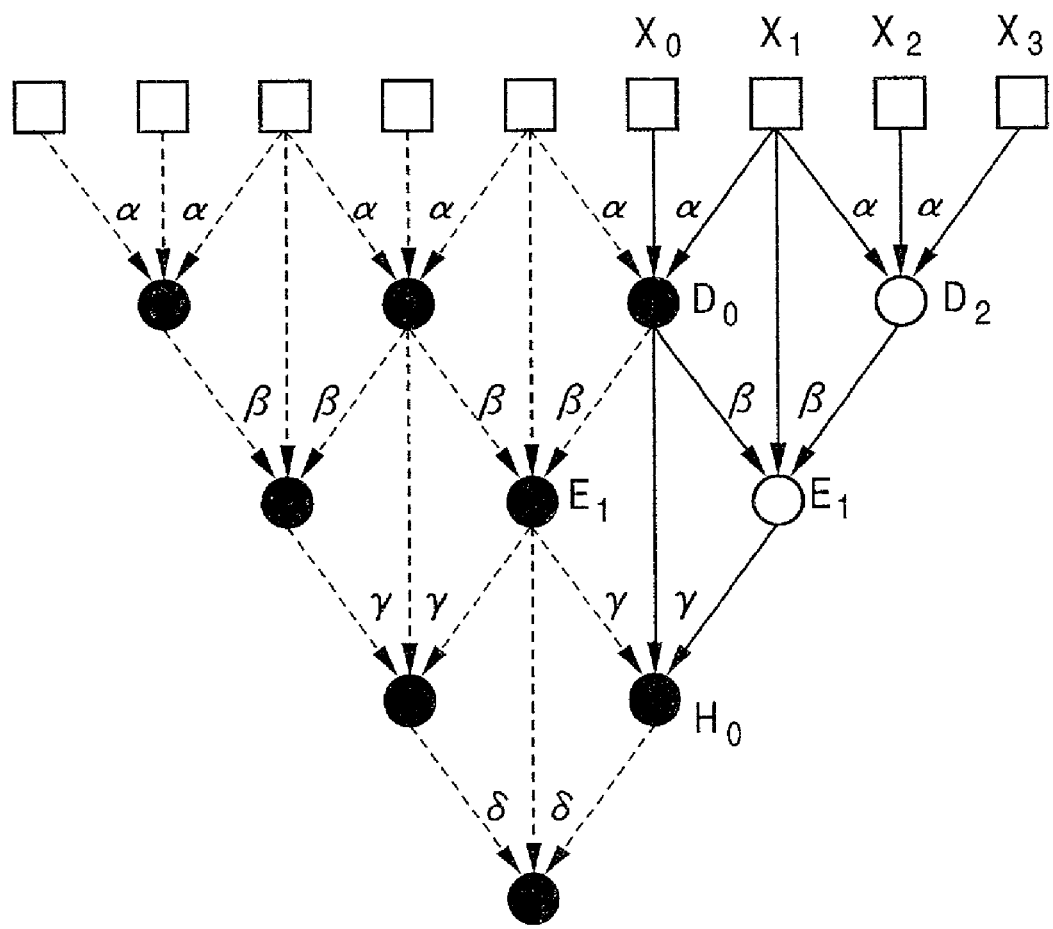
FIG. 44 is an expanded view of the structure of the third embodiment.

When head data in a given block must be transformed into a low-frequency coefficient, and that in another block into a high-frequency coefficient, processing must be done using an arrangement shown in FIG. 43 which has both the functions of FIGS. 37 and 42. Also, an arrangement in FIG. 44 is available as that corresponding to FIG. 42.

When an image undergoes wavelet transformation, as described above, processing can be done without preparing for data outside the boundary in advance as if data replicated at the boundary were apparently generated at the boundary processing timing. Therefore, the need for a process for preparing for data outside the boundary before the filter process can be obviated, and the need for a storage area for storing data outside the boundary can also be obviated.

In the above example, the boundary process of head data of the boundary has been discussed. An arrangement corresponding to a boundary process of last data (to be referred to as a terminal end process hereinafter) will be explained below.

Two methods are available to cope with the terminal end process. One of these methods will be described below, and the other will be described later as a modification.

Briefly speaking, an important point of this embodiment is to input all input data to the arithmetic units after their positions are symmetrically exchanged.

Figure 45:
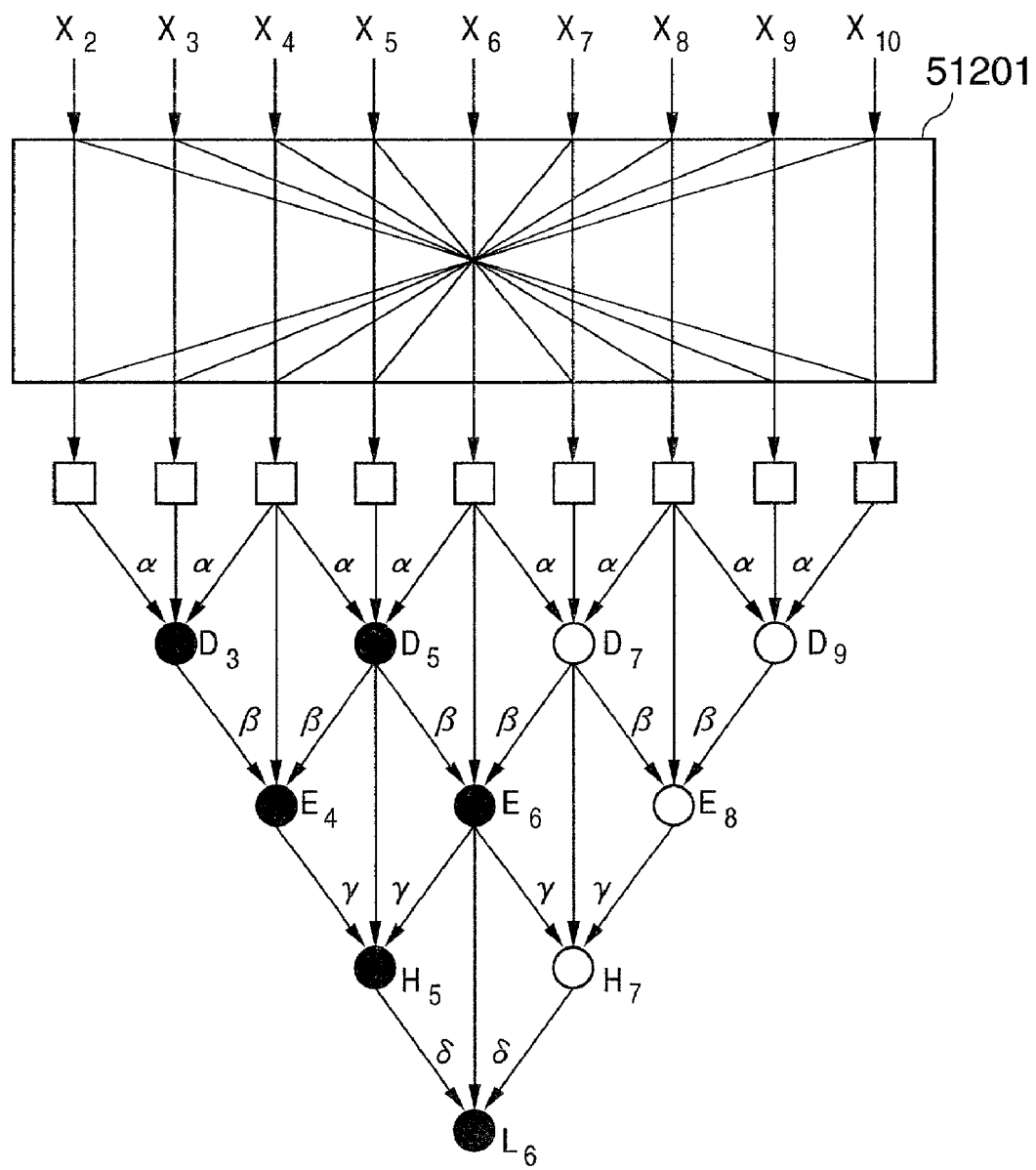
FIG. 45 is a view showing the structure of a modification of the third embodiment.

For this purpose, a cross switch 51201 for symmetrically exchanging the positions of input data is provided. The arithmetic process uses FIG. 43 or 44 of the above example. FIG. 45 shows an arrangement when FIG. 43 is used.

The cross switch 51201 has a cross mode for outputting input data after exchanging their right and left positions, and a through mode for directly outputting input data to the right-down units without exchanging them.

The cross switch operates in the through mode from the head data to given middle data, and is switched to the cross mode halfway through the process to input up to the last data.

The output position of the processing result changes before and after mode switching, and the way the output position changes differs depending on the arithmetic processors shown in FIGS. 43 and 44.

Figure 46:
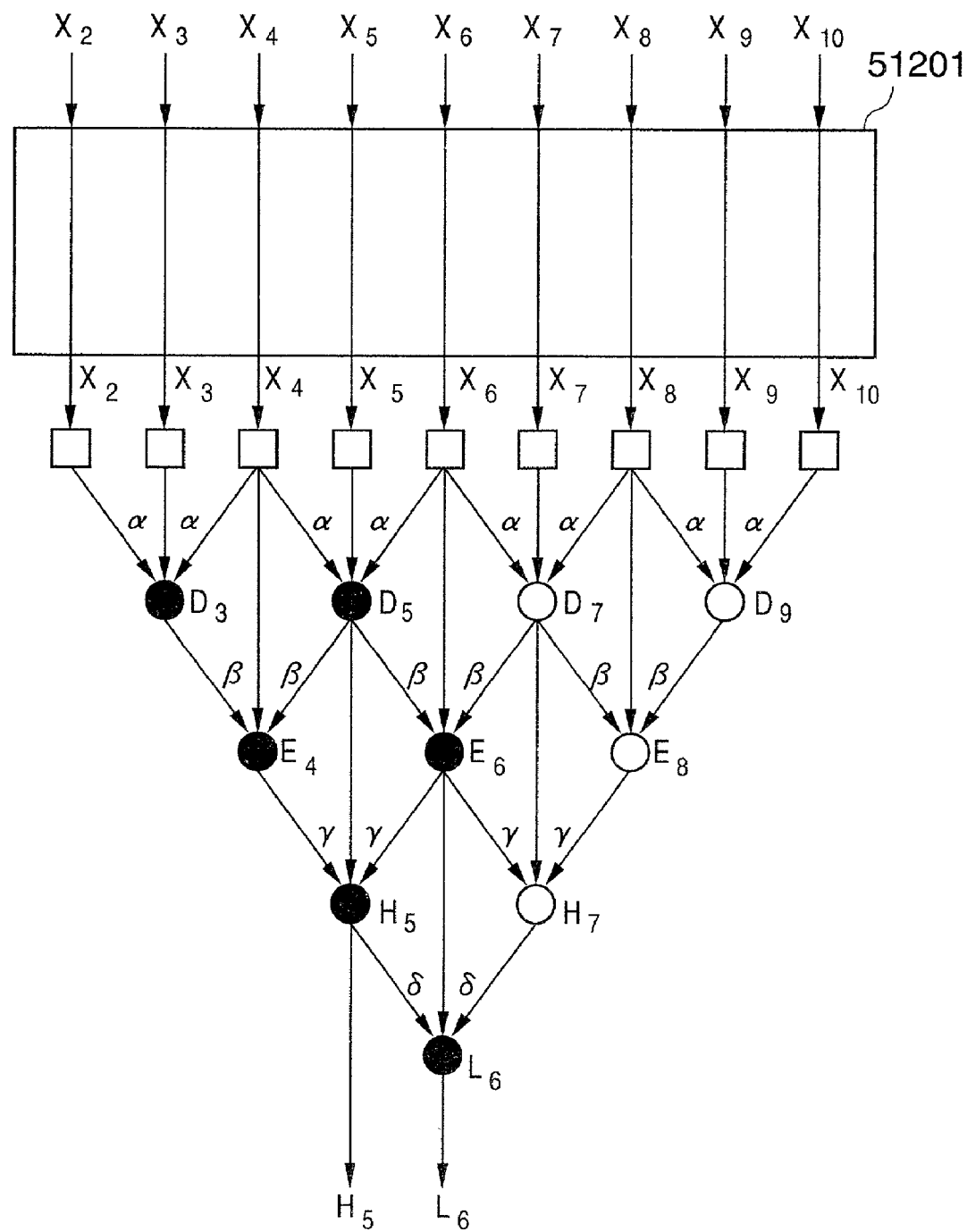
FIG. 46 is a view for explaining the operation of the modification of the third embodiment.
Figure 47:
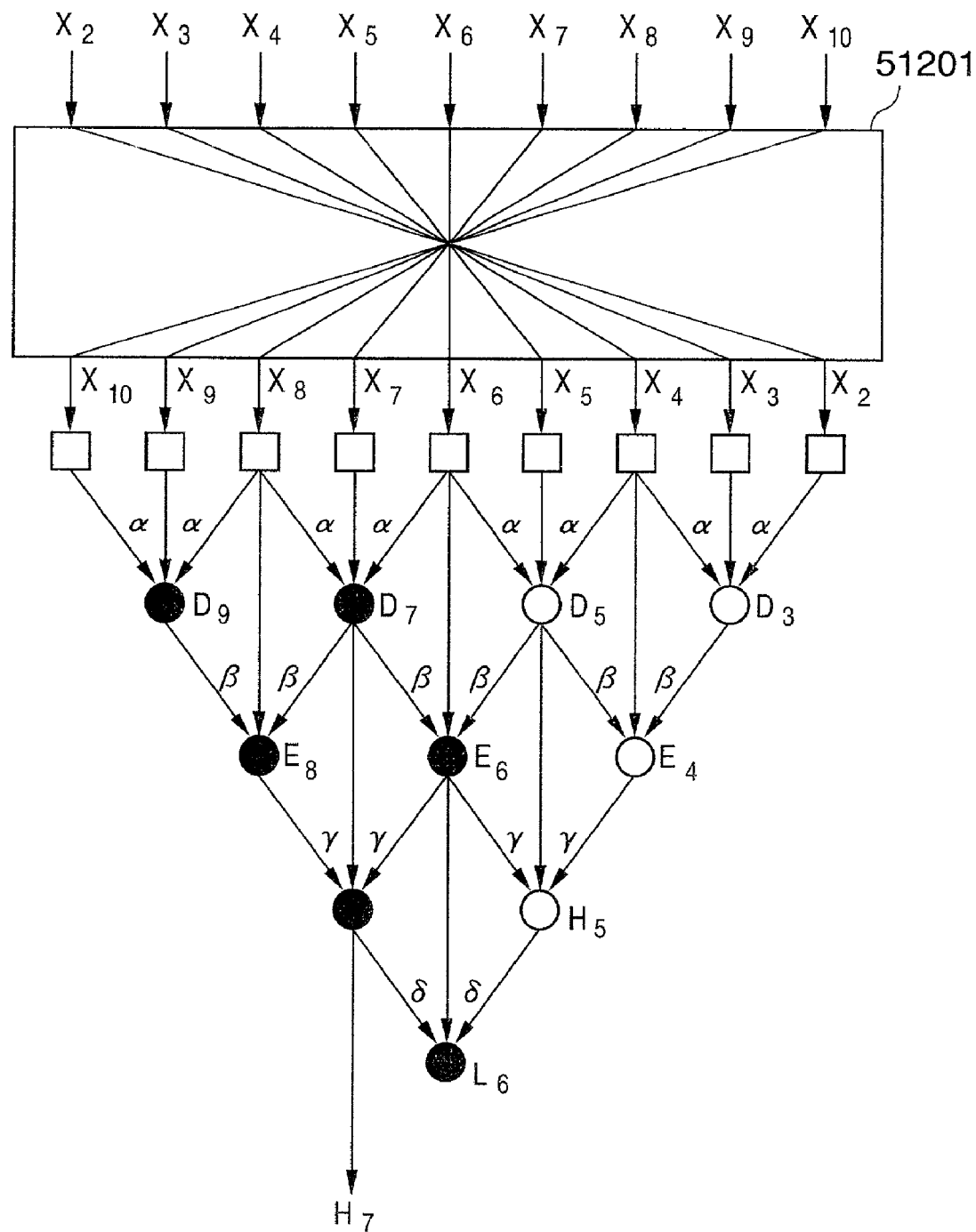
FIG. 47 is a view for explaining the operation of the modification of the third embodiment.
Figure 48:
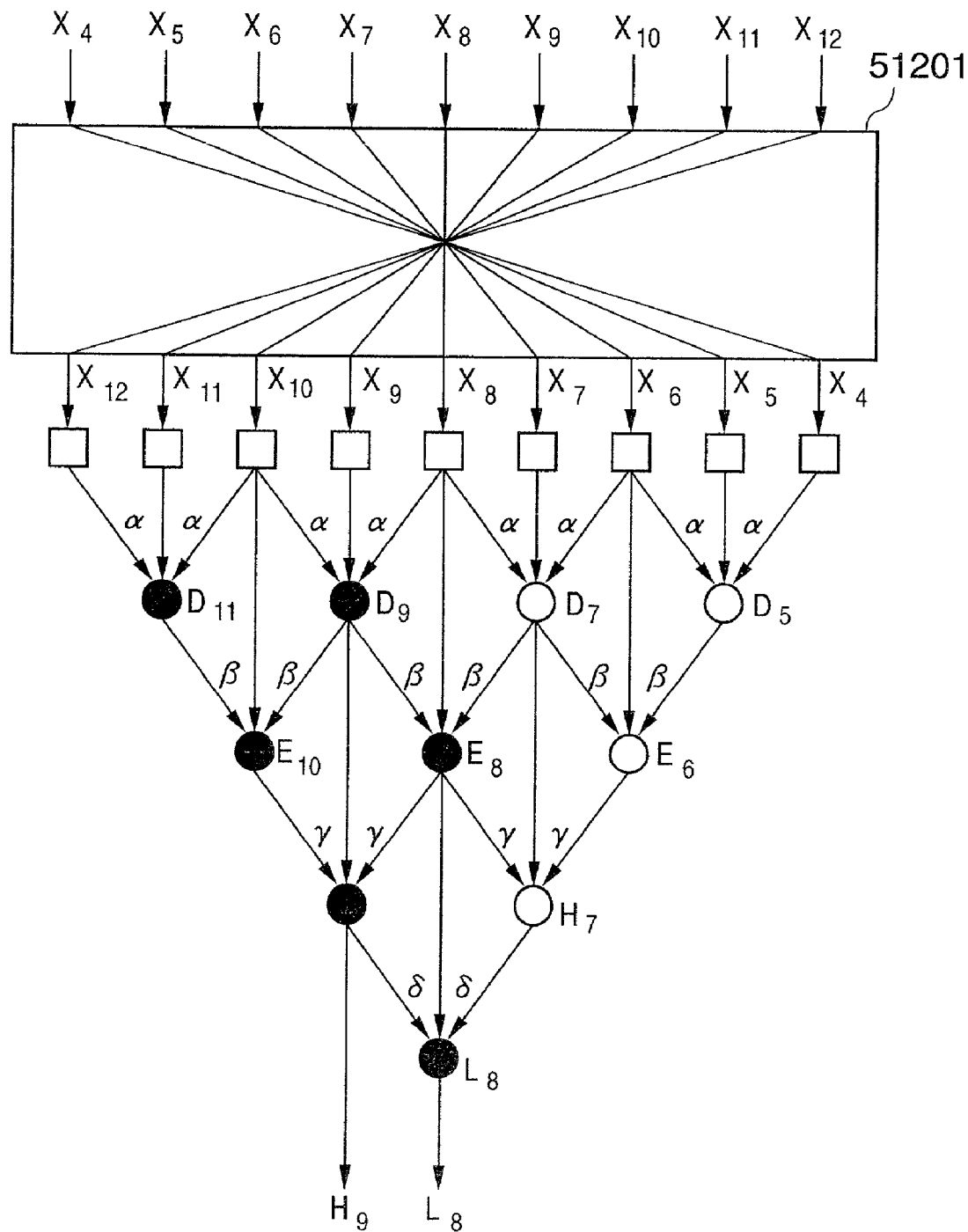
FIG. 48 is a view for explaining the operation of the modification of the third embodiment.
Figure 49:
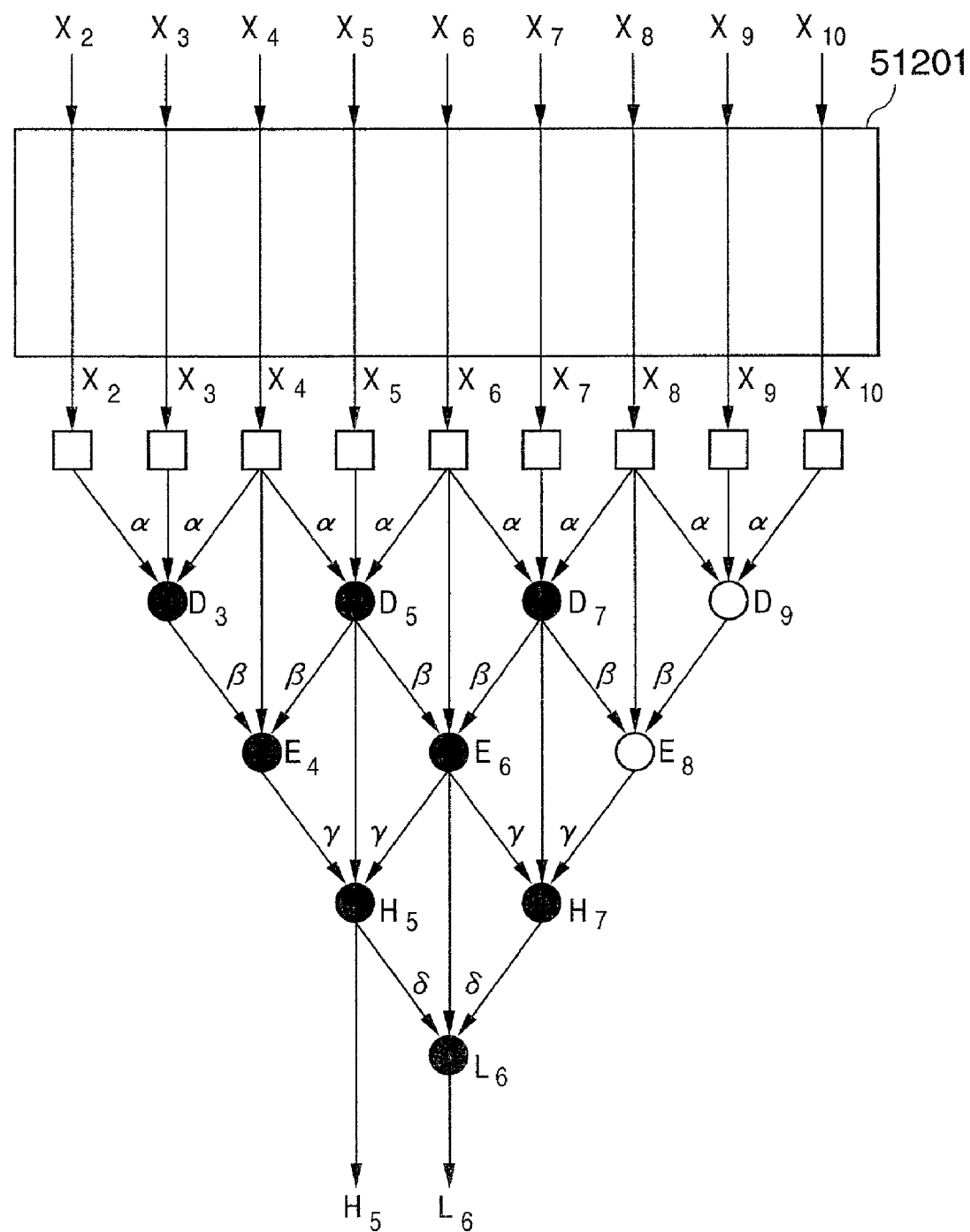
FIG. 49 is a view for explaining the operation of another structure of the third embodiment.
Figure 50:
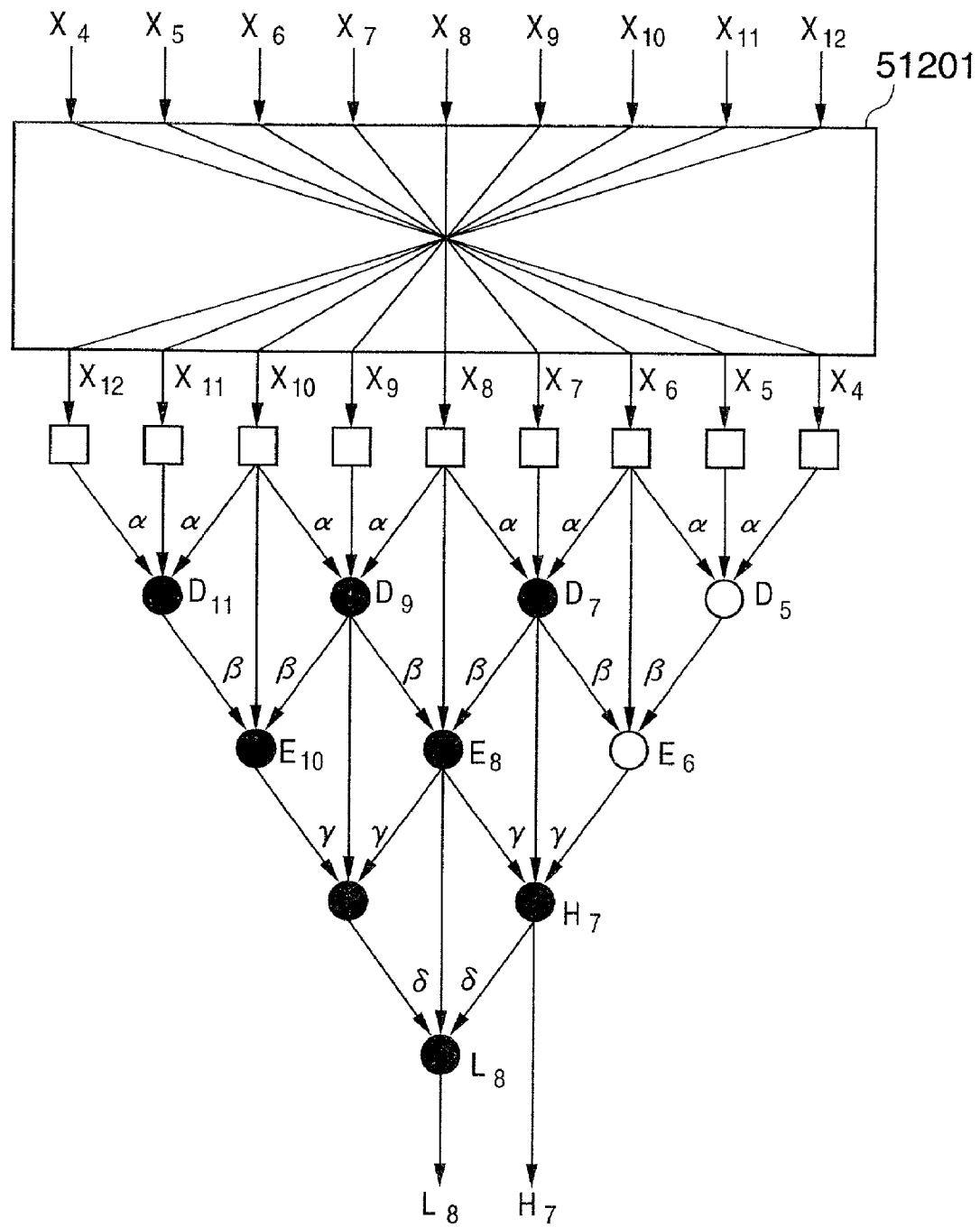
FIG. 50 is a view for explaining the operation of still another structure of the third embodiment.

FIGS. 46, 47, and 48 show the way the output position changes upon executing the arithmetic process using FIG. 43, and FIGS. 49 and 50 show that upon executing the arithmetic process using FIG. 44.

Assume that the two computed coefficients are output, as shown in FIG. 46, before switching.

If the mode of the cross switch 51201 alone is switched while input data remain the same, a new high-frequency coefficient is output, as shown in FIG. 47. After that, when input data are shifted by two taps each, two coefficients, i.e., high- and low-frequency coefficients are output, as shown in FIG. 48.

FIGS. 46 and 48 seem to be an identical output state at first glance. However, in FIG. 46, the suffix number of the left high-frequency coefficient is smaller than that of the right low-frequency coefficient. In FIG. 48, since the input data positions are symmetrically replaced, the relationship of the suffix numbers is reversed.

The reversed relationship of the suffix numbers also applies to a case wherein the output position changes from FIG. 49 to FIG. 50. That is, the suffix number of the left output is smaller than that of the right output before mode switching, but the suffix number of the left output becomes larger after mode switching.

In FIGS. 49 and 50, the input data state need not be temporarily maintained upon switching the mode. The output position changes instead.

Modification

The other method that copes with the terminal end process will be explained below.

Figure 51:
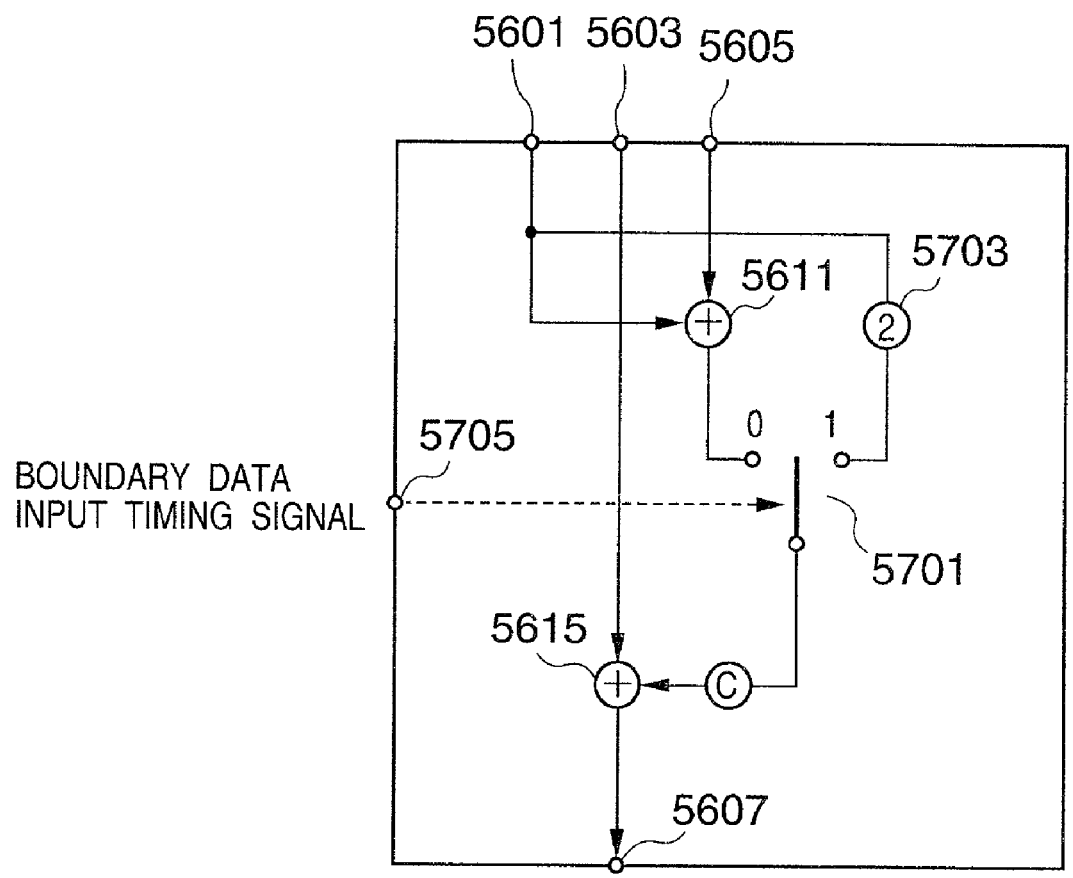
FIG. 51 is a diagram showing the arrangement of a lattice point data arithmetic unit for a terminal end process used in the modification of the third embodiment.
Figure 52:
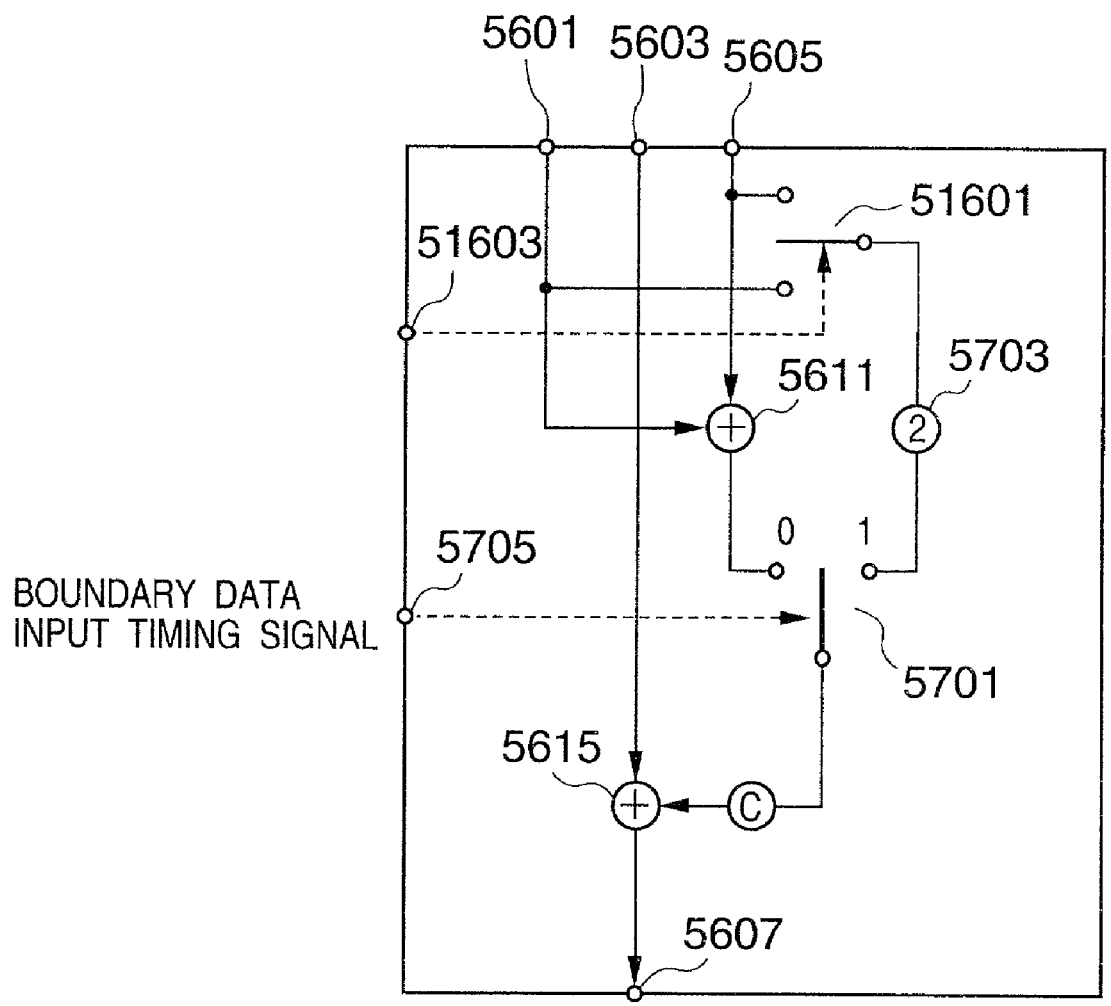
FIG. 52 is a diagram showing the arrangement of a lattice point data arithmetic unit which is used in the modification of the third embodiment, and can implement both start and terminal end processes.

In this modification, a boundary lattice point data arithmetic unit for the terminal end process, and a boundary lattice point data arithmetic unit that can execute the boundary processes of both the head and last data are used without any cross switch. FIGS. 51 and 52 respectively show the arrangements of these arithmetic units.

The difference between the boundary lattice point data arithmetic unit for processing the head data shown in FIG. 36, and FIG. 51 is that the input to the position converter 5703 is changed from the terminal 5605 to the terminal 5601.

In the boundary lattice point data arithmetic unit shown in FIG. 52, the input signals to the terminals 5601 and 5605 can be selectively input to the position converter 5703 to attain both the boundary processes. Switching is done by a selector 51601, and a switching control signal of the selector is input from a terminal 51603. Other building components are the same as those in FIG. 36.

Figure 53:
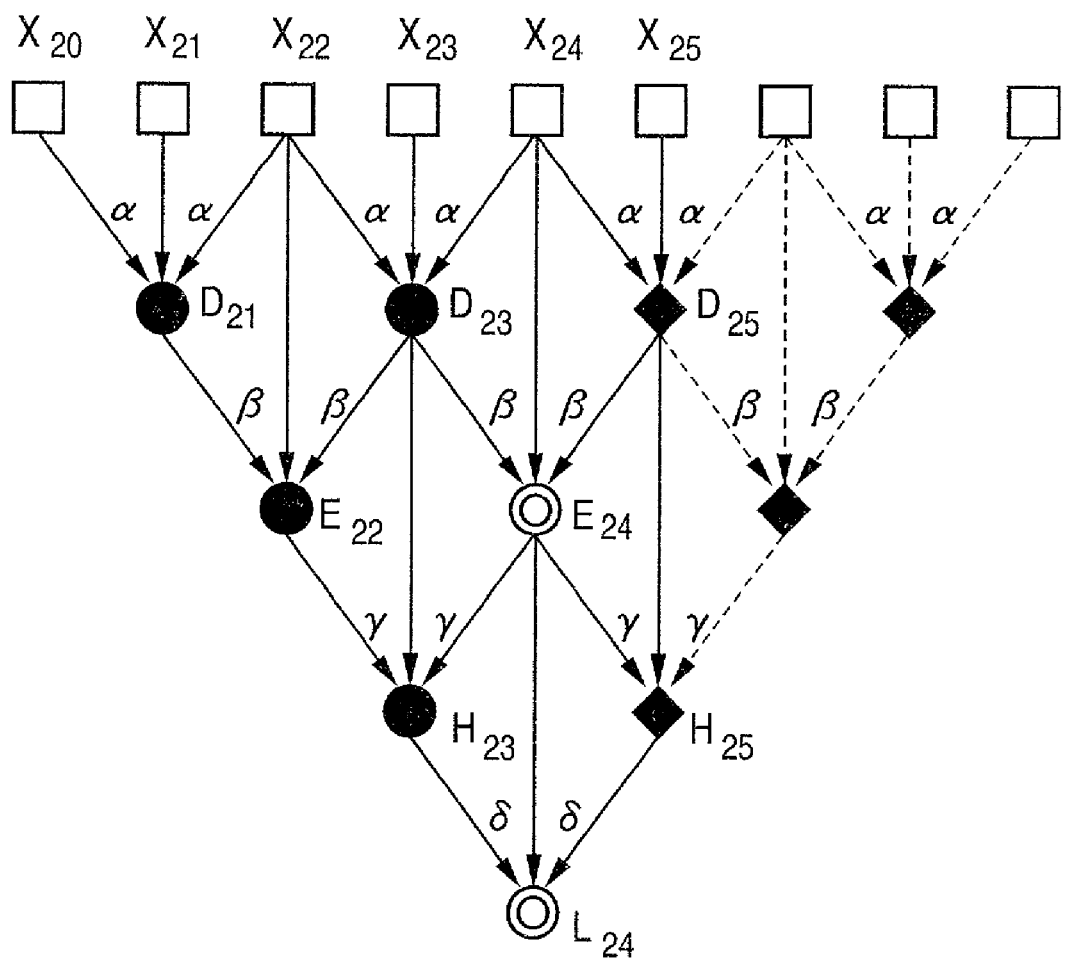
FIG. 53 shows the structure of the modification of the third embodiment.

FIG. 53 shows the overall arrangement of a transformation processor by expressing the boundary lattice point data arithmetic units shown in FIGS. 51 and 52 by ♦ and ⊙. This is the arrangement of this modification. In FIG. 53, X25 indicates the last data, the flow of valid data is indicated by the solid lines, and that of invalid data is indicated by the broken lines.

Upon transforming the head data into a high-frequency coefficient, that coefficient is output from a lattice point data arithmetic unit H23. Upon transforming the last data into a high-frequency coefficient, that coefficient is output from a lattice point data arithmetic unit H25. Hence, outputs are extracted from the three arithmetic units if a low-frequency coefficient is included.

Figure 54:
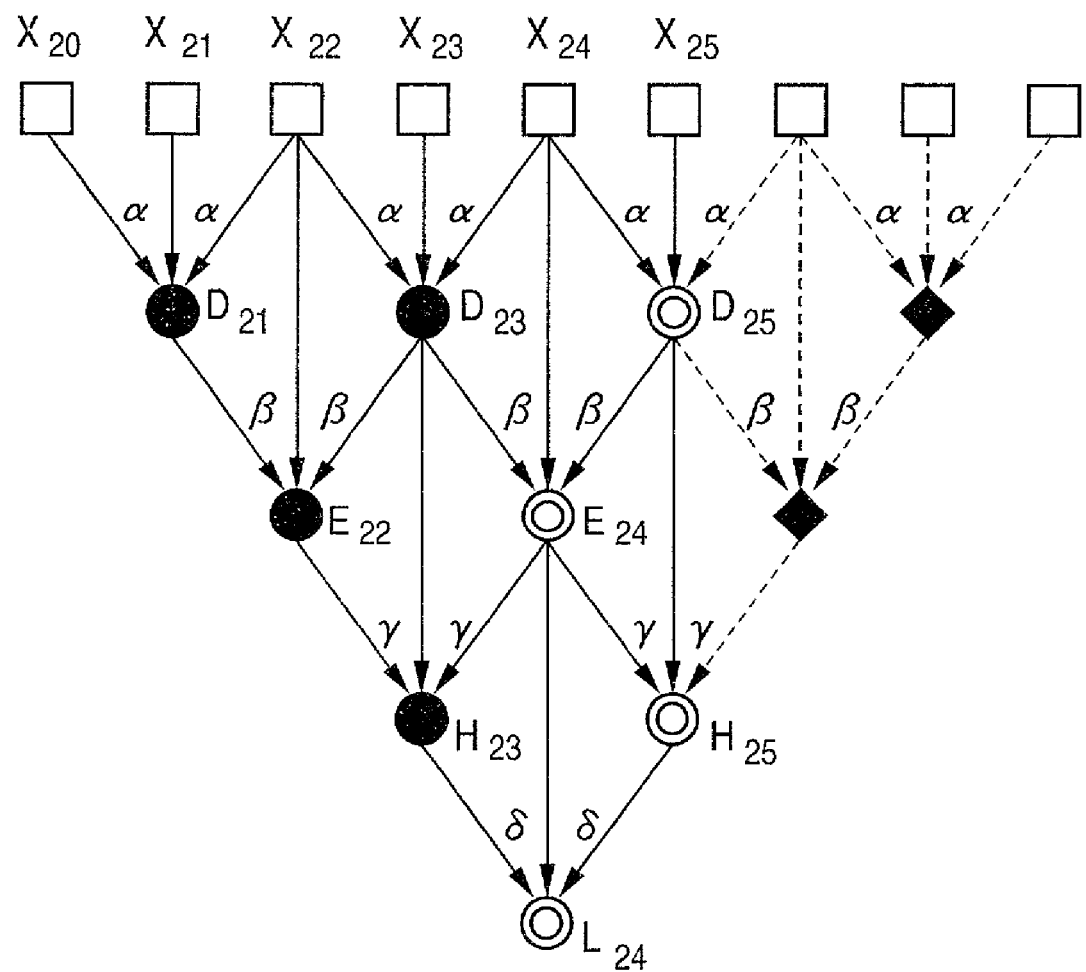
FIG. 54 shows the structure of a modification of the first embodiment.

When the number of arithmetic units from which outputs are extracted is to be limited to two, the transformation processor can have an arrangement shown in FIG. 54. With this arrangement, all high-frequency coefficients can be extracted from the lattice point data arithmetic unit H25, and low-frequency coefficients can be extracted from a lattice point data arithmetic unit L24.

The arrangement of only the forward transformation processor has been described in the above embodiment and its modification. But it is obvious to those who are skilled in the art that the arrangement of the embodiment can be easily applied to an inverse transformation processor due to the similarity between the forward and inverse transformation processors shown in FIGS. 32 and 33. Therefore, the present invention is not limited to the above embodiment.

As described above, according to the embodiment, means for selecting only data inside the boundary is provided to some of lattice point data arithmetic units having a function of computing lattice point data, and the output from the selection means is multiplied by a predetermined coefficient. In this way, the need for a process for replicating data inside the boundary to generate data outside the boundary is obviated, and no storage area for storing the data outside the boundary is required.

[Fourth Embodiment]

Figure 55:
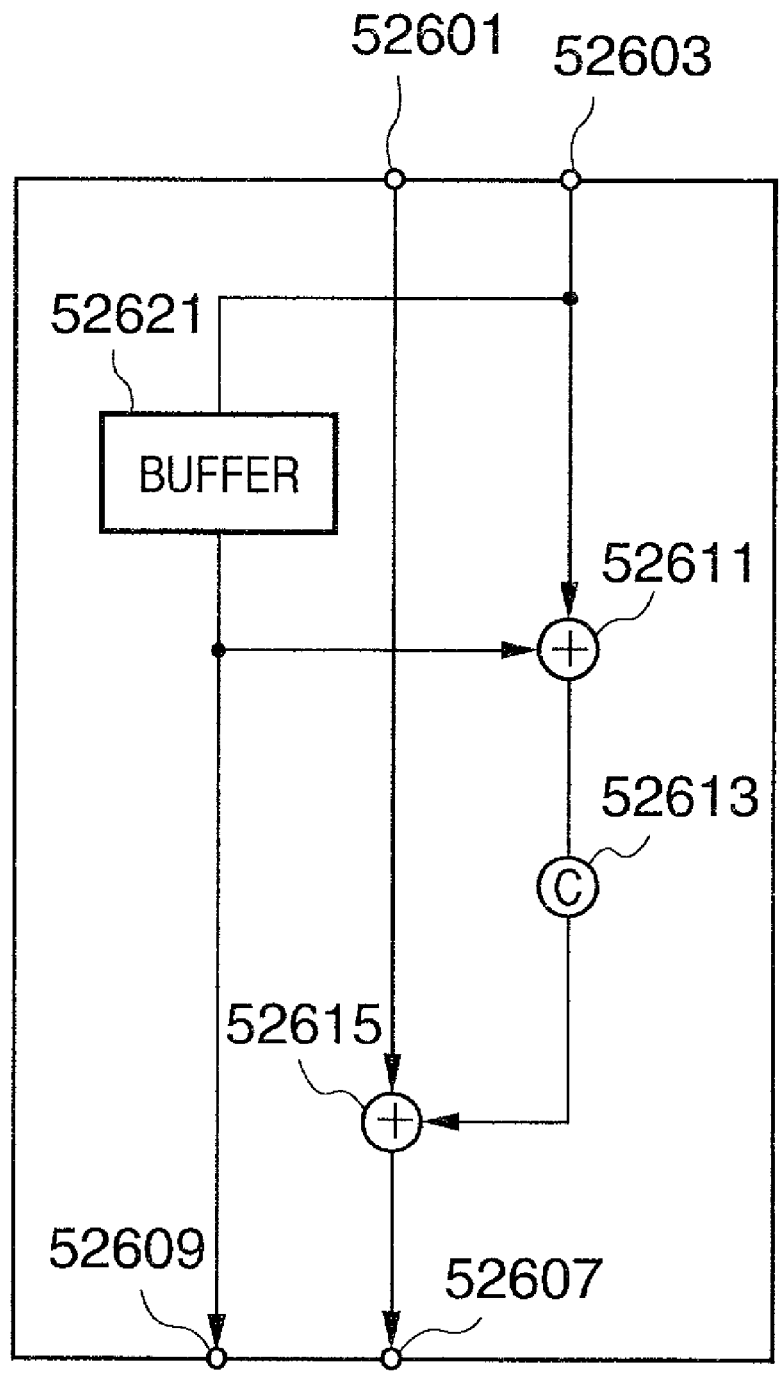
FIG. 55 is a diagram showing the arrangement of a lattice point data arithmetic unit in the fourth embodiment.
Figure 56:
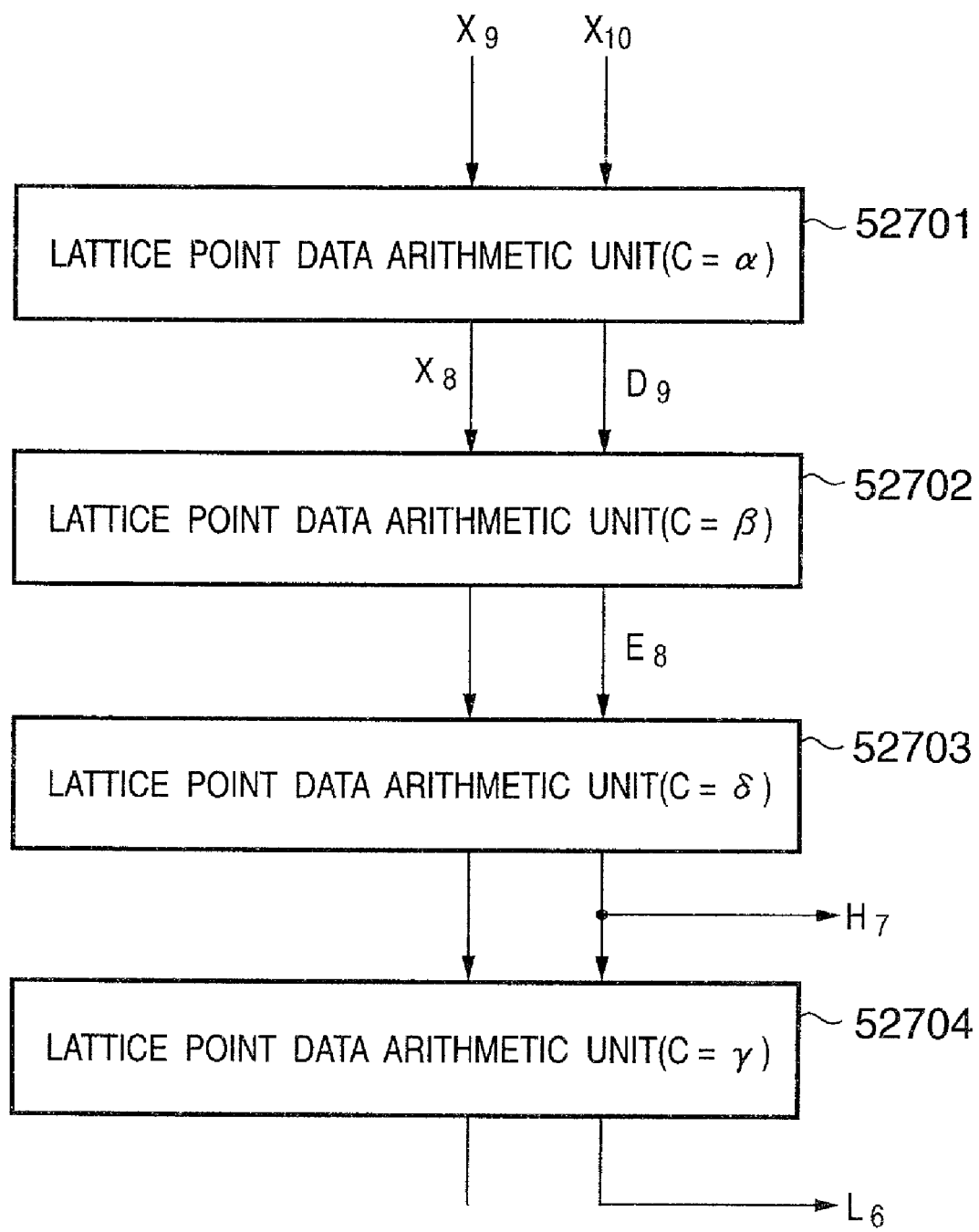
FIG. 56 is a block diagram of a filter processor built using the lattice point data arithmetic units in the fourth embodiment.

In this embodiment, lifting arithmetic operations of the filter process are made by an arrangement in which a plurality of lattice point data arithmetic units shown in FIG. 55 are connected, as shown in FIG. 56.

Referring to FIG. 55, reference numerals 52601 and 52603 denote terminals for inputting two data; 52607, a terminal for outputting computed lattice point data; 52621, a buffer for storing input data from the terminal 52603; 52609, a terminal for externally outputting the output from the buffer 52621; 52611, an adder for adding the output data from the buffer 52621 and input data; 52613, a multiplier for multiplying the sum by a coefficient (one of $\alpha$, $\beta$, $\gamma$, and $\delta$); and 52615, an adder for adding the product to input data located at the center of three data used in the arithmetic operations.

An outline of the arithmetic scheme will be briefly described below with reference to FIG. 32 again.

A case will be examined below wherein nine input data X0, X1, X2, X3, X4, X5, X6, X7, and X8 are processed. In this case, by computing 10 lattice point data (D1, D3, D5, D7, E2, E4, E6, H3, H5, and L4), a low-frequency transform coefficient L4 and high-frequency transform coefficient H5 can be output.

When two data X9 and X10 are added as new input data, a low-frequency transform coefficient L6 and high-frequency transform coefficient H7 can be output by similarly computing 10 lattice point data. At this time, if the previously computed lattice point data can be used, only four data D9, E8, L7, and L6 need be newly calculated.

In order to use the previously computed lattice point data, means for storing and holding the lattice point data is required, which is the buffer 52621 in FIG. 55.

Only the buffer in an uppermost lattice point data arithmetic unit 52701 in FIG. 56 is used to hold previously input data in place of the previously computed lattice point data. The buffers in other lattice point data arithmetic units are used to hold the previously computed lattice point data. The size of this buffer is 1 in minimum, and has no upper limit.

For example, a case will be examined below wherein the low-frequency transform coefficient L6 and high-frequency transform coefficient H7 are output. The uppermost lattice point data arithmetic unit 52701 receives only two new input data X9 and X10. This lattice point data arithmetic unit computes D9, and data X8 required for the arithmetic operation is output from the buffer 52621 in FIG. 55. This X8 is stored in the buffer when X8 was previously input from the terminal 52603.

The lattice point data arithmetic unit 52701 externally outputs the computed data D9 and the output data X8 from the buffer from the terminals 52607 and 52609, and inputs them to the next lattice point data arithmetic unit 52702.

The lattice point data arithmetic unit 52702 computes E8 based on the input data, and the other data D7 required for the arithmetic operation is output from the buffer 52621 in that unit. This D7 is stored in the buffer when it was previously input from the terminal 52603. The unit 52702 externally outputs the computed data E8 and the output data D7 from the buffer from the terminals 52607 and 52609, and sends them to the next lattice point data arithmetic unit 52703.

The lattice point data arithmetic units 52703 and 52704 execute the same processes. As a result, the arithmetic unit 52703 outputs a high-frequency transform coefficient H7, and the arithmetic unit 52704 outputs a low-frequency transform coefficient L6.

After that, every time two new data are input to the arithmetic unit 52701, the arithmetic units 52703 and 52704 output high- and low-frequency transform coefficients.

The fourth embodiment discloses arrangements of various (lattice point data) arithmetic units for efficiently executing a process equivalent to a boundary process for replicating data inside the image boundary to use the data as those outside the image boundary upon executing wavelet transformation or a filter arithmetic process, and the way these arithmetic units are connected to execute the filter process.

New arithmetic units to be added directly use equations (1a) to (8b) mentioned above. Equations (1a) to (4a) and (5a) to (8a) are arithmetic contents corresponding to the head boundary data, and equations (1b) to (4b) and (5b) to (8b) are those corresponding to the last boundary data.

The lattice point data arithmetic units 52701 to 52704 in FIG. 56 have arithmetic functions of equations (1) to (4) above. Arithmetic units having arithmetic functions of equations (1a) to (4a) or (1b) to (4b) in addition to these arithmetic functions will be examined below.

Figure 57:
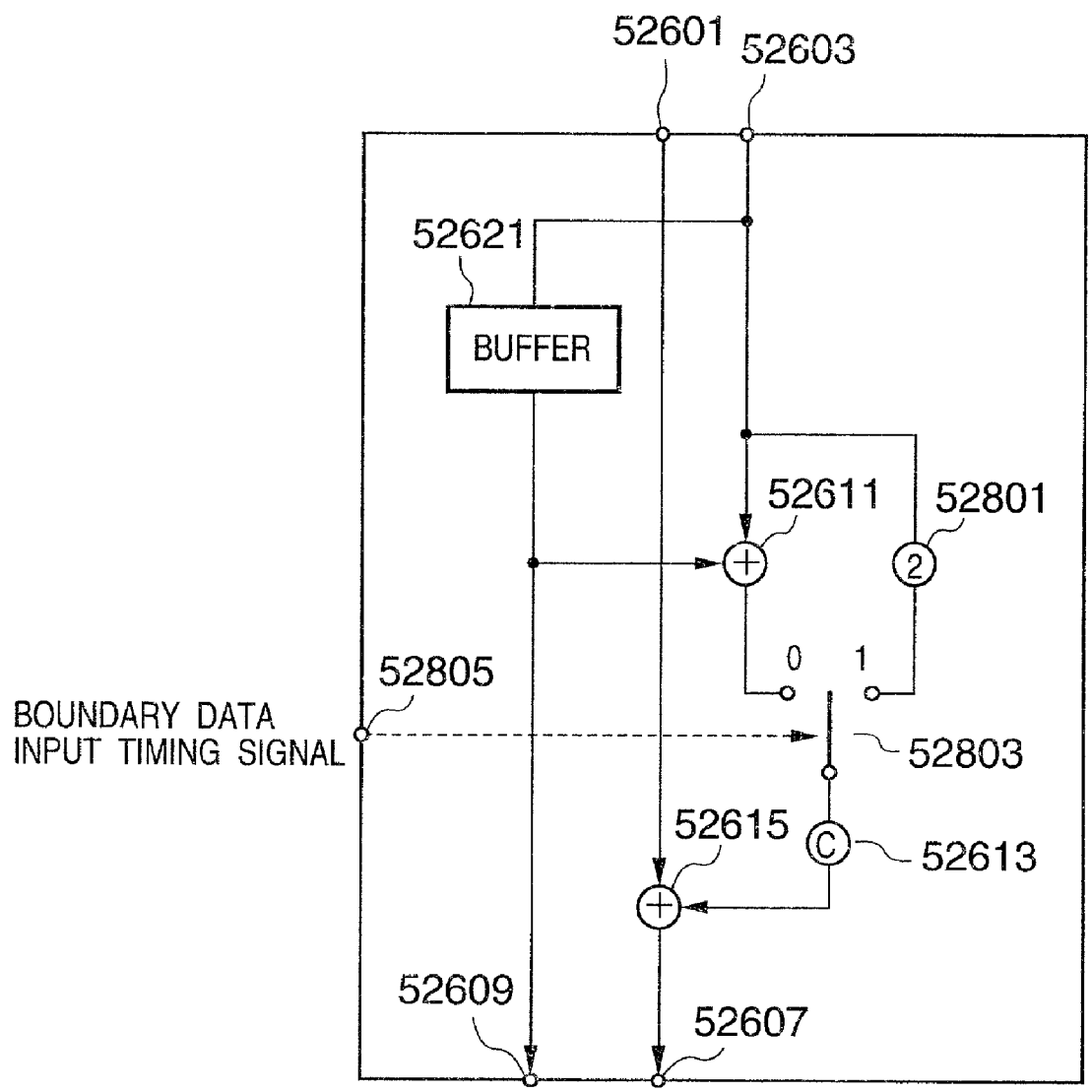
FIG. 57 is a diagram showing the arrangement of a start end compatible arithmetic unit in the fourth embodiment.

An arithmetic unit having two arithmetic functions of equations (1) and (1a), equations (2) and (2a), equations (3) and (3a), or equations (4) and (4a), will be referred to as a start end compatible (lattice point data) arithmetic unit hereinafter, and its arrangement is as shown in FIG. 57.

In FIG. 57, a position converter 52801, selector 52803, and terminal 52805 for inputting a switching control signal of the selector are added in addition to the arrangement shown in FIG. 55. By setting the control signal at "1" at the processing Liming of the head boundary data, and "0" at the processing timings of other data, the head boundary data can be processed using equation (1a), and other data can be processed using equation (1).

An arithmetic unit in which the multiplication coefficient of the multiplier 52613 is $\alpha$ is a start end compatible arithmetic unit that computes equations (1) and (1a), and those in which the multiplication coefficients are $\beta$, $\gamma$, and $\delta$ are start end compatible arithmetic units which correspond to equations (2) and (2a), (3) and (3a), and (4) and (4a), respectively.

Figure 58:
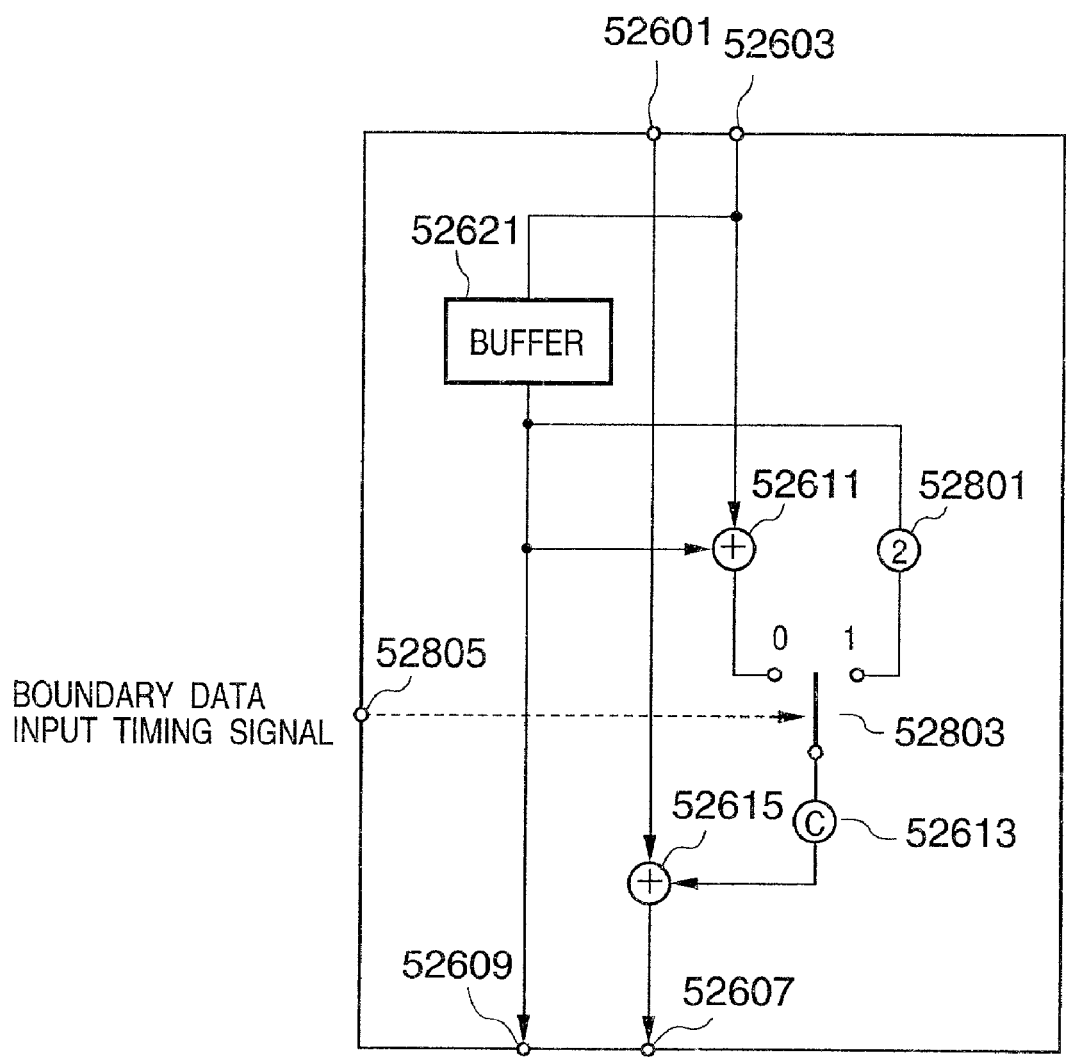
FIG. 58 is a diagram showing the arrangement of a terminal end compatible arithmetic unit in the fourth embodiment.

Likewise, an arithmetic unit having two arithmetic functions of equations (1) and (1b), equations (2) and (2b), equations (3) and (3b), or equations (4) and (4b), will be referred to as a terminal end compatible (lattice point data) arithmetic unit hereinafter. This arrangement is as shown in FIG. 58. The basic arrangement is substantially the same as that in FIG. 57, except that the input signal to the position converter 52801 is changed to the output from the buffer 52621. With this change, the processes of equations (1b) to (4b), i.e., the boundary processes for the last data can be done.

Figure 59:
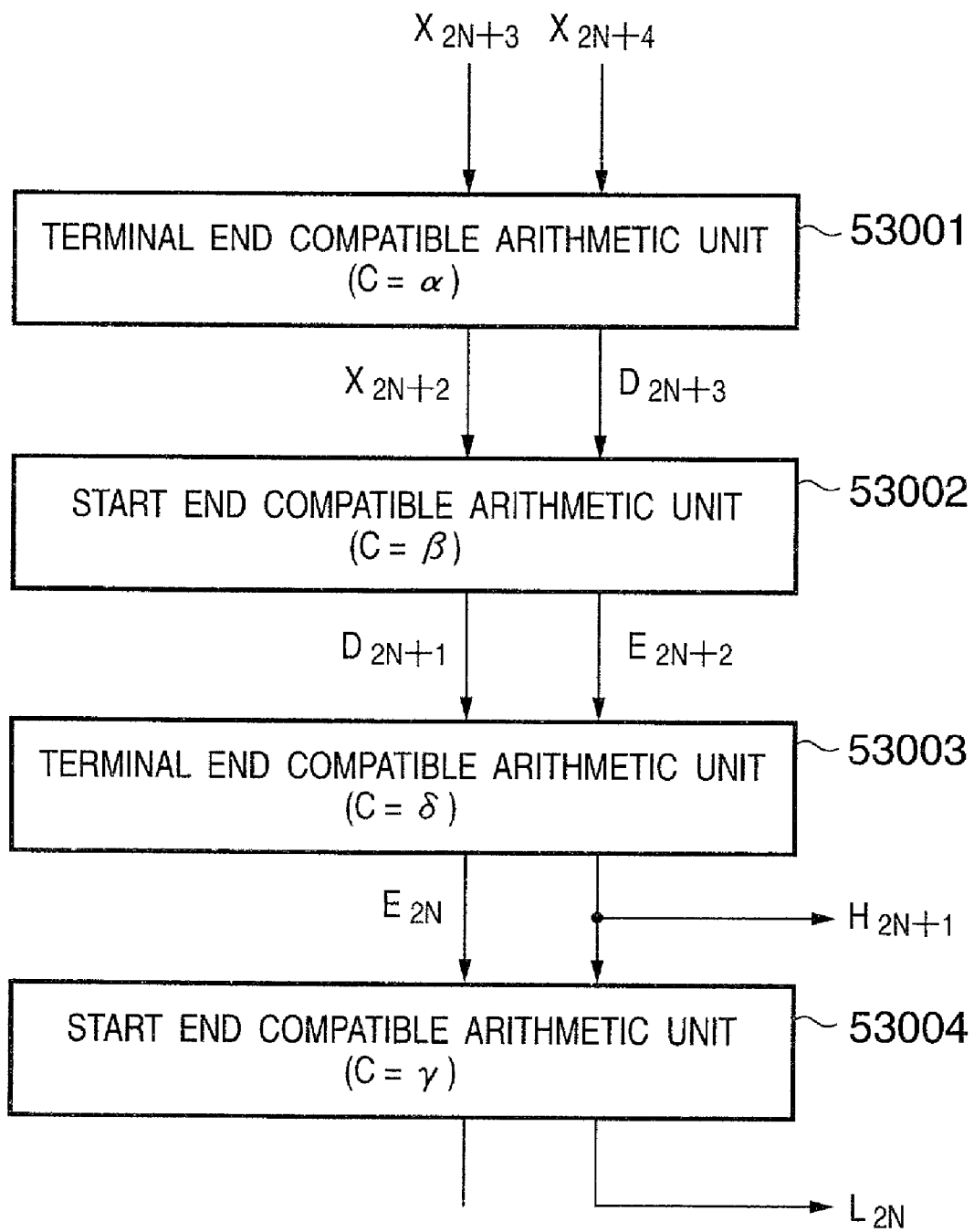
FIG. 59 is a block diagram of a filter processing apparatus in the fourth embodiment.
Figure 63:
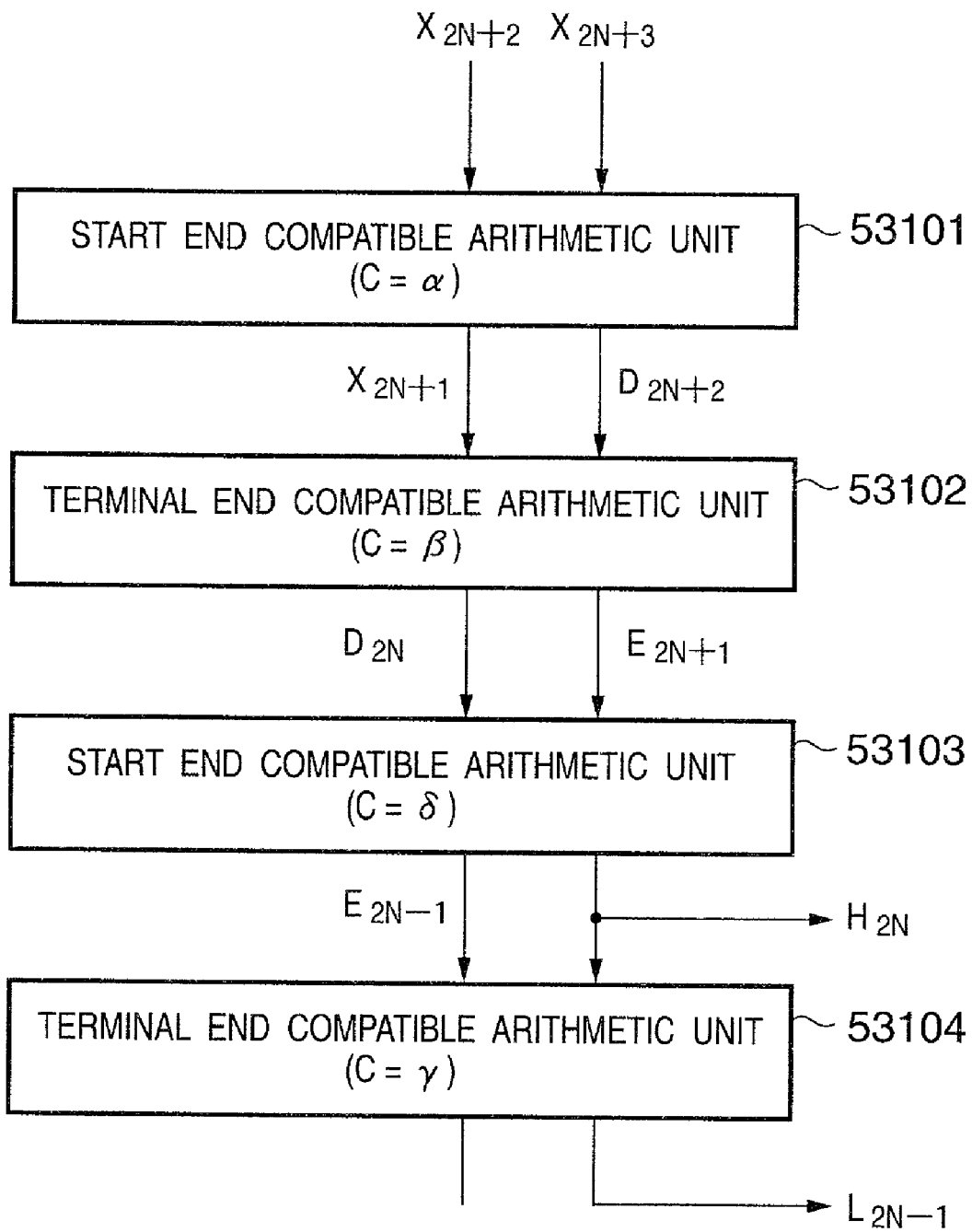
FIG. 63 is a diagram showing another arrangement of the fourth embodiment.

The fourth embodiment provides an arrangement that can appropriately execute boundary processes of data at the two ends if the size (the number of successive data) of data to be processed is specified by an even number. FIGS. 59 and 63 show such arrangements.

The arrangement in FIG. 59 is used to transform the head data into a low-frequency coefficient, and that in FIG. 63 is used to transform the head data into a high-frequency coefficient. The difference between these two arrangements is that start and terminal end compatible arithmetic units replace each other.

Also, the head data (X0) is input to the uppermost arithmetic unit from different terminals in these arrangements. The head data is input to the terminal 52603 in FIG. 59, and the terminal 52601 in FIG. 63.

Figure 60:
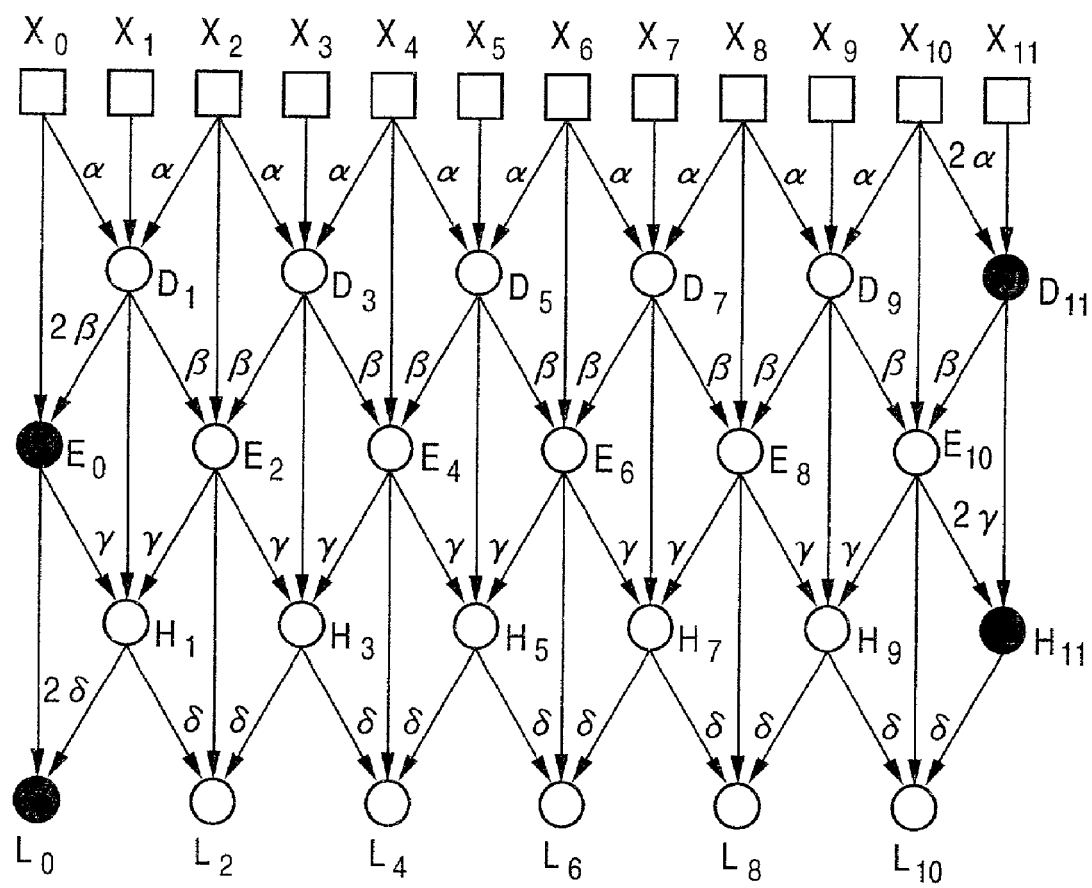
FIG. 60 shows arithmetic operations that require a boundary process when the data size is specified by an even number.
Figure 61:
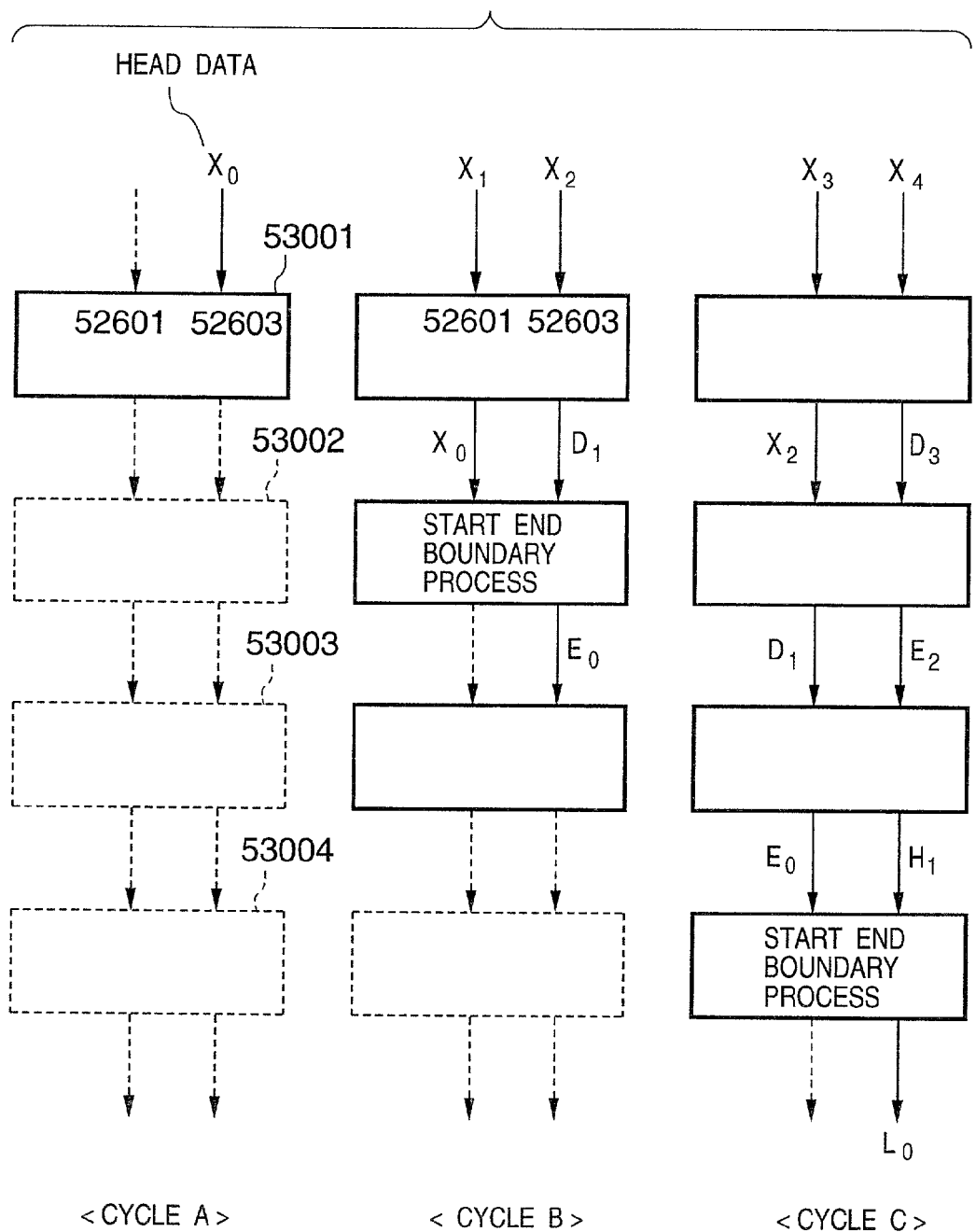
FIG. 61 shows the timings of a start end boundary process in the fourth embodiment.

The operation of the arrangement in FIG. 59 will be described below with reference to FIGS. 60 and 61. FIG. 60 shows an outline of the overall filter process, and FIG. 61 shows inputs/outputs of the respective arithmetic units in respective cycles.

FIG. 60 shows lattice point data which must be calculated upon transforming the head data into a low-frequency coefficient. Especially, lattice point data indicated by ● must be calculated by the aforementioned arithmetic operations for the boundary processes. More specifically, E0, L0, D11, and H11 are respectively obtained by computing equations (2a), (4a), (1b), and (3b).

In cycle A, X0 alone is input to the input terminal 52603 of an arithmetic unit 53001. This input data X0 is stored in the buffer 52621. At this time, other arithmetic units process data of other blocks or do not process any data. In FIG. 61, the arithmetic unit or units which processes or process data of interest is or are indicated by the solid lines, and other arithmetic units are indicated by the broken lines, thus discriminating arithmetic units.

In cycle B, X2 is input to the same input terminal 52603, and X1 to the input terminal 52601. The arithmetic unit 53001 computes D1 from three data, i.e., the buffer output X0, and the input data X1 and X2, and outputs the arithmetic result D1 and the buffer output X0 to the next arithmetic unit 53002. As can be seen from the above description, the arithmetic unit 53001 need not be a start end compatible arithmetic unit.

The arithmetic unit 53002 computes E0 from the two input data X0 and D1, and outputs only the arithmetic result E0 to the terminal 52603 of the next arithmetic unit 53003. At this time, this arithmetic unit executes a start end boundary process on the basis of equation (2a). Hence, the arithmetic unit 53002 must be a start end compatible arithmetic unit.

The arithmetic unit 53003 stores the input data E0 in the buffer 52621.

In cycle C, X3 is input to the input terminal 52601 and X4 to the input terminal 52603. The arithmetic unit 53001 computes D3 from three data, i.e., the buffer output X2 and the input data X3 and X4, and inputs the arithmetic result D3 and buffer output X2 to the next arithmetic unit 53002.

The arithmetic unit 53002 computes E2 from three data, i.e., the buffer output D1 and the input data X2 and D3, and outputs the arithmetic result E2 and buffer output D1 to the next arithmetic unit 53003.

The arithmetic unit 53003 computes H1 from three data, i.e., the buffer output E0 and the input data D1 and E2, and outputs the arithmetic result H1 and buffer output E0 to the next arithmetic unit 53004.

The arithmetic unit 53004 computes L0 from the two data E0 and E1, and outputs the arithmetic result L0 alone. At this time, this arithmetic unit executes a start end boundary process on the basis of equation (4a). Hence, the arithmetic unit 53004 must be a start end compatible arithmetic unit.

Cycles A, B, and C need not time-serially appear, but the respective arithmetic units must be controlled so that input data and data read out from the buffer are associated with each other. The simplest method of implementing this is to periodically process associated data.

The boundary processes of the head data have been explained. The boundary processes of the last data will be explained below with reference to FIGS. 60 and 62. Assume that X11 represents the last data in correspondence with FIG. 60 to be referred to.

Assume that the last data X11 is input to the input terminal 52601 of the arithmetic unit 53001 in cycle P. At this time, the buffers of the arithmetic units 53001 to 53004 store X10, D9, E8, and H7, respectively.

The arithmetic unit 53001 computes D11 from two data, i.e., the buffer output X10 and the input data X11, and outputs the arithmetic result D11 and the output X10 of the buffer 52621 to the next arithmetic unit 53002. At this time, the arithmetic unit executes a terminal end boundary process on the basis of equation (1b). Hence, the arithmetic unit 53001 must be a terminal end compatible arithmetic unit.

The arithmetic unit 53002 computes E10 from three data, i.e., the buffer output D9 and the input data X10 and D11, and outputs the arithmetic result E10 and buffer output D9 to the next arithmetic unit 53003. At this time, the input data D11 is stored in the buffer.

The arithmetic unit 53003 computes H9 from three data, i.e., the buffer output E8 and the input data D9 and E10, and outputs the arithmetic result H9 and buffer output E8 to the next arithmetic unit 53004. At this time, the input data E10 is stored in the buffer.

The arithmetic unit 53004 computes L8 from three data, i.e., the buffer output H7 and the input data E8 and H9, and outputs the arithmetic result L8 as a filter process result.

Figure 62:
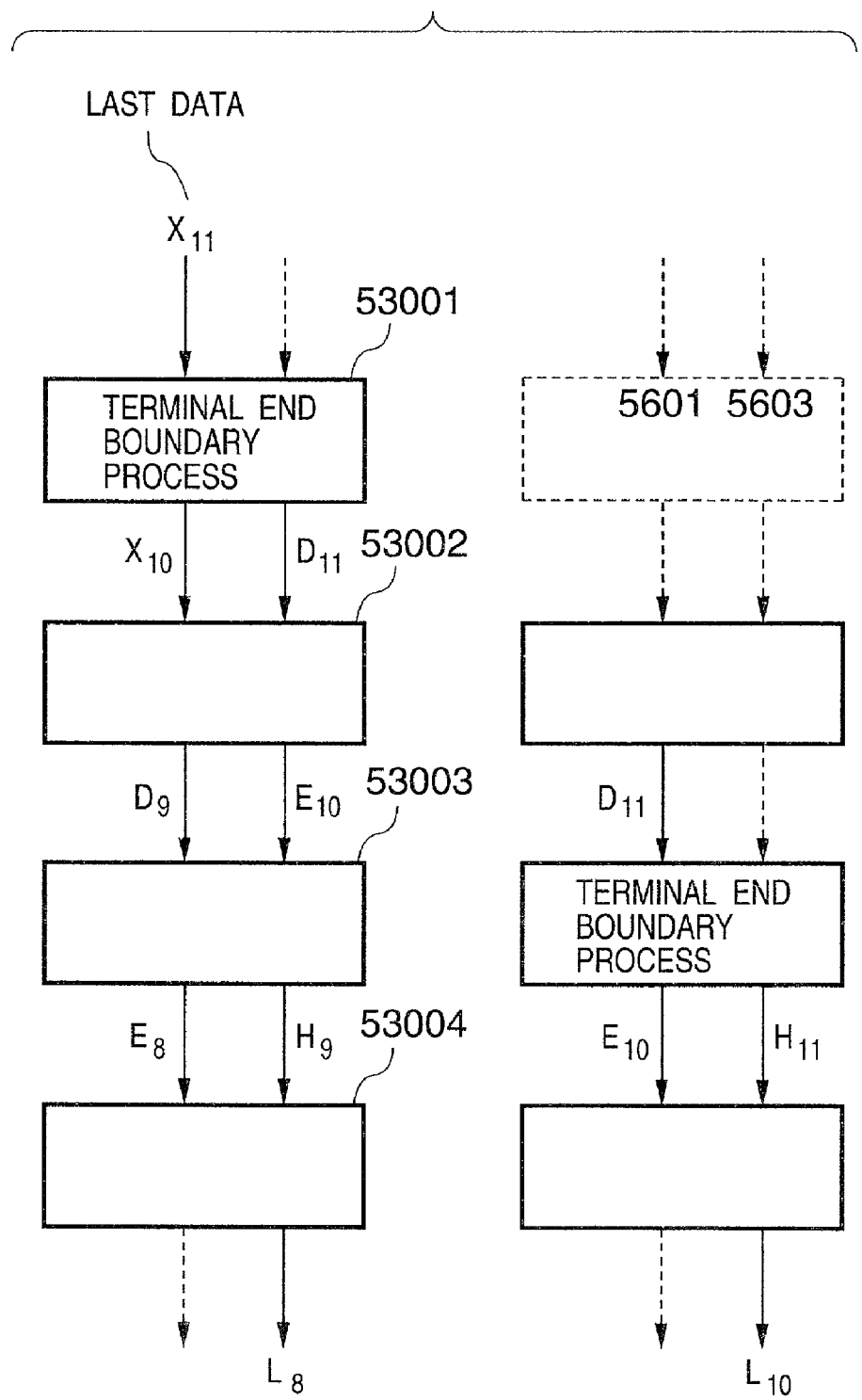
FIG. 62 shows the timings of a terminal end boundary process in the fourth embodiment.

The contents of input/output data of the respective arithmetic units are also shown in <Cycle P> in FIG. 62.

In cycle Q, the buffer output D11 in the arithmetic unit 53002 is output to the next arithmetic unit 53003.

The arithmetic unit 53003 computes H11 from two data, i.e., the buffer output E10 and the input data D11, and outputs the arithmetic result H11 and the buffer output E10 to the next arithmetic unit 53004. At this time, this arithmetic unit executes a terminal end boundary process on the basis of equation (3b). As can be seen from the above description, the arithmetic unit 53003 must be a terminal end compatible arithmetic unit. The arithmetic result H11 is also externally output as a filter process result.

The arithmetic unit 53004 computes L10 from three data, i.e., the buffer output H9 and the input data E10 and H11, and outputs the arithmetic result L10 as a filter process result. As in the description of the boundary processes of the head data, cycles P and Q need not time-serially appear.

To summarize, the arithmetic units 53002 and 53004 must be the start end compatible arithmetic units, and the arithmetic units 53001 and 53003 must be the terminal end compatible arithmetic units.

The start end compatible units execute boundary processes (switch the selectors) only in one cycle in which the head data (data with suffix 0 in the above description) is input, and the terminal end compatible units execute boundary processes (switch the selectors) only in one cycle in which the last data (data with suffix 11 in the above description) is input.

FIG. 59 which shows the arrangement used upon transforming the head data into a low-frequency coefficient has been described. FIG. 63 which shows an arrangement used upon transforming the head data into a high-frequency coefficient will be described.

Figure 64:
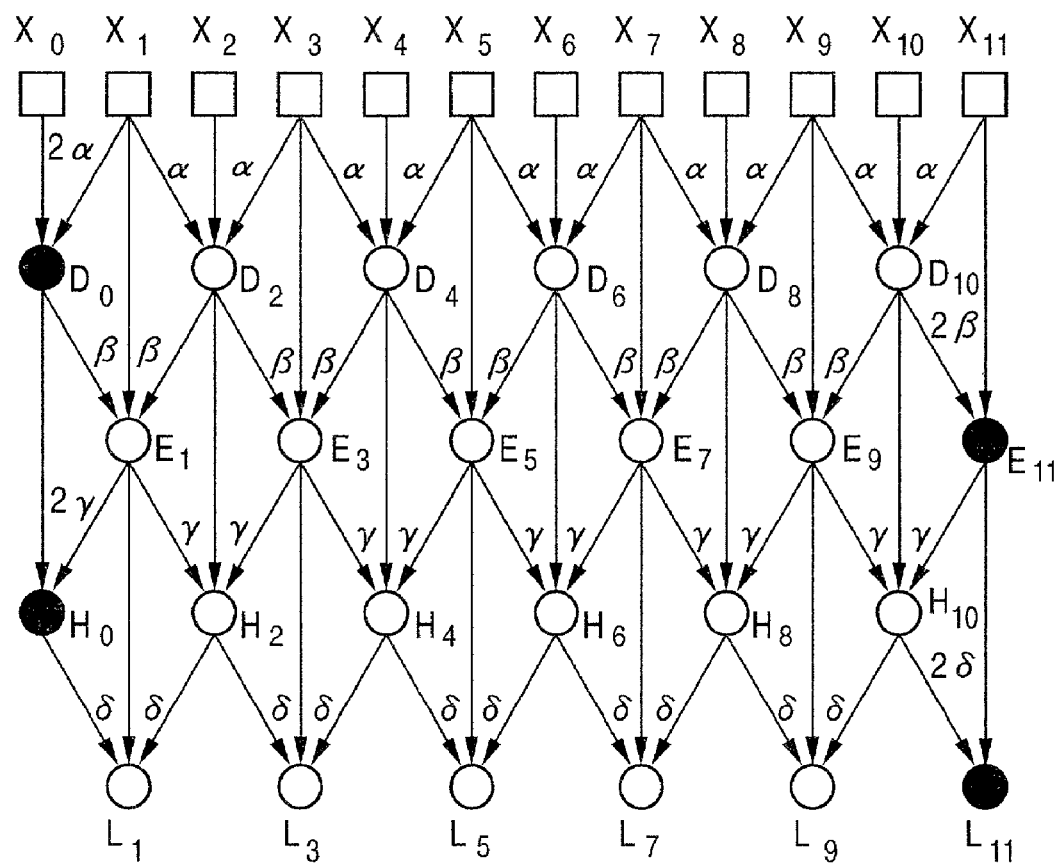
FIG. 64 shows arithmetic operations that require a boundary process when the data size is specified by an even number.

FIG. 64 shows the lifting lattice structure used upon transforming the head data into a high-frequency coefficient, and the following description will be given using FIG. 64.

As can be seen from comparison between FIGS. 64 and 60, the positions of lattice point data ● calculated by the boundary process arithmetic operations have horizontally opposite relationships. This means that the start and terminal end compatible arithmetic units replace each other.

More specifically, the arrangement of FIG. 63 in which the start and terminal end compatible arithmetic units in FIG. 59 are replaced can compute lattice point data in FIG. 64, and can transform the head data into a high-frequency coefficient.

In the arrangement of the fourth embodiment, even when the last data of the previous block and the head data of the next block are coupled and processed continuously, their boundary processes can be independently done, and data of the two blocks never interfere with each other.

The continuous process is implemented when each arithmetic unit executes a boundary process corresponding to input data at a timing at which boundary data such as the last data, head data, or the like which appears at the boundary of blocks, or transform data at the same position (with the same suffix number) as the boundary data is input to each lattice point data arithmetic unit. When the arithmetic unit does not have any boundary process function corresponding to input data, a normal arithmetic process is executed.

In this manner, when data with a large size is broken up into a plurality of blocks, and the boundary of neighboring blocks undergoes the boundary process, the data with a large size can be continuously processed.

[Fifth Embodiment]

In the fourth embodiment, the size of data to be processed is limited to that specified by an even number. The fifth embodiment will explain arrangements used upon transforming the head data into low- and high-frequency coefficients when the size of data to be processed is specified by an odd number.

Figure 65:
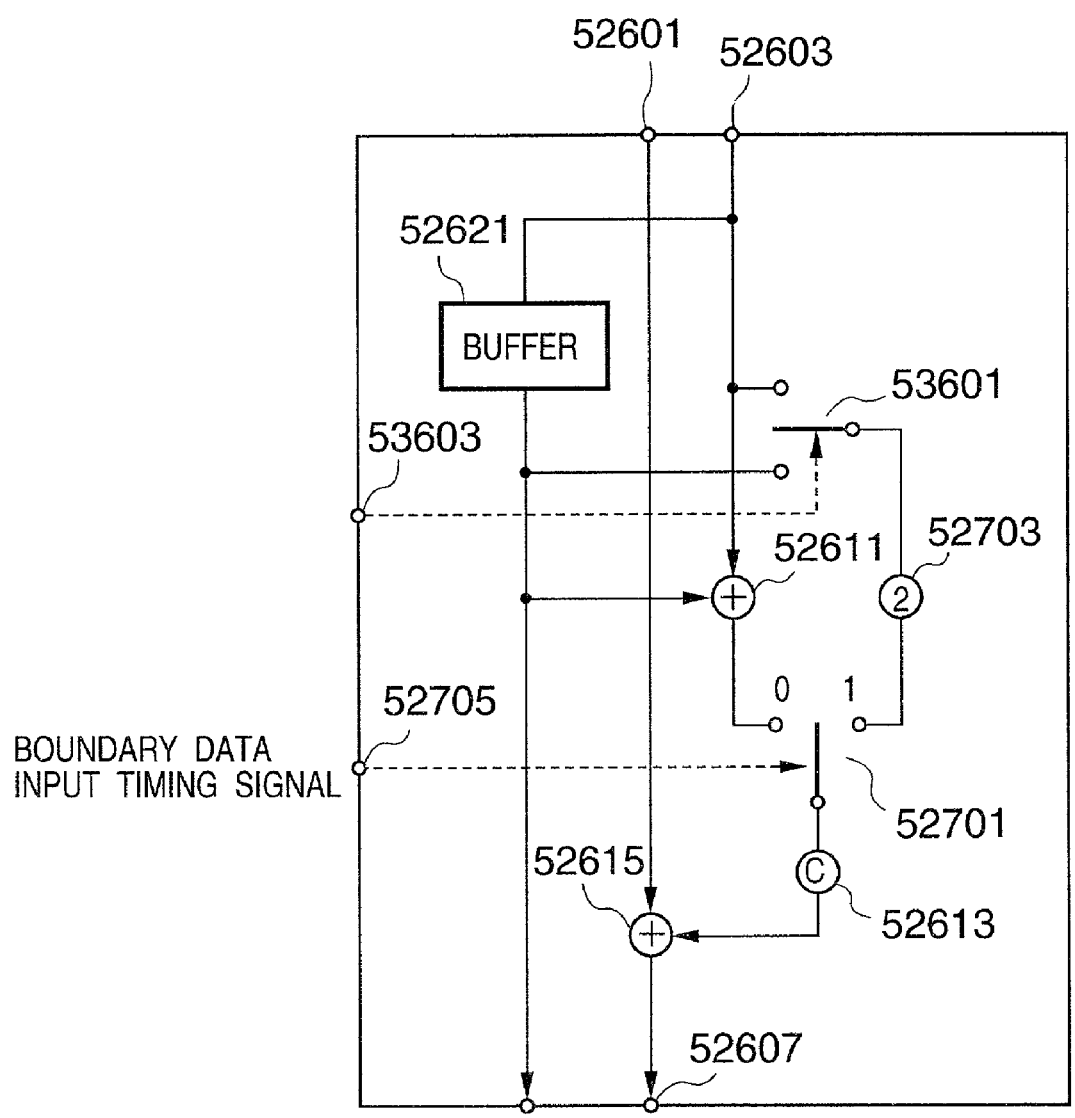
FIG. 65 is a diagram showing the arrangement of a both end compatible arithmetic unit in the fifth embodiment.

The fifth embodiment uses an arithmetic unit with an arrangement shown in FIG. 65. This arithmetic unit has functions of both the start and terminal end compatible arithmetic units. Hence, this arithmetic unit will be referred to as a both end compatible arithmetic unit hereinafter. The functions of the two different units are implemented by arranging a selector 53601. A control signal to the selector is input from a terminal 53603.

Figure 66:
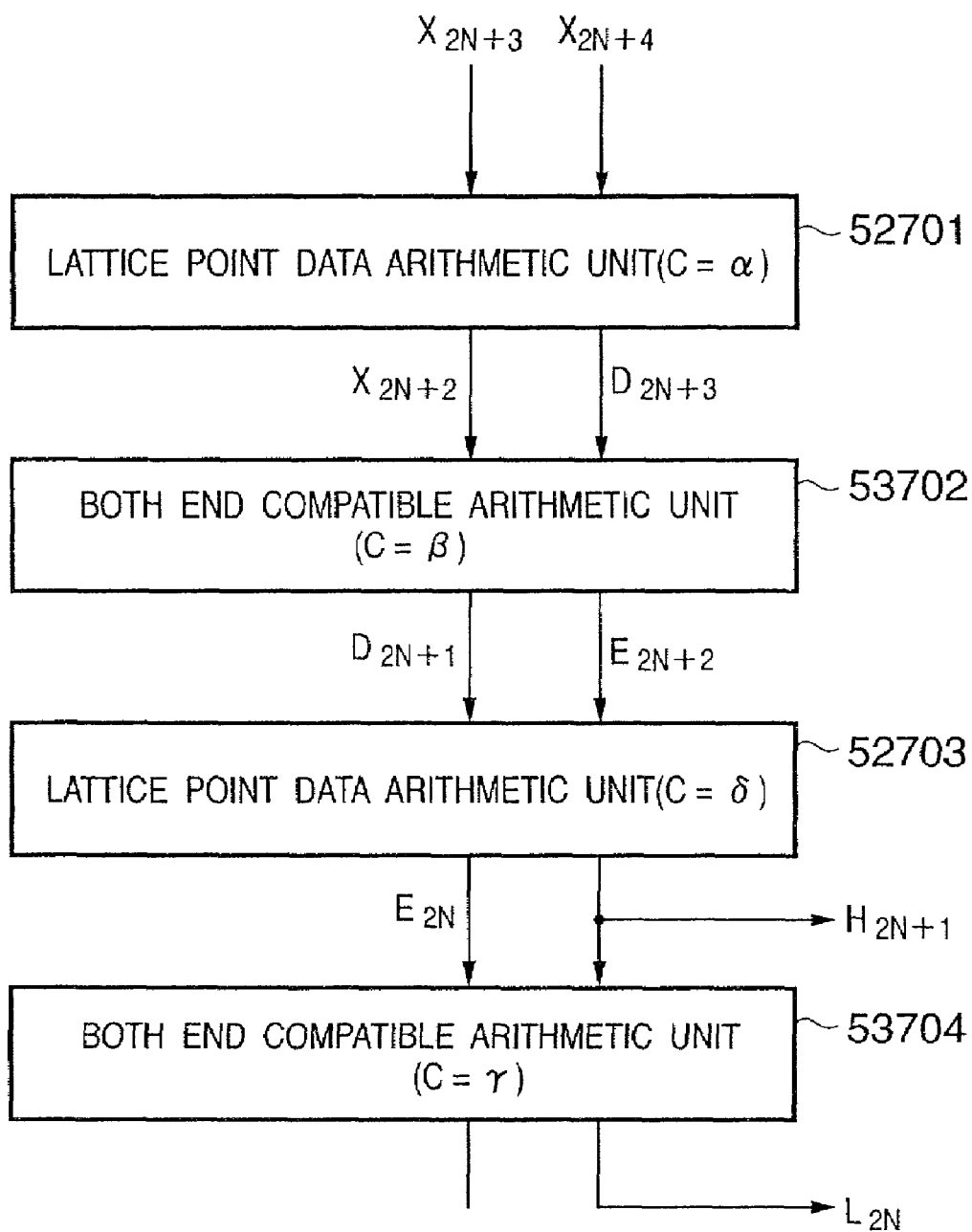
FIG. 66 is a block diagram of a filter processing apparatus in the fifth embodiment.
Figure 67:
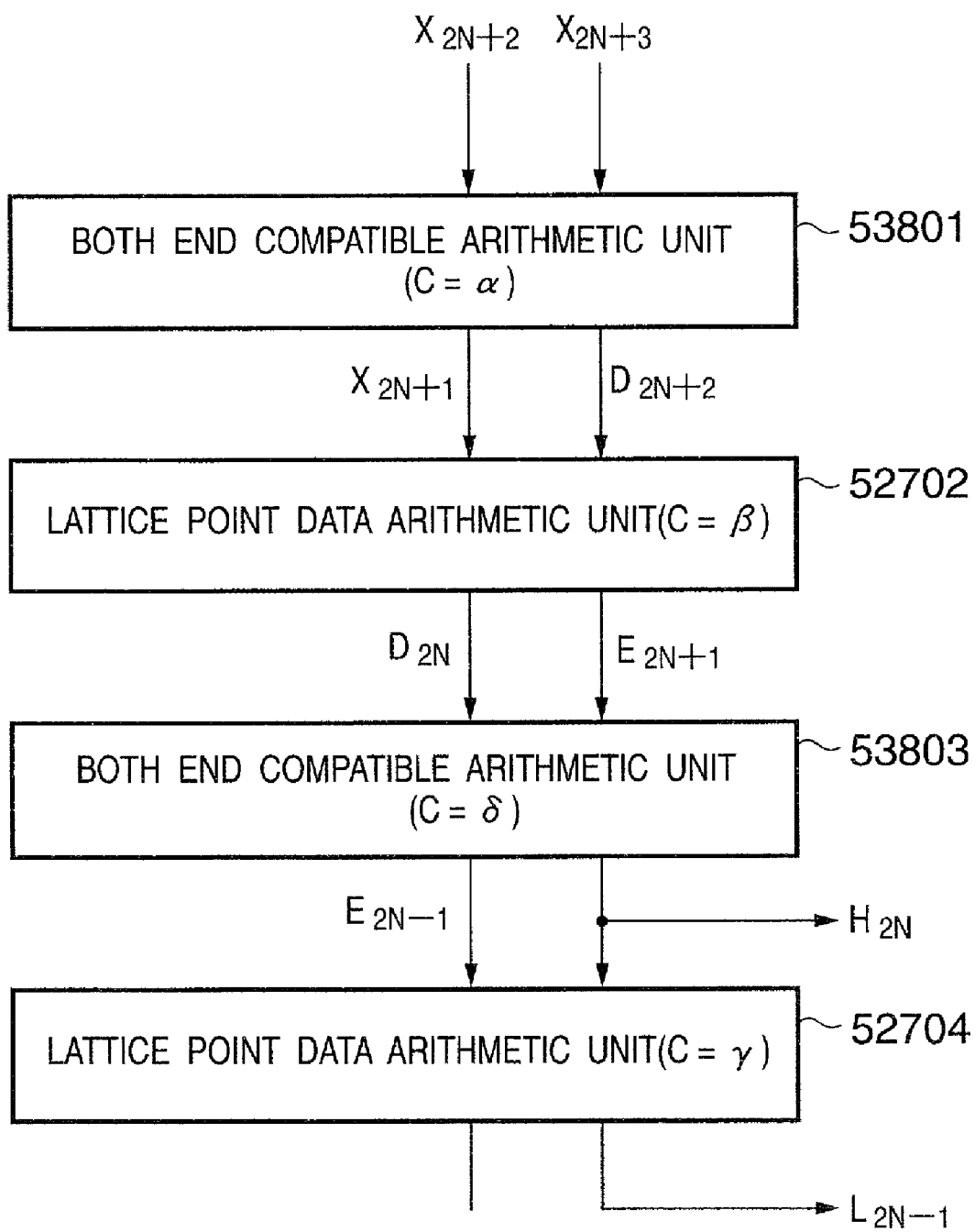
FIG. 67 is another block diagram of a filter processing apparatus in the fifth embodiment.

FIG. 66 shows an arrangement used upon transforming the head data of data having an odd-numbered size into a low-frequency coefficient, and FIG. 67 shows an arrangement used upon transforming such head data into a high-frequency coefficient.

Figure 30:
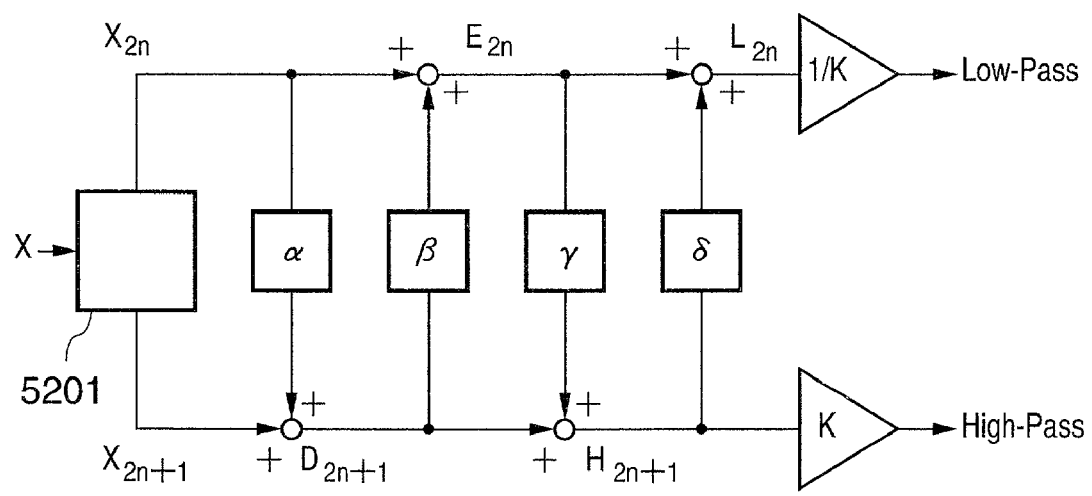
FIG. 30 is a diagram showing a forward lifting scheme.

The total number of lattice point data that require boundary processes among those calculated upon executing the filter process using the lifting arithmetic operations is the same as the number of stages of the lifting arithmetic operations. When the number of stages of the lifting arithmetic operations is four, as shown in FIG. 30, two lattice point data of each of the head and last data require boundary processes.

When the data size is specified by an even number as in the fourth embodiment, the lifting arithmetic operations which require the start end boundary process and those which require the terminal end boundary process are alternately located and never overlap (see FIGS. 60 and 64).

Figure 68:
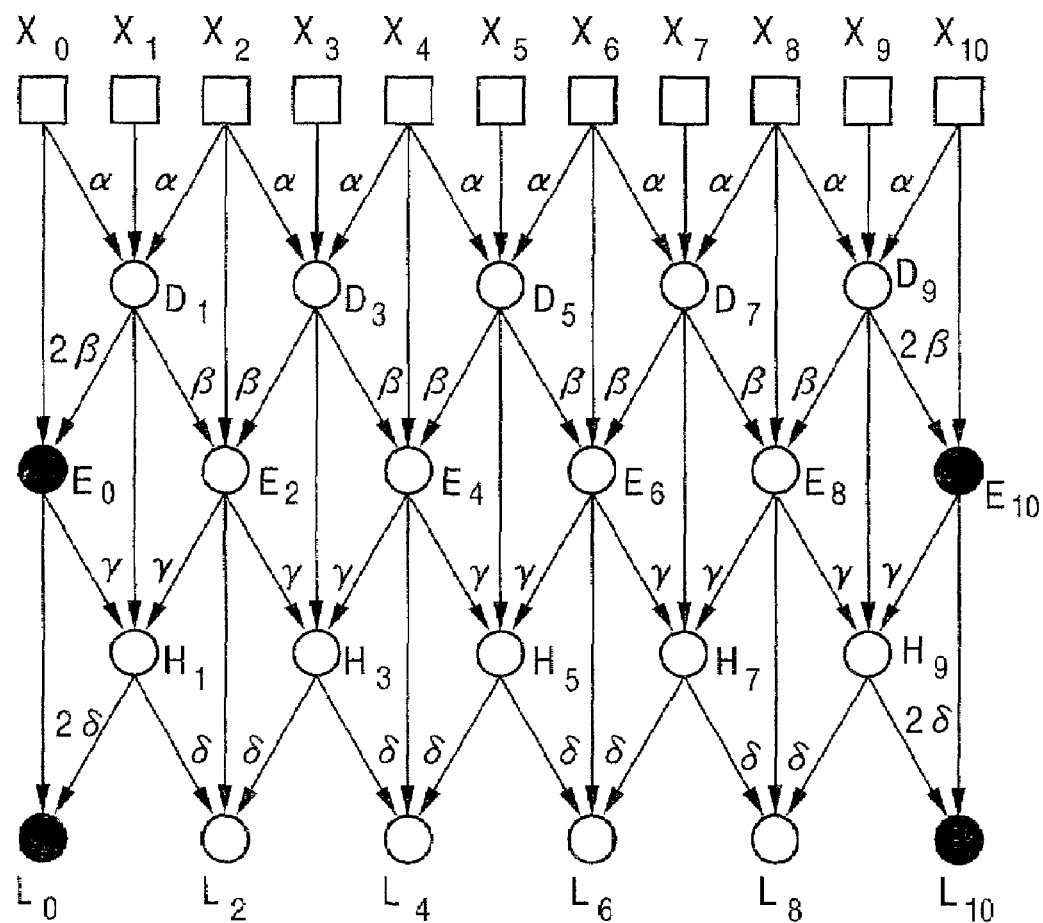
FIG. 68 shows arithmetic operations that require a boundary process when the data size is specified by an odd number.
Figure 69:
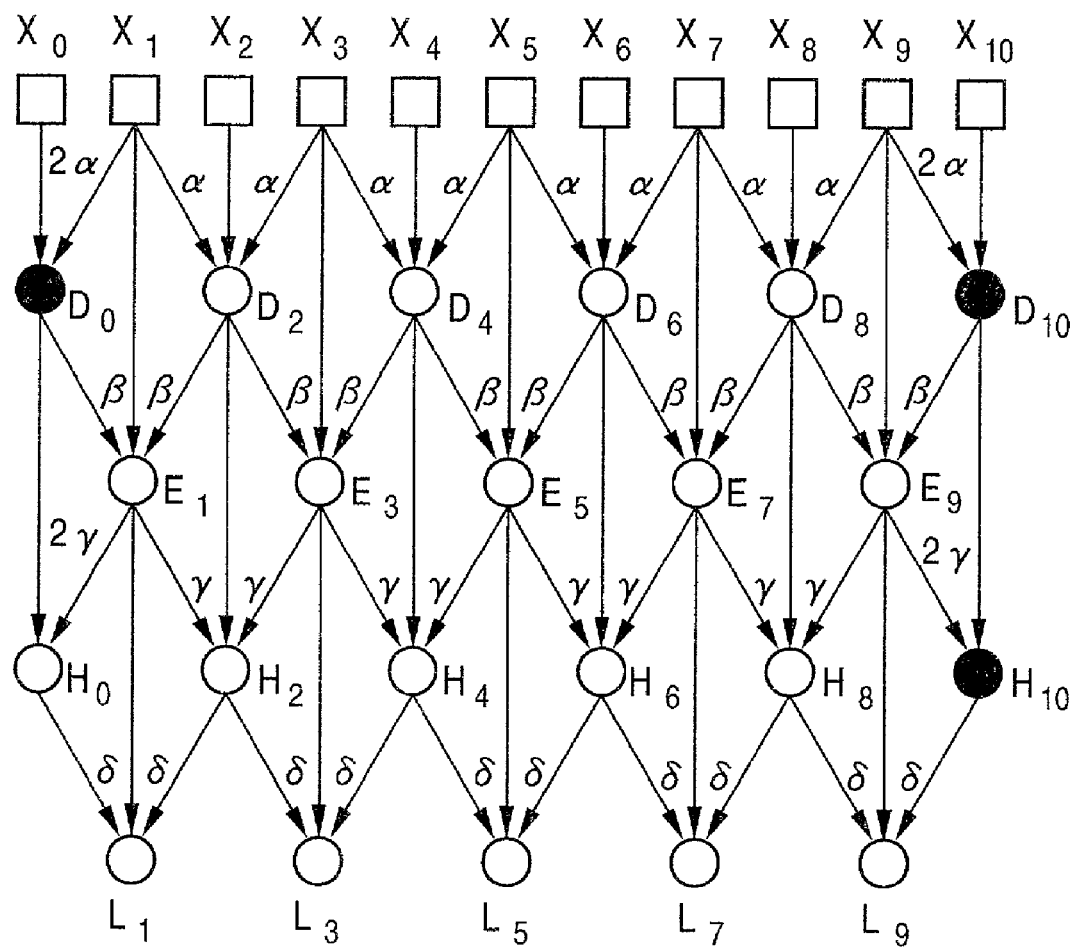
FIG. 69 shows arithmetic operations that require a boundary process when the data size is specified by an even number.

However, when the data size is specified by an odd number, the lifting arithmetic operations which require the start end boundary process and those which require the terminal end boundary process completely match (see FIGS. 68 and 69).

Upon transforming the head data into a low-frequency coefficient, both the head and last data must undergo boundary processes in the second and fourth lifting arithmetic operation stages, as shown in FIG. 68.

Upon transforming the head data into a high-frequency coefficient, both the head and last data must undergo boundary processes in the first and third lifting arithmetic operation stages, as shown in FIG. 69.

This means that only some lattice point data arithmetic units require both the start and terminal end boundary process functions.

More specifically, by replacing such some lattice point data arithmetic units by the both end compatible arithmetic unit shown in FIG. 65, the boundary process of data with an odd-numbered size can be achieved.

In the arrangement shown in FIG. 66, lattice point data arithmetic units of the second and fourth stages are replaced by the both end compatible arithmetic unit shown in FIG. 65, and those of the first and third stages are the same as the lattice point data arithmetic unit in FIG. 56. With this arrangement, the process corresponding to FIG. 68 can be done.

In the arrangement shown in FIG. 67, lattice point data arithmetic units of the first and third stages are replaced by the both end compatible arithmetic unit shown in FIG. 65, and those of the second and fourth stages are the same as the lattice point data arithmetic unit in FIG. 56. With this arrangement, the process corresponding to FIG. 69 can be done.

In the arrangements of this embodiment, when one dummy data is inserted between the last data of the previous block and the head data of the next block, a plurality of blocks can be continuously processed.

If no dummy data is inserted, the transform coefficient of the last data of the previous block, and that of the head data of the next block become coefficients of different types, and boundary data cannot be systematically transformed into a low- or high-frequency coefficient.

[Sixth Embodiment]

Figure 70:
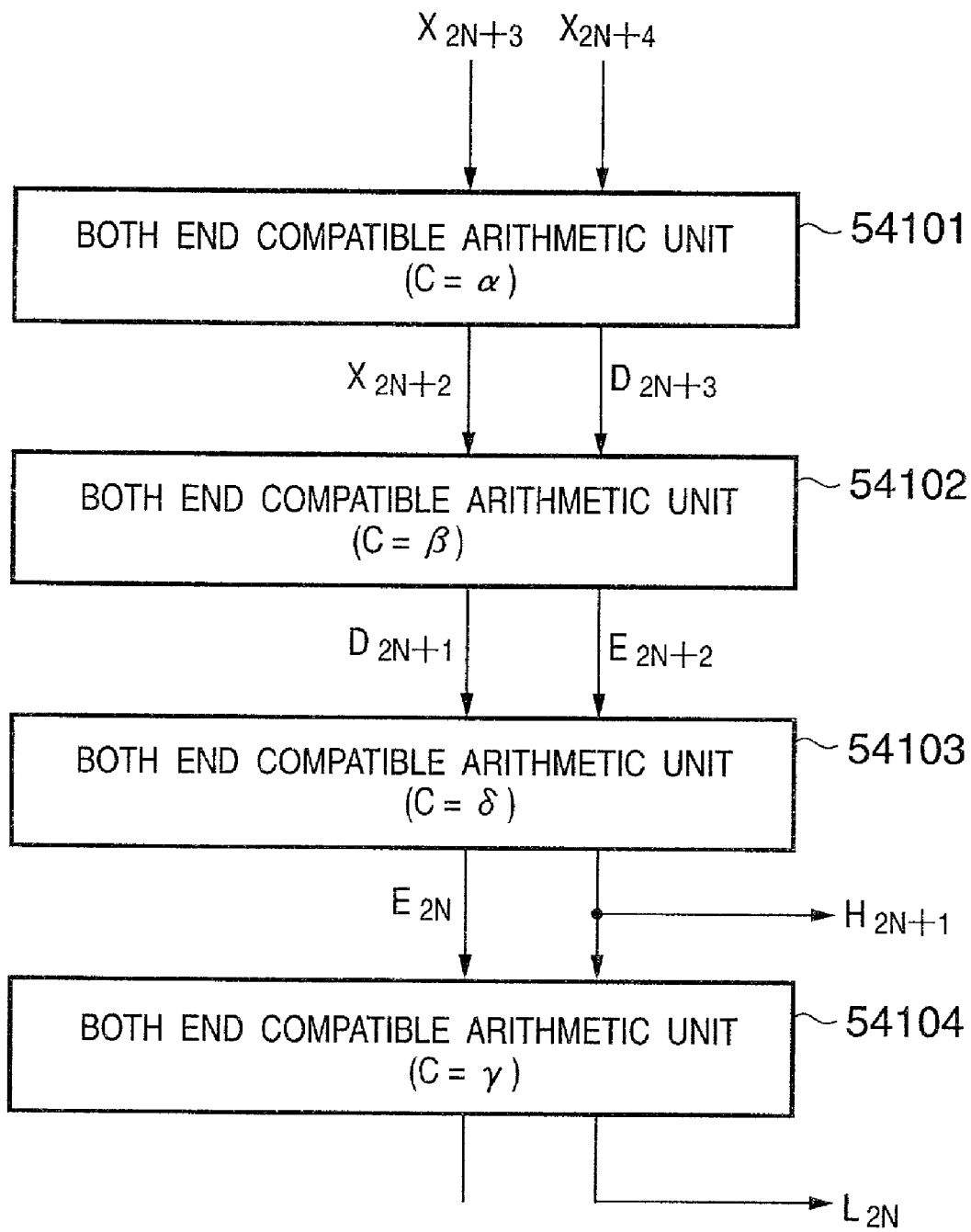
FIG. 70 is a block diagram of a filter processing apparatus in the sixth embodiment.

An arrangement of FIG. 70 in which all lattice point data arithmetic units are replaced by both end compatible arithmetic units can appropriately execute boundary processes even when boundary data is to be transformed into either a low- or high-frequency coefficient. Also, this arrangement can appropriately execute boundary process independently of the even- or odd-numbered data size. FIG. 70 shows an example of input/output data upon transforming the head data into a low-frequency coefficient as one processing example.

Figure 31:
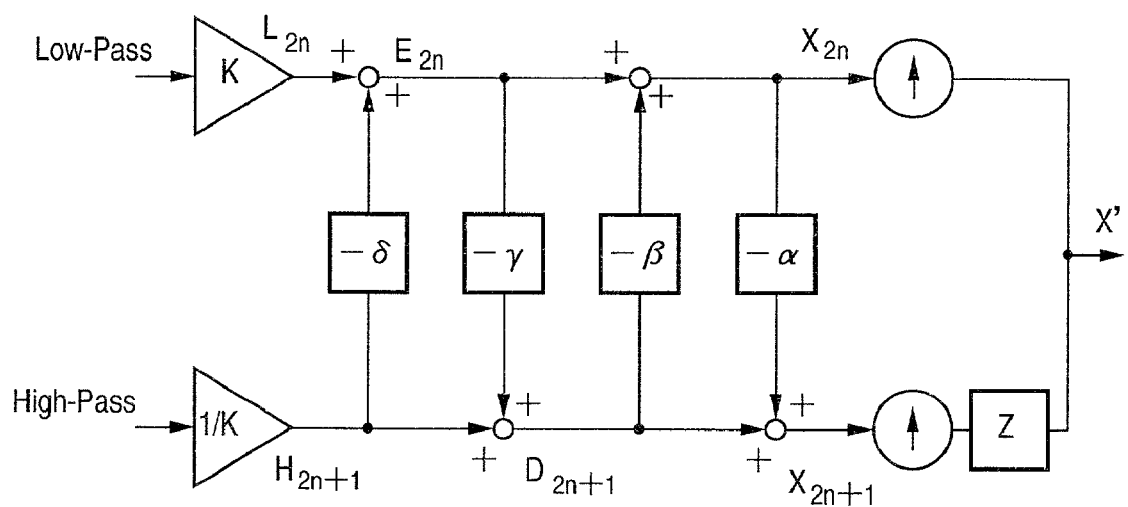
FIG. 31 is a diagram showing a reverse lifting scheme.
Figure 71:
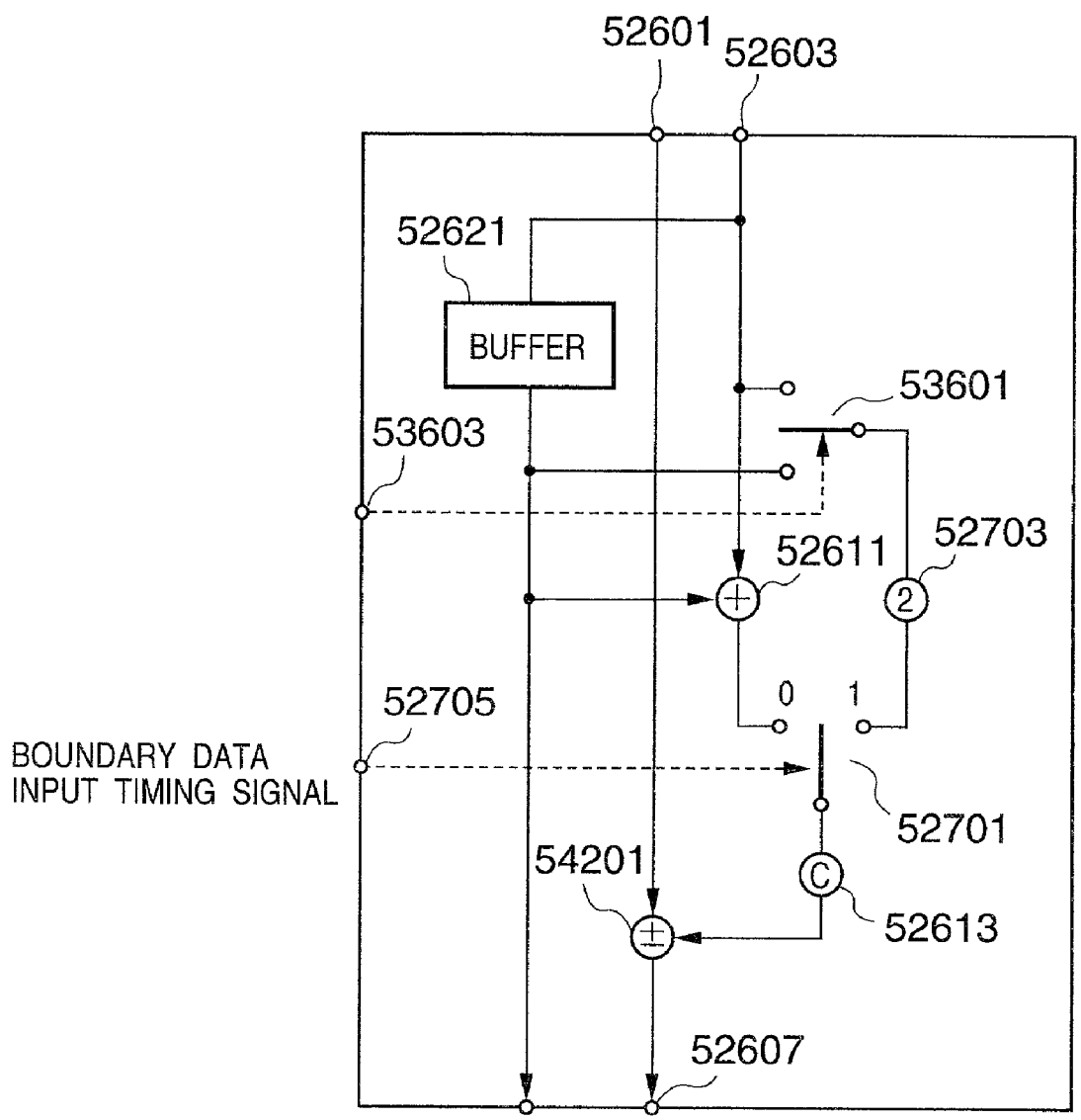
FIG. 71 is a diagram showing the arrangement of an arithmetic unit in the sixth embodiment.
Figure 72:
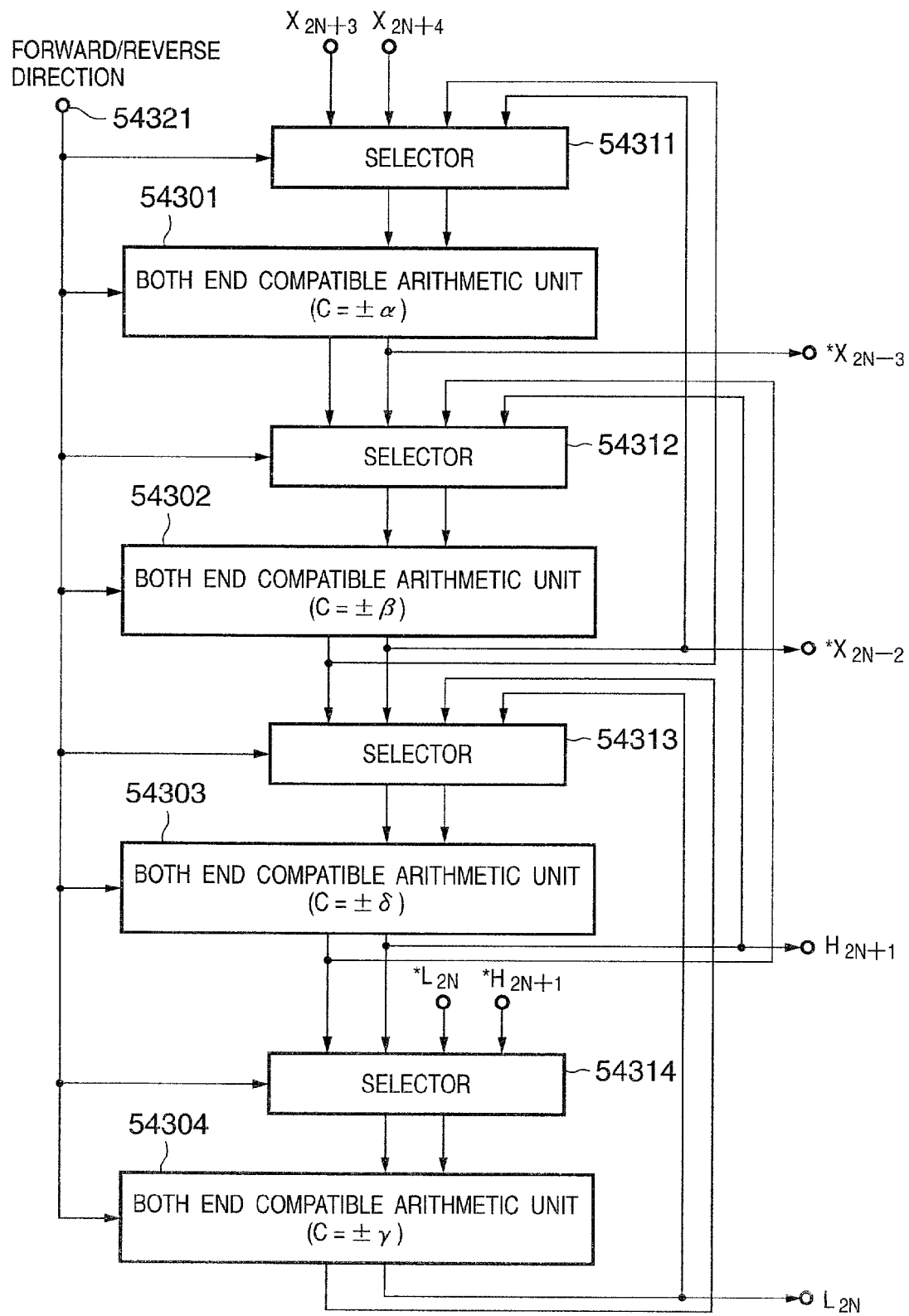
FIG. 72 is another block diagram of a filter processing apparatus in the sixth embodiment.

Furthermore, the both end compatible arithmetic unit in FIG. 65 is slightly modified, as shown in FIG. 71. In this modification, the adder 52615 in FIG. 65 is replaced by an adder/subtractor 54201. This is to cope with inverse lifting arithmetic operations in FIG. 31 (that modified unit is also called a both end compatible arithmetic unit since it is modified slightly). In addition to the above modification, selectors are inserted between neighboring both end compatible arithmetic units, as shown in FIG. 72, and processing is done in a reverse order like a selector 54314→arithmetic unit 54304→selector 54313→arithmetic unit 54303→selector 54312→arithmetic unit 54302→selector 54311→arithmetic unit 54301, thus implementing inverse transformation.

Forward transformation is done by processing in the order of the selector 54311→arithmetic unit 54301→selector 54312→arithmetic unit 54302→selector 54313→arithmetic unit 54303→selector 54314→arithmetic unit 54304 (input/output data upon inverse transformation are discriminated by attaching * marks to their heads).

Forward transformation and inverse transformation are switched by a control signal input from a terminal 54321. By switching the selectors 43311 to 54314 and the arithmetic functions of the adders/subtractors 54201 in the arithmetic units by the control signal, the two different arithmetic orders can be realized. Each adder/subtractor 54201 serves as an adder upon forward transformation, and as a subtractor upon inverse transformation.

As described above, according to the fourth to sixth embodiments, the lattice point data arithmetic unit which has the buffer for storing input data and an arithmetic block for computing lattice point data comprises means for selecting only data inside the boundary, and the output from the selection means is multiplied by a predetermined coefficient. In this way, the need for a process for replicating data inside the boundary to generate data outside the boundary is obviated, and no storage area for storing the data outside the boundary is required.

With the fourth to sixth embodiments of the present invention mentioned above, even when data required for processing are located outside the boundary of image data, those data outside the boundary need not be generated by a pre-process and, hence, the structure can be simplified.

[Seventh Embodiment]

In the present invention, the process for "leaving four data X8, D7, E6, and H5 upon calculating and outputting L4 and H5, and inputting new data X9 and X10" in the prior art is modified as follows.

Figure 32:
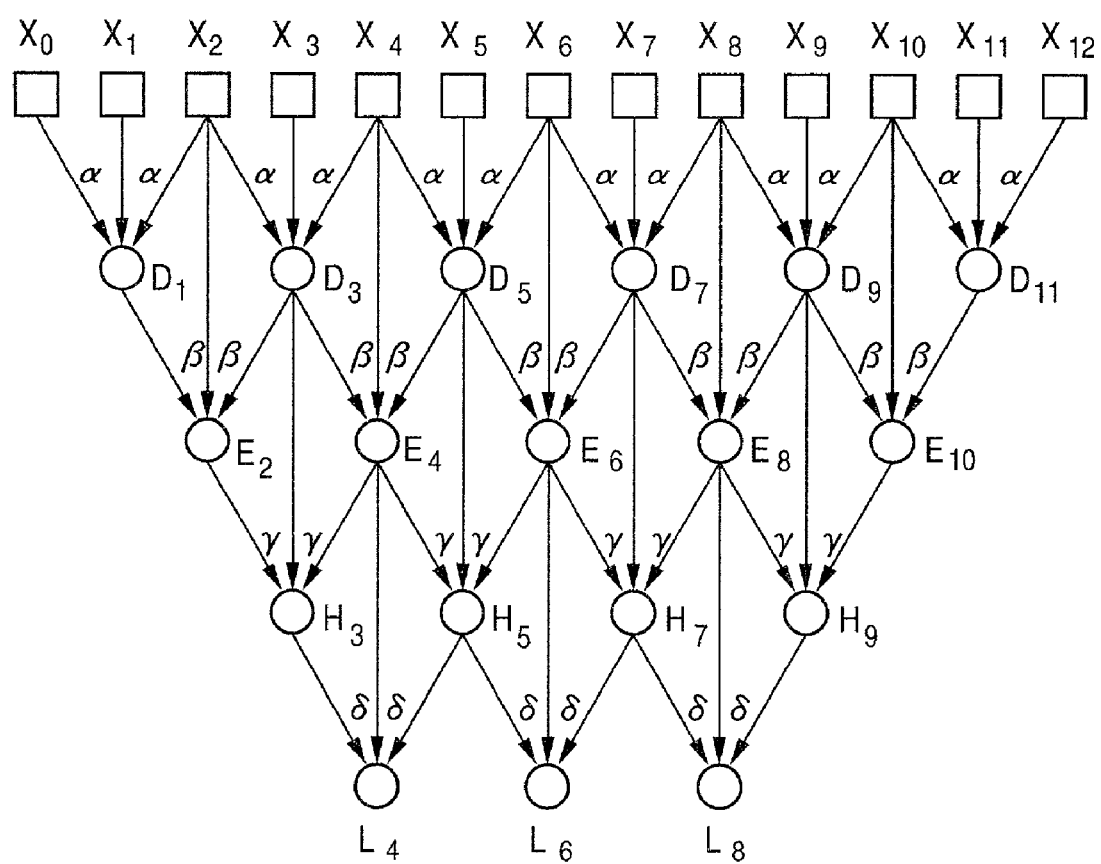
FIG. 32 shows a lifting lattice structure of forward transformation.
Figure 33:
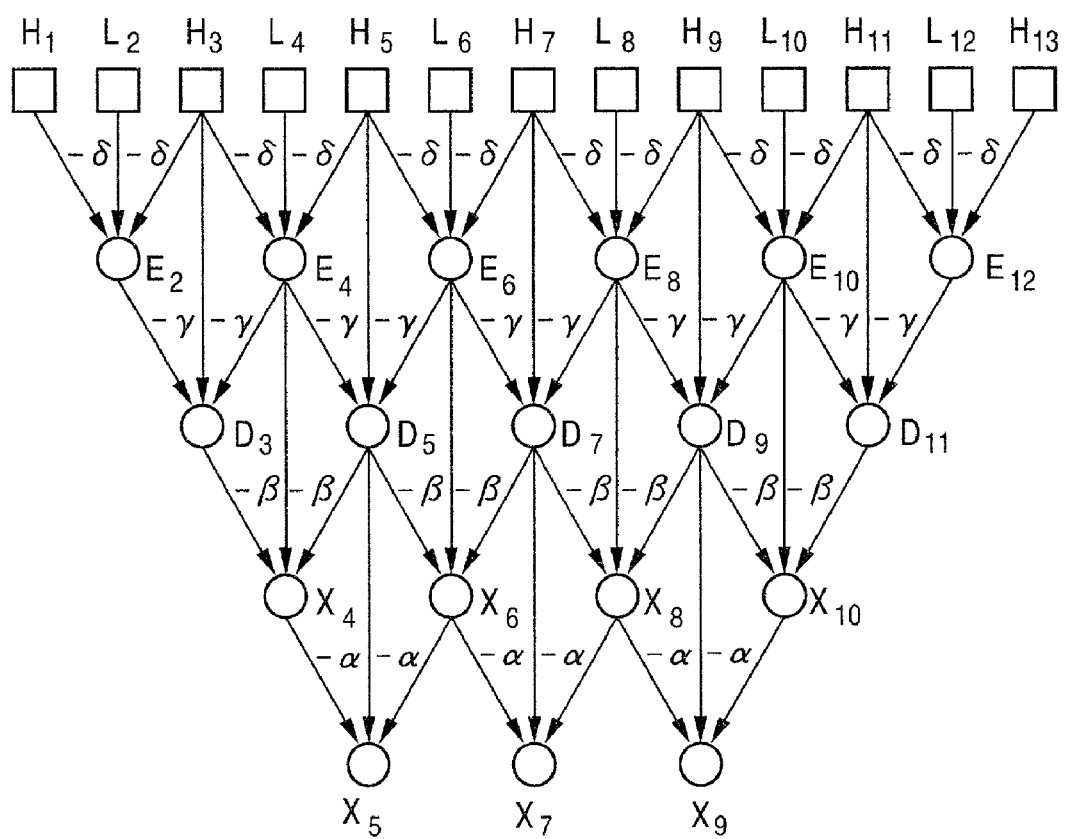
FIG. 33 shows a lifting lattice structure of inverse transformation.
Figure 34:
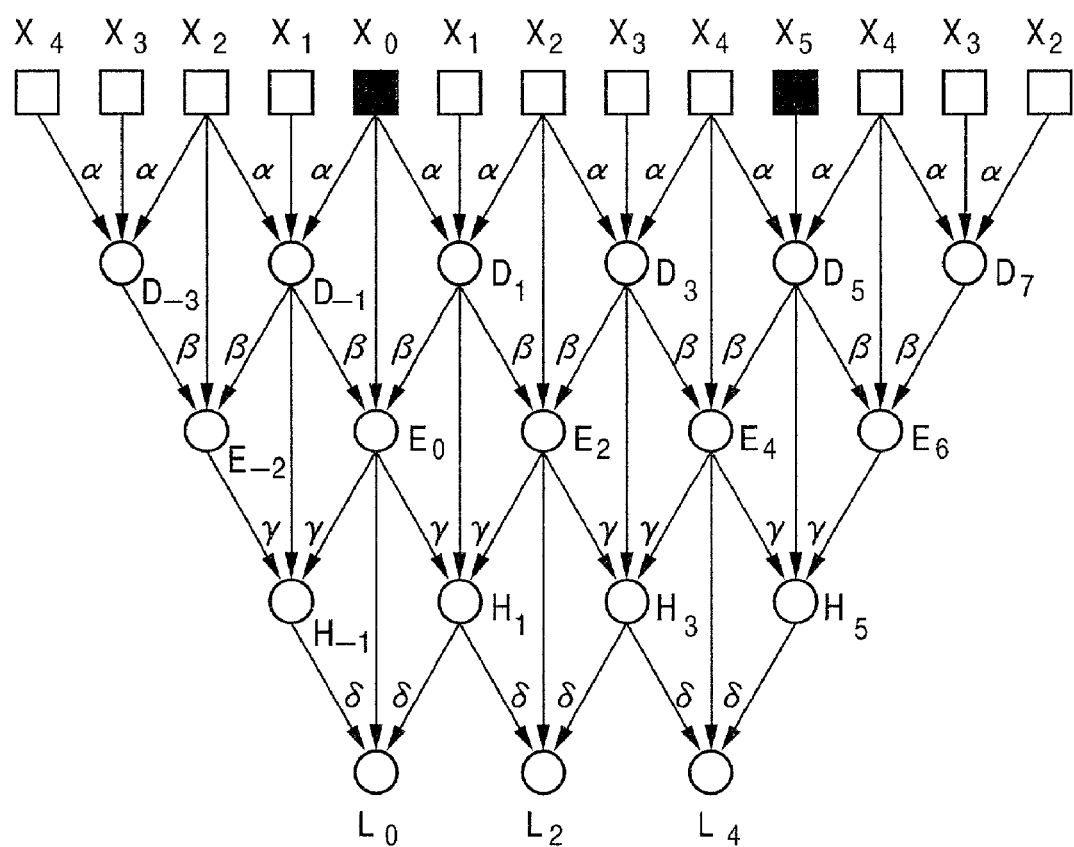
FIG. 34 shows replication of input data in a region outside boundary data.

That is, a process for "leaving data (to be also referred to as intermediate data hereinafter) d9t, E8t, H7t, and L6t generated during computations of four data D9, E8, H7, and L6 upon calculating and outputting L4 and H5, and inputting new data X10 and X11 in the next processing cycle" is done in FIG. 32.

Note that the seventh embodiment will explain a case wherein data of 9 taps and 7 taps are respectively used in arithmetic operations of high- and low-frequency wavelet transform coefficients, i.e., a case wherein a 9×7 filter (a filter consisting of data of 9 taps and 7 taps). However, the present invention is not limited to such specific case, and can be applied to data of 2n+1 taps and 2n−1 taps respectively in arithmetic operations of high- and low-frequency wavelet transform coefficients.

The aforementioned intermediate data are described by:

$$D9t = X9 + \alpha \cdot X8 \quad (17)$$

$$E8t = X8 + \beta \cdot D7 \quad (18)$$

$$H7t = D7 + \gamma \cdot E6 \quad (19)$$

$$L6t = E6 + \delta \cdot H5 \quad (20)$$

At the same time, from D7t, E6t, H5t, and L4t left in the previous processing cycle, L4 and H5 are calculated by:

$$D7 = D7t + \alpha \cdot X8 \quad (21)$$

$$E6 = E6t + \beta \cdot D7 \quad (22)$$

$$H5 = H5t + \gamma \cdot E6 \quad (23)$$

$$L4 = L4t + \delta \cdot H5 \quad (24)$$

The data to be left are held in registers and are used in the next processing cycle. Arithmetic operations done in the next processing cycle using those data are described by:

$$D9 = D9t + \alpha \cdot X10 \quad (25)$$

$$E8 = E8t + \beta \cdot D9 \quad (26)$$

$$H7 = H7t + \gamma \cdot E8 \quad (27)$$

$$L6 = L6t + \delta \cdot H7 \quad (28)$$

With this process, L6 and H7 can be output.

Figure 73:
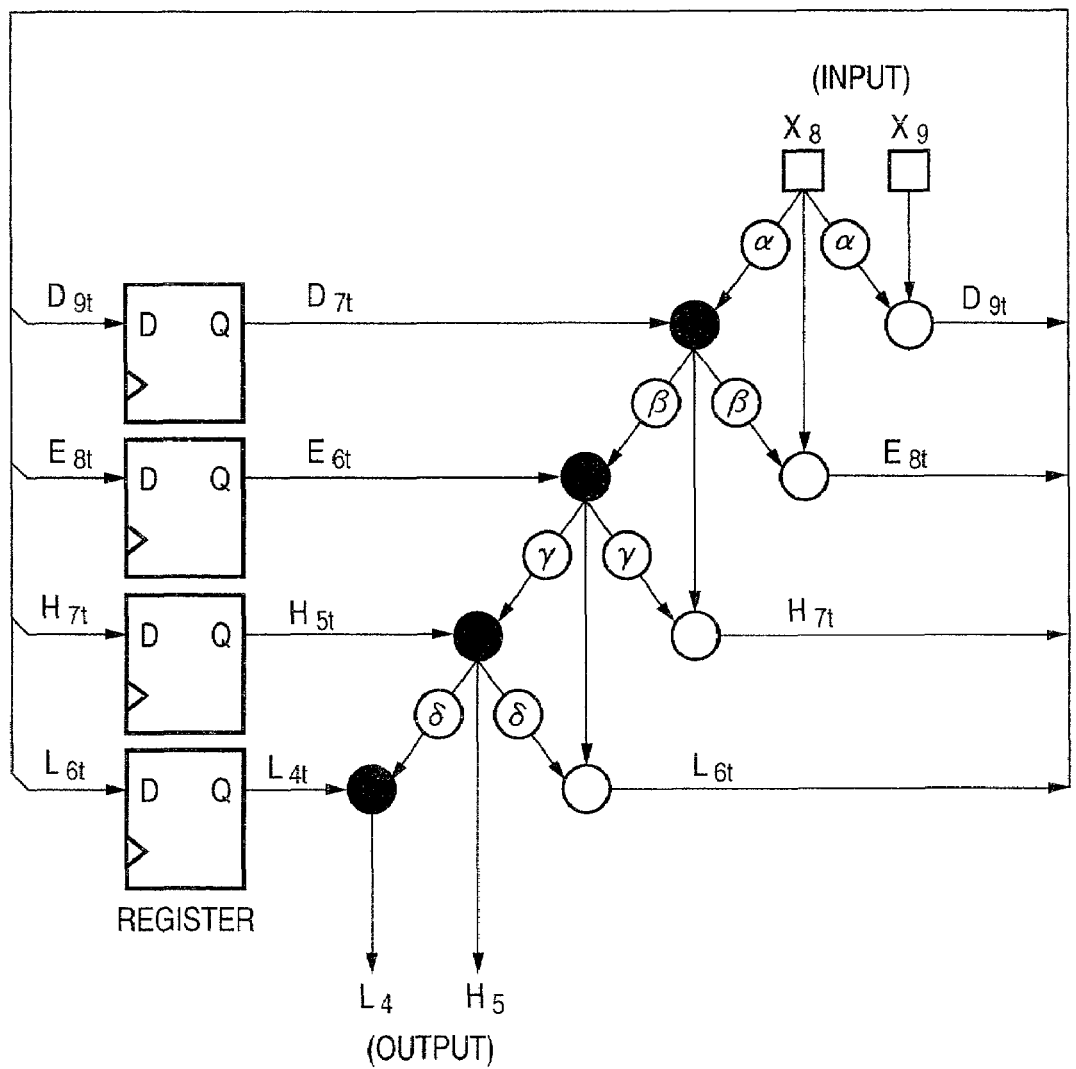
FIG. 73 shows a lifting lattice structure that expresses the contents of the present invention.
Figure 74:
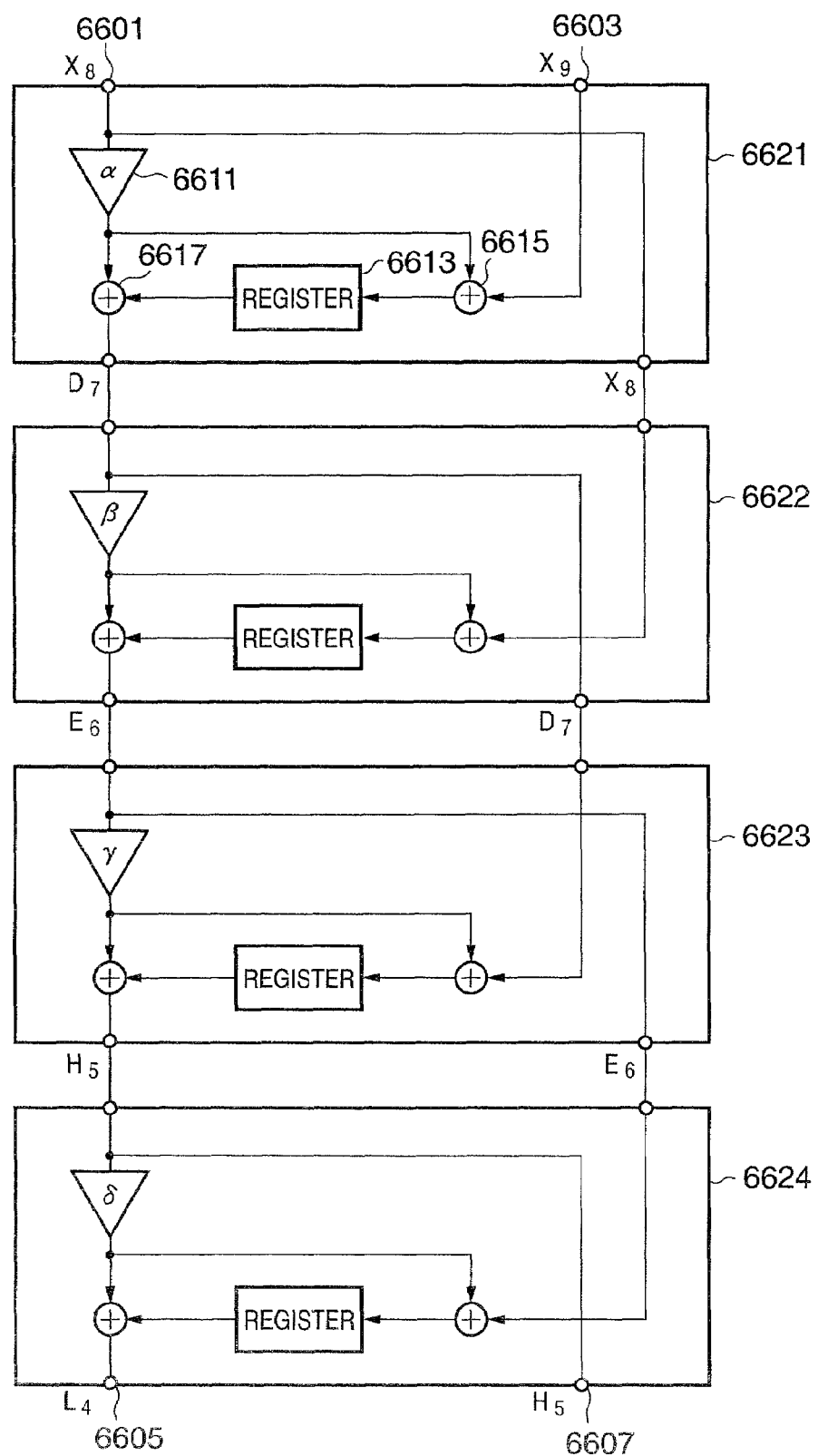
FIG. 74 is a diagram showing the arrangement of the seventh embodiment.

FIG. 73 expresses such processing contents according to the lifting lattice structure chart. FIG. 74 shows an actual hardware arrangement.

In FIG. 74, reference numerals 6601 and 6603 denote terminals for inputting a pair of data. Reference numerals 6605 and 6607 denote terminals for respectively outputting low- and high-frequency wavelet transform coefficients. Reference numeral 6611 denotes a multiplier for multiplying by a lifting coefficient as a multiplication coefficient. Reference numeral 6613 denotes a register for holding intermediate data as data generated during an arithmetic operation. Reference numerals 6615 and 6617 denote adders for respectively adding the output from the multiplier to the input and output of the register. Reference numeral 6621 denotes a lifting arithmetic unit. Reference numerals 6622, 6623, and 6624 denote lifting arithmetic units which have substantially the same arrangement as that of the lifting arithmetic unit 6621 except for multiplication coefficients of the multipliers.

When X8 and X9 are input to the input terminals 6601 and 6603, the multiplier 6611 multiplies X8 by a lifting coefficient $\alpha$, and outputs $\alpha \cdot X8$ as a product. This product is supplied to the adders 6615 and 6617, which respectively compute equations (17) and (21).

The remaining lifting arithmetic units 6622, 6623, and 6624 make arithmetic processes to have the following correspondence. That is, the lifting arithmetic unit 6622 simultaneously makes arithmetic operations of equations (18) and (22);

the lifting arithmetic unit 6623 simultaneously makes arithmetic operations of equations (19) and (23); and lifting arithmetic unit 6624 simultaneously makes arithmetic operations of equations (20) and (24).

Hence, the lifting arithmetic unit 6624 computes a low-frequency wavelet transform coefficient L4, the lifting arithmetic unit 6623 computes a high-frequency wavelet transform coefficient H5, and these coefficients are output from the terminals 6605 and 6607. The arithmetic results of equations (17) to (20) are held in the registers of the respective arithmetic units, and are used in arithmetic operations of equations (25) to (28) executed in the next cycle.

In this way, the horizontal forward wavelet transformation process can be done.

Figure 1:
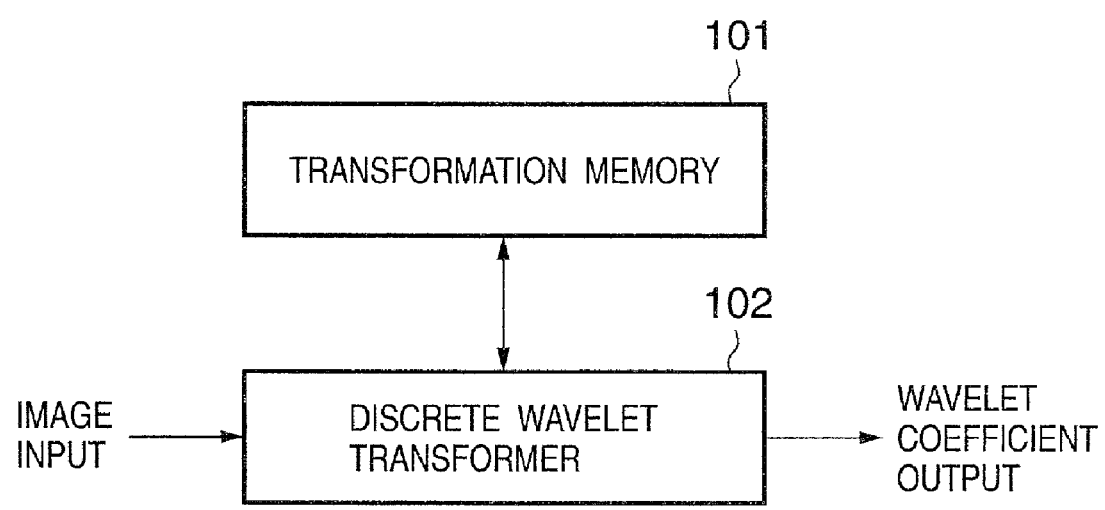
FIG. 1 is a diagram for explaining the operation of a transformation memory 101 and discrete wavelet transformer 102 in the prior art.
Figure 2A:
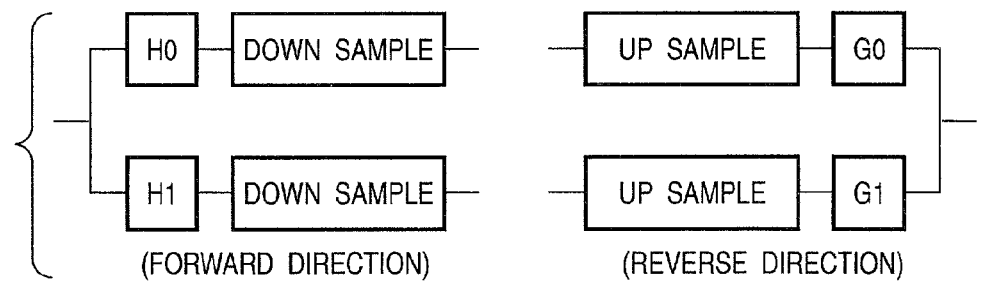
FIG. 2A is a block diagram showing the basic arrangement of the discrete wavelet transformer 102.
Figure 2B:
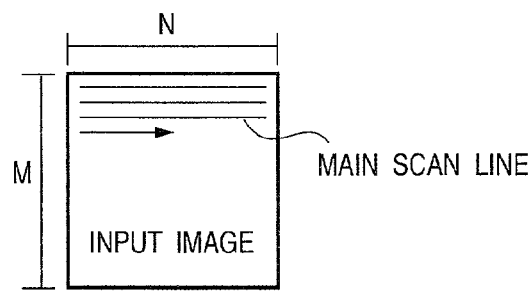
FIG. 2B shows an input image.
Figure 2C:
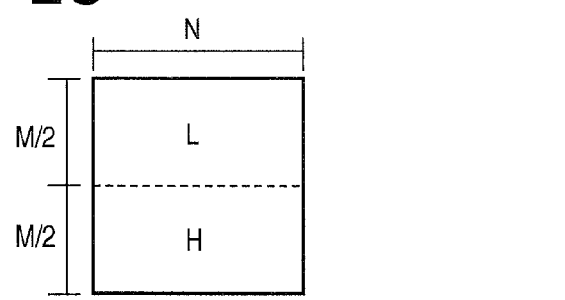
FIG. 2C shows generated L and H subbands.
Figure 2D:
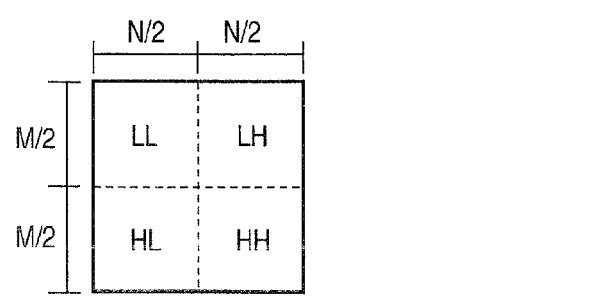
FIG. 2D shows HH, HL, LH, and LL subbands.
Figure 3:
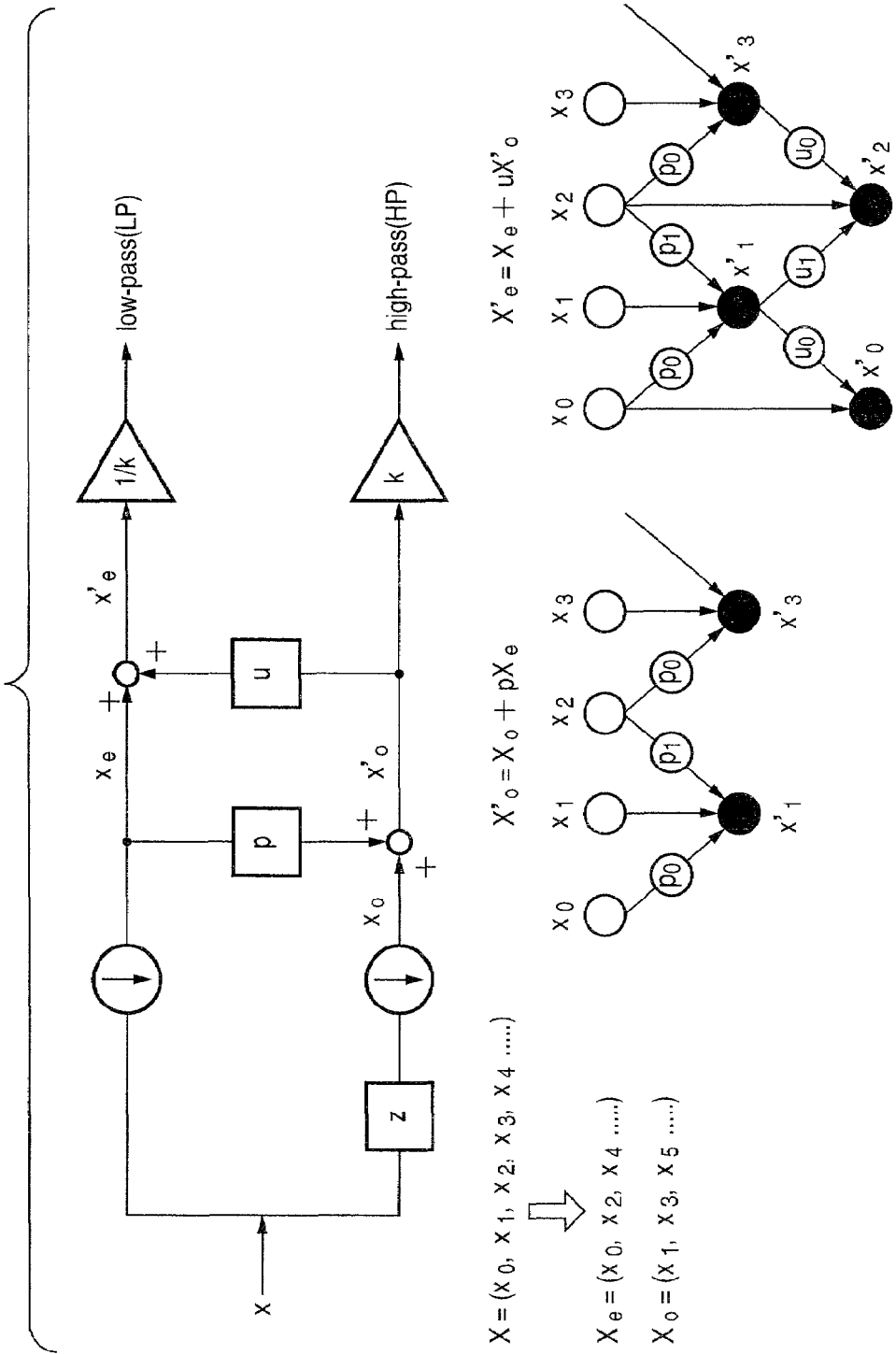
FIG. 3 is a diagram showing the basic arrangement of a forward lifting scheme.
Figure 4:
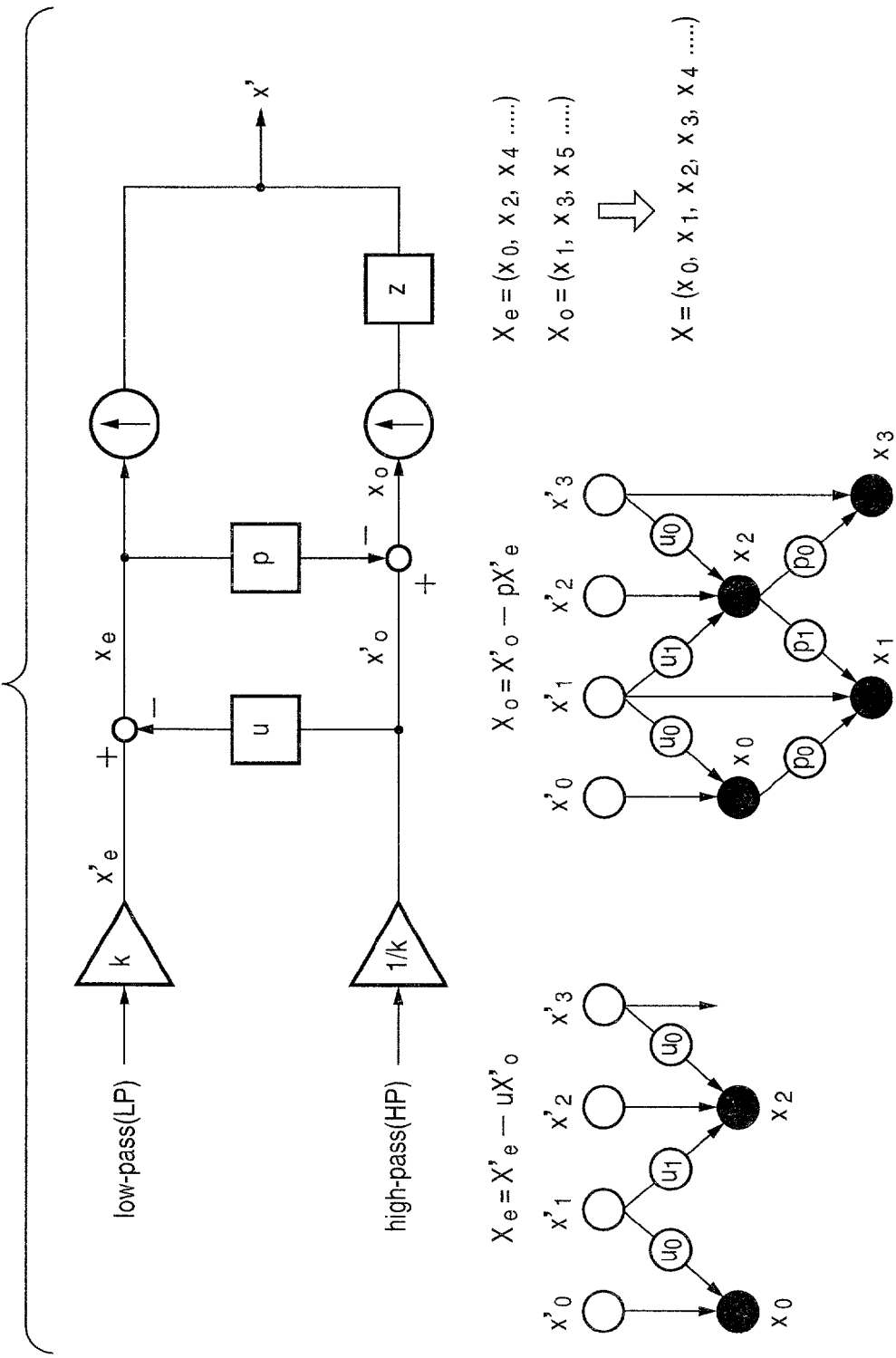
FIG. 4 is a diagram showing the basic arrangement of a reverse lifting scheme.
Figure 7:
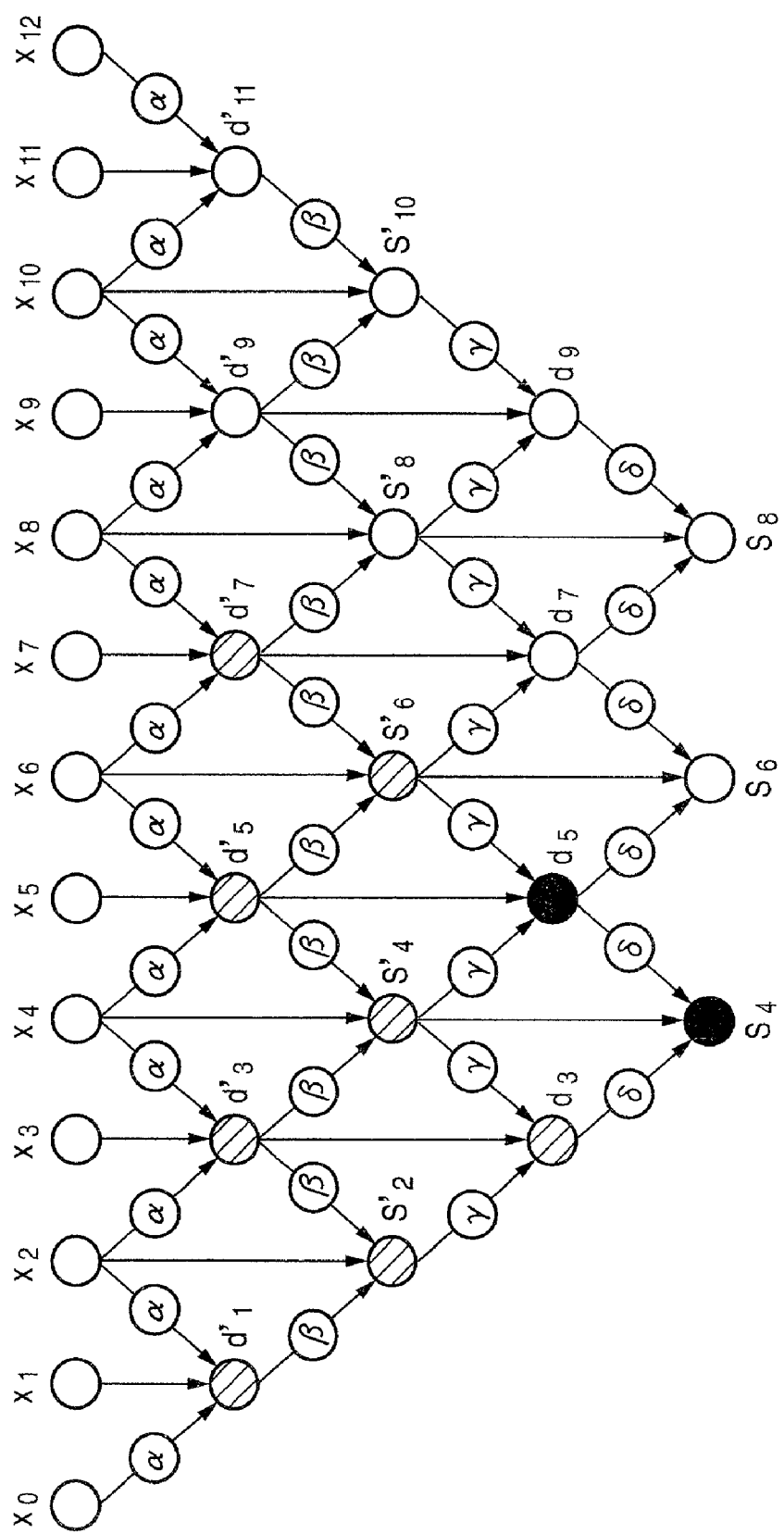
FIG. 7 shows the structure of a lifting lattice.
Figure 8:
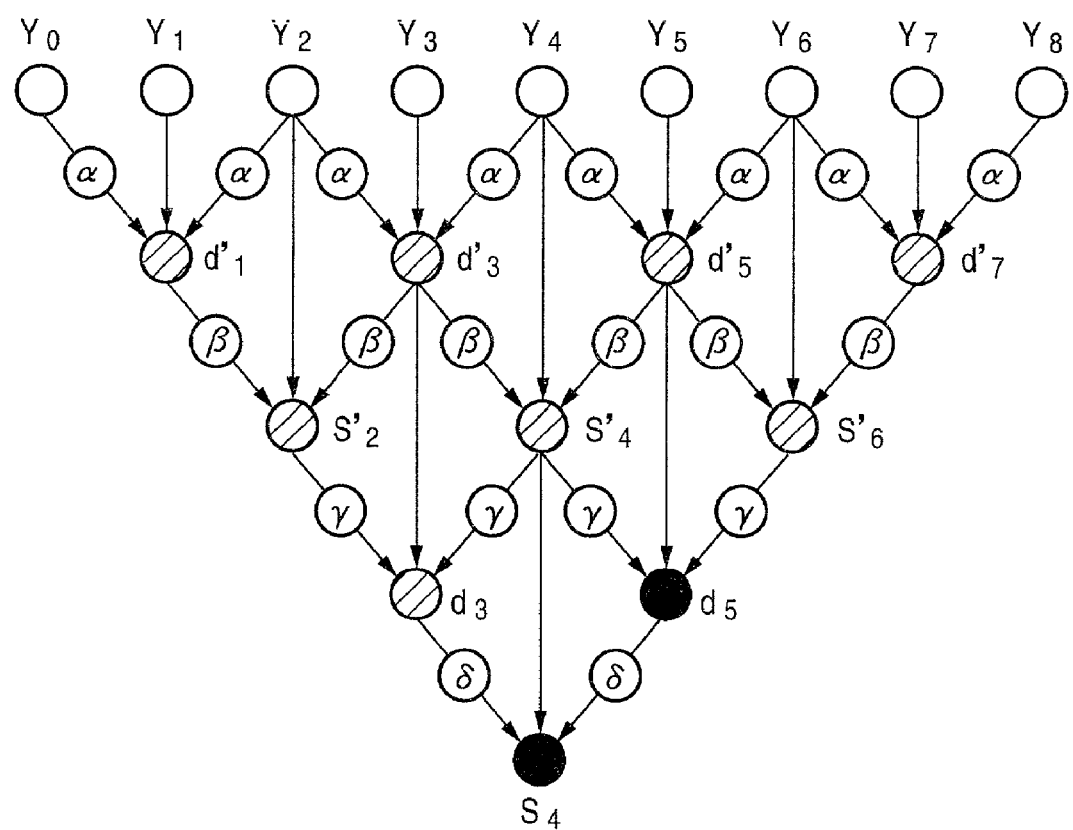
FIG. 8 shows the structure of a lifting lattice.

The present inventors have already proposed a data processing apparatus which executes wavelet transformation by connecting a plurality of lattice point arithmetic units shown in FIG. 7. The contents of this proposal and the present invention have the following two differences:

(i) the difference between the internal arrangements of the lattice point arithmetic unit and lifting arithmetic unit; and (ii) the difference between combinations of two data to be simultaneously processed (i.e., the input phase difference).

Other arrangements are basically the same. Especially, a connection method for executing processing by connecting a plurality of these arithmetic units is the same, and if these arithmetic units are considered as black boxes and the input data phase is ignored, two processing systems seem to be the same.

Hence, by merely replacing the lattice point data arithmetic units by the lifting arithmetic units, application examples in the already proposed contents can be directly applied to the present invention.

Application example 1: horizontal inverse wavelet transformation processing apparatus Application example 2: vertical forward wavelet transformation processing apparatus Application example 3: vertical inverse wavelet transformation processing apparatus Application example 4: wavelet transformation processing apparatus capable of multiplexing different kinds of data Application example 5: wavelet transformation processing apparatus (horizontal, vertical) capable of switching forward and inverse transformation directions Application example 6: wavelet transformation processing apparatus that shares multipliers used to normalize coefficients in application example 5

These application examples will be briefly explained below.

Figure 76:
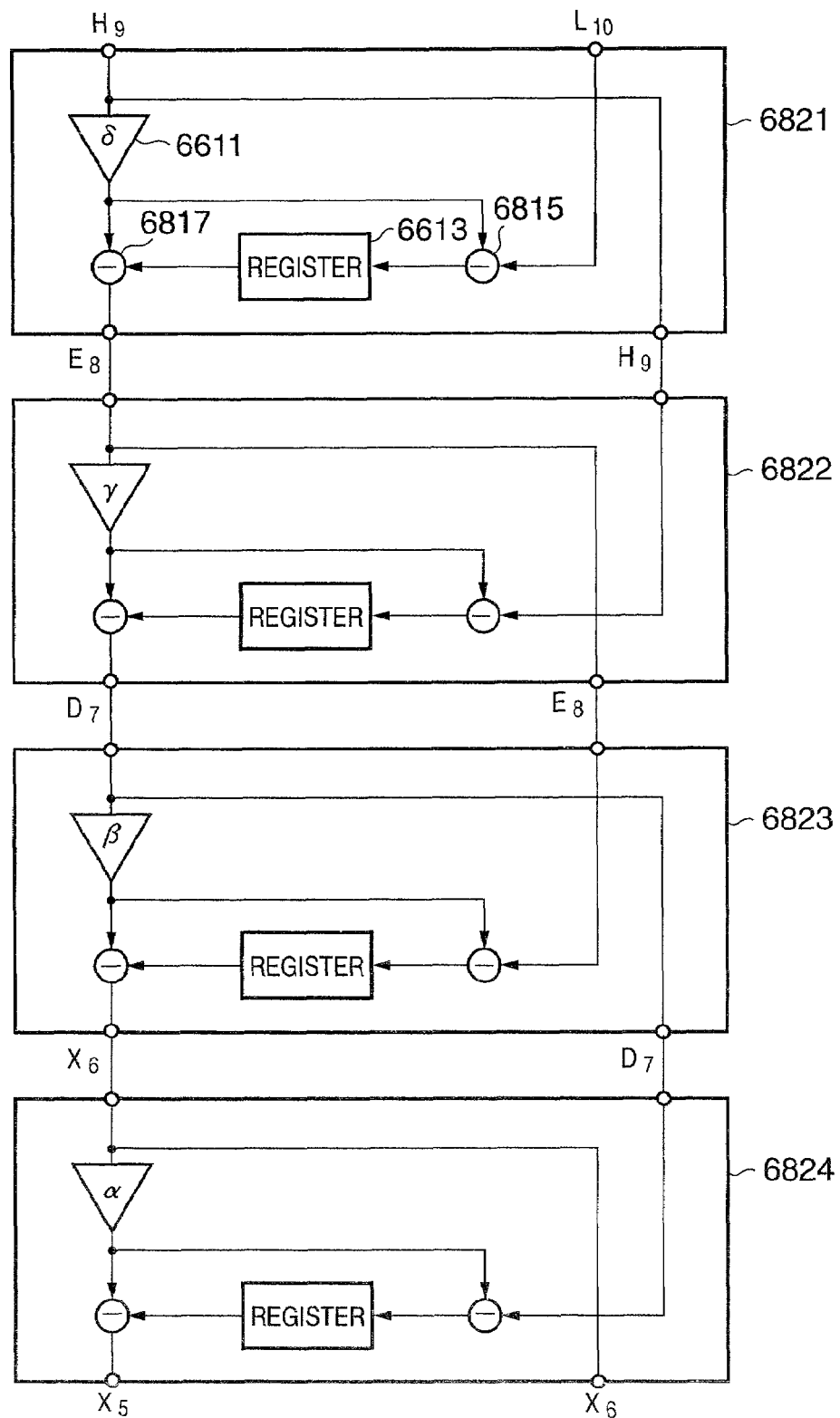
FIG. 76 is a diagram showing the arrangement of an IDWT transformation apparatus as an application example of the seventh embodiment.

Application example 1 is implemented by the arrangement shown in FIG. 76. The difference from the arrangement in FIG. 74 is that the lifting coefficients are set in the order of $\delta$, $\gamma$, $\beta$, and $\alpha$ in turn from the uppermost unit, which is vertically opposite to that in FIG. 74. Also, all the adders before and after the registers in FIG. 74 are replaced by subtractors in FIG. 76 (if coefficients $-\delta$, $-\gamma$, $-\beta$, and $-\alpha$ are used, the adders may be used).

Application examples 2 and 3 can be implemented by respectively replacing all the registers in the arithmetic units in FIGS. 74 and 76 by line memories (not shown).

Application example 4 can be implemented by replacing the register in each arithmetic unit in FIG. 74 by a plurality of cascaded registers, multiplexing a plurality of kinds of data, and inputting multiplexed data to the terminals 6601 and 6603.

Figure 77:
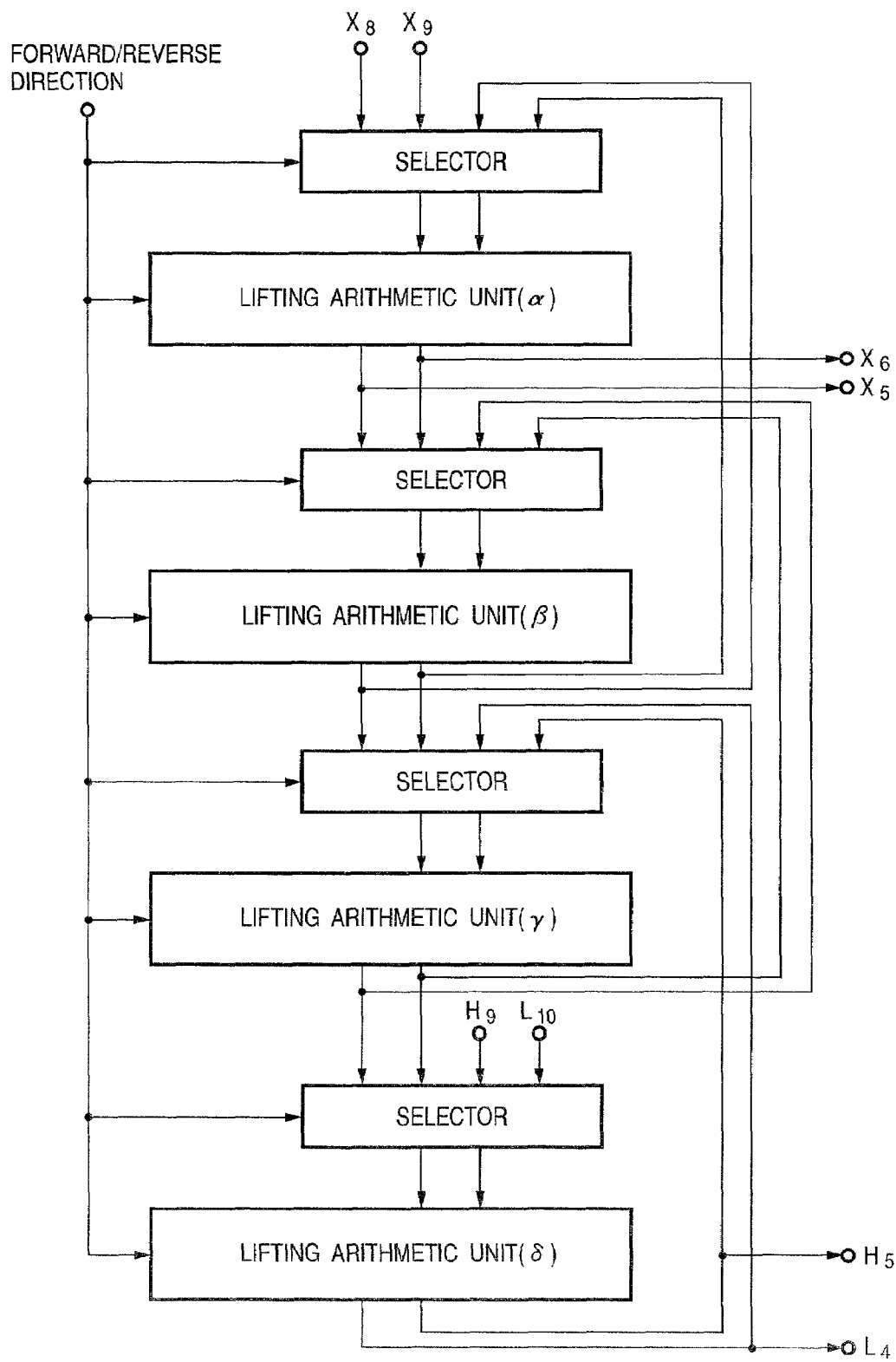
FIG. 77 is a diagram showing the arrangement of a DWT/IDWT transformation apparatus a an application example of the seventh embodiment.

Application example 5 can be implemented as follows. That is, all the adders in the arithmetic units in FIG. 74 are replaced by adders/subtractors, which are used as adders upon forward transformation and as subtractors upon inverse transformation, and selectors are inserted between neighboring arithmetic units to control processed data to flow from the lower to upper arithmetic units, thus obtaining the arrangement equivalent to that shown in FIG. 76. FIG. 77 shows the arrangement.

Figure 78:
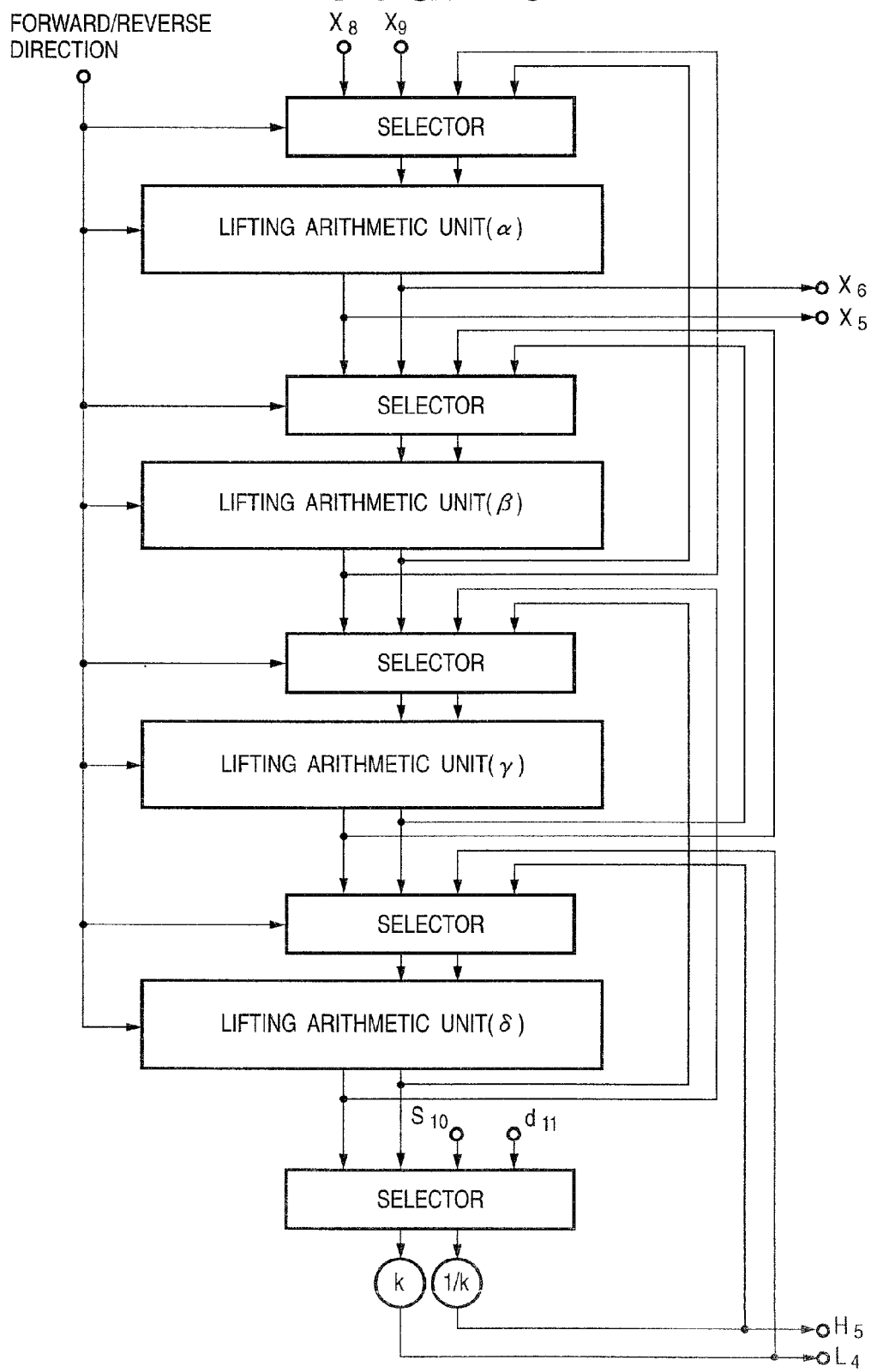
FIG. 78 is a diagram showing the arrangement of a DWT/IDWT transformation apparatus a an application example of the seventh embodiment.

In application example 6, another selector is added to the arrangement of application example 5 so as to share multipliers used to normalize coefficients in forward and inverse transformation processes. FIG. 78 shows the arrangement.

As the seventh application example, there is proposed:

Application example 7: wavelet transformation processing apparatus capable of a boundary process without expanding data at the image boundary In the boundary process, "when only two out of three data required for computing lattice point data are available, deficient data is substituted by data located at a symmetric position to make arithmetic operations".

In this case, the internal arrangement of the lifting arithmetic unit in the present invention must be modified.

Figure 79:
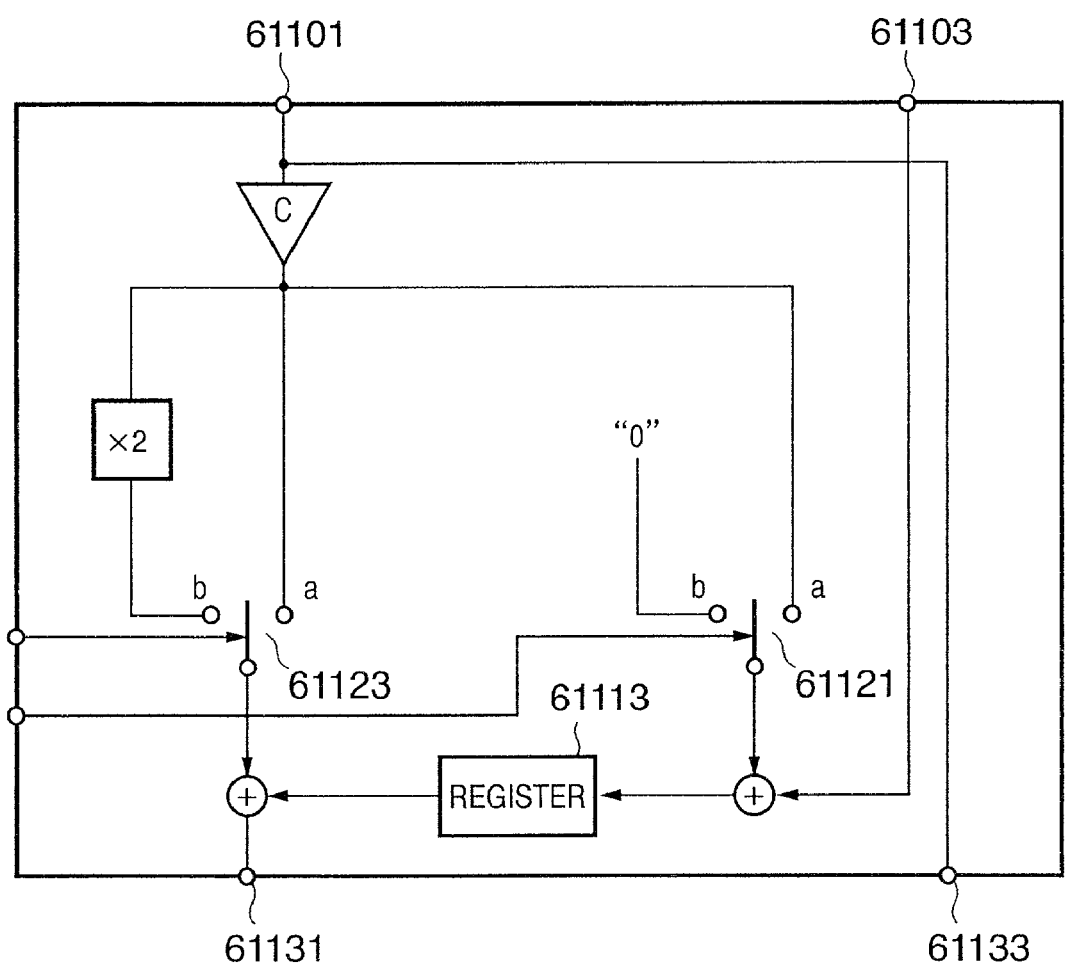
FIG. 79 is a diagram showing the arrangement of a lifting arithmetic unit capable of a start end boundary process.
Figure 80:
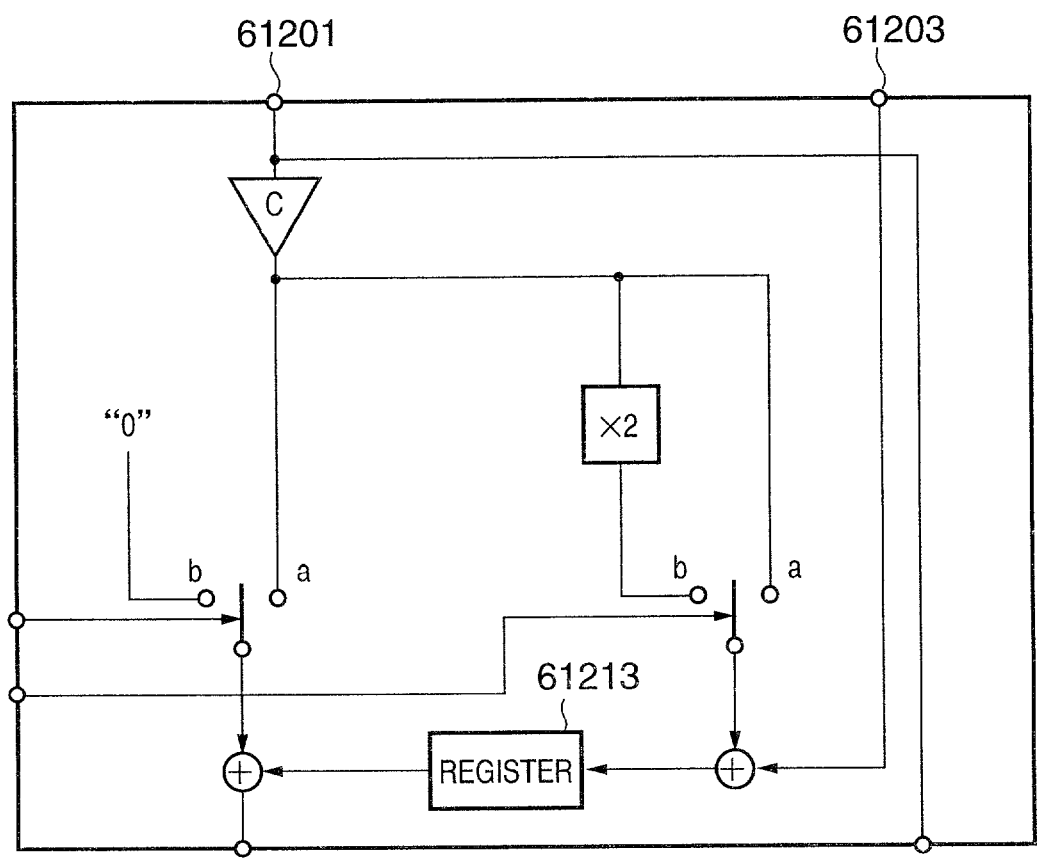
FIG. 80 is a diagram showing the arrangement of a lifting arithmetic unit capable of a terminal end boundary process.
Figure 81:
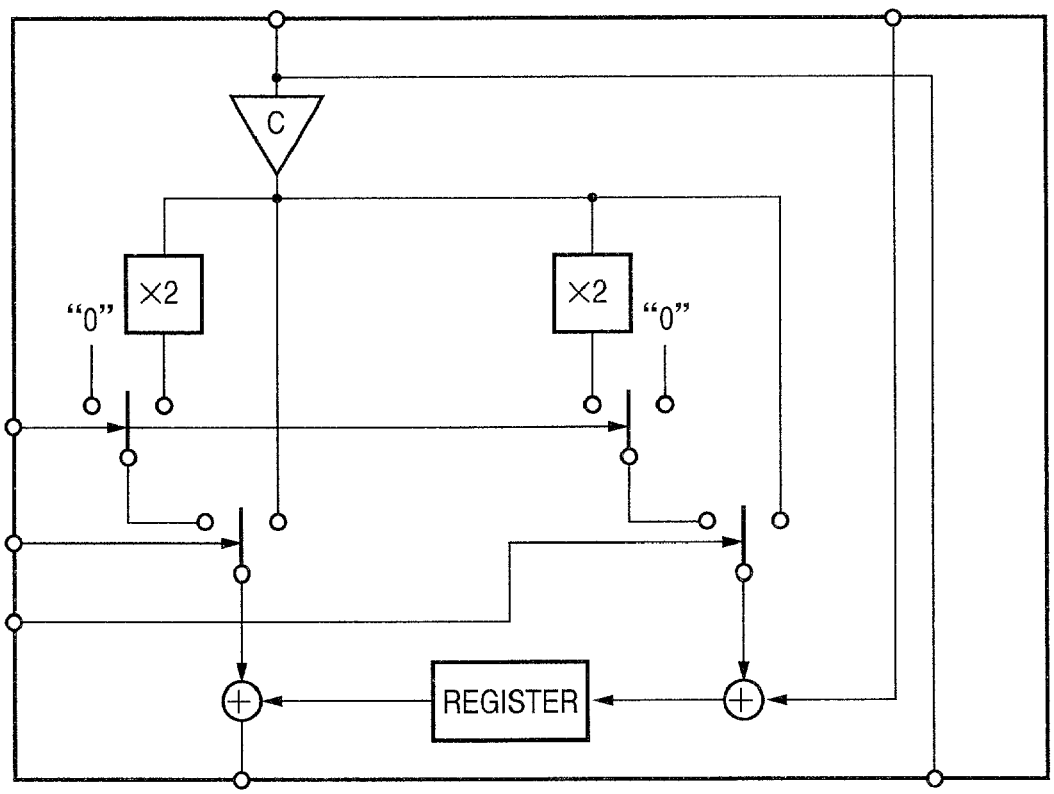
FIG. 81 is a diagram showing the arrangement of a lifting arithmetic unit capable of both start and terminal end boundary processes.

FIGS. 79, 80, and 81 show internal arrangements after modifications. The modified arrangements are the following three ones.

Arrangement 1: lifting arithmetic unit capable of a start end boundary process (start end compatible arithmetic unit)

Arrangement 2: lifting arithmetic unit capable of a terminal end boundary process (terminal end compatible arithmetic unit)

Arrangement 3: lifting arithmetic unit capable of both start and terminal end boundary processes (both end compatible arithmetic unit)

Figure 82:
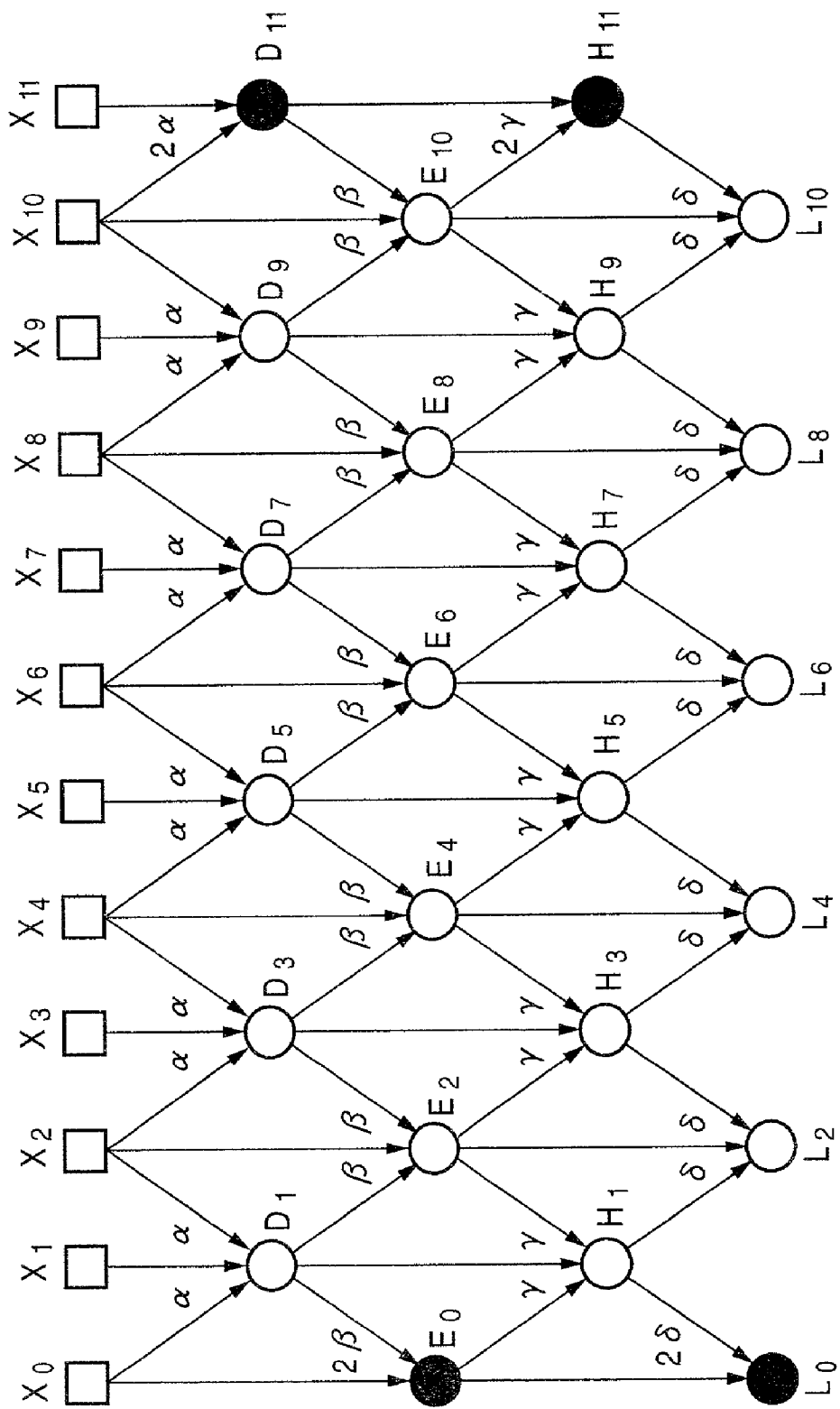
FIG. 82 shows boundary data in the lifting lattice structure.

The lifting arithmetic unit capable of a start end boundary process shown in FIG. 79 can compute lattice point data indicated by ● at the left end boundary portion shown in FIG. 82. Two selectors 61121 and 61123 added in FIG. 79 select the inputs at terminals a in a normal process. Note that C in FIGS. 79 to 81 is one of lifting coefficients: $\alpha$, $\beta$, $\gamma$, and $\delta$.

Upon computing boundary data, the selector 61121 selects terminal b to store data input from a terminal 61103 in a register 61113 as the input value. When terminal b of the selector 61123 is selected in the next cycle, a value obtained by multiplying data input from a terminal 61101 by 2·C is added to the output from the register.

For example, data X0 input from the terminal 61103 is stored in the register 61113 as the input value, and when D1 is input to the terminal 61101 in the next cycle, X0+2·β·D1 (=E0) is output from a terminal 61131. Such control is made by control signals to be supplied to the selectors 61121 and 61123.

The lifting arithmetic unit capable of a terminal end boundary process shown in FIG. 80 can compute lattice point data indicated by ● at the right end boundary portion shown in FIG. 82. Unlike in the start end boundary process, the terminal end boundary process controls to add a value obtained by multiplying data input from a terminal 61201 by 2·C to data input from a terminal 61203 upon storing data in a register 61213. Instead, no value is added to the output from the register 61213.

Figure 83:
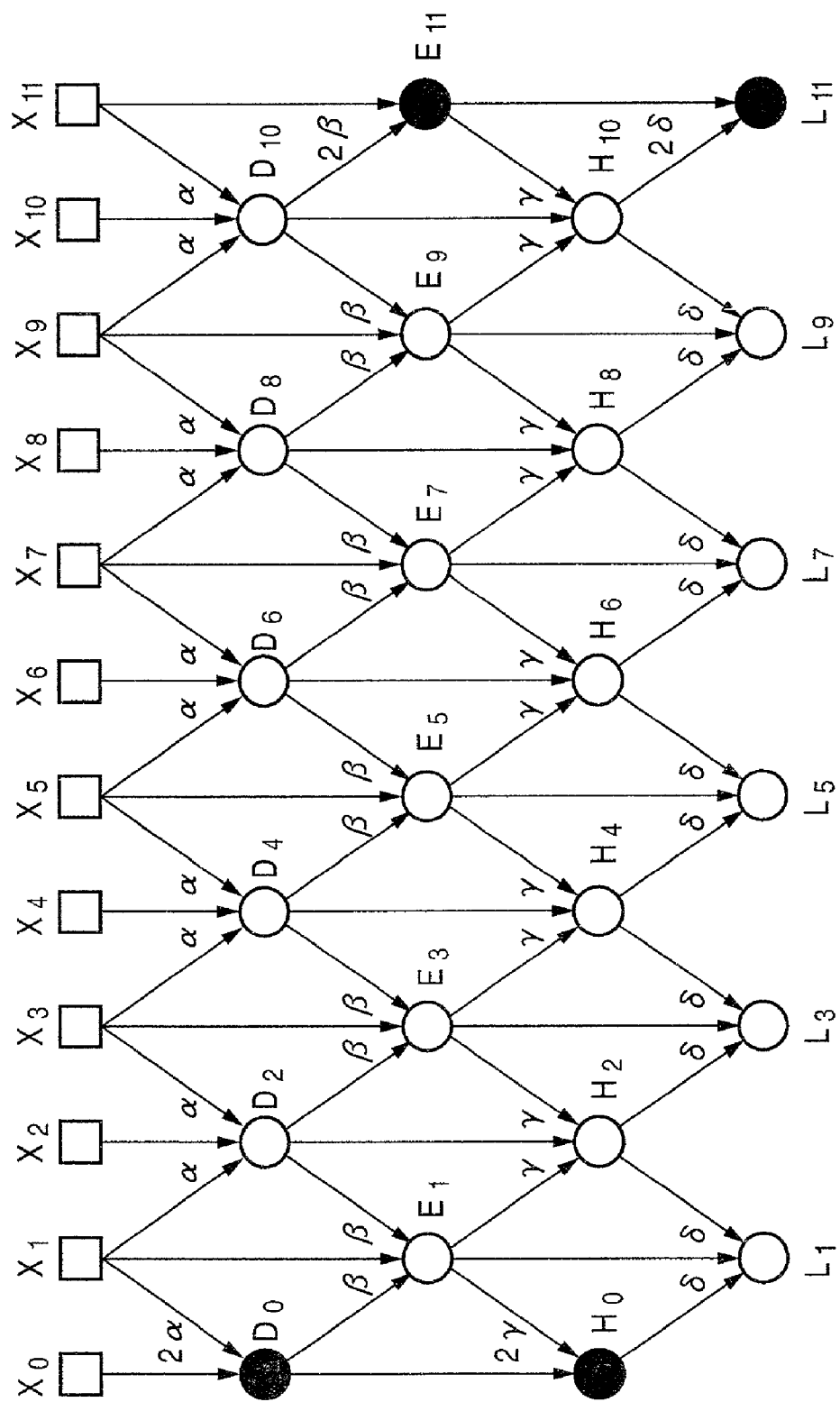
FIG. 83 shows boundary data in the lifting lattice structure.
Figure 84:
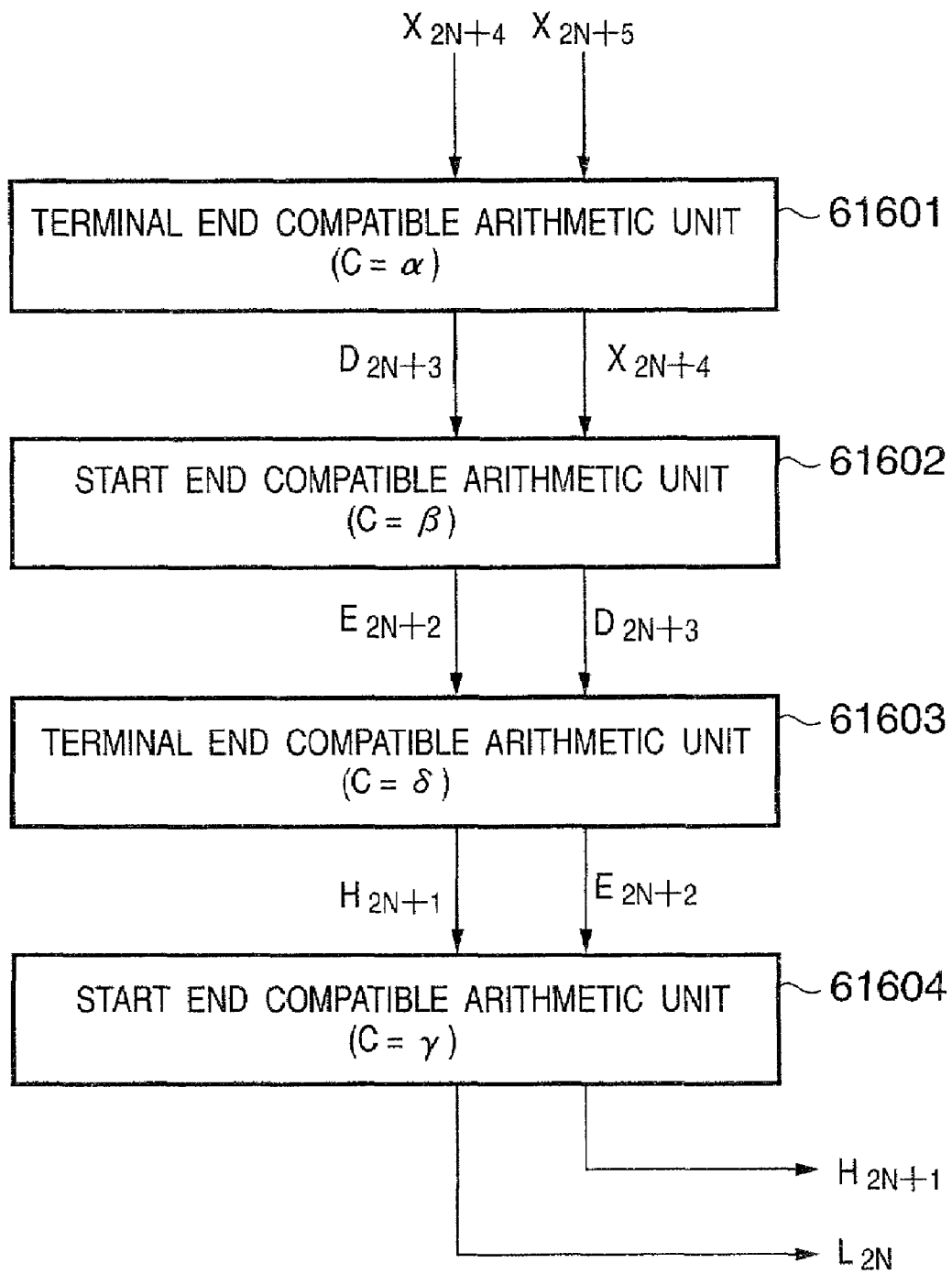
FIG. 84 is a diagram showing a DWT transformer that can process boundary data shown in FIG. 82.
Figure 85:
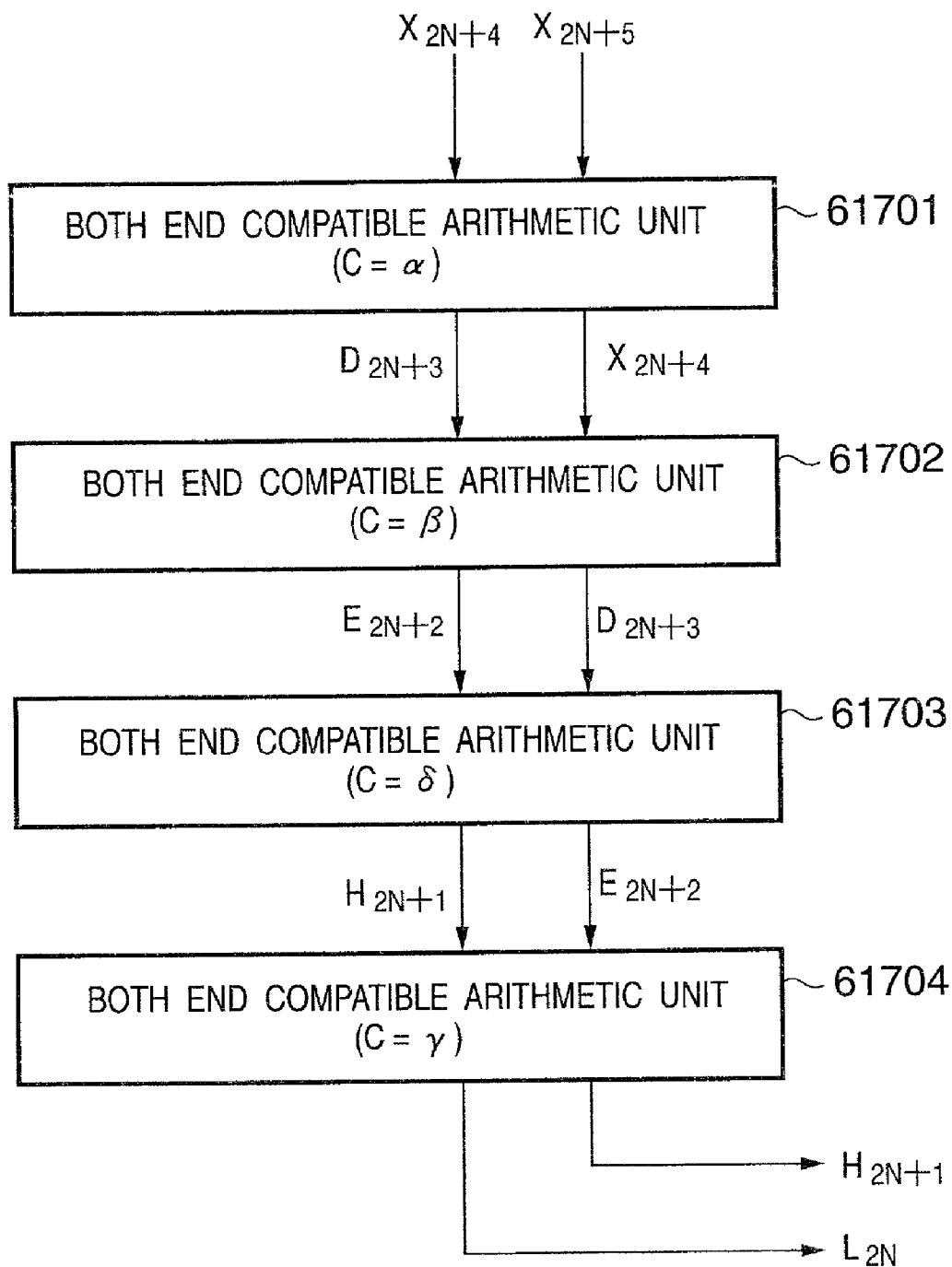
FIG. 85 is a diagram showing a DWT transformer that can process both boundary data shown in FIGS. 82 and 83.

An arrangement obtained by connecting the lifting arithmetic units, as shown in FIG. 84, can compute all lattice point data of the lifting lattice structure shown in FIG. 82. The lifting lattice structure is not limited to that shown in FIG. 82, but that shown in FIG. 83 is available. In order to process boundary data in FIG. 83, the start and terminal end compatible arithmetic units may be replaced in the arrangement in FIG. 84. However, in order to process both FIGS. 82 and 83, an arrangement obtained by cascading the both end compatible arithmetic units shown in FIG. 81, as shown in FIG. 85, is indispensable.

Figure 86:
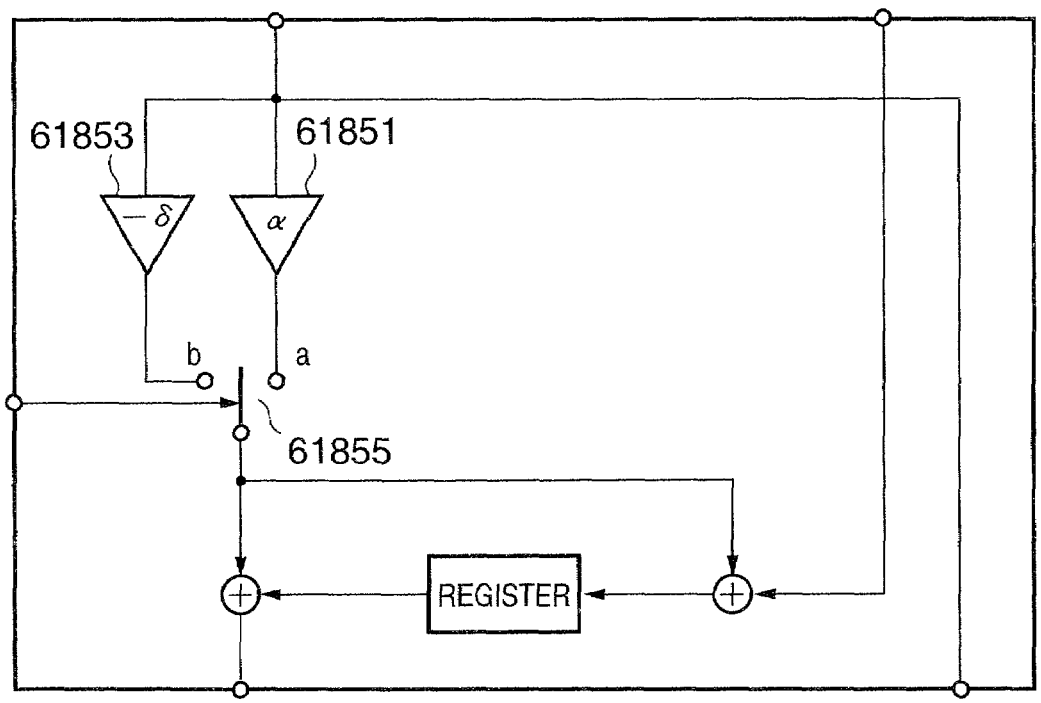
FIG. 86 is a diagram showing another arrangement of a lifting arithmetic unit capable of DWT/IDWT.

As the lifting arithmetic unit capable of both forward and inverse wavelet transformation processes, an arrangement shown in FIG. 86 may be used. This unit becomes a lifting arithmetic unit which can be used in inverse wavelet transformation by adding a multiplier 61853 to the arithmetic unit 6621 shown in FIG. 74, and controlling a selector 61855 to switch from the output from an originally equipped multiplier 61851 to that from the added multiplier 61853.

That is, when the lifting arithmetic unit switches the multiplier from the multiplier 61851 with the multiplication coefficient (lifting coefficient) $\alpha$ to the multiplier 61853 with the multiplication coefficient (lifting coefficient) $-\delta$, and the remaining lifting arithmetic units corresponding to arithmetic units 6622 to 6624 shown in FIG. 74 respectively switch their multipliers from those with $\beta$, $\gamma$, and $\delta$ to those with $-\gamma$, $-\beta$, and $-\alpha$, the arrangement in FIG. 74 becomes equivalent to that in FIG. 76, thus allowing inverse wavelet transformation.

Figure 75:
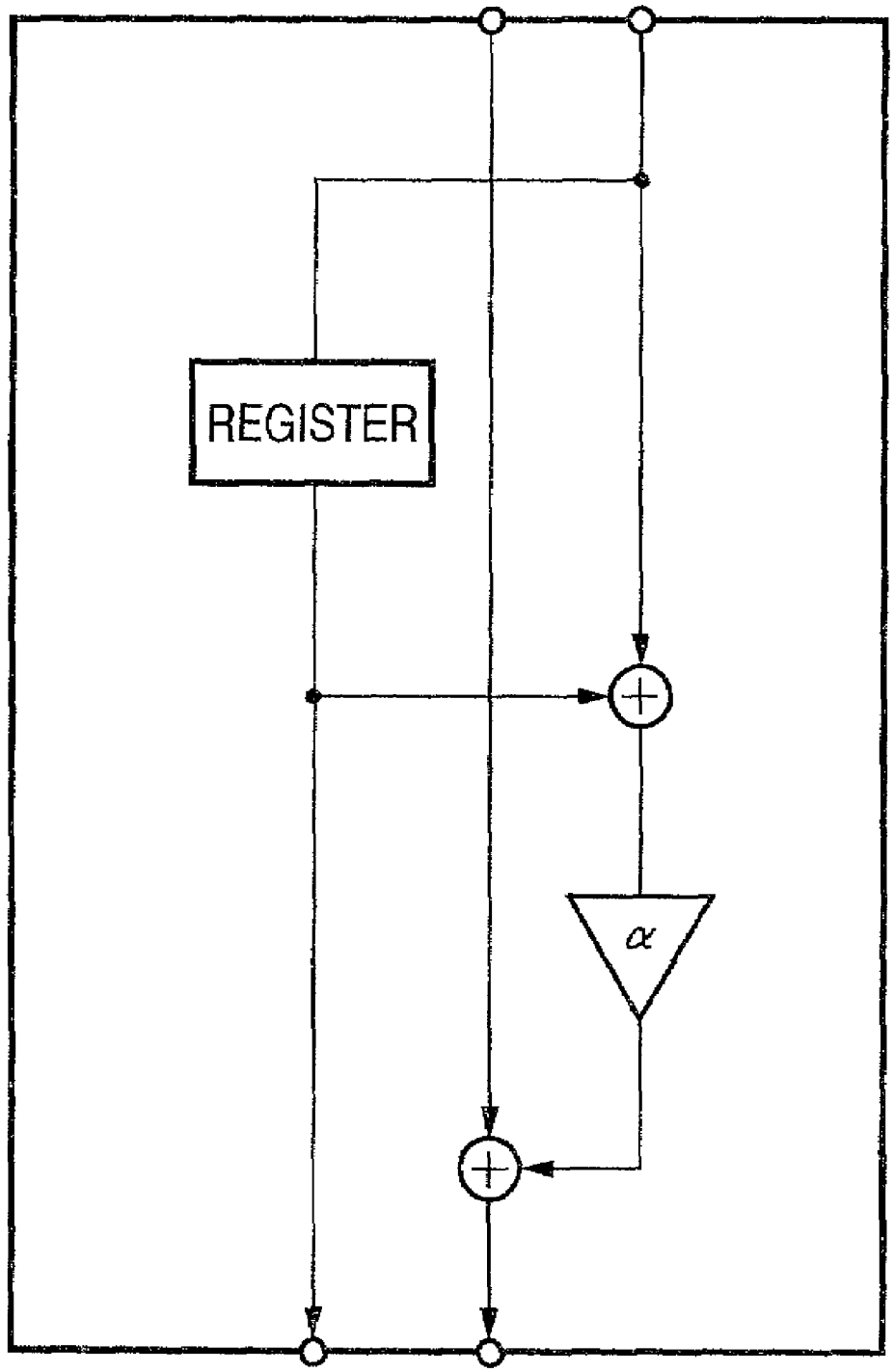
FIG. 75 is a diagram showing the arrangement of a lattice point data arithmetic unit.
Figure 87:
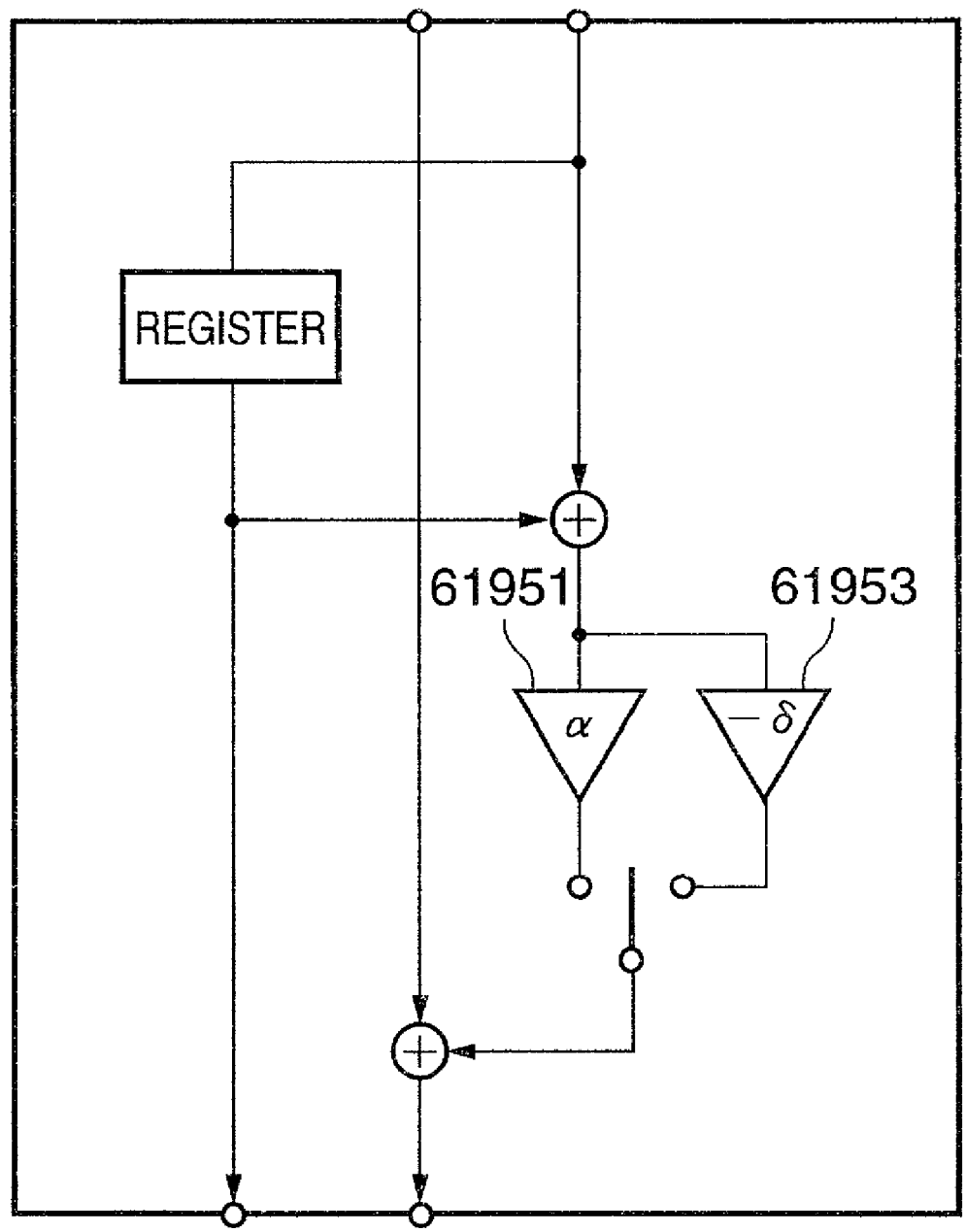
FIG. 87 is a diagram showing another arrangement of a lattice point arithmetic unit capable of DWT/IDWT.

The arrangement that uses two multipliers with different multiplication coefficients can be applied to the arithmetic unit shown in FIG. 75, and a lattice point data arithmetic unit shown in FIG. 87 is obtained. When this arithmetic unit is used, both forward and inverse wavelet transformation processes can be done.

As described above, according to the seventh embodiment, intermediate data generated during arithmetic operations of lattice point data on the lifting lattice structure are saved in registers, and arithmetic operations using these intermediate data can be made. Hence, wavelet transformation can be executed for pairs of pixels from the head of an input data stream. Also, a boundary process can be implemented by a simple circuit arrangement without expanding data at image boundaries.

[Eighth Embodiment]

The seventh embodiment has explained the 9×7 filter that uses data of 9 taps and 7 taps in arithmetic operations of low- and high-frequency wavelet transform coefficients.

The eighth embodiment will explain an arrangement when low- and high-frequency wavelet transform coefficients are computed using a 5×3 filter which uses lifting coefficients of only powers of 2, and consists of data of 5 taps and 3 taps.

Since the lifting coefficients are only powers of 2, no multipliers are required, and a multiplication of a lifting coefficient can be made by changing only the bit position.

A high-frequency wavelet transform coefficient H obtained from data of 3 taps, and a low-frequency wavelet transform coefficient L obtained from data of 5 taps are respectively given by:

$$H2n+1 = X2n+1 - 0.5X2n - 0.5X2n+2 \qquad (29)$$

$$L2n+2 = X2n+2 + 0.25H2n+1 + 0.25H2n+3 \qquad (30)$$

Figure 88:
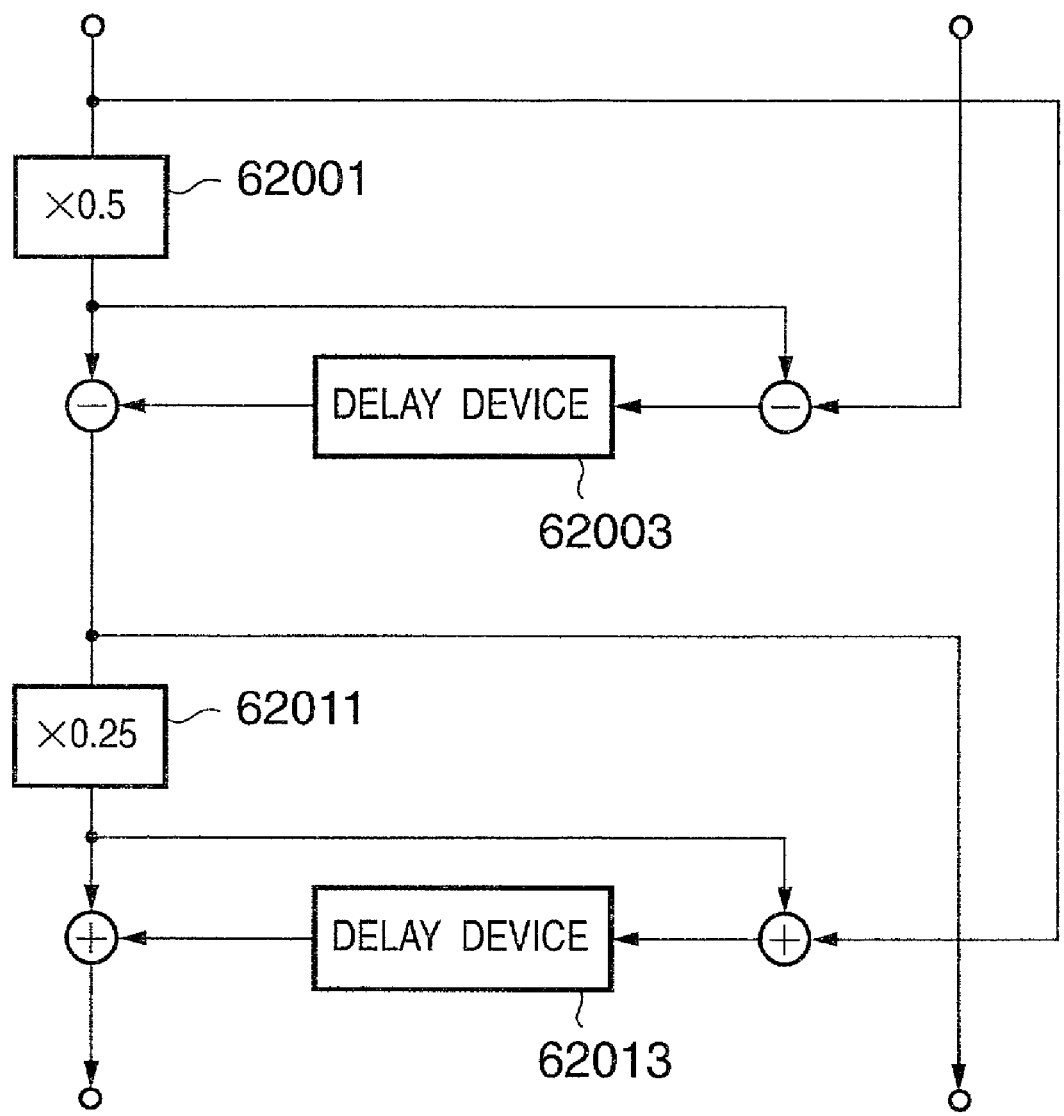
FIG. 88 is a diagram showing the arrangement of a DWT transformation processor of a 5×3 filter.

FIG. 88 shows the arrangement of the wavelet transformation processor. Referring to FIG. 88, reference numeral 62001 denotes a position converter corresponding to a process for multiplying a lifting coefficient=0.5, and an entity on hardware shifts wiring lines by 1 bit. In the diagram shown in FIG. 88, a buffer for storing intermediate data as data during arithmetic operation comprises a delay device 62003 so that this arrangement can be used in both horizontal and vertical processes. When the delay device 62003 comprises a single register, this arrangement serves as a horizontal wavelet transformation processor; when it comprises a line memory, this arrangement serves as a vertical wavelet transformation processor. Reference numeral 62011 denotes a position converter corresponding to a process for multiplying a lifting coefficient=0.25.

Inverse transformation is described by:

$$X2n+2 = L2n+2 - 0.25H2n+1 - 0.25H2n+3 \qquad (31)$$

$$X2n+1 = H2n+1 + 0.5X2n + 0.5X2n+2 \qquad (32)$$

Figure 89:
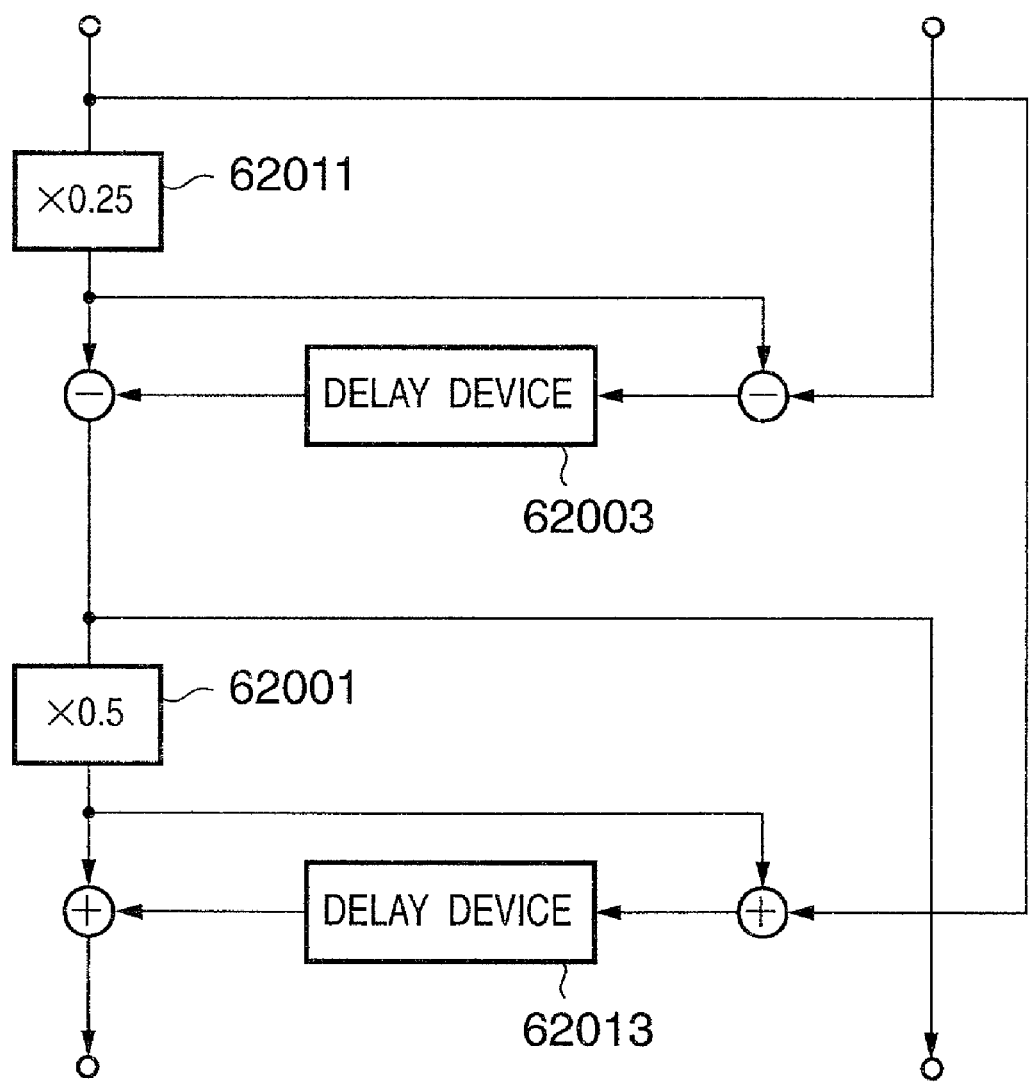
FIG. 89 is a diagram showing the arrangement of an IDWT transformation processor of a 5×3 filter.

FIG. 89 shows the arrangement of the wavelet transformation processor. This arrangement is substantially the same as that in FIG. 88, except that the lifting coefficient of the first stage is changed from 0.5 to 0.25, and that of the second stage is changed from 0.25 to 0.5.

Figure 90:
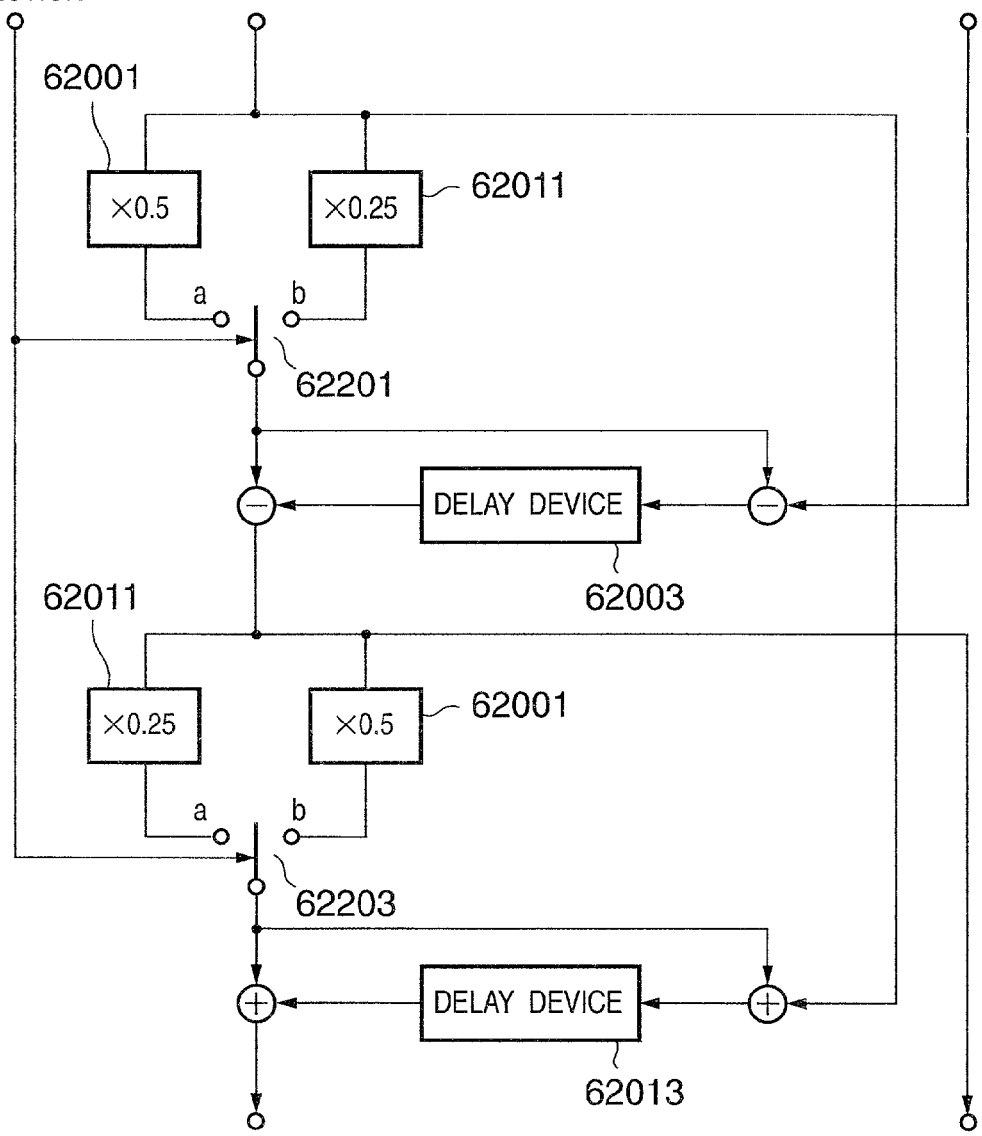
FIG. 90 is a diagram showing the arrangement of a DWT/IDWT transformation processor of a 5×3 filter.

FIG. 90 shows the arrangement capable of both forward and inverse wavelet transformation processes. Upon forward transformation, selectors 62201 and 62203 are controlled to select the inputs at terminals a. Upon inverse transformation, these selectors are controlled to select the inputs at terminals b.

When the forward and inverse wavelet transformation processes are executed using the above lifting coefficients, the connection states among the arithmetic units may be switched using selectors, as shown in FIG. 77. Alternatively, when the lifting coefficients are switched, as shown in FIG. 90, selectors for switching the values after multiplication of the lifting coefficients need only be added. Hence, since the number of selects added is smaller, and no adders/subtractors are required, the hardware scale can be reduced.

The aforementioned three different arrangements can be applied to FIG. 75 above. More specifically, an arrangement shown in FIG. 91 can implement forward wavelet transformation, and that in FIG. 92 can implement both forward and inverse wavelet transformation processes.

As described above, according to the eighth embodiment, when the lifting coefficients use only powers of 2, arithmetic operations using intermediate data generated during arithmetic operations of lattice point data on a lifting lattice structure are allowed using the delay devices, so that pairs of pixels from the head of an input data stream can undergo wavelet transformation.

[Ninth Embodiment]

The ninth embodiment will explain an arrangement which can easily switch between reversible (lossless) transformation and irreversible (lossy) transformation. Transformation/inverse transformation that can completely reclaim original data upon computing the inverse transforms of transform coefficients obtained by transformation is called reversible transformation. Since image data has a large data size, irreversible compression that ensures a high compression ratio is normally used. However, some images such as medial images used in diagnosis require reversible compression (reversible transformation) free from image deterioration.

In any of the arrangements shown in FIGS. 88 to 92, normal irreversible transformation can be changed to reversible transformation by adding a round processor.

The reason why reversible transformation can be implemented by adding a round process will be briefly explained below.

Normally, arithmetic errors are generated by real number calculations, and when such errors are accumulated, an original value cannot often be obtained after inverse transformation even if no quantization is done (free from any quantization errors).

However, when integer conversion is attained by the round process, the round process becomes an error source, and if the round process is uniquely defined, and is consistent in forward and inverse transformation processes, errors cancel each other. Hence, it is theoretically guaranteed that an original value is reclaimed after inverse transformation.

Figure 91:
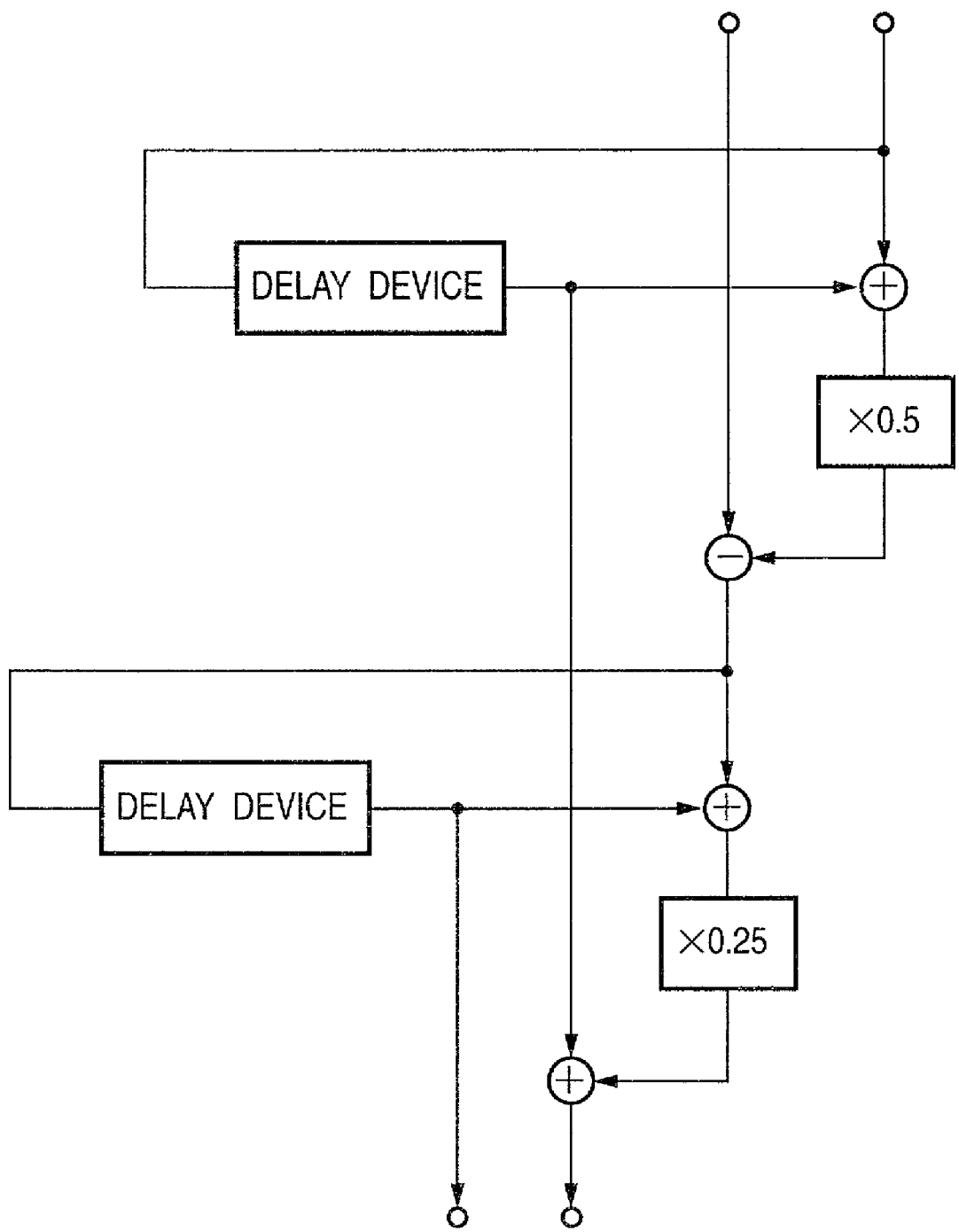
FIG. 91 is a diagram showing another arrangement of a DWT transformation processor of a 5×3 filter.
Figure 92:
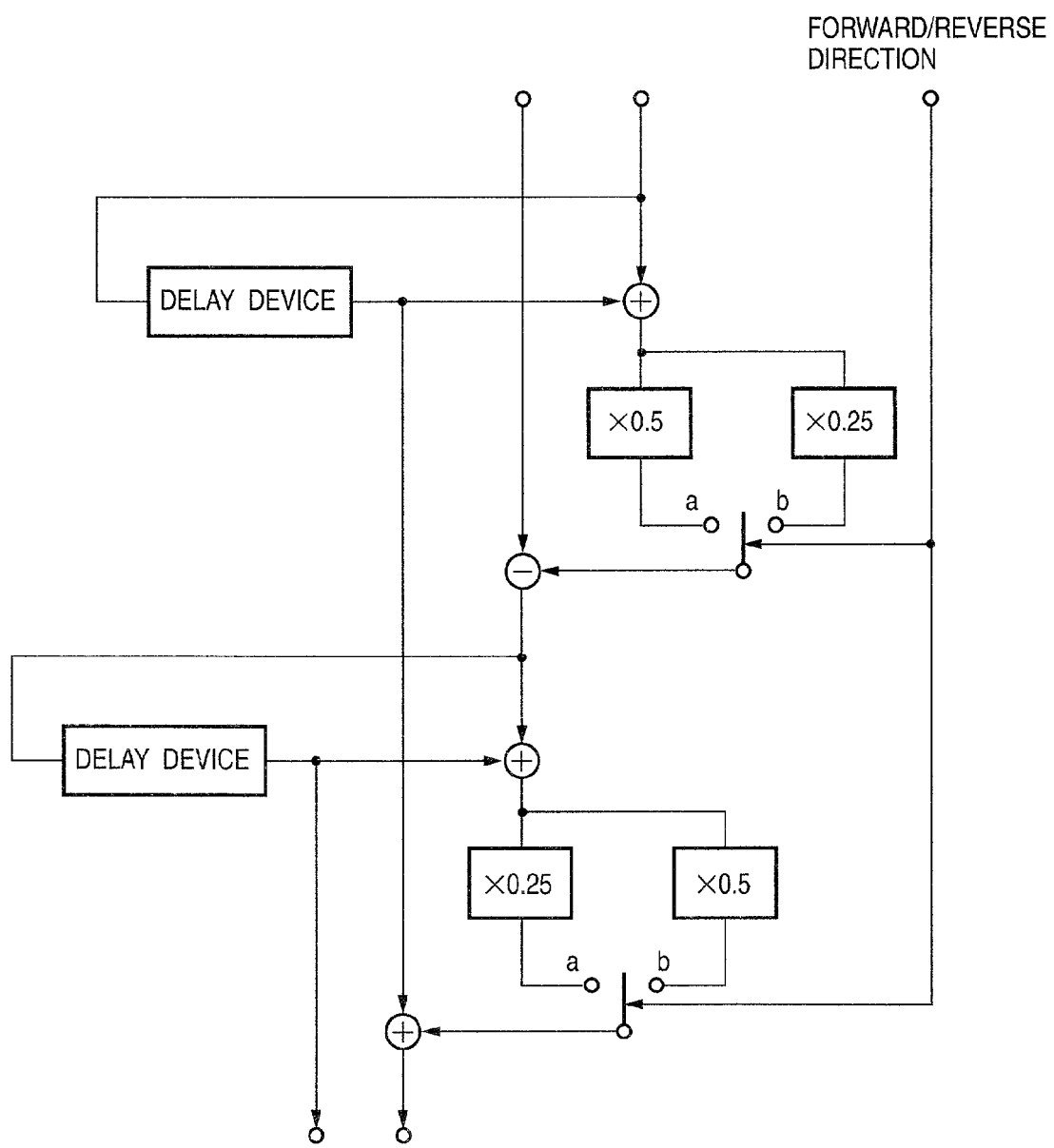
FIG. 92 is a diagram showing another arrangement of a DWT/IDWT transformation processor of a 5×3 filter.
Figure 93:
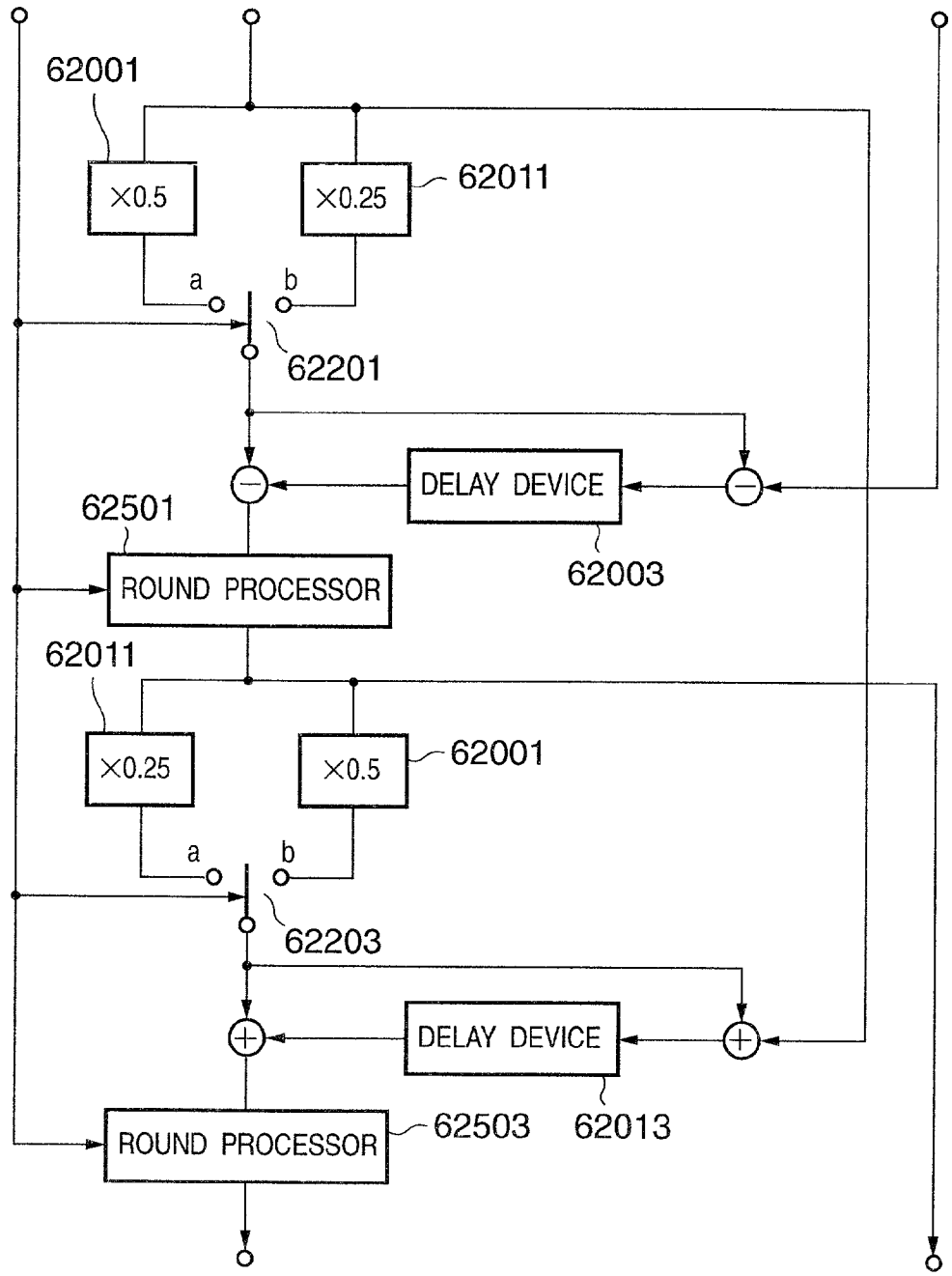
FIG. 93 is a diagram showing the arrangement of a reversible DWT/IDWT transformation processor of a 5×3 filter.
Figure 94:
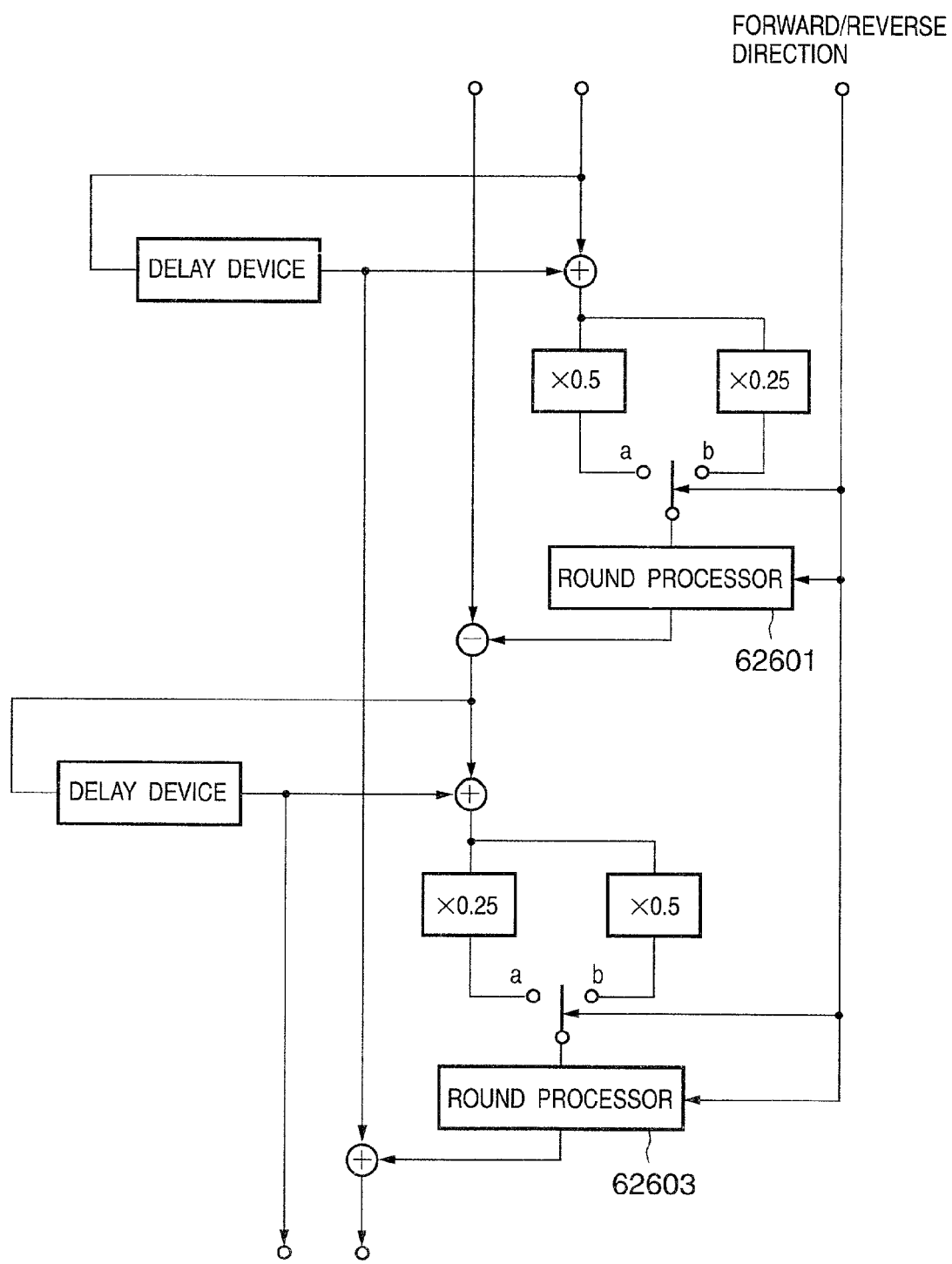
FIG. 94 is a diagram showing another arrangement of a reversible DWT/IDWT transformation processor of a 5×3 filter.

FIGS. 93 and 94 show arrangements obtained by adding round processors to FIGS. 90 and 91. Assuming that input data is integer data, the round process in this case is to convert a decimal part generated by an arithmetic process into an integer.

Various round process methods such as rounding off, rounding down, rounding up, and the like. In FIG. 93, round processors 62501 and 62503 of the first and second stages round off upon forward transformation. Upon inverse transformation, the round processor 62501 of the first stage rounds up 0.75 or more and rounds down 0.5 or less, and the round processor 62503 of the second stage rounds down.

In FIG. 94, a round processor 62601 of the first stage rounds down upon forward transformation, and rounds off upon inverse transformation. A round processor 62603 of the second stage rounds off upon forward transformation, and rounds down upon inverse transformation.

Therefore, since the respective round processors must switch their round process contents in correspondence with the types of transformation, they receive control signals for switching.

By adding an offset by an adder or subtractor before each round processor, the process of the round processor can be limited to rounding down. Note that rounding down is to drop the decimal part after the decimal point.

Figure 95:
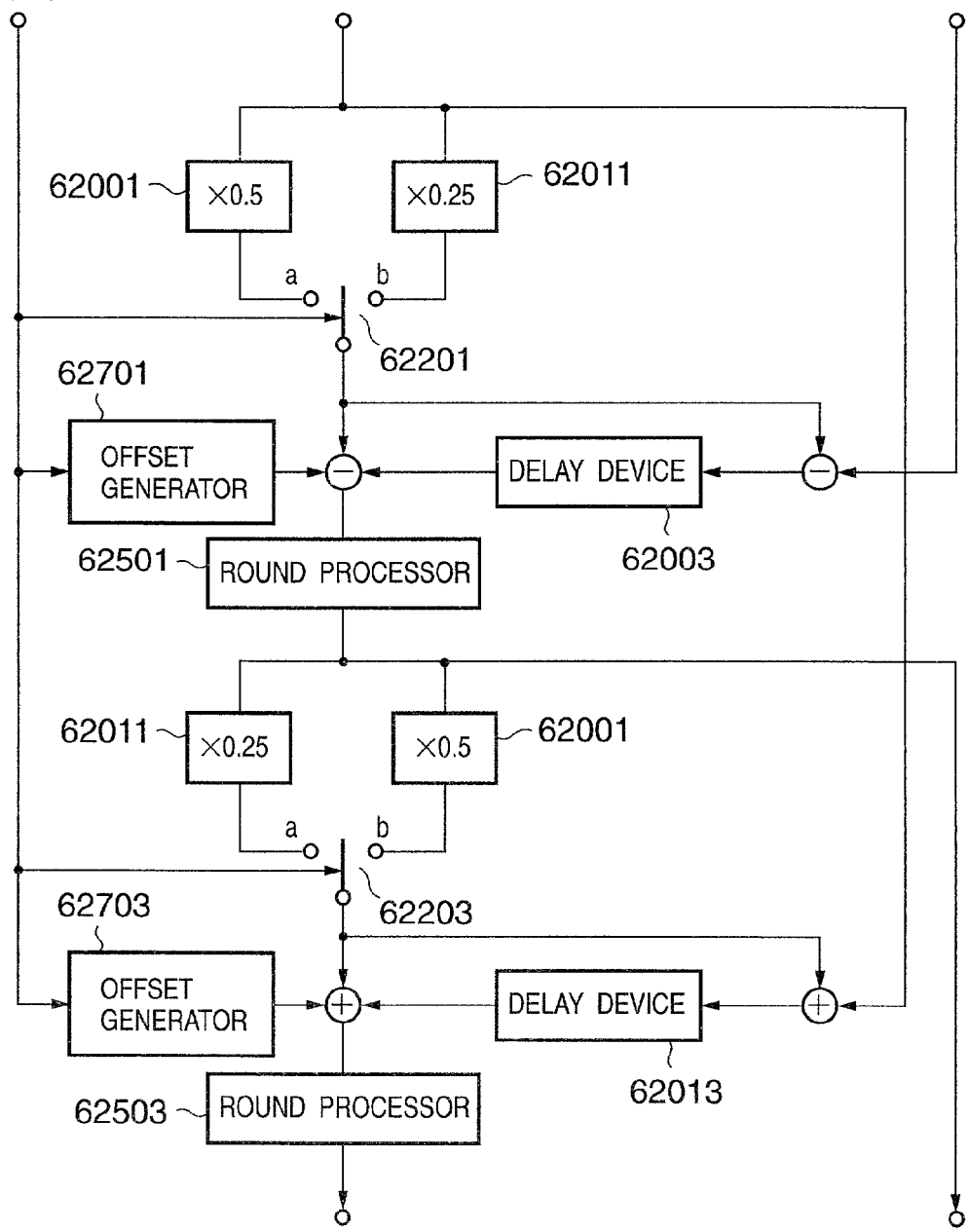
FIG. 95 is a diagram showing still another arrangement of a reversible DWT/IDWT transformation processor of a 5×3 filter.
Figure 96:
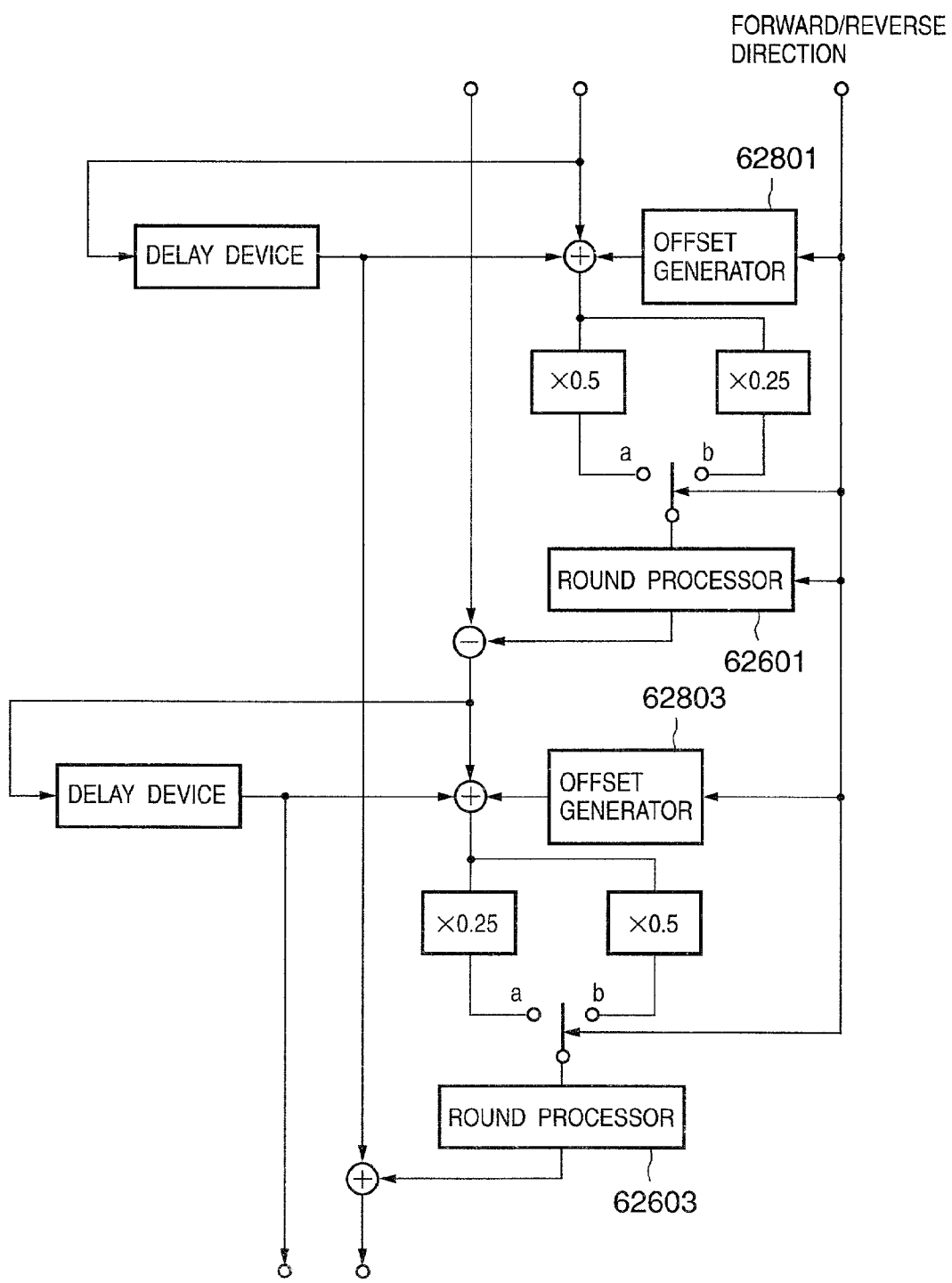
FIG. 96 is a diagram showing still another arrangement of a reversible DWT/IDWT transformation processor of a 5×3 filter.

FIGS. 95 and 96 show arrangements when an offset is added in FIGS. 93 and 94. Each round processor in FIGS. 95 and 96 only rounds down a decimal part. An offset value to be added varies depending on the type (forward/inverse) of transformation. In FIG. 95, an offset generator 62701 outputs 0.5 upon forward transformation, and 0.25 upon inverse transformation, and the other offset generator 62703 outputs 0.5 upon forward transformation, and 0 upon inverse transformation.

In FIG. 96, an offset generator 62801 outputs 0 upon forward transformation, and 2 upon inverse transformation, and the other offset generator 62803 outputs 2 upon forward transformation, and 0 upon inverse transformation.

Since these offset generators must switch offset values to be output in correspondence with the type of transformation, they receive control signals for switching. Conversely, since the round process only rounds down a decimal part, no control signals need be input. In this case, each round processor has no physical entity, and a wiring line of a decimal part is disconnected.

Based on the arrangements in FIGS. 95 and 96 in which the round process is attained by rounding down a decimal part, the following new arrangement is available.

When each round processor is replaced by an arrangement for masking a decimal part signal by a control signal, the round process can be ON/OFF-controlled by the control signal, thus allowing easy switching between reversible transformation and irreversible transformation. In this case, ON/OFF control of not only the round process but also an offset input to an adder/subtractor must be done.

Figure 97:
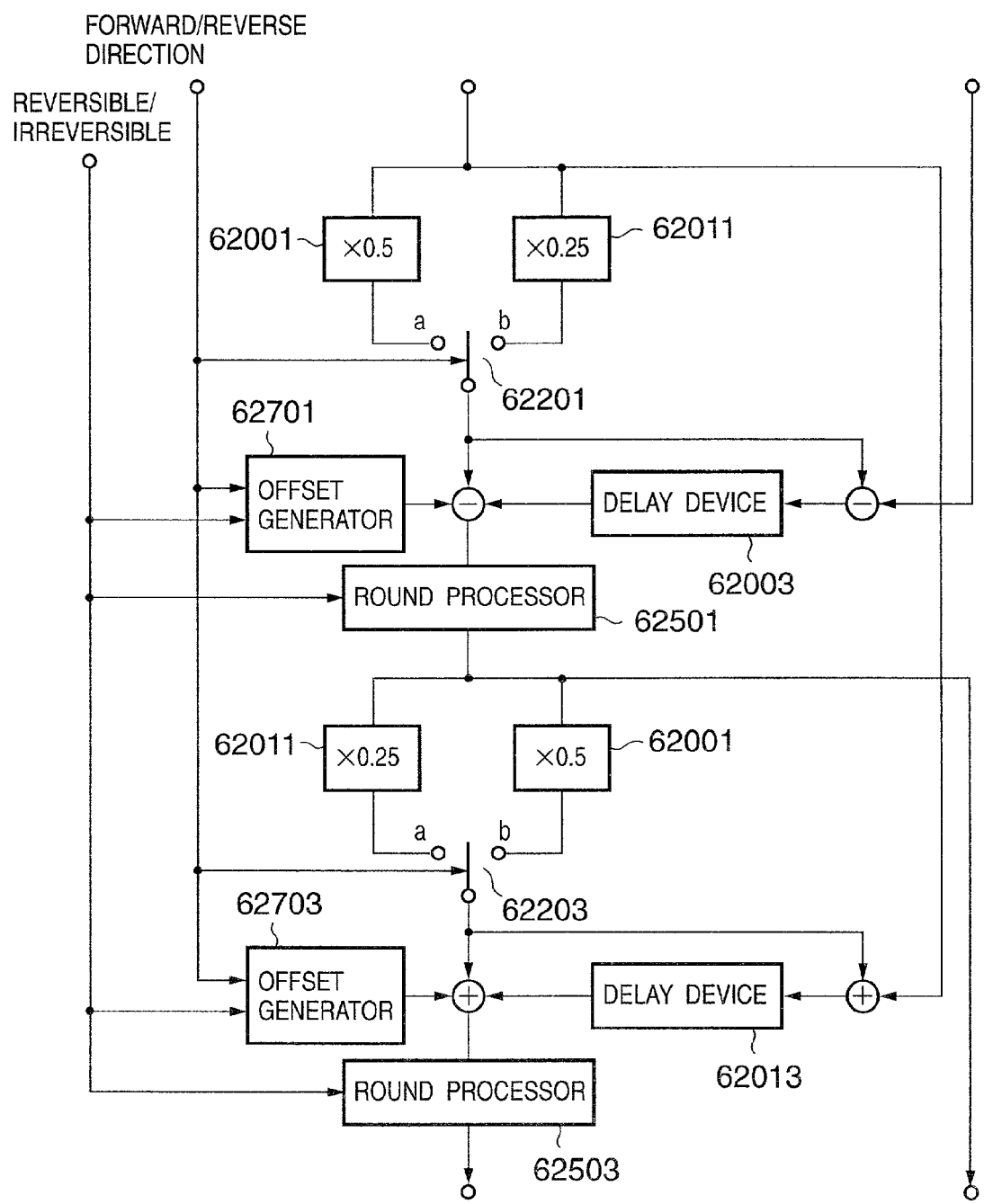
FIG. 97 is a diagram showing the arrangement of a reversible/irreversible DWT/IDWT transformation processor of a 5×3 filter.
Figure 98:
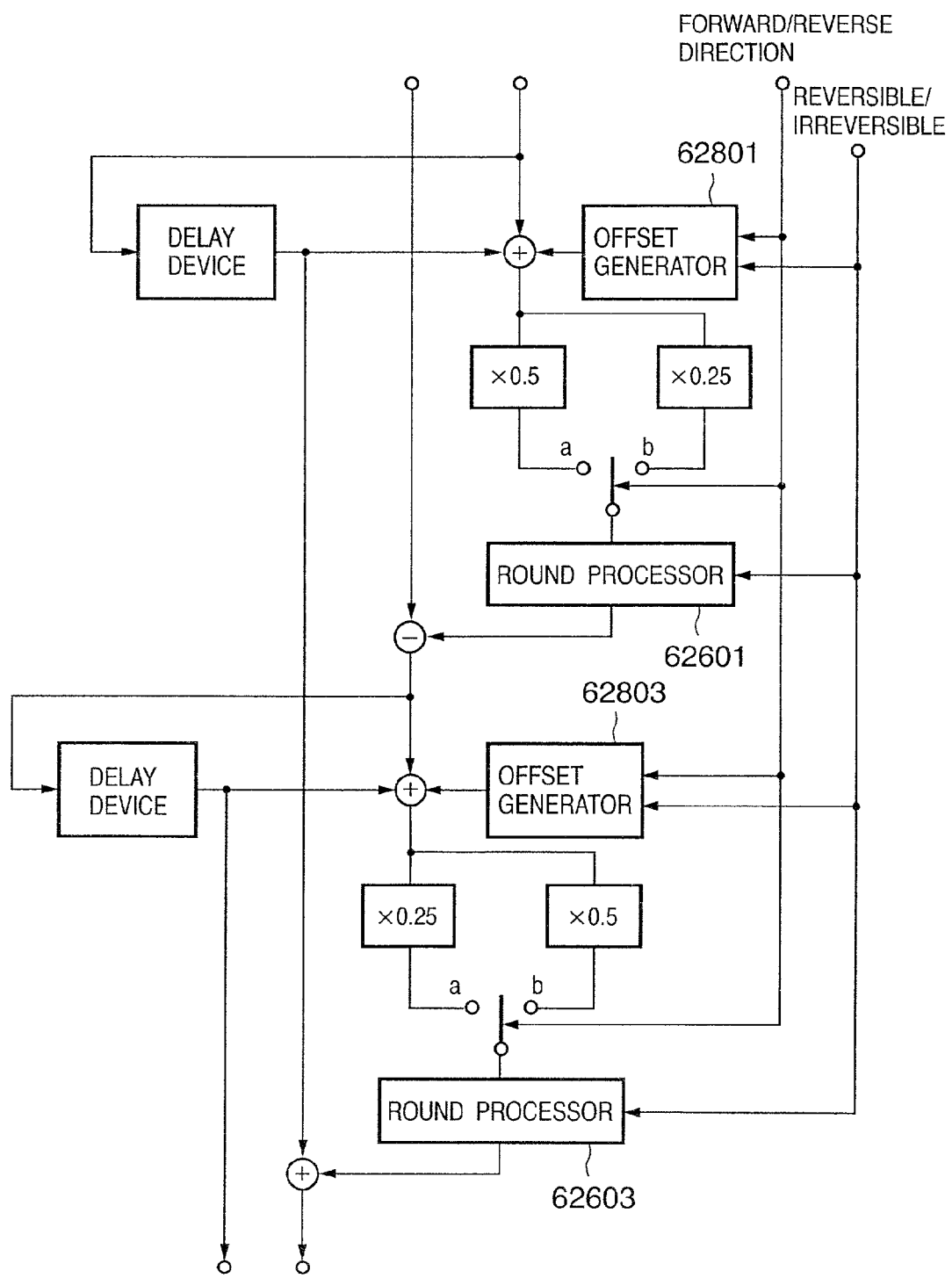
FIG. 98 is a diagram showing another arrangement of a reversible/irreversible DWT/IDWT transformation processor of a 5×3 filter.

In arrangements shown in FIGS. 97 and 98, a control signal for switching between reversible transformation and irreversible transformation is added to the arrangements shown in FIGS. 95 and 96. Upon reversible transformation, the control signal masks a decimal part in each round processor. Upon irreversible transformation, the control signal masks an offset output in each offset generator.

With the aforementioned control, a wavelet transformation apparatus which can easily switch between a reversible transformation process that adds an offset and rounds down a decimal part, and an irreversible transformation process that neither adds an offset nor rounds down a decimal part can be constructed.

In FIGS. 93 and 94, when a selector is added to pass the round processors in response to a control signal that switches reversible/irreversible transformation, the reversible/irreversible transformation can be switched.

As described above, according to the ninth embodiment, reversible and irreversible transformation processes in wavelet transformation can be easily switched by a simple circuit arrangement by adding round processors and offset generators to the arrangement explained in the eighth embodiment, in addition to the effects of the eighth embodiment.

[10th Embodiment]

In the above embodiments, one of horizontal and vertical wavelet transformation processes is done. The 10th embodiment will explain an arrangement that executes a two-dimensional wavelet transformation process in the horizontal and vertical directions.

FIG. 99 shows the arrangement of a two-dimensional wavelet transformation processor using the lifting or lattice point arithmetic units. The wavelet transformation processes a 5×3 filter using the aforementioned lifting coefficients of powers of 2.

Referring to FIG. 99, reference numeral 63101 denotes a terminal for inputting data upon forward transformation. Reference numeral 63103 denotes a terminal for inputting data upon inverse transformation. Reference numerals 63111 and 63113 denote arithmetic units for executing vertical wavelet transformation. Reference numerals 63121 and 63123 denote arithmetic units for executing horizontal wavelet transformation. Reference numerals 63115 and 63125 denote selectors for switching inputs to the arithmetic units in accordance with a transformation mode (forward or inverse transformation). Reference numerals 63117 and 63127 denote data rotation units for rotating data that have undergone horizontal or vertical wavelet transformation in units of 2×2 data, and supplying the rotated data to the wavelet transformation processor of the next stage. Reference numeral 63130 denotes a buffer for temporarily storing data that has undergone forward or inverse, two-dimensional wavelet transformation, and outputting them to, e.g., an external memory.

Upon forward transformation, data input from the terminal 63101 is supplied to the arithmetic unit 63111 via the selector 63115. The arithmetic unit 63111 and the next arithmetic unit 63113 execute vertical wavelet transformation, and send a transformation result to the data rotation unit 63117.

The two data rotation units 63117 and 63127 will be briefly explained below. Each of the data rotation units 63117 and 63127 has an arrangement shown in FIG. 100, rotates two parallelly input data in units of 2×2 data in two cycle periods, and sends the rotated data to the selector of the next stage.

Figure 100:
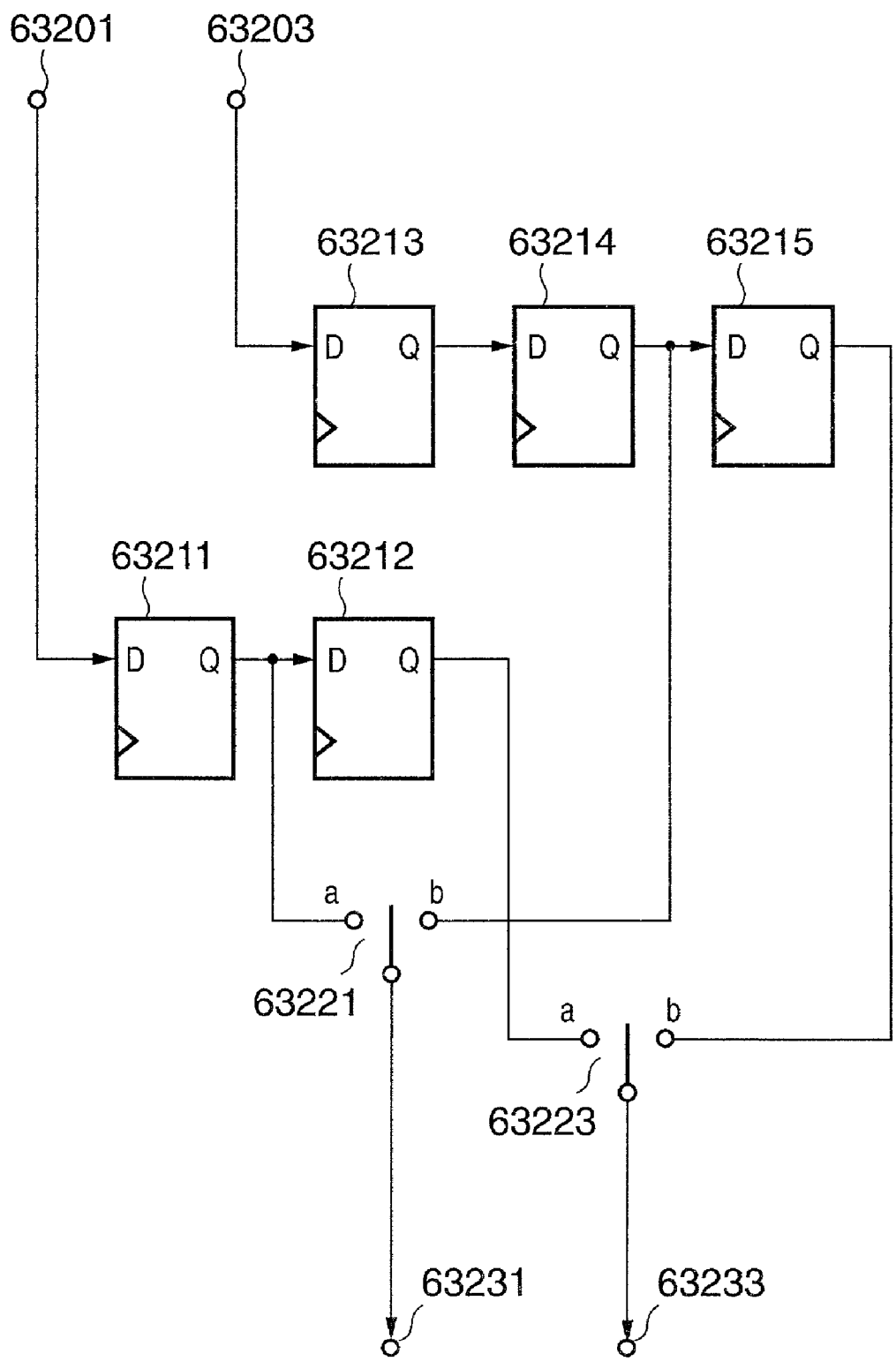
FIG. 100 is a diagram showing the arrangement of a data rotation unit.

In FIG. 100, data parallelly input from data input terminals 63201 and 63203 are stored in registers 63211 to 63215 while being shifted each cycle.

Data input to the terminal 63201 in the m-th and (m+1)-th cycles are output from terminals 63231 and 63233 via selectors 63221 and 63223 in the (m+2)-th cycle.

Data input to the terminal 63203 parallel to the aforementioned data are output from the terminals 63231 and 63233 via selectors 63221 and 63223 in the (m+3)-th cycle. 2×2 data input in the (m+2)-th and (m+3)-th cycles are output in the (m+4)-th and (m+5)-th cycles.

The data rotation unit 63117 converts two vertical samples of parallel data into two horizontal samples of parallel data, and the data rotation unit 63127 converts two horizontal samples of parallel data into two vertical samples of parallel data.

The two horizontal samples of parallel data converted by the data rotation unit 63117 are input to the arithmetic unit 63121 via the selector 63125. A horizontal wavelet transformer formed by the arithmetic units 63121 and 63123 computes the transforms of the input data, and outputs the transform results from the arithmetic unit 63123 to the buffer 63130.

Since the horizontal wavelet transformer alternately processes low- and high-frequency wavelet transform coefficients in the vertical direction, each delay device in the arithmetic units 63121 and 63123 comprises two registers.

Upon inverse transformation, data input from the terminal 63103 is supplied to the arithmetic unit 63121 via the selector 63125. The arithmetic units 63121 and 63123, which are set in the inverse wavelet transformation mode in response to a control signal (not shown), execute a horizontal inverse wavelet transformation process, and send the transform results to the data rotation unit 63127.

Upon inverse transformation, the horizontal wavelet transformer can process data in an order reverse to data to be output upon forward transformation. However, since this order is different from that of a normal process for each line, a supplemental description will be given.

The arrangement of the 10th embodiment processes two lines at a time. However, since two lines cannot simultaneously undergo parallel processes, two horizontal samples of each of two lines are alternately input to execute horizontal inverse wavelet transformation. Since each delay device in the arithmetic units comprises two registers, two lines can be alternately processed.

Of course, the inverse transformation processing results for two lines are alternately output. By converting these results into parallel data for two lines by the 2×2 data rotation unit 63127, data suitable for vertical wavelet transformation can be sent.

After that, when the selector 63115 selects and inputs the data to the arithmetic unit 63111, vertical inverse wavelet transformation is done, and the transform results are output from the arithmetic unit 63113 to the buffer 63130.

Upon executing processing using a 9×7 filter, the arithmetic units 63111 and 63113 in the vertical processor and the arithmetic units 63121 and 63123 in the horizontal processor can be replaced by the arrangement shown in FIG. 77.

As described above, according to the 10th embodiment, two lines each from the head of an input data stream can undergo two-dimensional wavelet transformation by a simple circuit arrangement using the arrangements described in the seventh to ninth embodiments.

Note that the hardware arrangement implemented by the present invention is mounted as a dedicated hardware board or chip in a terminal such as a personal computer, and a controller such as a CPU or the like of that terminal makes the aforementioned control or generates the aforementioned control signal to execute processes by the hardware arrangement.

Figure 101:
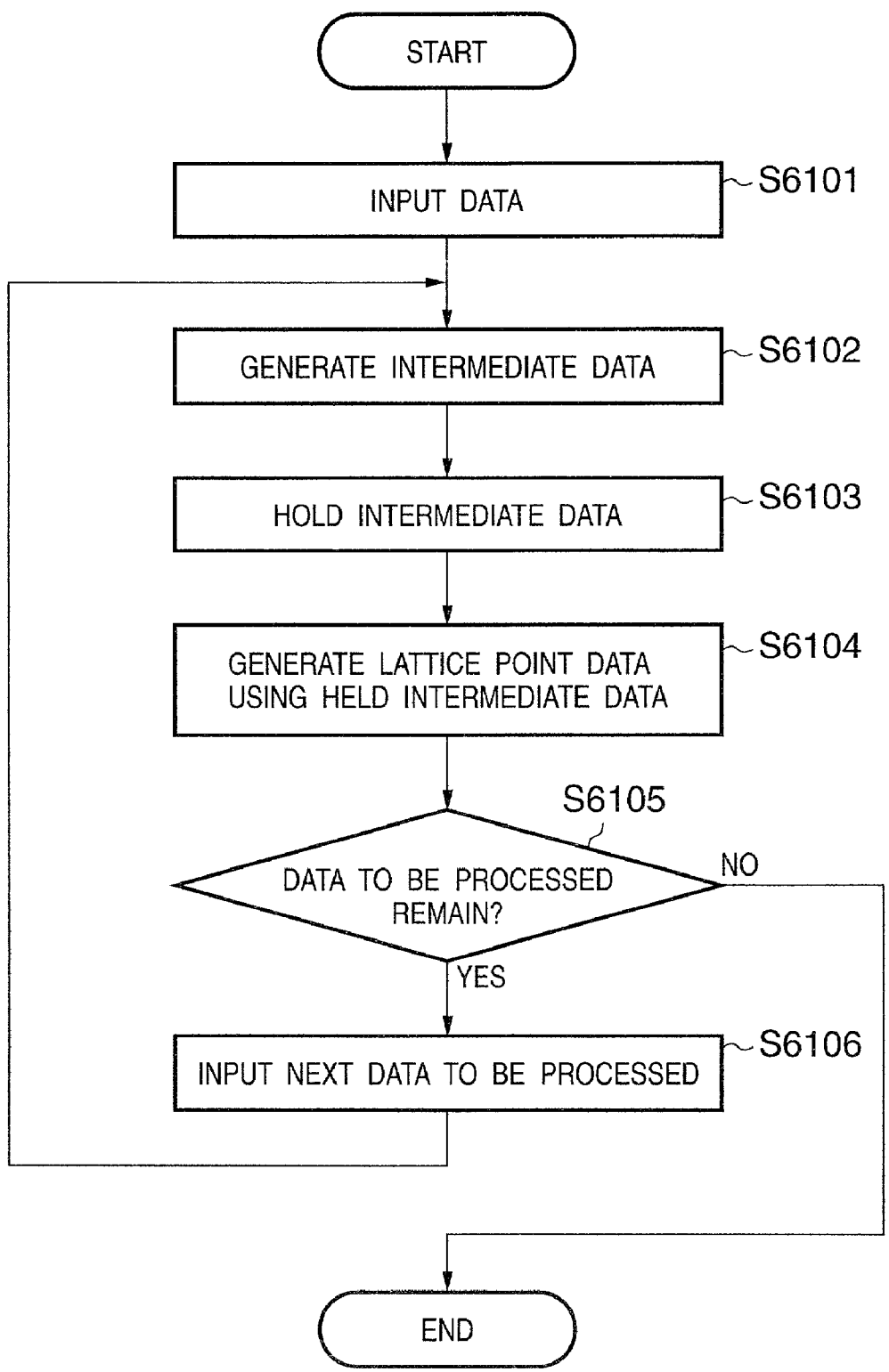
FIG. 101 is a flow chart showing the processing executed by the present invention.

Also, processes of the hardware arrangement implemented by the present invention may be stored as software in a storage device of a terminal, and the software may be executed by a CPU of the terminal. FIG. 101 shows processes to be executed by the software.

FIG. 101 is a flow chart showing the processes to be executed by the present invention.

In step S6101, data is input. In step S6102, intermediate data as data during arithmetic operations of lattice point data on the lifting lattice structure are generated using equations (17) to (20) above. In step S6103, the generated intermediate data are held. In step S6104, lattice point data are generated based on the held intermediate data using equations (21) to (24) above.

It is checked in step S6105 if data to be processed still remain. If data to be processed still remain (YES in step S6105), the flow advances to step S6106 to input the next data to be processed, and the flow returns to step S6102. On the other hand, if data to be processed does not remain (NO in step S6105), the processing ends.

Note that the present invention may be applied to either a system constituted by a plurality of devices (e.g., a host computer, an interface device, a reader, a printer, and the like), or an apparatus consisting of a single equipment (e.g., a copying machine, a facsimile apparatus, or the like).

The objects of the present invention are also achieved by supplying a storage medium, which records a program code of a software program that can implement the functions of the above-mentioned embodiments to the system or apparatus, and reading out and executing the program code stored in the storage medium by a computer (or a CPU or MPU) of the system or apparatus.

In this case, the program code itself read out from the storage medium implements the functions of the above-mentioned embodiments, and the storage medium which stores the program code constitutes the present invention.

As the storage medium for supplying the program code, for example, a floppy disk, hard disk, optical disk, magneto-optical disk, CD-ROM, CD-R/RW, DVD-ROM/RAM, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

According to the seventh to 10th embodiments of the present invention mentioned above, a filter processing apparatus that can efficiently execute wavelet transformation, its control method, a program, and a storage medium can be provided.

As many apparently widely different embodiments of the present invention can be made without departing from the spirit and scope thereof, it is to be understood that the invention is not limited to the specific embodiments thereof except as defined in the appended claims.

What is claimed is:

1. A filter processing apparatus, having a plurality of arithmetic units, each arithmetic unit comprising:
   data storage means for generating data obtained by delaying input data by a predetermined amount in accordance with a type of data;
   multiplication means for multiplying data, including the input data and the generated data, by a predetermined coefficient;
   addition means for adding a product obtained by said multiplication means to the input data; and
   switching means for switching data to be input to the arithmetic unit,
   wherein said switching means are switched by an external control signal to switch a filter process between forward and inverse filter processes, and said plurality of arithmetic units are cascaded to execute a filter process for data inputted to a first stage of arithmetic unit.

2. The apparatus according to claim 1, wherein the external control signal inverts a sign of the predetermined coefficient in accordance with switching of said switching means.

3. The apparatus according to claim 1, further comprising scaling means for executing a scaling process of a filter processing result of the arithmetic unit.

4. The apparatus according to claim 1, wherein the input data contains the externally input data, the sum obtained by said addition means, and the delayed data.

5. The apparatus according to claim 1, wherein the plurality of data further contains the externally input data and the delayed data.

6. The apparatus according to claim 1, wherein the data inputted to the first stage of arithmetic unit which comprises said cascaded arithmetic units is data that forms an image which is to undergo the forward filter process.

7. The apparatus according to claim 1, wherein the filter process includes discrete wavelet transformation.

8. The apparatus according to claim 1, wherein the filter process follows a method indicated by a lifting scheme.

9. The apparatus according to claim 1, wherein the predetermined coefficient is a multiplication coefficient in a lifting arithmetic operation.

10. A method of controlling a filter processing apparatus having a plurality of arithmetic units, comprising:
a method of controlling an arithmetic unit, comprising
a data storage step, of generating data obtained by delaying input data by a predetermined amount in accordance with a type of data;
a multiplication step, of multiplying data, including the input data and the generated data, by a predetermined coefficient,
an addition step, of adding a product obtained in said multiplication step to the input data; and
a switching step, of switching data to be input to the arithmetic unit;
wherein said switching steps are switched by a control mode signal to switch a filter process between forward and inverse filter processes, and said plurality of arithmetic units are cascaded to execute a filter process for data inputted to a first stage of said arithmetic unit.

11. The method according to claim 10, further comprising a scaling step, of executing a scaling process of a filter processing result of the arithmetic unit.

12. A storage medium that stores program code which makes a computer, that loads said program code, function as a filter processing apparatus having a plurality of arithmetic units, comprising:
program code which serves as an arithmetic unit and comprises
program code of a data storage step, of outputting, from predetermined storage means, data obtained by delaying input data by a predetermined amount in accordance with a type of data; and
program code of a multiplication step, of multiplying data, including the input data and the obtained data, by a predetermined coefficient,
program code of an addition step, of adding a product obtained in said the multiplication step to the input data; and
a switching step, of switching data to be input to the arithmetic unit,
wherein said switching steps are switched by an external control signal to switch a filter process between forward and inverse filter processes, and said plurality of arithmetic units are cascaded to execute a filter process for data inputted to a first stage of arithmetic unit.

13. A filter processing apparatus having a plurality of arithmetic units, each arithmetic unit comprising:
input means for inputting first and second data which have a spatially adjacent positional relationship in a data group including the first and second data;
storing means for storing the first data and then outputting third data, the second and third data having a spatially adjacent positional relationship in the data group, obtained by delaying the first data by a predetermined amount;
multiplication means for multiplying the first and third data by a predetermined coefficient; and
addition means for adding a product obtained by said multiplication means to the second data,
wherein the filter processing apparatus executes a filter processing for external input data using the plurality of arithmetic units.

14. A method of controlling a filter processing apparatus having a plurality of arithmetic units, comprising:
a method of controlling an arithmetic unit, comprising
an input step, of inputting first and second data which have a spatially adjacent positional relationship in a data group including the first and second data;
a storing step, of storing the first data and then outputting third data, the second and third data having a spatially adjacent positional relationship in the data group, obtained by delaying the first data by a predetermined amount;
a multiplication step, of multiplying the first and third data by a predetermined coefficient; and
an addition step, of adding a product of said multiplication step to the second data,
wherein the filter processing apparatus executes a filter processing for external input data using the plurality of arithmetic units.

15. A storage medium that stores program code which makes a computer, that loads said program code, function as a filter processing apparatus having a plurality of arithmetic units, comprising:
program code which serves as an arithmetic unit and comprises
program code of an input step, of inputting first and second data which have a spatially adjacent positional relationship in a data group including the first and second data;
program code of a storing step, of storing the first data and then outputting third data, the second and third data have spatially adjacent positional relationship in the data group, obtained by delaying the first data by a predetermined amount;
program code of a multiplication step, of multiplying the first and third data by a predetermined coefficient; and
program code of an addition step, of adding a product of said multiplication means to the second data,
wherein the filter processing apparatus executes a filter processing for external input data using the plurality of arithmetic units.

16. A filter processing apparatus having a plurality of arithmetic units, each arithmetic unit comprising:
input means for inputting first and second data which have a spatially adjacent positional relationship in a data group including the first and second data;
multiplication means for outputting third data obtained by multiplying the first data by a predetermined coefficient;
first addition means for outputting fourth data obtained by adding the third data to the second data;
storing means for outputting fifth data obtained by delaying the fourth data by a predetermined amount; and
second addition means for outputting sixth data obtained by adding the third data to the fifth data,
wherein the filter processing apparatus executes a filter processing for external input data using the plurality of arithmetic units.

17. A method of controlling a filter processing apparatus having a plurality of arithmetic units, comprising:
a method of controlling an arithmetic unit, comprising
an input step, of inputting first and second data which have a spatially adjacent positional relationship in a data group including the first and second data;

a multiplication step, of outputting third data obtained by multiplying the first data by a predetermined coefficient;

a first addition step, of outputting fourth data obtained by adding the third data to the second data;

a storing step, of outputting fifth data obtained by delaying the fourth data by a predetermined amount; and a second addition step, of outputting sixth data obtained by adding the third data to the fifth data, wherein the filter processing apparatus executes a filter processing for external input data using the plurality of arithmetic units.

18. A storage medium that stores program code which makes a computer, that loads said program code, function as a filter processing apparatus having a plurality of arithmetic units, comprising:

program code which serves as an arithmetic unit and comprises program code of an inputting step, of inputting first and second data which have a spatially adjacent positional relationship in a data group including the first and second data;

program code of a multiplication step, of outputting third data obtained by multiplying the first data by a predetermined coefficient;

program code of a first addition step, of outputting fourth data obtained by adding the third data to the second data;

program code of a storing step, of outputting fifth data obtained by delaying the fourth data by a predetermined amount; and second addition means for outputting sixth data obtained by adding the third data to the fifth data, wherein the filter processing apparatus executes a filter processing for external input data using the plurality of arithmetic units.

* * * * *

UNITED STATES PATENT AND TRADEMARK OFFICE
CERTIFICATE OF CORRECTION

PATENT NO. : 6,996,593 B2
APPLICATION NO. : 09/982916
DATED : February 7, 2006
INVENTOR(S) : Tadayoshi Nakayama It is certified that error appears in the above-identified patent and that said Letters Patent is hereby corrected as shown below:

COLUMN 1:

Line 46, "symbols" should read --symbol--.

COLUMN 4:

Line 2, "resulting" should read --resulting in--.

COLUMN 6:

Line 57, "Fourth stage) $X2n+1=D2n+1-\alpha \cdot X2n+2$" should read
--Fourth stage) $X2n+1=D2n+1-\alpha \cdot X2n-\alpha \cdot X2n+2$--.

COLUMN 9:

Line 53, "sowing" should read --showing--; and
Line 61, "filer" should read --filter--.

COLUMN 11:

Line 58, "a an" should read --as an--; and
Line 61, "a an" should read --as an--.

COLUMN 14:

Line 32, "compute" should read --computes--.

COLUMN 18:

Line 63, "$E0=X0+2\alpha \cdot D1$     (2a)" should read --$E0=X0+2\beta \cdot D1$     (2a)--.

COLUMN 19:

Line 63, "δare" should read --δ are--.

COLUMN 24:

Line 30, "Liming" should read --timing--.

UNITED STATES PATENT AND TRADEMARK OFFICE
CERTIFICATE OF CORRECTION

PATENT NO. : 6,996,593 B2
APPLICATION NO. : 09/982,916
DATED : February 7, 2006
INVENTOR(S) : Tadayoshi Nakayama It is certified that error appears in the above-identified patent and that said Letters Patent is hereby corrected as shown below:

COLUMN 30:

Line 28, "is, the" should read --is, ¶ the--.

COLUMN 33:

Line 62, "selects" should read --selectors--.

COLUMN 34:

Line 45, "methods" should read --methods are used--.

COLUMN 36:

Line 38, "2x2 data" should read --¶ 2x2 data--.

COLUMN 39:

Line 14, "coefficient," should read --coefficient;--;
Line 18, "unit;" should read --unit;--;
Line 36, "and" should be deleted; and
Line 41, "the" (first occurrence) should be deleted.

COLUMN 40:

Line 32, "have" should read --having a--.

Signed and Sealed this

Eighth Day of August, 2006

JON W. DUDAS
*Director of the United States Patent and Trademark Office*